(12) United States Patent
Mihara

(10) Patent No.: US 7,605,859 B2
(45) Date of Patent: Oct. 20, 2009

(54) IMAGE PICKUP DEVICE AND IMAGE PICKUP OPTICAL SYSTEM THAT OPTICALLY REDUCE COLOR FLARES

(75) Inventor: Shinichi Mihara, Machida (JP)

(73) Assignee: Olympus Corporation, Tokyo (JP)

(*) Notice: Subject to any disclaimer, the term of this patent is extended or adjusted under 35 U.S.C. 154(b) by 321 days.

(21) Appl. No.: 11/543,855

(22) Filed: Oct. 6, 2006

(65) Prior Publication Data
US 2007/0024725 A1 Feb. 1, 2007

Related U.S. Application Data

(62) Division of application No. 11/400,199, filed on Apr. 10, 2006, now Pat. No. 7,564,497, which is a division of application No. 09/612,597, filed on Jul. 7, 2000, now Pat. No. 7,057,659.

(30) Foreign Application Priority Data

| Jul. 8, 1999 | (JP) | ................................. 11-194400 |
| Nov. 16, 1999 | (JP) | ................................. 11-325685 |
| Jan. 26, 2000 | (JP) | ................................. 2000-021860 |
| Mar. 17, 2000 | (JP) | ................................. 2000-075690 |

(51) Int. Cl.
H04N 5/232 (2006.01)
H04N 5/225 (2006.01)

(52) U.S. Cl. ..................... 348/345; 348/335; 359/569

(58) Field of Classification Search ................ None
See application file for complete search history.

(56) References Cited

U.S. PATENT DOCUMENTS

| 4,811,086 | A | * | 3/1989 | Hieda ........................ 348/227.1 |
| 5,418,574 | A | * | 5/1995 | Miyabata et al. ............. 348/625 |
| 6,046,768 | A | * | 4/2000 | Kaneda et al. ............ 348/208.2 |
| 6,084,721 | A | * | 7/2000 | Terasawa ..................... 359/684 |
| 6,417,973 | B2 | | 7/2002 | Mihara et al. |
| 7,095,434 | B1 | | 8/2006 | Ikeda |
| 7,414,665 | B2 | | 8/2008 | Watanabe et al. |

* cited by examiner

FOREIGN PATENT DOCUMENTS

JP 03167534 A 7/1991

*Primary Examiner*—Huy T Nguyen
*Assistant Examiner*—Heather R Jones
(74) *Attorney, Agent, or Firm*—Pillsbury Winthrop Shaw Pittman, LLP

(57) ABSTRACT

An optical system enables images of a wide range of natural subjects to be well reproduced with their colors, and provides an image pickup system including, at least, an image pickup optical system, an electronic image pickup device having three or more different spectral characteristics to obtain a color image, and a controller for implementing signal processing or image processing on the basis of an output from the electronic image pickup device. The optical element that takes part in the determination of a focal length in said image pickup system includes an optical element making use of a refraction phenomenon alone. The 400-nm wavelength input/output ratio is 10% or less with respect to an input-output ratio for a 400-nm to 800-nm wavelength at which an output signal strength ratio with respect to an input quantity of light is highest when the input quantity of light is defined by the quantity of a light beam emanating from the same object point and entering the image pickup optical system and the output signal strength is defined by the strength of a signal produced from the controller in response to the light beam.

10 Claims, 53 Drawing Sheets

○ Primary colors filter

R:Red  G:Green  B:Blue

○ Complementary colors filter

C:Cyan  M:Magenta  Ye:Yellow
G:Green

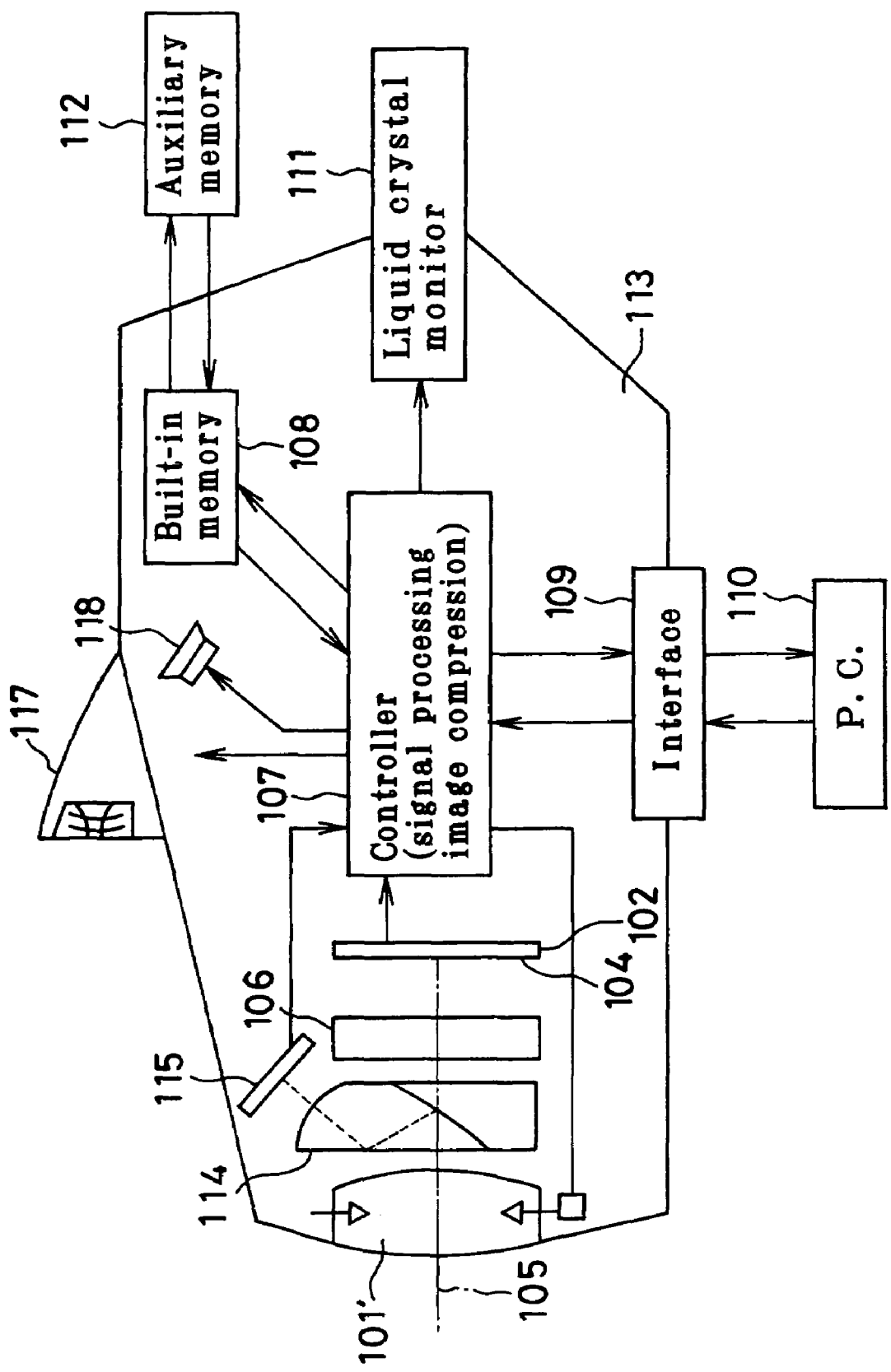

<-1EV  ±0EV +1EV  >+2EV

○ Primary colors filter

R:Red  G:Green  B:Blue

○ Complementary colors filter

C:Cyan  M:Magenta  Ye:Yellow
G:Green

FIG. 41
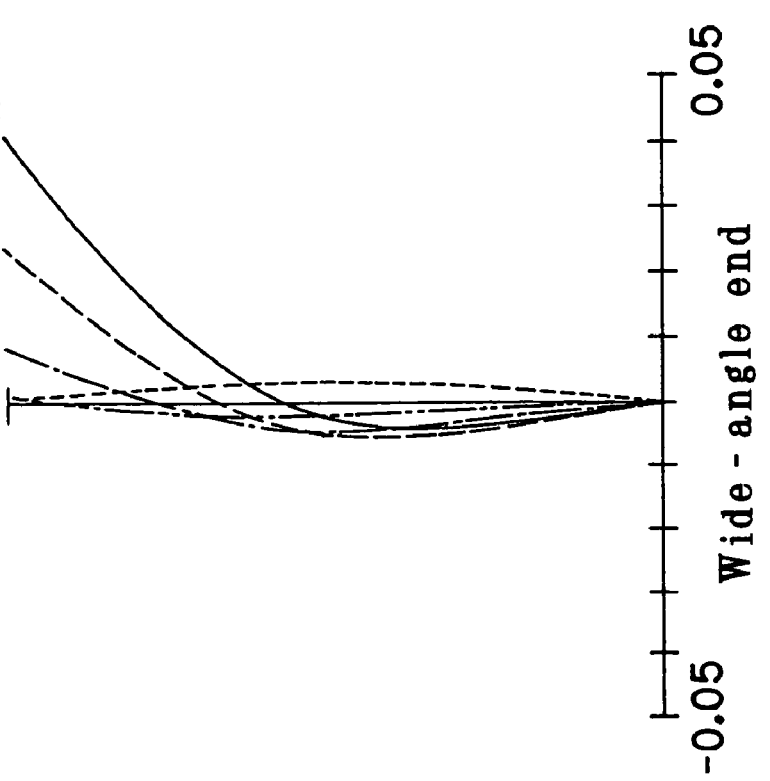
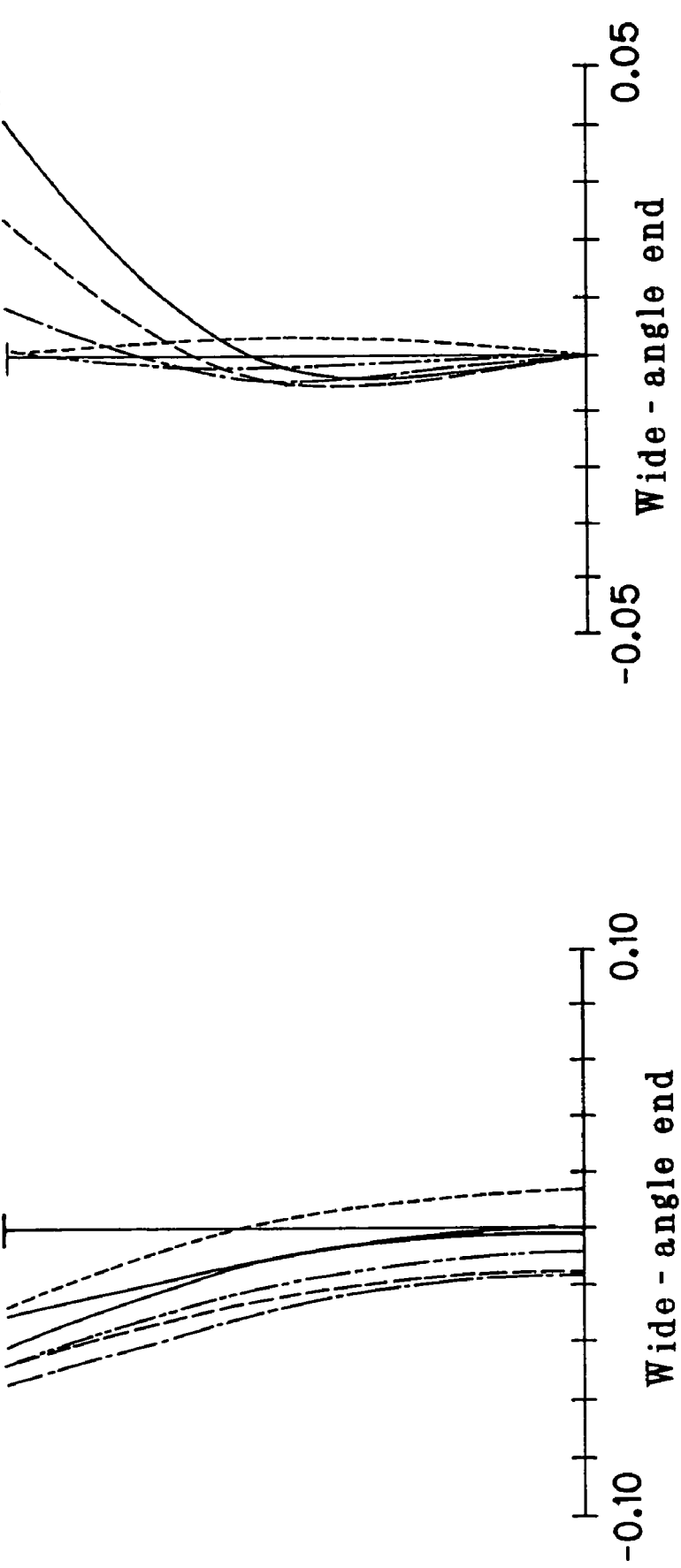

Amount of chromatic aberrations of magnification

R:Red   G:Green   B:Blue

○ Primary colors filter

C:Cyan   M:Magenta   Ye:Yellow
G:Green

Wavelength (nm)

○ Primary colors filter

R:Red  G:Green  B:Blue

○ Complementary colors filter

C:Cyan  M:Magenta  Ye:Yellow
G:Green

United States Patent document US 7,605,859 B2

IMAGE PICKUP DEVICE AND IMAGE PICKUP OPTICAL SYSTEM THAT OPTICALLY REDUCE COLOR FLARES

This application is a divisional of U.S. patent application Ser. No. 11/400,199, filed Apr. 10, 2006, now U.S. Pat. No. 7,564,497 which is a divisional of U.S. patent application Ser. No. 09/612,597, filed Jul. 7, 2000, now U.S. Pat. No. 7,057,659 which relies for priority upon Japanese Patent Application Nos. 11-194400, 11-325685, 2000-021860 and 2000-075690 filed in Japan on Jul. 8, 1999, Nov. 16, 1999, Jan. 26, 2000 and Mar. 17, 2000, respectively, the contents of all of which are incorporated herein by reference in their entireties.

BACKGROUND OF THE INVENTION

The present invention relates generally to an image pickup system and an image pickup optical system, and more particularly to an image pickup optical system and electronic image pickup system for forming a subject image on the image pickup surface of an electronic image pickup device such as a CCD, which comprises a plurality of pixels having at least three different spectral characteristics for obtaining a color image.

An electronic image pickup system using an electronic image pickup device is designed to have sensitivity even to wavelengths of 400 nm or less so as to ensure the quantity of light sensible to the electronic image pickup device. For instance, when the quantity of light sensed by the electronic image pickup device is small, gamma characteristics are often controlled to make the output from the photoelectric converters higher than the input thereto upon image reproduction. If, in this case, the spectral state of the subject is substantially constant, no particular problem arises. However, when the energy of wavelengths (e.g., h-line) in the vicinity of 400 nm is large with respect to that of, for instance, 450 nm or g-line, a problem arises; for instance, the blue tint of the reproduced image is more stressed than when actually seen by the human eyes. The reason is that while the sensitivity of the human eyes to the short wavelength side of the visible range is considerably low, yet such short wavelengths are reproduced by an electronic image pickup device in colors perceptible to the human eyes, because the sensitivity of the device to the short wavelength range is relatively high.

For recently developed digital cameras comprising a ever-larger number of pixels, on the other hand, it is required to achieve drastic size and cost reductions. With this, image pickup optical systems, too, are now requited to have ever-higher performance and ever-higher zooming and other functions with size and cost reductions. To achieve higher performance, it is required to increase the image-formation capability of a system all over the wavelength range to which the system is sensible. In the present disclosure, changes in the image-formation capability due to wavelengths are called chromatic aberrations. In general, the chromatic aberrations are corrected making use of the fact that the rate (dispersion) of change of the index of refraction with respect to wavelengths differ from material to material. For instance, an optical system having a positive focal length is designed to make correction for the chromatic aberrations by using a material of small dispersion for an optical element having positive refracting power and a material of large dispersion for an optical element having negative refracting power.

When the chromatic aberrations are corrected by using a combination of optical elements as mentioned above, it is required to take not only the chromatic aberrations but also the image-formation capability of the whole image pickup surface into consideration; for instance, it is required to increase the number of optical elements. For a zoom lens system of the type that the focal length of the system is varied by varying the separations between a plurality of lens groups comprising a lens group having a positive focal length and a lens group having a negative focal length, more complicated combinations of optical elements are required. In this case, when a refracting type of optical element (lens) is formed using a glass or plastic material, the index of refraction increases, sometimes drastically, as the wavelength changes from a long wavelength side to a short wavelength side, although depending on the material used.

FIG. 84 is illustrative of how the refractive index of two single lenses whose refracting power (the reciprocal of the focal length) becomes 1 at 550-nm wavelength change due to wavelengths. It is here noted that the single lenses are constructed using a typical vitreous material and a material called an ultra-low dispersion material. FIG. 85 is illustrative of the amount of displacements on the basis of 500 nm of the back focal position of an optical system constructed only of a general refraction type optical element, with wavelength as abscissa and displacement as ordinate. As can be seen from FIG. 84, the refracting type optical element shows a similar power change tendency with respect to wavelength, irrespective of whether it is formed of a normal material or an ultra-low dispersion material. Thus, the axial chromatic aberration of an image pickup optical system constructed of a refracting optical element formed of a material in the practical range has a V-shaped form as shown in FIG. 85; an image is formed on the same point at only two wavelengths with the chromatic aberrations becoming large both on the short and long wavelength sides. On the short wavelength side in particular, there is a large chromatic aberration change. To reduce such chromatic aberration changes, it is proposed to make use of fluorite and a special-purpose glass such as an ultra-low dispersion glass. However, this special glass, too, has such characteristics as shown in FIG. 84; in other words, it is difficult to reduce the chromatic aberration change on the short wavelength side to a sufficiently low level. When this glass is used for an electronic image pickup device, colors of short wavelengths appear together with chromatic aberrations, and so offer an unnatural "color running" problem.

In JP-A 10-170822 as one prior art, it is proposed to reduce the chromatic aberration changes on the short wavelength side by use of a diffractive optical element. According to this publication, chromatic aberrations due to the light used are corrected making use of the reciprocal dispersion of the diffractive optical element. In the diffractive optical element, however, diffracted light other than the used light appears in the form of unnecessary light, which is in turn responsible for ghosts and flares. In this publication, the wavelength range is limited, whereby the influence of unnecessary light on the diffractive optical element is reduced.

However, this unnecessary light reaches the image-formation plane discontinuously (independently) with respect to the used light. In the spectral wavelength characteristics, too, the unnecessary light is discontinuous with respect to the used light. In this publication, unnecessary light having no relation to normal image-formation (by the used light) is reduced making use of its wavelength characteristic difference. To obtain good images, it is thus required to largely reduce the strength of the image due to unnecessary light. For instance, a system hardly sensible to 420 nm is proposed.

However, 420 nm has an influence on the sense of sight of the human in general and the perception of colors in particular. In view of color reproduction, reducing this wavelength is tantamount to reducing a short wavelength component than required, leading to a possible impairment of natural color reproduction. Thus, a problem with the technique set forth in this publication is that it is difficult to make a reasonable tradeoff between high color reproducibility and flare removal, because the short wavelength range having an influence on the sense of sight of the human must be largely cut off so as to make the influence of unnecessary light unobtrusive.

With conventional design with weight given to an intermediate wavelength region in the visible range, it is impossible to make perfect correction for chromatic aberrations at both ends of the visible range, and those on the short wavelength side in particular. For this reason, when the image of a high-contrast subject is picked up, the colors of shorter wavelengths are not only stressed but also color flares of brighter blues occur at the boundary of light and shades.

For recently developed digital cameras comprising a ever-larger number of pixels, it is required to achieve drastic size and cost reductions, as already mentioned. With this, image pickup optical systems, too, are now required to have ever-higher performance and ever-higher zooming and other functions with size and cost reductions. Especially for increasing the number of pixels and achieving size reductions, it is required to decrease the area of each pixel of the image pickup device. This means that it is required to increase on a per-unit-area basis the quantity of light subjected to photoelectric conversion by an image pickup device. In other words, it is required to make the S/N ratio of the device favorable, maintain the sensitivity of the device to a dark subject and make short device exposure time To obtain a color image, a color filter having such a filter arrangement as shown in FIG. 2 or 3 is located in front of the image pickup device so as to achieve a photoelectric conversion device having at least three different wavelength characteristics. The filter shown in FIG. 2 is of the type called a primary color filter comprising red (R), green (G) and blue (B) filter elements. The respective wavelength characteristics of these filter elements are shown in FIG. 4. The filter shown in FIG. 3 is of the type called a complementary color filter comprising cyan (C), magenta (M), yellow ($Y_e$) and green (G) filter elements. The respective wavelength characteristics of these filter elements are shown in FIG. 5. When the complementary color filter is used as the filter, the filtered light is converted by a controller 4 to R, G and B according to the following processing:

for luminance signals $$Y = |G + M + Y_e + C| * \frac{1}{4}$$

for color signals $$R - Y = |(M + Y_e) - (G + C)|$$

$$B - Y = |(M + C) - (G + Y_e)|$$

Both the primary color filter and the complementary color filter are not sensible to the human eyes. In many cases, an IR cutoff filter having sensitivity to the image pickup device and capable of cutting off light of wavelengths of about 700 nm or greater (infrared cutoff filter) is located in an optical system. Most of IR cutoff filters are designed to cut off wavelengths of 700 nm or greater, and so their transmittance with respect to the vicinity of 600 nm becomes worse, as shown in FIG. 68.

With the primary color filter, it is easy to carry out processing for color reproduction. When the complementary color filter with an R, G and B conversion process is used, an output of R signals (for red development) is produced with respect to the input of the blue wavelength range (a wavelength of about 400 nm to about 430 nm in FIG. 11) upon conversion from the complementary color filter to R, G and B.

For this reason, the primary color filter is mainly used for digital cameras required to have a large number of pixels and high image quality. Sometimes, the complementary color filter is used for an image pickup system less likely to produce chromatic aberrations. The "image pickup system less likely to produce chromatic aberrations" is understood to include an image pickup system wherein the number of pixels is so reduced that the aberrations of a phototaking lens have little or no influence on image quality, and an image pickup system with inherently reduced chromatic aberrations (this may be achieved by increasing the F-number of the system, decreasing the magnification of a zoom lens in the case of a zoom lens system, using a vitreous material (e.g., fluorite) that costs much or is of poor productivity, increasing the number of lens elements, and increasing the length of the system.

With the primary color filter, it is easy to carry out processing for color reproduction. However, the quantity of light entering each pixel is small (because the wavelength range of light entering each pixel is narrow). In the primary color filter, only G has sensitivity to green (light in the wavelength range of about 500 nm to about 550 nm) that is a significant determinant for image resolution. For this reason, the primary color filter is designed in such a way that the ratio of R, G and B pixels is set at 1:2:1, thereby regulating the ratio of pixels having a significant influence on the determination of image resolution to 50%.

When such a primary color filter is used, the quantity of light entering each pixel is small, and so problems arise in connection with S/N and exposure time as pixel size becomes small. The pixels having an influence on image resolution are barely 50%; there is a problem that it is impossible to take full advantage of the large number of pixels, thereby achieving high image quality.

SUMMARY OF THE INVENTION

In view of such problems as explained with reference to the prior art, a primary object of the present invention is to provide an optical system which enables the images of a wide range of natural subjects to be well reproduced with their colors although its construction is simplified. In other words, a) one particular object of the invention is to reduce or eliminate the contribution of wavelengths—which are virtually insignificant to the human sense of sight—to the determination of the colors of a reproduced image, and b) another particular object of the invention is to reduce or eliminate a reproduced image deterioration due to wavelengths which are virtually insignificant to the human sense of sight.

Yet another object of the invention is to provide an electronic image pickup system and an image pickup optical system which, albeit being simple in construction, enable the images of a wide range of natural subjects to be well reproduced with reduced color flares.

A further object of the invention is to provide an optical system which, albeit being simple in construction, enables a satisfactory image to be reproduced with its colors. A further object of the invention is to provide an optical system suitable for reducing the cost and size of a digital camera, yet with an increased number of pixels.

According to the first embodiment of the first aspect of the present invention, there is provided an image pickup system comprising, at least, an image pickup optical system, an electronic image pickup device having three or more different spectral characteristics to obtain a color image and a controller for implementing signal processing or image processing on the basis of an output from the electronic image pickup device, characterized in that:

an optical element that takes part in the determination of a focal length in said image pickup system is made up of an optical element making use of a refraction phenomenon alone, and a 400-nm wavelength input/output ratio is 10% or less with respect to an input/output ratio for a 400-nm to 700-nm wavelength at which an output signal strength ratio with respect to an input quantity of light is highest with the proviso that said input quantity of light is defined by the quantity of a light beam emanating from the same object point and entering said image pickup optical system and said output signal strength is defined by the strength of a signal produced from said controller in response to said light beam.

The action of the image pickup system according to the first embodiment of the first aspect of the present invention is explained. For the optical element that takes part in the determination of a focal length in the image pickup optical system, an optical element making use of the refraction phenomenon alone is used. When a diffractive optical element is used as the optical element taking part in the determination of a focal length, effective-order chromatic aberrations may be well corrected. However, unnecessary light forms different images on both the long and short wavelength sides of a wavelength range virtually sensitive to the human eyesight, resulting in overall drastic image deterioration. Thus, the image pickup optical system uses a refracting element alone; that is, the image pickup optical system does not use any diffractive optical element, so that the nature of the image in the wavelength range of interest can be gradually changed. Note that a system comprising an optical element that harnesses a plurality of light beams produced by a diffraction phenomenon, for instance, a low-pass filter, too, is embraced in the first embodiment of the first aspect of the invention.

In the first embodiment of the first aspect of the present invention, the 400-nm input/output ratio should be 10% or less with the respect to the input/output ratio for the 400-nm to 700-nm wavelength at which the output signal strength ratio with respect to the input quantity of light is highest. The occupation of wavelengths of 400 nm or less in the spectral luminous efficiency is about 0.01%, and the occupation in the spectral luminous efficiency of a color matching function z for a 10° visual field in the CIE 1964 XYZ colorimetric system is about 0.6%. On the other hand, the occupation in the spectral luminous efficiency of a color matching function x for a 10° visual field in the CIE 1964 XYZ calorimetric system is about 0.1%. Unless this point is satisfied, there is an alienation between the colors of an object as directly observed and the colors of an object image reproduced through an image pickup device, especially when the energy of wavelengths of 400 nm or less is relatively higher than that of the rest. This alienation makes the colors of the reproduced image unnatural. More preferably, the 400-nm wavelength input/output ratio should be 5% or less, and especially 2% or less. For color vs. wavelength relations and the color matching functions for the 100 visual field in the CIE 1964 XYZ calorimetric system, for instance, see Mitsuo Ikeda, "THE FOUNDATIONS OF COLOR ENGINEERING", ASAKURA SHOTEN.

It is noted that the "electronic image pickup device having three or more different spectral characteristics to obtain a color image" used with reference to the first image pickup system according to the first aspect of the present invention refers to an imaging device designed for the purpose of forming images, and so does not refer to an imaging device designed for AE (automatic exposure) or AF (automatic focusing), which device provides no direct image formation. In this context, it is understood that any imaging device for the purpose of forming images, with AE or AF functions added thereto, is embraced in the first image pickup system.

According to the second embodiment of the first aspect of the present invention, the first image pickup system is further characterized in that a 420-nm wavelength input/output ratio is 10% or greater with respect to the input/output ratio for the 400-nm to 700-nm wavelength at which the output signal strength ratio with respect to the input quantity of light is highest.

The action of the second image pickup system according to the first aspect of the present invention is now explained. The occupation of wavelengths in the vicinity of 420 nm (415 nm to 425 nm) in the spectral luminous efficiency is about 1.6%, and the occupation in the spectral luminous efficiency of the color matching function z for the 10° visual field in the CIE 1964 XYZ calorimetric system is about 12%. On the other hand, the occupation in the spectral luminous efficiency of the color matching function x for the 100 visual field in the CIE 1964 XYZ calorimetric system is about 2.6%. Although this wavelength range has a limited influence on the spectral luminous efficiency, yet it has a sufficient influence on the determinant of tints. When the 420-nm input/output ratio is less than 10%, it is impossible to achieve any reproduction of natural colors. The 420-nm input/output ratio should be preferably at least 15%, and more preferably at least 20%.

According to the third embodiment of the first aspect of the present invention, there is provided an image pickup system comprising, at least, an image pickup optical system and an electronic image pickup device having three or more different spectral characteristics to obtain a color image, characterized in that:

an optical element that takes part in the determination of a focal length in said image pickup system is made up of an optical element making use of a refraction phenomenon alone, and a 400-nm wavelength input/output ratio is 6% or less with respect to an input/output ratio for a 400-nm to 700-nm wavelength at which an output signal strength ratio with respect to an input quantity of light is highest with the proviso that said input quantity of light is defined by the quantity of a light beam emanating from the same object point and entering said image pickup optical system and said output signal strength is defined by the strength of a signal produced from the image pickup device in response to said light beam.

The action of the third image pickup device according to the first aspect of the present invention is now explained. When signals produced from the image pickup device are weak, the input/output ratio is often altered through gamma correction or the like at a controller. If required, signal processing and image processing at the controller may be altered by software changing. The third image pickup system is constructed with such alteration in mind, so that color reproducibility can be improved at outputs from the image pickup optical system and image pickup device. It is here noted that the 400-nm wavelength input/output ratio should be preferably 3% or less, and more preferably 1.2% or less.

According to the fourth embodiment of the first aspect of the present invention, the third image pickup system is further characterized in that a 420-nm wavelength input/output ratio is 6% or greater with respect to the input/output ratio for the 400-nm to 700-nm wavelength at which the output signal strength ratio with respect to the input quantity of light is high.

The action of the fourth image pickup device is the same as that of the second image pickup device. The 420-nm wavelength input/output ratio should be preferably 9% or greater, and more preferably 12% or greater.

According to the fifth embodiment of the first aspect of the present invention, there is provided an image pickup system comprising, at least, an image pickup optical system and an electronic image pickup device having three or more different spectral characteristics to obtain a color image, characterized in that:

an optical element that takes part in the determination of a focal length in said image pickup system is made up of an optical element making use of a refraction phenomenon alone, and a spectral transmittance from an entrance portion of said image pickup optical system to an entrance portion of said electronic image pickup device is such that the ratio of a 400-nm wavelength transmittance with respect to a transmittance for a wavelength of 400 nm to 700 nm at which the highest transmittance is obtained is 15% or less.

The action of the fifth image pickup system is now explained. In consideration of cost, the image pickup device is a constituting member that benefits from the greatest effects of the economies of scale. In view of cost and production, it is thus preferable to achieve an image pickup device that can be commonly mounted on an image pickup system designed to phototake a subject in a room substantially free from light beams in the vicinity of 400 nm and an image pickup system wherein there is no strong demand for the natural color-match reproducibility on the premise that color correction should be made for each pixel during displaying, printing or the like. In both types of image pickup systems, how the quantity of light is ensured takes precedence over color reproducibility, etc. With the fifth image pickup system, it is possible to obtain images with improved color reproducibility even when such an image pickup device is used under a light source containing some considerable short wavelengths, for instance, under solar rays, because the 400-nm wavelength transmittance is limited with respect to the spectral transmittance from the entrance portion of the image pickup optical system to the entrance portion of the electronic image pickup device. It is here noted that the ratio of 400-nm wavelength transmittance should be preferably 8% or less, and more preferably 3% or less.

According to the sixth embodiment of the first aspect of the present invention, the fifth image pickup system is further characterized in that the ratio of 420-nm wavelength transmittance with respect to the transmittance for the wavelength of 400 nm to 700 nm at which the highest transmittance is obtained is 15% or greater.

The action of this sixth image pickup system is the same as that of the second image pickup system. It is noted that the ratio of 420-nm wavelength transmittance should be preferably 20% or greater, and more preferably 25% or greater.

According to the seventh embodiment of the first aspect of the present invention, the fifth or sixth image pickup system is further characterized in that at least one of the three different spectral characteristics that the electronic image pickup device possesses so as to obtain a color image has two peak wavelengths, each of high sensitivity, between which there is a wavelength having a sensitivity of 50% or less to the sensitivities of the two peak wavelengths.

The action of the seventh image pickup system is now explained. The image pickup device in the seventh image pickup system is a color-compatible image pickup device using a so-called complementary color filter. The complementary color filter is advantageous over a primary color filter in that the quantity of light can be easily ensured. For the seventh image pickup system, at least one filter having two peak wavelengths, each of high sensitivity, should be located. Requirements for the filter are that the peak-to-peak trough be kept as constant as possible and the peaks be reached with a sharp rising edge. When the sensitivity to about 400 nm is decreased from the peak sensitivity on a short wavelength side, the construction of the filter becomes complicated. In addition, when the sensitivity to 420 nm is ensured to a certain degree, the construction of the filter becomes more complicated. According to this seventh embodiment, it is thus possible to provide an image pickup system that makes it easy to ensure light quantity and is of general versatility, because the 400-nm or 400-nm and 420-nm wavelength transmittance is restricted before the wavelengths enter the image pickup device.

According to the eighth embodiment of the first aspect of the present invention, there is provided an image pickup optical system detachably mounted on an image pickup system comprising an electronic image pickup device having three or more different spectral characteristics so as to obtain a color image, characterized in that:

an optical element that takes part in the determination of a focal length in said image pickup optical system is made up of an optical element making use of a refraction phenomenon alone, and the spectral transmittance of said image pickup optical system is such that the ratio of 400-nm wavelength transmittance thereof with respect to the transmittance thereof for a wavelength of 400 nm to 700 nm at which the highest transmittance is obtained is 15% or less.

The action of the image pickup optical system according to the eighth embodiment of the first aspect is now explained. Such an image pickup optical system can be mounted on a variety of image pickup systems with high color reproducibility. It is noted that the ratio of 400-nm wavelength transmittance should be preferably 8% or less, and more preferably 3% or less.

According to the ninth embodiment of the first aspect of the present invention, the image pickup optical system according to the eighth embodiment is further characterized in that the ratio of a 420-nm wavelength transmittance thereof with respect to the transmittance thereof to a wavelength of 400 nm to 700 nm at which the highest transmittance is obtained is 15% or greater.

It is noted that the ratio of 420-nm wavelength transmittance should be preferably 20% or greater, and more preferably 25% or greater.

According to the tenth embodiment of the first aspect of the present invention, there is provided an image pickup system comprising an electronic image pickup device having three or more different spectral characteristics to obtain a color image, a controller for carrying out signal processing or image processing on the basis of an output from said electronic image pickup device and a mount for enabling an image pickup optical system for guiding an outside image to said electronic image pickup device to be detachably mounted on said image pickup system, characterized by further comprising a wavelength range control means for allowing a 400-nm wavelength input/output ratio to be 10% or less with respect to an input/output ratio for a wavelength of 400 nm to 700 nm at which the ratio of an output signal strength with respect to input light quantity is highest with the proviso that said input light quantity is defined by the quantity of an incident light beam and said output signal strength is defined by the strength of a signal produced from the controller in response to said incident light beam.

The action of the tenth image pickup system is now explained. Even when various image pickup optical systems are mounted on this tenth image pickup system, satisfactory color reproduction is achievable. It is noted that the 400-nm wavelength input/output ratio should be preferably 5% or less, and more preferably 2% or less.

According to the eleventh embodiment of the first aspect of the present invention, the eleventh image pickup system is further characterized in that said wavelength range control means allows a 420-nm wavelength input/output ratio to be 20% or greater with respect to the input/output ratio for a wavelength of 400 nm to 700 nm at which the ratio of the output signal strength with respect to the input light quantity is highest.

According to the twelfth embodiment of the first aspect of the present invention, the tenth or eleventh image pickup system is further characterized in that the wavelength range control means is a filter interposed between the electronic image pickup device and the mount.

The action of the twelfth image pickup system is now explained. By using a mosaic filter with the image pickup device or locating other filter on the entrance surface of the image pickup device, it is thus possible to obtain an image with improved color reproducibility yet without making signal processing complicated.

According the thirteenth embodiment of the first aspect of the present invention, any one of the first through seventh image pickup systems is further characterized in that when the image pickup optical system is focused at 70% of an effective screen thereof on an infinite object point, chromatic aberrations in meridian section at a 400-nm wavelength are equivalent in size to four or more pixels.

The action of the thirteenth image pickup system is now explained. The refracting power of an optical element used with an image pickup optical system varies with changing wavelength. The so-called glass or plastic materials have increasing power as wavelength becomes short. In other words, image-formation capability varies with changing wavelength. One index to how sharply refracting power changes due to wavelength is an Abbe number. In general, lenses with varying Abbe numbers are located in the form of a positive and a negative lens for the purpose of reducing the changes in the image-formation capability due to changing wavelength. Unlike microscopes or the like, an image pickup system having a relatively wide field angle such as a general-purpose digital camera is required to have its image-formation capability in compliance with large wavelength changes while the image-formation capability is maintained at the desired level. However, the construction of an image pickup optical system does not only become complicated but also an expensive material of poor processability is needed, resulting in the need of meeting a high level of fabrication precision.

According to the thirteenth embodiment of the first aspect of the present invention, the optical system is designed in such a way that when focused on an infinite object point in the range of 70% of the effective screen, the chromatic aberrations in meridian section at a 400-nm wavelength are equivalent in size to four or more pixels. It is thus possible to provide an optical system of simplified construction, which makes it possible to enhance its image-formation capability in the wavelength region taking part in image formation.

In this regard, an account is given of the limitation that the chromatic aberrations in meridian section are equivalent in size to four or more pixels. Here consider the state where the image pickup system is focused on an infinite object point (i.e., the state where the image pickup system is focused through an autofocusing mechanism on a nearly infinite object point or it is focused on a nearly infinite object point in a manual focusing mode set on an infinite memory, or the state where the peak of an axial PSF (point spread function) strength at d-line (587.6 nm) is maximized with respect to an infinite object point on an optical axis. Then, the chromatic aberrations are defined by a size δ on meridian section, which accounts for at least 1.6% of the maximum value of the PSF strength at a specific wavelength. In other words, the aforesaid limitation means that the size δ (400) at 400-nm wavelength is equivalent to four or more pixels.

Also assume the length from the center of the image pickup surface to a maximum effective image height to be equal to 1. Then, the range of 70% of the effective screen is defined by the inside of a circle, the radius of which is 7/10 of that length.

According to the fourteenth embodiment of the first aspect of the present invention, the thirteenth image pickup system is further characterized in that chromatic aberrations for a wavelength of 435 nm to 600 nm are equivalent to three or less pixels in the range of 70% of the effective screen.

The action of the fourteenth image pickup system is now explained. With this construction, it is possible to provide an image pickup optical system wherein the image-formation capability change due to wavelength is on a practically acceptable level. It is here noted that a certain image pickup optical system designed to be detachable from an image pickup system, if it can be mounted on the image pickup system for use, is also embraced in the present invention.

Here let D represent the effective diagonal length of the electronic image pickup device, and δ(400) and δ(420) stand for chromatic aberrations at 400-nm wavelength and 420-nm wavelength as found in the range of 70% of the effective screen, respectively. It is then preferable to satisfy $$\delta(400)/D > 2.0 \times 10^{-3}$$

It is more preferable to satisfy $$\delta(420)/D < 1.5 \times 10^{-3}$$

While the chromatic aberrations for 400-nm wavelength and 420-nm wavelength have been discussed, it is understood that even when the chromatic aberrations for 400-nm wavelength are replaced by those for h-line (404.7 nm) and the chromatic aberrations for 420-nm wavelength are replaced by those for g-line (435.8 nm), the same effects are achievable.

Referring to the chromatic aberrations of magnification, it is preferable that the distance between the peak of a d-line spot and the peak of a g-line spot is equivalent to seven or less pixels all over the effective screen of the electronic image pickup device. More preferably in this case, the distance between the d-line and the g-line should be equivalent to ten or more pixels.

Alternatively, let Δdh, Δdg and D represent the distance between the peaks of d- and h-lines, the distance between the peaks of d- and g-lines and the effective diagonal length of the electronic image pickup device. It is then preferable that the following condition is satisfied with respect to at least a part of the screen:

$$\Delta dh/D > 6.0 \times 10^{-3}$$

More preferably in this case, the following condition should be satisfied with respect to the whole screen:

$$\Delta dg/D < 4.5 \times 10^{-3}$$

Preferably, such optical elements as explained below are located in the image pickup optical system in each of the thirteenth and fourteenth image pickup systems, etc.

According to the fifteenth embodiment of the first aspect of the present invention, any one of the first through fourteenth image pickup systems is further characterized in that the image pickup optical system comprises an aperture stop, and an optical system portion located on the image pickup device side with respect to the aperture stop has generally positive refracting power and comprises at least one negative lens.

The action of the fifteenth image pickup system is now explained. The requirement for increasing the efficiency of photoelectric conversion of light beams incident on the image pickup device (or for bringing the system close to a telecentric one) is that the optical system portion located on the image pickup device side with respect to the aperture stop has generally positive refracting power. The requirement for making correction for spherical aberrations, axial chromatic aberrations and chromatic aberrations of magnification is that the optical system has at least one negative lens. By meeting these requirements, it is possible to provide an image pickup optical system of simplified construction, which has improved image-formation capability in the necessary wavelength range. However, note that chromatic aberrations for 400-nm wavelength become large.

According to the sixteenth embodiment of the first aspect of the present invention, the fifteenth image pickup system is further characterized in that the image pickup optical system comprises an aperture stop and an optical system portion located on the image pickup device side with respect to the aperture stop comprises, in order from an object side thereof, a positive lens, a negative lens and a positive lens group or a positive lens, a positive lens, a negative lens and a positive lens group.

The action of the sixteenth image pickup system is now explained. With such a lens arrangement, it is possible to reduce the overall length of the optical system portion located on the image pickup device side with respect to the aperture stop. If the power of the negative lens is increased, it is then possible to enhance this action. At the same, however, aberrations in the vicinity of 400-nm wavelength become large.

According to the seventeenth embodiment of the first aspect of the present invention, the fifteenth image pickup system is further characterized in that the image pickup optical system comprises, on the image pickup device side with respect to the stop, a lens group which, for zooming a wide-angle end to a telephoto end thereof, moves monotonously from an image side to an object side thereof and comprises a negative lens.

The action of the seventeenth image pickup system is now explained. This arrangement is known to be effective for achieving overall length reductions, high zoom ratios and high aperture ratios. In this arrangement, the group in the rear of the stop, too, makes some contribution to zooming. In the negative group-preceding type, only the lens group in the rear of the stop contributes to zooming. The negative lens used has functions of making correction for aberrations such as field curvature as well as chromatic aberrations. To correct aberrations for a reference wavelength, some limitations are imposed on the power and shape of this negative lens. For correction of chromatic aberrations, therefore, it is required to construct the negative lens of a material having a proper Abbe number. However, this lens has the property of varying more largely in the index of refraction as wavelength becomes shorter. It is still difficult to make correction for chromatic aberrations for 400-nm wavelength.

According to the eighteenth embodiment of the first aspect of the present invention, the seventeenth image pickup system is further characterized in that in the image pickup optical system, a moving lens group is positioned just after the stop.

The action of eighteenth image pickup system is now explained. This arrangement is known to be effective for achieving further overall length reductions, ever higher zoom ratios and ever higher aperture ratios. With this negative lens, however, the height of paraxial rays grows and so chromatic aberrations in the vicinity of 400-nm wavelength are likely to become large. In particular, the effect of the eighteenth image pickup system increases with decreasing F-number, because chromatic aberrations become large.

According to the nineteenth embodiment of the first aspect of the present invention, any one of the fifteenth through seventeenth image pickup systems is further characterized in that the negative lens satisfies the following conditions:

$$0.2 < {}_sR_{RN}/D < 2 \quad (3)$$

$$1.7 < n_{RN} < 1.95 \quad (4)$$

$$20 < \nu_{RN} < 30 \quad (5)$$

$$0.004 < \Delta\theta_{RN} < 0.05 \quad (6)$$

Here ${}_sR_{RN}$ is the smaller radius of curvature of the negative lens, D is the diagonal length of the effective image pickup surface of the image pickup device, $n_{RN}$ is the index of refraction of the negative lens, $\nu_{RN}$ is the Abbe number of the negative lens, and $\Delta\theta_{RN}$ is the amount of displacement of the vitreous material of the negative lens in the $\theta_{g-F}$ direction on the basis of a straight line between glass code 511605 and glass code 620363 on a $\theta_{g-F}$ vs. $\nu_d$ plot of the vitreous material, providing a numerical expression of anomalous dispersion. In this regard, note that glass code 511605 is a glass product NSL7 made by OHARA Co., Ltd. with a $\theta_{g-F}$ value of 0.5436 and a $\nu_d$ value of 60.49 and glass code 620363 is a glass product PBM2 made by OHARA Co., Ltd. with a $\theta_{g-F}$ value of 0.5828 and a $\nu_d$ value of 36.26.

Condition (3) is provided to ensure the f back necessary for the image pickup optical system. When the upper limit of 2 is exceeded, it is difficult to ensure the necessary f back. When the lower limit of 0.2 is not reached, chromatic aberrations for the necessary wavelengths become too larger even when conditions (4) to (6) are satisfied. By making an appropriate selection from the vitreous materials capable of satisfying conditions (4), (5) and (6), it is possible to gain satisfactory control of chromatic aberrations for the necessary wavelengths. However, the anomalousness of partial dispersion ratios is large, and so the shorter the wavelength, the more rapidly are chromatic aberrations produced. It is thus difficult to make correction for aberrations for 400-nm wavelength. The left side of condition (3) should be preferably 0.3 and more preferably 0.5, and the left side of condition (6) should be preferably 0.007 and more preferably 0.01.

According to the twentieth embodiment to the first aspect of the present invention, any one of the fifteenth through eighteenth image pickup systems is further characterized in that the optical element of refracting power, located nearest to the image side of the image pickup optical system, is a positive lens.

This arrangement is known to result in overall length reductions. However, the chromatic aberrations of this positive lens are enlarged through the optical system portion located on the image pickup device side with respect to the positive lens. Chromatic aberrations for 400-nm wavelength are larger than those for 435-nm wavelength for instance, and this difference is enlarged, producing a large influence on the chromatic aberrations of magnification in particular.

According to the twenty-first embodiment of the first aspect of the present invention, the twentieth image pickup system is further characterized in that an air separation between the positive lens and a lens located adjacent thereto is variable during zooming. This arrangement is preferable because the amount of movement of the lens groups is reduced during zooming.

According to the twenty-second embodiment of the first aspect of the present invention, any one of the fifteenth through twenty-first image pickup systems is further characterized in that the image pickup optical system is constructed of a zooming system comprising, in order from an object side thereof, a first group having positive refracting power, a second group having negative refracting power, a third group having positive refracting power and a fourth group having positive refracting power.

This arrangement is preferable because the amount of movement of the groups during zooming is reduced, and makes it easy to reduce the overall length of the system and decrease the F-number of the system.

According to the twenty-third embodiment of the first aspect of the present invention, any one of the image pickup systems or image pickup optical systems according to the first through ninth embodiments, thirteenth and fourteenth embodiments is further characterized in that the image pickup optical system has therein a reflecting surface having a reflectance of 50% or greater at 400-nm wavelength and 10% or less at 420-nm wavelength.

The action of the twenty-third image pickup system is now explained. By locating in the image pickup optical system a reflecting surface having an antireflection function at 420-nm wavelength and an increased reflection function at 400-nm wavelength, it is possible to obtain a clear image.

According to the twenty-fourth embodiment of the first aspect of the present invention, the twenty-third image pickup system or image pickup optical system is further characterized in that the reflecting surface is formed of at least two thin films having different refractive indices, which films are laminated upon one another.

The action of the twenty-fourth image pickup system is now explained. It is desired that the reflecting surface is formed of a multilayered film laminated on the surface of an optical element.

According to the twenty-fifth embodiment of the first aspect of the present invention, there is provided an image pickup system comprising, at least, an image pickup optical system, a filter or prism and an electronic image pickup device having three or more different spectral characteristics to obtain a color image, characterized in that:

an optical element that takes part in the determination of a focal length in said image pickup optical system is formed of an optical element making use of a refraction phenomenon alone, and at least one filter or prism has a 400-nm wavelength transmission of 10% or less with respect to the maximum wavelength transmission.

The action of the twenty-fifth image pickup system is now explained. For an image pickup system, it is often required to locate an infrared cutoff filter, a low-pass filter and an optical path splitter prism therein. It is preferable to form the filter or prism of a material having a 400-nm wavelength transmittance of 10% or less with respect to the maximum transmission, because it is unnecessary to use an additional member for restricting a 400-nm wavelength light beam. It is noted that the 420-nm wavelength transmission should be preferably 40% or greater with respect to the maximum transmission wavelength.

According to the twenty-sixth embodiment of the first aspect of the present invention, there is provided an image pickup system comprising, at least, an image pickup optical system, an optical path splitter means located in an optical path for said image pickup device to split the optical path to a finder optical path and a phototaking optical path, and an electronic image pickup device having three or more different spectral characteristics to obtain a color image, characterized in that:

an optical element that takes part in the determination of a focal length in said image pickup optical system is formed of an optical element making use of a refraction phenomenon alone, and the proportion of a light beam emerging from said optical path splitter means toward the electronic image pickup device with respect to a light beam incident on said optical path splitter means is such that the ratio of a 400-nm wavelength light beam leaving said means with respect to a light beam of the longest wavelength in the range of wavelengths used is less than 1.

The action of the twenty-sixth image pickup system is now explained. Even when the finder is removed off, the quantity of light emanating from the subject often offers no problem. In this case, when more light beams of 400 nm or less in wavelength are incident on the finder optical system, there is little or no influence on the perception of colors or images by the human sense of sight. In the image pickup device, on the other hand, a 400-nm wavelength light beam is treated in the same manner as a 435-nm light beam; that is, there is an influence on the perception of colors. Thus, the twenty-sixth image pickup system that permits the greater portion of the 400-nm wavelength light beam is allocated to the finder optical system is preferable.

The second aspect of the present invention is now explained.

For an image pickup system such as a camera designed to phototake visible light areas, it is generally required that an image pickup optical system be optimized on the basis of the vicinity of an intermediate wavelength in the visible light range. When, at this time, it is intended to obtain satisfactory optical performance all over the visible light range, extra costs are added to the optical system because of the need of using a special vitreous material for correcting chromatic aberrations and increasing the number of lenses.

The purport of the second aspect of the present invention is to achieve an image pickup system and an image pickup optical system at low costs, which permit certain degrees of chromatic aberrations and can reduce color flares down to an unobtrusive level by warning the observer of color flares likely to occur due to chromatic aberrations, reducing color flares electrically or placing a wavelength range with prominent chromatic aberrations in an optically unobtrusive state.

According to the first embodiment of the second aspect of the present invention, this object is achieved by the provision of an electronic image pickup system characterized by comprising an electronic image pickup device having three or more different spectral characteristics to obtain a color image, an image pickup optical system for producing chromatic aberrations and forming a subject image on the image pickup surface of the electronic image pickup device, a large luminance difference detecting means for detecting an area where a luminance difference among certain adjacent pixels of the electronic image pickup device reaches or exceeds a certain level, and a warning means for issuing a warning of detection of a certain or greater luminance difference by the large luminance difference detecting means.

With this arrangement, it is possible for the operator to have an immediate understanding of the fact that the subject is likely to produce high-contrast color flares. Then, suitable means can be used to reduce such high-contrast color flares, so that images with reduced or unobtrusive color flares can be obtained. For instance, the operator can move close to the subject, set the camera angle in a follow light mode or use an electronic flash to reduce the luminance difference.

For the warning means, it is acceptable to use a buzzer for sounding beeps, a warning indicator built in a finder or a liquid crystal display in a camera body or a flash actuator for reducing luminance differences.

It is understood that a screw coupling mount or other mount on which the image pickup optical system can be mounted may be used for a lens replaceable camera.

According to the second embodiment of the second aspect of the present invention, there is provided an electronic image pickup system characterized by comprising an electronic image pickup device including a plurality of pixels having three or more different spectral characteristics to obtain a color image and provided for converting an image sensed by said pixels to an electric signal including luminance and color information and producing said electric signal, an image pickup optical system for producing chromatic aberrations and forming a subject image on the image pickup surface of said electronic image pickup device, a large luminance difference boundary detecting means for detecting a boundary where a luminance difference among certain adjacent pixels of said electronic image pickup device reaches or exceeds a certain level, and a signal processing means for electrically controlling said electric signal including luminance and color information in such a way as to reduce color flares due to said chromatic aberrations in the vicinity of said boundary including a certain or greater level of luminance difference when said certain or greater level of luminance difference is detected by said large luminance difference boundary detecting means.

According to the third embodiment of the second aspect of the present invention, there is provided an electronic image pickup system characterized by comprising an electronic image pickup device including a plurality of pixels having three or more different spectral characteristics so as to obtain a color image and provided for converting an image sensed by said pixels to an electric signal including luminance and color information and producing said electric signal, an image pickup optical system for producing chromatic aberrations and forming a subject image on the image pickup surface of said electronic image pickup device, a correct exposure calculating means for calculating a correct exposure value for a phototaking area on said electronic image pickup device, a large luminance difference boundary detecting means for detecting a boundary having a large luminance difference by detecting a pixel having an exposure level saturated by underexposure of 2 EV or less with respect to said correct exposure and/or an unsaturated pixel adjacent to said saturated pixel, and a signal processing means for electrically controlling said electric signal including luminance and color information in such a way as to reduce color flares due to said chromatic aberrations in the vicinity of said boundary detected by said large luminance difference boundary detecting means.

A high-luminance subject portion such as the sky or illuminations exists in the form of an area where the exposure level is saturated even by underexposure of 2 EV or less with respect to correct exposure, and so high-contrast areas adjacent thereto are likely to give rise to color flares. However, if the electronic image pickup system according to the second aspect of the present invention is constructed as in the third embodiment thereof, it is then possible to reduce color flares caused by such areas.

In the second or third image pickup system according to the second aspect of the present invention, it is preferable to use a two-dimensional area photometric sensor as the large luminance difference boundary detecting means.

If the two-dimensional area photometric sensor is used, it is then possible to detect a high-luminance area and low-luminance areas adjacent thereto on the image pickup surface and thereby find out a zone having a large luminance difference, so that color flares can be reduced by the signal processing means operated on the basis of the results.

It is also preferable to locate a plurality of pixels provided with sensitivity reducing means on the image pickup surface of the electronic image pickup device, so that the boundary can be detected by use of light sensing signals from those pixels.

This arrangement enables the image pickup device and two-dimensional area photometric sensor to be constructed in a monolithic form, which in turn makes it possible to reduce the size of the image pickup device. Through luminance information obtained from high-sensitivity pixels and low-sensitivity pixels, it is also possible to obtain an area where the exposure level is saturated and areas adjacent thereto.

For the sensitivity reducing means, it is possible to use an ND filter, etc.

If the color saturation of an area of the image pickup surface in the vicinity of the boundary is reduced by the signal processing means, it is then possible to reduce color flares to an unobtrusive "color running" level.

If the area to be reduced in color saturation is composed of one through 50 pixels found around the boundary, it is then possible to place signal processing quantity and color correction effect in a well balanced state. With less than one pixel, it is impossible to make perfect correction for color flares. With more than 50 pixels, the signal processing quantity becomes too much.

In the second or third image pickup system according to the second aspect of the present invention, it is further preferable that the signal processing means is used to approximate the chromaticity of the boundary and an area adjacent to the boundary and on a dark side of lower luminance to the chromaticity of a dark area spaced away from the boundary toward the dark side by at least a certain number of pixels, thereby eliminating color flares to an unobtrusive "color running" level.

If the aforesaid dark area is defined by 2 through 50 pixels as counted from the boundary to the dark side, it is possible to place signal processing quantity and color correction effect in a well-balanced state. With less than 2 pixels, it is impossible to make perfect correction for color flares. With more than 50 pixels, the signal processing quantity becomes too much.

In the first to third embodiments of the second aspect of the present invention, it is preferable that the image pickup optical system for producing chromatic aberrations satisfies the following condition (11):

$$(Lh-Ld)/F_{min} \geq 2P \tag{11}$$

where P and $F_{min}$ are the minimum pixel pitch and minimum F-number for the electronic image pickup device, and Lh is the absolute value of spherical aberrations for a h-line (404.7 nm) marginal ray and Ld is the absolute value of spherical aberration for a d-line (587.56 nm) marginal ray when the F-number is $F_{min}$.

In the first to third embodiments of the second aspect of the present invention, it is preferable that the image pickup opti cal system for producing chromatic aberrations satisfies the following condition (12):

$$|Sh| \geq 2P \tag{12}$$

where P is the minimum pixel pitch for the electronic image pickup device, and Sh is the amount of transverse chromatic aberration of magnification for h-line with respect to d-line at any one of the image height ratios of 0.9, 0.7 and 0.5 with respect to the maximum image height.

When both the lower-limit 2P values in conditions (11) and (12) are not reached, it is possible to dispense with any signal processing because chromatic aberrations themselves become small.

In the second aspect of the present invention, condition (11) may be replaced by the following condition (11'):

$$(Lh-Ld)/F_{min} > 4P \tag{11'}$$

In the second aspect of the present invention, condition (11') may also be replaced by the following condition (11"):

$$(Lh-Ld)/F_{min} \geq 6P \tag{11"}$$

In the second aspect of the present invention, condition (12) may be replaced by the following condition (12'):

$$|Sh| \geq 3P \tag{12'}$$

In the second aspect of the present invention, condition (12') may also be replaced by the following condition (12"):

$$|Sh| \geq 5P \tag{12"}$$

In the second aspect of the present invention chromatic aberrations become larger in the order of conditions (11'), (11"), (12') and (12"). By satisfying these conditions, however, electric correction is achievable, resulting in the achievement of reductions in the size of the optical system.

How color flares due to chromatic aberrations are optically reduced according to the second aspect of the present invention is now explained.

FIG. 21 is a conceptual representation of the image pickup optical system designed to optically reduce color flares according to the second aspect of the present invention. An image pickup optical system 101 comprises a filter 103, etc. as a wavelength correction means. A light beam passing through the image pickup optical system 101 forms a subject image on an image pickup device 102. Then, an image including the whole visible light range is formed on an image plane 104. It is noted that how the image is formed with respect to the center of the image plane is judged on the basis of a spherical aberration diagram.

FIG. 22 is a spherical aberration diagram for the image pickup optical system of FIG. 21. In FIG. 22, Lλ is the F-number upon stop in, i.e., the absolute value of a difference between a paraxial image point and the position of intersection of each wavelength marginal ray having the maximum height of incident ray with an optical axis at the minimum F-number or $F_{min}$ or, in another parlance, the absolute value of the amount of spherical aberrations. If λ is d-line (587.56 nm), then the absolute value of the amount of d-line spherical aberration is represented by Ld.

In the aberration diagram of FIG. 22, Ld and Lλ indicate the amount of a focal point displacement at the maximum height of incident ray, and FIG. 23 is illustrative of how the focal position displacement is seen in a sectional view of the back focal point portion of the image pickup optical system 101.

In FIG. 23, a solid line refers to a d-line marginal ray at the maximum height of incident ray, and a broken line indicates a marginal ray of an arbitrary wavelength λ at the maximum height of incident ray. Then, the displacement of each wavelength with respect to the paraxial image plane 104 is perceived in the form of color flares on the paraxial image plane.

In FIG. 23, $Ld/F_{min}$ and $L\lambda/F_{min}$ indicate the diameters of flares with an optical axis 105 on the paraxial image plane 104 at the center.

A large difference between $Ld/F_{min}$ and $L\lambda/F_{min}$ makes color flares likely to occur. It is difficult to make correction for chromatic aberrations on a shorter wavelength side with respect to d-line. To achieve a low-cost image pickup optical system, therefore, it is required to keep chromatic aberrations undercorrected on the shorter wavelength side.

For the image pickup optical system according to the second aspect of the present invention, it is thus required that the difference between $Ld/F_{min}$ and $L\lambda/F_{min}$ be 0.05 mm. Here let λ1 represent a wavelength where the following condition (13) is satisfied:

$$(L\lambda-Ld)/F_{min} = 0.05 \text{ mm} \tag{13}$$

To allow λ1 to exist within a wavelength range of d-line or shorter to which the electronic image pickup device is sensitive, permit d-line at which good images are obtainable to ensure the light quantity needed for image formation and reduce the light quantity for wavelength λ1 leading to color flares, a wavelength λc whose transmittance is a half-value of d-line transmittance satisfies the following condition (14):

$$\lambda 1 \leq \lambda c \leq d\text{-line (587.56 nm)} \tag{14}$$

With this arrangement, it is possible to ensure sufficient light quantity in the vicinity of d-line at which satisfactory image-formation capability is obtainable, and reduce light quantity for wavelength λ1 responsible for color flares. According to the second aspect of the present invention, it is thus possible to use a simplified optical system to reduce color flares. When λc does not reach the lower limit to condition (14), color flares become striking to the eye. When the upper limit is exceeded, color reproducibility becomes worse.

As explained above, the aforesaid condition (14) should preferably be satisfied with respect to λ1 at which $(L\lambda-Ld)/F_{min} = 0.05$ mm. In consideration of the fact that the obtained electronic image is often enlarged for observation, however, condition (14) should more preferably be satisfied with respect to λ1 at which $(L\lambda-Ld)/F_{min} = 0.04$ mm. Even more preferably, condition (14) should be satisfied with respect to λ1 at which $(L\lambda-Ld)/F_{min} = 0.03$ mm.

It is noted that to satisfy the aforesaid condition (14), the spectral transmittance characteristics of the wavelength correction filter 3 may be controlled. Alternatively, the overall spectral transmittance characteristics of the image pickup optical system may be controlled by providing thereon with a wavelength correction coating, etc.

While the axial chromatic aberrations have so far been explained, it is understood that the same also holds for chromatic aberrations of magnification. FIG. 24 is an aberration diagram for the amount of chromatic aberrations of magnification for a wavelength λ with respect to d-line. In FIG. 24, the amount Sλ of transverse chromatic aberration of magnification for the wavelength λ with respect to d-line at an image height ratio of 0.9 with respect to the maximum image height IH is indicated by an arrow. FIG. 25 is illustrative of the state of chromatic aberrations at the image height ratio of 0.9 on the image plane as illustrated on the paraxial image plane 104 of FIG. 21. In this state, color flares occur.

Here let λ2 represent a wavelength at which the following condition (15) is satisfied:

$$|S\lambda| = 0.025 \text{ mm} \tag{15}$$

where Sλ is the amount of transverse chromatic aberration of magnification for an arbitrary wavelength λ with respect to d-line (587.56 nm) at an image height ratio of 0.9 with respect to the maximum image height, and |S$\lambda$| is the amount of a displacement on the paraxial image plane 104. While $\lambda 2$ exists on a shorter wavelength side with respect to d-line, it is preferable that the following condition (16) should be satisfied with respect to a wavelength $\lambda c$ whose transmittance is a half-value of d-line transmittance.

$$\lambda 2 \leq \lambda c \leq \text{d-line (587.56 nm)} \quad (16)$$

When the wavelength $\lambda c$ does not reach the lower limit to condition (16), color flares become striking to the eye. When the upper limit is exceeded, color reproducibility becomes worse.

As explained above, the aforesaid condition (16) should preferably be satisfied with respect to $\lambda 2$ at which |S$\lambda$|=0.025 mm. In consideration of the fact that the obtained electronic image is often enlarged for observation, however, condition (16) should more preferably be satisfied with respect to $\lambda 2$ at which |S$\lambda$|=0.02 mm. Even more preferably, condition (16) should be satisfied with respect to $\lambda 2$ at which |S$\lambda$|=0.015 mm.

Thus, the image pickup optical system should have such a spectral transmittance as satisfying the aforesaid condition (14) and the aforesaid condition (16) at the same time. With this image pickup optical system, it is possible to reduce color flares both on and off the optical axis.

The sensitivity of the human eyes to a shorter wavelength side of the visible light range is low, and so a visible ray close to the ultraviolet ray range is hardly sensible to the human eyes. Unlike the sensitivity of the human eyes, on the other hand, an image pickup device enables even a light ray in the visible ray range close to the ultraviolet ray range to be reproduced at a level sensible to the human eyes. Thus, the reproducibility of light in a range close to the ultraviolet ray range should be lowered, while the quantity of light in a range remarkably perceptible to the human eyes should be ensured.

In order to decrease the quantity of light on the side wavelengths shorter than 390 nm hardly perceptible to the human eyes and ensure the quantity of light on the side wavelengths longer than 430 nm easily perceptible to the human eyes, it is preferable to use an image pickup optical system in which the following condition (17) is satisfied with respect to a wavelength $\lambda c$ whose transmittance is a half-value of d-line transmittance.

$$390 \text{ nm} \leq \lambda c - 440 \text{ nm} \quad (17)$$

In this case, even when the axial chromatic aberrations of the image pickup optical system itself become worse, there is little or no influence on the image to be reproduced.

Here let $F_{min}$ represent the minimum F-number of the image pickup optical system, and $L\lambda$ represent the absolute value of the amount of spherical aberration for a marginal ray having an arbitrary wavelength $\lambda$ and Ld represent the absolute value of the amount of spherical aberration for a marginal ray at d-line (587.56 nm) when the F-number is $F_{min}$, and $\lambda 1$ represent a wavelength capable of satisfying the following condition (13):

$$(L\lambda - Ld)/F_{min} = 0.05 \text{ mm} \quad (13)$$

For the image pickup optical system, it is then preferable to satisfy the following condition (18) with respect to the wavelength $\lambda 1$.

$$390 \text{ nm} \leq \lambda 1 \leq 430 \text{ nm} \quad (18)$$

When the wavelength $\lambda 1$ becomes less than the lower limit to the aforesaid condition (18), it is impossible to cut down the cost of the optical system because precision must be given thereto. At greater than the upper limit, it is impossible to achieve perfect elimination of color flares.

When the lower limit to the aforesaid condition (17) is not reached, color flares become striking to the eye on the shorter wavelength side. Exceeding the upper limit to condition (17) makes color reproducibility worse.

As explained above, the aforesaid condition (18) should preferably be satisfied with respect to $\lambda 1$ at which $(L\lambda - Ld)/F_{min} = 0.05$ mm. In consideration of the fact that the obtained electronic image is often enlarged for observation, however, condition (18) should more preferably be satisfied with respect to $\lambda 1$ at which $(L\lambda - Ld)/F_{min} = 0.04$ mm. Even more preferably, condition (18) should be satisfied with respect to $\lambda 1$ at which $(L\lambda - Ld)/F_{min} = 0.03$ mm.

For chromatic aberrations of magnification, too, the image pickup optical system according to the second aspect of the present invention should also satisfy the aforesaid condition (17). Here let S$\lambda$ represent the amount of transverse chromatic aberration of magnification for a wavelength $\lambda$ with respect to d-line (587.56 nm) at an image height ratio of 0.9 with respect to the maximum image height, and $\lambda 2$ represent a wavelength capable of the following condition (15):

$$|S\lambda| = 0.025 \text{ mm} \quad (15)$$

For this optical system, it is further preferable that the following condition (19) is satisfied with respect to $\lambda 2$.

$$390 \text{ nm} \leq \lambda 2 < 430 \text{ nm} \quad (19)$$

When the wavelength $\lambda 2$ becomes less than the lower limit to the aforesaid condition (19), it is impossible to cut down the cost of the optical system because precision must be given thereto. At greater than the upper limit, it is impossible to achieve perfect elimination of color flares.

As explained above, the aforesaid condition (19) should preferably be satisfied with respect to $\lambda 2$ at which |S$\lambda$|=0.025 mm. In consideration of the fact that the obtained electronic image is often enlarged for observation, however, condition (18) should more preferably be satisfied with respect to $\lambda 2$ at which |S$\lambda$|=0.02 mm. Even more preferably, condition (18) should be satisfied with respect to $\lambda 2$ at which |S$\lambda$|=0.015 mm.

The aforesaid conditions (17), (18) and (19) should preferably be satisfied at the same time, because it is possible to reduce color flares both on and off the optical axis.

The image pickup optical system according to the second aspect of the present invention is an image pickup optical system designed to form the image of a subject on the electronic image pickup device. Here again, let $F_{min}$ represent the minimum F-number of the image pickup optical system, $L\lambda$ represent the absolute value of the amount of spherical aberration for a marginal ray having an arbitrary wavelength $\lambda$ and Ld represent the absolute value of the amount of spherical aberration for a marginal ray at d-line (587.56 nm) when the F-number is $F_{min}$ and $\lambda 1$ represent a wavelength capable of satisfying the following condition (13):

$$(L\lambda - Ld)/F_{min} = 0.05 \text{ mm} \quad (13)$$

For the image pickup optical system it is then preferable to satisfy the following condition (20) with respect to the wavelength $\lambda 1$.

$$350 \text{ nm} \leq \lambda 1 \leq 550 \text{ nm} \quad (20)$$

Further, let $\tau(\lambda 1)$ represent the transmittance ratio of the image pickup optical system at the wavelength $\lambda 1$ with respect to d-line transmittance, and $\tau(\lambda 1+30)$ represent the transmittance ratio of the image pickup optical system at a wavelength $\lambda 1+30$ nm with respect to d-line transmittance.

Then, the image pickup optical system should preferably satisfy the following conditions (21) and (22):

$$\tau(\lambda 1) \leq 10\% \quad (21)$$

$$\tau(\lambda 1+30) \geq 50\% \quad (22)$$

It is thus possible to reduce the wavelength responsible for color flares on the shorter wavelength side where axial chromatic aberrations occur and to ensure light quantity with little or no influence of chromatic aberrations in the wavelength range perceptible to the human eyes. In other words, it is possible to achieve a compact image pickup optical system that can make a reasonable tradeoff between color reproducibility and rendering capability.

When the wavelength $\lambda 1$ becomes less than the lower limit to the aforesaid condition (20), it is impossible to cut down the cost of the optical system because precision must be given thereto. At greater than the upper limit, it is impossible to achieve perfect elimination of color flares.

When the wavelength $\lambda 1$ transmittance becomes greater than 10%, color flares become striking to the eye. When the wavelength $\lambda 1+30$ nm transmittance becomes less than 50%, color reproducibility becomes worse.

As explained above, the aforesaid condition (20) should preferably be satisfied with respect to $\lambda 1$ at which $(L\lambda-Ld)/F_{min}$=0.05 mm. In consideration of the fact that the obtained electronic image is often enlarged for observation, however, the aforesaid conditions (20), (21) and (22) should more preferably be satisfied with respect to $\lambda 1$ at which $(L\lambda-Ld)/F_{min}$=0.04 mm. Even more preferably, conditions (20), (21) and (22) should be satisfied with respect to $\lambda 1$ at which $(L\lambda-Ld)/F_{min}$=0.03 mm.

For chromatic aberrations of magnification, too, the image pickup optical system according to the second aspect of the present invention should also satisfy requirements similar to those for axial chromatic aberrations. Here let Sk represent the amount of transverse chromatic aberration of magnification for a wavelength $\lambda$ with respect to d-line (587.56 nm) at an image height ratio of 0.9 with respect to the maximum image height, and $\lambda 2$ represent a wavelength capable of the following condition (15):

$$|S\lambda|=0.025 \text{ mm} \quad (15)$$

This optical system should satisfy the following condition (23) with respect to $\lambda 2$.

$$350 \text{ nm} \leq \lambda 2 \leq 550 \text{ nm} \quad (23)$$

Further, let $\tau(\lambda 2)$ represent the transmittance ratio of the image pickup optical system at the wavelength $\lambda 2$ with respect to d-line transmittance, and $\tau(\lambda 2+30)$ represent the transmittance ratio of the image pickup optical system at a wavelength $\lambda 2+30$ nm with respect to d-line transmittance. Then, the image pickup optical system should preferably satisfy the following conditions (24) and (25):

$$\tau(\lambda 2) \leq 10\% \quad (24)$$

$$\tau(\lambda 2+30) \geq 50\% \quad (25)$$

It is thus possible to reduce the wavelength responsible for color flares on the shorter wavelength side where axial chromatic aberrations occur and to ensure light quantity with little or no influence of chromatic aberrations in the wavelength range perceptible to the human eyes. In other words, it is possible to achieve a compact image pickup optical system that can make a reasonable tradeoff between color reproducibility and rendering capability.

When the wavelength $\lambda 2$ becomes less than the lower limit to the aforesaid condition (23), it is impossible to cut down the cost of the optical system because precision must be given thereto. At greater than the upper limit, it is impossible to achieve perfect elimination of color flares.

When the wavelength $\lambda 2$ transmittance becomes greater than 10%, color flares become striking to the eye. When the wavelength $\lambda 2+30$ nm transmittance becomes less than 50%, color reproducibility becomes worse.

As explained above, the aforesaid conditions (23), (24) and (25) should preferably be satisfied with respect to $\lambda 2$ at which $|S\lambda|$=0.025 mm. In consideration of the fact that the obtained electronic image is often enlarged for observation, however, the aforesaid conditions (23), (24) and (25) should more preferably be satisfied with respect to $\lambda 2$ at which $|S\lambda|$=0.02 mm. Even more preferably, conditions (23), (24) and (25) should be satisfied with respect to $\lambda 2$ at which $|S\lambda|$=0.015 mm.

If the aforesaid conditions (20), (21), (22), (23), (24) and (25) are satisfied at the same time, it is then possible to achieve an image pickup optical system with more reduced color flares both on and off the optical axis.

The image pickup optical system according to the second aspect of the present invention is an image pickup optical system designed to form the image of a subject on the electronic image pickup device. Here again, let $F_{min}$ represent the minimum F-number of the image pickup optical system, and Lh represent the absolute value of the amount of spherical aberration for an h-line (404.7 nm) marginal ray, Lg represent the absolute value of the amount of spherical aberration for a g-line (435.8 nm) marginal ray and Ld represent, the absolute value of the amount of spherical aberrations a d-line (587.56 nm) marginal ray when the F-number is $F_{min}$, $\tau h$ represent the h-line transmittance of the image pickup optical system with respect to d-line, and $\tau g$ is the g-line transmittance with respect to d-line. Then, the image pickup optical system should preferably satisfy the following condition (26) as well as the following condition (27) providing that a wavelength $\lambda c$ whose transmittance is a half-value of d-line transmittance should exist between g-line and h-line.

$$(Lg-Ld)/F_{min} \times \tau h \leq (Lg-Ld)/F_{min} \times \tau g \quad (26)$$

$$h\text{-line } (404.7 \text{ nm}) < \lambda c < g\text{-line } (435.8 \text{ nm}) \quad (27)$$

On the left side of the aforesaid condition (26), the magnitude of h-line "color running" with respect to d-line "color running" in the vicinity of the optical axis is multiplied by the h-line transmittance, and on the right side the magnitude of g-line "color running" with respect to d-line "color running" in the vicinity of the optical axis is multiplied by the g-line transmittance.

In general, an image pickup optical system using light in the visible range as a light source is designed in such a way as to eliminate aberrations in the vicinity of d-line, and so the h-line is greater in the magnitude of "color running" than the g-line. Thus, if the aforesaid condition (26) is satisfied or the h-line transmittance is decreased and the g-line transmittance is increased, it is then possible to reduce color flares depending on the h-line.

If the aforesaid condition (27) is satisfied or the wavelength $\lambda c$ whose transmittance is a half-value of g-line transmittance is allowed to exist between the g-line and the h-line, it is then possible to ensure light quantity for the g-line and color reproducibility.

For chromatic aberrations of magnification, too, the image pickup optical system according to the second aspect of the present invention should also satisfy requirements similar to those for axial chromatic aberrations. Here let Sh represent the amount of transverse chromatic aberration of magnification for h-line (404.7 nm) with respect to d-line (587.56 nm) at an image height ratio of 0.9 with respect to the maximum image height, Sg represent the amount of transverse chromatic aberration of magnification for g-line (435.8 nm) with respect to d-line (587.56 nm) at an image height ratio of 0.9 with respect to the maximum-image height, τh represent the h-line transmittance ratio of the image pickup optical system with respect to d-line and τg represent the g-line transmittance ratio with respect to d-line. Then, the image pickup optical system should preferably satisfy the following condition (28)

$$|Sh| \times \tau h \leq |Sg| \times \tau g \quad (28)$$

as well as the aforesaid condition (27) providing that the wavelength λc whose transmittance is a half-value of d-line transmittance should exist between the g-line and the h-line.

Oh the left side of the aforesaid condition (28), the h-line color shift with respect to d-line due to chromatic aberrations of magnification is multiplied by the h-line transmittance, and on the right side the g-line color shift with respect to d-line due to chromatic aberrations of magnification is multiplied by the g-line transmittance.

As mentioned above, the h-line is greater in the magnitude of "color running" than the g-line. Thus, if the aforesaid condition (28) is satisfied or the h-line transmittance is decreased and the g-line transmittance is increased, it is then possible to reduce color flares depending on the h-line.

If the aforesaid condition (27) is satisfied or the wavelength λc whose transmittance is a half-value of g-line transmittance is allowed to exist between the g-line and the h-line, it is then possible to ensure light quantity for the g-line and color reproducibility.

The limits to the wavelengths used, as defined by the aforesaid conditions, may be primarily determined by the vitreous materials used for the optical elements. However, it is acceptable to locate in the image pickup optical system a filter acting as a wavelength correction filter that makes primary correction for wavelengths. Alternatively, lenses may be each provided on its surface with a coating for making correction for wavelengths.

The image pickup optical system can be fabricated with ease by applying coating films for correcting wavelengths on planes.

The number of optical elements can be reduced by locating a low-pass filter in the image pickup optical system and applying a wavelength-correcting coating on at least one surface of the low-pass filter.

The number of optical elements can also be reduced by locating in the image pickup optical system an infrared cutoff filter for reducing infrared light components and applying a wavelength-correcting coating on at least one surface of the infrared cutoff filter.

If coating is carried out in such a way that the wavelength whose transmittance is a half-value of d-line transmittance exists between g-line and h-line, and between 600 nm and 700 nm, it is then possible to dispense with such an infrared cutoff filter, again resulting in a decrease in the number of optical elements.

When correction of wavelengths is carried out by an optical path splitter means located in the optical path of the image pickup optical system, it is preferable to locate the wavelength-correcting element on an optical path alone, which has an image pickup area whose g-line sensitivity is 30% or more of e-line sensitivity and is positioned on the side of the image pickup device.

The fact that the sensitivity to g-line is 30% or more of the sensitivity to e-line means that color flares are likely to occur at short wavelengths. If wavelengths responsible for chromatic aberrations are reduced by the aforesaid wavelength-correcting element, it is then possible to ensure the desired light quantity for another optical path without recourse to the aforesaid wavelength-correcting element, because the influence of short wavelengths on another optical path is limited.

For instance, if one of the optical paths obtained by the optical path splitter means is used as an observation optical path guided to the eye of the observer, it is unnecessary to locate any wavelength-correcting element because the sensitivity of the human eyes to short wavelengths is inherently low.

For a so-called multi-plate image pickup system comprising image pickup elements having different spectral sensitivity characteristics, which are separately mounted on some of optical paths obtained by the optical path splitter means, it is unnecessary to locate the aforesaid wavelength-correcting element on an optical path whose sensitivity to short wavelengths is low and which is positioned on the side of the image pickup devices.

According to the second aspect of the present invention, there is provided an image pickup optical system for forming a subject image on an electronic image pickup device, characterized by having an optical path with a light quantity control element being located therein so as to carry out wavelength correction in such a way that the sensitivity of said element to a wavelength between g-line and h-line is a half-value of e-line transmittance.

According to this embodiment of the second aspect, it is possible to reduce the number of optical elements because of no need of providing any additional wavelength-correcting means.

More specifically, the action of correcting wavelengths can be obtained by applying coating on the control element or mixing an absorption dye with the control element.

In this embodiment, too, it is preferable to satisfy any one of the conditions mentioned so far herein. It is also understood that these conditions may be used in combination of two or more.

For the image pickup optical system according to the second aspect of the present invention, it is preferable that the optical path taking part in the determination of the focal length therein is constructed of an optical element making use of a refraction phenomenon alone, because its construction can be simplified.

According to the image pickup system of the second aspect of the present invention, it is acceptable to locate at the back focal position of the image pickup optical system an electronic image pickup device having three or more different spectral sensitivity characteristics so as to obtain a color image.

If at least one of electronic image pickup devices having three or more different spectral sensitivity characteristics is provided with a so-called complementary type mosaic filter which has two high peak wavelengths, between which there is a wavelength having a 50% or less sensitivity to both peak wavelengths, then the sensitivity to short wavelengths becomes higher than required. This is effective for each embodiment of the second aspect of the present invention.

The third aspect of the present invention is now explained.

The purport of the third aspect of the invention is to make correction for chromatic aberrations for h-line as is the case with chromatic aberrations for d-line. Even when the h-line of the subject is reproduced with a blue wavelength easily perceptible to the human eyes, color flares with blue becoming striking remarkably to the eyes can be eliminated by superposing another wavelength on the blue wavelength.

According to the third aspect of the present invention, there is provided an electronic image pickup system comprising an electronic image pickup device including a plurality of pixels having three or more spectral characteristics to obtain a color image and an image pickup optical system for forming a subject image on the image pickup surface of the electronic image pickup device, characterized in that:

said image pickup optical system satisfies the following conditions (31) and (32):

$$(Lh-Ld)/F_{min} \leq 0.07 \text{ mm} \tag{31}$$

$$|Sh| \leq 0.04 \text{ mm} \tag{32}$$

where $F_{min}$ is the minimum F-number, Lh is the absolute value of the amount of spherical aberrations for an h-line (404.7 nm) marginal ray and Ld is the absolute value of the amount of spherical aberrations for a d-line (587.56 nm) when said optical system is focused on an infinite object point with F-number=$F_{min}$, and Sh is the amount of transverse chromatic aberration of magnification for h-line with respect to d-line at an image height ratio of 0.9, 0.7 and 0.5 with respect to the maximum image height.

According to the third aspect of the present invention, there is also provided an electronic image pickup system comprising an electronic image pickup device including a plurality of pixels having three or more spectral characteristics to obtain a color image and an image pickup optical system for forming a subject image on the image pickup surface of the electronic image pickup device, characterized in that:

said image pickup optical system satisfies the following conditions (33) and (34):

$$(Lh-Ld)/F_{min} \leq 6P \tag{33}$$

$$|Sh| \leq 5P \tag{34}$$

where P is the minimum pixel pitch, $F_{min}$ is the minimum F-number, Lh is the absolute value of the amount of spherical aberrations for an h-line (404.7 nm) marginal ray and Ld is the absolute value of the amount of spherical aberrations for a d-line (587.56 nm) when said optical system is focused on an infinite object point with F-number=$F_{min}$, and Sh is the amount of transverse chromatic aberration of magnification for h-line with respect to d-line at an image height ratio of 0.9, 0.7 and 0.5 with respect to the maximum image height.

In addition, the electronic image pickup system according to the third aspect of the present invention should preferably satisfy the following conditions (35) and (36):

$$(Lh-Ld)/F_{min} \geq 0.5P \tag{35}$$

$$|Sh| \geq 0.03P \tag{36}$$

According to the first embodiment of the fourth aspect of the present invention, there is provided an image pickup system characterized by comprising, at least:

an electronic image pickup device satisfying the following condition (41) and including a complementary filter comprising at least four color filter elements, an image pickup optical system having spectral characteristics given by the following conditions (42) and (43) and provided for guiding a light beam from the object side of the image pickup system to the electronic image pickup device, and a controller for carrying out signal processing and image processing on the basis of an output from the electronic image pickup device:

$$1.0 \times 10^{-4} < p/d < 6.0 \times 10^{-4} \tag{41}$$

$$8 \times T_{700} < T_{600} \tag{42}$$

$$T_{400} < T_{600} \tag{43}$$

where d is the diagonal length of an effective image pickup area of the image pickup device, p is the center separation between horizontal pixels, $T_{400}$ is a 400-nm transmittance, $T_{600}$ is a 600-nm transmittance and $T_{700}$ is a 700-nm transmittance.

The action and effect of the first embodiment of the image pickup system according to the second aspect of the present invention are now explained.

Condition (41) gives a definition of the number of pixels in the horizontal direction, which is required to obtain high image quality. The resolving power of the human eye is said to be high in the horizontal direction in particular. When the upper limit of $6.0 \times 10^{-4}$ in condition (41) is exceeded, rough images of poor image quality are obtained, and there is little or no need of obtaining the effect (to be described later) due to the use of other constituting elements in the fourth aspect of the present invention. When the lower limit of $1.0 \times 10^{-4}$ in condition (41) is not reached, pixel size becomes too small to ensure sufficient light quantity, and the effect on image quality improvements is unachievable because of the influence of diffraction. In addition, the whole size of the image pickup device becomes large, resulting in an increase in the size of the phototaking optical system, which is contrary to significant size reductions. In consideration of cost, too small a p/d value is not preferable because the whole size of an image pickup device such as a CCD has a great influence on its cost.

By use of a complementary color filter, it is possible to ensure light quantity per unit area. A four-color filter comprises magenta (M), cyan (C), yellow ($Y_e$) and green (G), of which cyan (C), yellow ($Y_e$) and green (G) have sensitivity to green light (light in the wavelength range of about 500 nm to about 550 nm) that is a significant determinant for image resolution; at least 75% of effective pixels have a large influence on image resolution. With this complementary color filter, it is thus possible to increase the number of pixels, as defined by condition (41).

Condition (42) gives a definition of infrared cutoff. By satisfying this condition, it is inevitably possible to reduce the 700-nm transmittance down to 12.5% or less and so achieve sufficient infrared cutoff effects. A deviation from the range defined by condition (42) causes light in the infrared range—which cannot be perceived by the human eyes as colors—to have a large influence on red development, and causes ill-balanced exposure, resulting in a failure in achieving preferable color reproduction.

Condition (43) gives a definition of the influence of a shorter wavelength side on red development by the complementary color filter. In color conversion by the complementary filter to R, G and B, R signals (for red development) are produced upon incidence of light in the blue wavelength range (of about 400 nm to about 430 nm in FIG. 70). When there is a deviation from the upper limit to condition (43), the input of wavelengths shorter than the red wavelength has a large influence on the strength of R signals, making color reproduction worse. Especially in the case of a phototaking optical system wherein large chromatic aberrations occur on the side of wavelengths shorter than a wavelength in the primary visible range, the spread of an originally unobtrusive spot on the shorter wavelength side (the so-called flares produced by chromatic spherical aberrations, coma, chromatic aberrations of magnification, etc.) develops striking red, resulting in image quality deterioration.

By satisfying conditions (42) and (43) with the use of the complementary color filter, it is possible to achieve satisfactory color reproduction. Even with a phototaking optical system with increased chromatic aberrations, the flares on the shorter wavelength side are sufficiently weaker as compared with images in the visible range, and so are substantially unlikely to have an influence on image quality, in consideration of the sensitivity of the human eyes.

With such a phototaking optical system, it is possible to construct a totally preferable phototaking system, because by producing chromatic aberrations on the side of wavelengths shorter than those in the primary visible range, it is possible to make the optical system compact, provide easy fabrication of the optical system, decrease the number of lenses, decrease the F-number of the optical system, make the field angle of the optical system larger than the standard (in return for the production of off-axis chromatic aberrations) or smaller than the standard (in return for the production of axial chromatic aberrations), and increase zoom ratios in the case of a zoom lens system.

It is noted that the controller may be used for the conversion of complementary colors to R, G and B, gamma correction, etc.

It is not always necessary to construct the phototaking optical system, electronic image pickup device and controller in a monolithic form. For instance, the image pickup optical system may be designed to be detachable from equipment including the electronic image pickup device, and it is acceptable to use a plurality of image pickup optical systems.

It is desired that p be in the range of 1.8 μm to 3.9 μm inclusive. At greater than the upper limit of 3.9 μm, the whole area of the electronic image pickup device increases, resulting in cost increases. At less than the lower limit of 1.8 μm, it is difficult to impart sufficient light quantity to each pixel of the image pickup device. More preferably, p should be in the range of 2.1 μm to 3.5 μm inclusive. At greater than the upper limit of 3.5 μm, the whole area of the electronic image pickup device becomes large, resulting in cost increases. At less than the lower limit of 2.1 μm, it is difficult to set up, with simple construction and at low costs, a phototaking optical system having chromatic aberrations acceptable to the fourth aspect of the present invention. If p is in the range of 2.1 μm to 3.2 μm inclusive, the balance of the image pickup device is then more improved.

According to the second embodiment of the fourth aspect of the present invention, there is provided an image pickup system comprising, at least:

a phototaking optical system, an electronic image pickup device having a complementary color filter comprising at least four color filter elements, said electronic optical system satisfying the following condition (41), and a controller for implementing signal process and image processing on the basis of an output from the electronic image pickup device, and a spectral strength curve for output signals that are produced from the electronic image pickup device upon incidence of light from the phototaking optical system thereon and photoelectric conversion of the light and correspond to at least one color filter (a curve delineated by the strength of an output signal at each wavelength when light is incident from a light source $D_{65}$ on the phototaking optical system) satisfies the following condition (44):

$$1.0 \times 10^{-4} < p/d < 6.0 \times 10^{-4} \tag{41}$$

$$0.45 < (S_{600} - S_{650})/S_p < 0.85 \tag{44}$$

where d is the diagonal length of an effective image pickup area, p is the center separation between horizontal pixels, $S_p$ is the spectral strength peak, $S_{600}$ is the strength of 600 nm and $S_{650}$ is the strength of 650 nm.

Condition (41) and the complementary color filter are the same as in the case of the first image pickup system according to the fourth aspect of the present invention.

Condition (44) gives a definition of infrared cutoff and the so-called red signal strength. Within the range defined by this condition, it is possible to obtain red signals of sufficient strength and relatively reduce the influence of the shorter wavelength side on the red development signals calculated at the controller. It is thus possible to achieve substantially satisfactory color reproduction while the effect of the complementary color filter is available. Falling short of the lower limit of 0.45 in condition (44) is not preferable, because it is impossible to obtain red signals of sufficient strength. Exceeding the upper limit of 0.85 in condition (44) is not preferable, because it is difficult to make color or infrared cutoff filters or fabricate by evaporation a thin-film coating having an infrared cutoff function, resulting in cost increases or a productivity drop due to complicated designs.

According to the third embodiment of the fourth aspect of the present invention, the first or second image pickup system is further characterized in that the electronic image pickup device comprises a complementary color filter having at least four color filter elements in which:

a first color filter G has a peak at a wavelength $G_p$ a second color filter $Y_e$ has a peak at a wavelength $Y_p$, a third color filter C has a peak at a wavelength $C_p$, and a fourth color filter M has peaks at wavelengths $M_{p1}$ and $M_{p2}$, provided that $$510 \text{ nm} < G_p < 540 \text{ nm} \tag{45-1}$$

$$5 \text{ nm} < Y_p - G_p < 35 \text{ nm} \tag{45-2}$$

$$-100 \text{ nm} < C_p - G_p < -5 \text{ nm} \tag{45-3}$$

$$430 \text{ nm} < M_{p1} < 480 \text{ nm} \tag{45-4}$$

$$580 \text{ nm} < M_{p2} < 640 \text{ nm} \tag{45-5}$$

The action and effect of the third image pickup system according to the fourth aspect of the present invention are now explained. By satisfying conditions (45-1) to (45-5), it is possible to achieve satisfactory image reproduction and allow G, $Y_e$ and C to have sufficient sensitivity to green (light in the wavelength range of about 500 nm to about 550 nm) that is a significant determinant for image resolution, thereby obtaining image resolution consistent with the large number of pixels.

According to the fourth embodiment of the fourth aspect of the present invention, the third image pickup system is further characterized in that the electronic image pickup device comprises a complementary color filter comprising at least four color filter elements, three color filter elements of which have a strength of 80% or greater at 530-nm wavelength with respect to their spectral strength peaks and one of which has a strength of 25% or greater at 530-nm wavelength with respect its spectral strength peak.

The action and effect of the fourth image pickup system are now explained. According to the construction of this image pickup system, it is possible to fetch information having an influence on image resolution from all the color filter elements.

According to the fifth embodiment of the fourth aspect of the present invention, any one of the first through fourth image pickup systems is further characterized in that the electronic image pickup device comprises a complementary color filter assembly comprising at least four color filters which are positioned in such a mosaic manner that substantially the same number of filter elements are used for each color and adjacent pixels do not correspond to the same kind of color filter elements.

The action and effect of the fifth image pickup system according to the fourth aspect of the present invention are now explained. According to the construction of this image pickup system, image quality is generally improved with improvements in image resolution, color reproduction and color resolution.

According to the sixth embodiment of the fourth aspect of the present invention, any one of the first through fifth image pickup systems is further characterized by comprising an optical element located on an object side of the system with respect to the electronic image pickup device, said optical element being coated by evaporation with a thin film having a 600-nm transmittance of 80% or greater and a 700-nm transmittance of 10% or less.

The action and effect of the sixth image pickup system are now explained. According to this construction, it is possible to achieve at low costs an image pickup system having the combined properties of the first and second image pickup systems. The so-called infrared cutoff function of cutting off light rays of 700 nm or greater may be achieved by use of an infrared cutoff filter or a combination of thin-film coats provided by evaporation on a plurality of lenses forming a phototaking optical system. However, this causes a drop of 600-nm transmittance. To ensure sufficient 600-nm transmittance and sufficient red input signals, it is preferable to use a thin-film coat obtained by evaporation on one surface, thereby achieving such characteristics as mentioned above.

According to this process, the site having a main infrared cutoff function is so thin that it is possible to prevent the overall transmittance from decreasing excessively and, hence, reduce the size of the phototaking system. In addition, the number of sites that must be controlled with infrared cutoff in mind is so reduced that productivity such as yields can be improved, resulting in some considerable cost reductions.

More preferably, the optical element should be coated by evaporation with a thin film having a 600-nm transmittance of 90% or greater and a 700-nm transmittance of 10% or less.

According to the seventh embodiment of the fourth aspect of the present invention, any one of the first through sixth image pickup systems is further characterized by comprising a phototaking optical system having an area with an effective diagonal field angle of 70° or greater.

The action and effect of the seventh image pickup system are now explained. At an effective diagonal field angle of 70° or greater, off-axis aberrations, viz., chromatic aberrations of magnification and chromatic coma are likely to occur. According to the fourth aspect of the present invention, it is possible to achieve a high image-quality phototaking system which enables colors to be reproduced with image resolution yet without recourse to any complicated construction, i.e., with little or no use of special optical elements or costly materials. It is understood that a zoom phototaking optical system having an effective diagonal field angle of 70° or greater at its wide-angle end, too, is embraced in this aspect of the present invention.

According to the eighth embodiment of the fourth aspect of the present invention, any one of the first through sixth image pickup systems is further characterized by comprising a phototaking optical system having an area with an effective diagonal field angle of 12° or less.

The action and effect of the eighth image pickup system are now explained. At an effective diagonal field angle of 12° or less, the proportion of a focal length difference due to wavelengths is likely to become large and so axial aberrations, viz., chromatic spherical aberrations are likely to occur. According to the fourth aspect of the present invention, it is possible to achieve a high image-quality phototaking system which enables colors to be reproduced with image resolution yet without recourse to any complicated construction, i.e., with little or no use of special optical elements or costly materials. It is understood that a zoom phototaking optical system having an effective diagonal field angle of 12° or less at its wide-angle end, too, is embraced in this aspect of the present invention.

According to the ninth embodiment of the fourth aspect of the present invention, any one of the first through sixth image pickup systems is further characterized by comprising a phototaking optical system having an area with an F-number of 2.8 or less.

The action and effect of the ninth image pickup system are now explained. A small F-number makes it possible to obtain sufficient light intensity even when pixel size is small. At an F-number of 2.8 or less, chromatic spherical aberrations and chromatic coma are likely to occur. According to the fourth aspect of the present invention, it is possible to achieve a high image-quality phototaking system which enables colors to be reproduced with image resolution yet without recourse to any complicated construction, i.e., with little or no use of special optical elements or costly materials. It is understood that a zoom phototaking optical system having an F-number of 2.8 or less at its wide-angle end, too, is embraced in this aspect of the present invention.

According to the tenth embodiment of the fourth aspect of the present invention, any one of the first through sixth image pickup systems is further characterized by comprising a phototaking optical system comprising, in order from an object side of the phototaking optical system, a positive, first lens group, a negative, second lens group that is movable during zooming and a lens group having a focusing function, said lens group being located on an image side of the phototaking optical system with respect to the second negative lens group.

The action and effect of the tenth image pickup system are now explained. An axial light beam incident from the object side of the system on the positive, first lens group enters the negative, second lens group while it is converged. In other words, the diameter of the second lens group can be decreased. This effect in turn enables the power of the second lens group to be so increased that the zoom ratio can be easily increased with a decrease in the F-number. Accordingly, the power of the first lens group, too, can become strong and, hence, higher-order chromatic aberrations of magnification are likely to occur. An increased zoom ratio makes higher-order chromatic aberrations of magnification likely to occur with zooming. This influence becomes prominent as the number of pixels increases as defined by condition (41). Referring here to axial chromatic aberrations, it is impossible to make perfect correction for the chromatic aberrations due to secondary spectra on the telephoto side in particular. Referring to aberrations due to reference wavelength which are not the so-called chromatic aberrations, they can be well corrected within each group or between groups with a relatively reduced number of lenses and an inexpensive material. If this image pickup system has such properties as explained with reference to the first and second image pickup systems, it is then possible to obtain substantially satisfactory image quality without recourse to any complicated or large construction or any special optical elements or costly materials, even when relatively large aberrations are produced on the short wavelength side in particular. To locate the lens group having a focusing function on the image side of the image pickup optical system with respect to the second lens group is favorable for ensuring a focusing space. This is particularly advantageous for a phototaking optical system compatible with an electronic image pickup device with an exit pupil set at a remote point, because image deterioration due to an object point distance variation can be reduced.

According to the eleventh embodiment of the fourth aspect of the present invention, the tenth image pickup system is further characterized by comprising a phototaking optical system comprising, in order from an object side of the phototaking optical system, a positive, first lens group, a negative, second lens group that is movable during zooming, a positive, third lens group and a fourth lens group that is movable during zooming and has a focusing function.

The action and effect of the eleventh image pickup system are now explained. By using the positive, third lens group, it is easy to make light incident on the electronic image pickup device nearly vertical to pixels, i.e., locate the exit pupil at a remote point. Preferably, an aperture stop should be located between the second lens group and the third lens group, so that the exit pupil can be set at a much remoter point.

According to the twelfth embodiment of the fourth aspect of the present invention, the eleventh image pickup system is further characterized by comprising a phototaking optical system comprising, in order from an object side of the phototaking optical system, a positive, first lens group, a negative, second lens group that is movable during zooming, a positive, third lens group that is movable during zooming and a positive, fourth lens group that is movable during zooming and has a focusing function.

The action and effect of the twelfth image pickup system are now explained. The positive, third lens group, because of being designed to be movable, can share the zooming action of the second lens group, so that zoom ratio improvements can be easily achieved with an F-number decrease. By giving positive power to the fourth lens group, the fourth lens group can share the ability of the third lens group to set the exit pupil at a remote point, so that the zooming function of the third lens group can be enhanced.

According to the thirteenth embodiment of the fourth aspect of the present invention, the eleventh image pickup system is further characterized by comprising a phototaking optical system comprising, in order from an object side of the phototaking optical system, a positive, first lens group, a negative, second lens group that is movable during zooming, a generally positive, third lens group that is located on an image side of the phototaking optical system with respect to the second lens group and includes at least a positive lens and a negative lens, and a lens group that is located on an image side of the phototaking optical system with respect to the third lens group and has positive power and a focusing function.

The action and effect of the thirteenth image pickup system are now explained. The positive-negative power profile of the third lens group makes it possible to locate the principle point at a relatively front point and the positive lens group is located on the image side, thereby making the overall length of the image pickup system short.

According to the fourteenth embodiment of the fourth aspect of the present invention, the thirteenth image pickup system is further characterized by comprising a phototaking optical system comprising, in order from an object side of the phototaking optical system, a positive, first lens group, a negative, second lens group that is movable during zooming, a generally positive, third lens group that is located on an image side of the phototaking optical system with respect to the second lens group and includes at least a positive lens, a positive lens and a negative lens having a strong-curvature concave surface on its image side, and a lens group that is located on an image side of the phototaking optical system with respect to the third lens group and has positive power and a focusing function.

The action and effect of the fourteenth image pickup system are now explained. The layout of the positive lens, positive lens and negative lens located in this order in the third lens group, said negative lens having a strong-curvature concave surface on its image side, is effective for correction of axial light beams and off-axis coma.

If the fourth lens group is started with at least a negative lens and a positive lens in order from its object side, the third and fourth lens groups then provide together a substantially double-Gauss type layout, which makes it easy to achieve satisfactory performance even with a decreasing F-number.

By constructing the fourth lens group of one positive lens, it is also possible to reduce the overall length of the image pickup system (because an axial beam is almost uniformly converged in the fourth lens group).

According to the fifteenth embodiment of the fourth aspect of the present invention, the fourteenth image pickup system is further characterized by comprising a phototaking optical system comprising, in order from an object side of the phototaking optical system, a positive, first lens group, a negative, second lens group that is movable during zooming, a generally positive, third lens group that is located on an image side of the phototaking optical system with respect to the second lens group and includes at least a positive lens having an aspherical surface and a cemented component consisting of a positive lens and a negative lens having a concave surface having a curvature stronger on its image side than on its object side, and a lens group that is located on an image side of the phototaking optical system with respect to the third lens group and has positive power and a focusing function.

The effect and action of the fifteenth image pickup system are now explained. By using the aspherical surface with the positive lens located on the object side in the third lens group, correction of higher-order spherical aberrations is carried out. It is then preferable to locate the aspherical surface on the image side of the positive lens because it is possible to take full advantage of the aspherical surface by choice of lens curvature. The subsequent positive lens followed by the negative lens having a concave surface having a curvature stronger on its image side than on its object side provides an layout effective for correction of axial light beams and off-axis coma. To achieve some considerable reduction of a factor for image deterioration due to a possible decentration between the positive lens and the negative lens, these lenses are cemented together.

If the fourth lens group is started with at least a negative lens and a positive lens in order from its object side, the third and fourth lens groups then provide together a substantially double-Gauss type layout, which makes it easy to achieve satisfactory performance even with a decreasing F-number.

By constructing the fourth lens group of one positive lens, it is also possible to reduce the overall length of the image pickup system (because an axial beam is almost uniformly converged in the fourth lens group).

According to the sixteenth embodiment of the fourth aspect of the present invention, any one of the first through sixth image pickup systems is further characterized by comprising an image pickup optical system comprising, in order from an object side of the phototaking optical system, a negative, first lens group that is movable during zooming, a positive, second lens group that is movable during zooming, and a lens group having a focusing function, which is located at the second lens group or on an image side of the optical system with respect thereto.

The action and effect of the sixteenth image pickup system are now explained. When the negative, first lens group and positive, second lens group are located in order from the object side of the optical system, the diameter of the second lens group tends to become large. However, this layout is effective for lowering the height of off-axis light beams incident on the first lens group and, hence, for a zoom lens or wide-angle zoom lens system having a relatively low magnification of up to about 3. The diameter of the first lens group, too, can be easily decreased so that the length of the first lens group can be reduced, thereby reducing the size of the phototaking optical system during collapsing. To take full advantage of this effect, it is required to decrease the number of lenses forming the first lens group (the reduction in the number of lenses does not only make a contribution to length reductions but is also effective for decreasing the diameter of the lens on the object side of the first lens group or the length for each lens). When the number of lenses forming the first lens group is reduced, on the other hand, higher-order chromatic aberrations of magnification are likely to occur at the wide-angle end in particular. If this image pickup system has such properties as explained with reference to the first and second image pickup systems, it is then possible to obtain substantially satisfactory image quality without recourse to any complicated or large construction or any special optical elements or costly materials, even when relatively large aberrations are produced on the short wavelength side in particular.

For speedy focusing, it is preferable for the second or third lens group to have a focusing function.

According to the seventeenth embodiment of the fourth aspect of the present invention, the sixteenth image pickup system is further characterized by comprising an image pickup optical system comprising, in order from an object side of the image pickup optical system, a generally negative, first lens group that is movable during zooming with a negative lens located nearest to an object side thereof, a generally positive, second lens group that is movable during zooming and includes at least a positive lens having an aspherical surface and a cemented component consisting of a positive lens and a negative lens having a concave surface having a curvature stronger on its image side than on its object side, and a lens group that is located at the second lens group or on an image side with respect thereto and has positive power and a focusing function.

The action and effect of the seventeenth image pickup system are now explained. According to this construction, it is possible to locate the principle point on a front side and ensure a zooming space between the first lens group and the second lens group. With the aspherical surface, it is further possible to make correction for higher-order spherical aberrations and coma in particular. With the negative lens having a concave surface that has a strong curvature on the image side, it is possible to make correction for aberrations for off-axis light beams in particular. The positive lens and the subsequent negative lens having a curvature stronger on its image side than on its object side provide an layout effective for correction of axial light beams and off-axis coma. To achieve some considerable reduction of a factor for image deterioration due to a possible decentration between the positive lens and the negative lens, these lenses are cemented together.

It is preferable to locate a positive single lens on the image side of the second lens group, said single lens being designed to remain fixed during zooming and have a strong curvature on its image side, because this single lens is effective for correction of off-axis coma, etc., and the location of the exit pupil as well. It is also preferable to locate an aperture stop between the first lens group and the second lens group, because the exit pupil can be effectively located.

According to the eighteenth embodiment of the fourth aspect of the present invention, the seventeenth image pickup system is further characterized by comprising an image pickup optical system comprising, in order from an object side of the image pickup optical system:

a generally negative, first lens group that is movable during zooming with a negative lens located nearest to the object side, a generally positive, second lens group that is movable during zooming and includes a positive lens having an aspherical surface and a cemented component consisting of a positive lens and a negative lens having a strong-curvature concave surface on an image side thereof, and a lens group that is located at the second lens group or or on an image side with respect thereto and has a focusing function, said image pickup optical system satisfying the following condition (46):

$$-\beta_T > 1.2 \tag{46}$$

where $\beta_T$ is the magnification of the second lens group at its wide-angle end.

The action and effect of the eighteenth image pickup system are now explained. Condition (46) is the requirement for effectively reducing the length of each lens group. Any deviation from condition (46) makes the power of the first lens group strong, resulting in an increase in the number of lenses and, hence, in the length of the system.

The lens layout for each of the tenth through eighteenth image pickup systems is designed mainly with aberrations for reference wavelength and paraxial arrangements in mind. If this lens layout is used in combination with the first or second image pickup system, it is then possible to obtain ever higher image quality with more simplified construction, lower-cost construction or more compact construction.

The level of chromatic aberrations is now explained more specifically. As already mentioned, the optical system is designed in such a way that when focused on an infinite object point in the range of 70% of the effective screen, the chromatic aberrations in meridian section at a 400-nm wavelength are equivalent in size to four or more pixels. It is thus possible to provide an optical system of simplified construction, which makes it possible to enhance its image-formation capability in the wavelength region taking part in image formation. In this regard, an account is given of the limitation that the chromatic aberrations in meridian section are equivalent in size to four or more pixels. Here consider the state where the image pickup system is focused on an infinite object point (i.e., the state where the image pickup system is focused through an autofocusing mechanism on a nearly infinite object point or it is focused on a nearly infinite object point in a manual focusing mode set on an infinite memory, or the state where the peak of an axial PSF (point spread function) strength at d-line (587.6 nm) is maximized with respect to an infinite object point on an optical axis. Then, the chromatic aberrations are defined by a size δ on meridian section, which accounts for at least 1.6% of the maximum value of the PSF strength at a specific wavelength. In other words, the aforesaid limitation means that the size δ (400) at 400-nm wavelength is equivalent to four or more pixels.

Also assume the length from the center of the image pickup surface to the maximum effective image height to be equal to 1. Then, the range of 70% of the effective screen is defined by the inside of a circle, the radius of which is 7/10 of that length.

The present invention is further characterized in that chromatic aberrations for a wavelength of 435 nm to 600 nm are equivalent to three or less pixels in the range of 70% of the effective screen, thereby providing an image pickup optical system wherein the change in the image-formation capability due to wavelength is on a practically acceptable level.

Here let d represent the effective diagonal length of the electronic image pickup device, and δ(400) and δ(420) stand for chromatic aberrations at 400-nm wavelength and 420-nm wavelength as found in the range of 70% of the effective screen, respectively. It is then preferable to satisfy $$\delta(400)/d > 2.0 \times 10^{-3}$$

It is more preferable to satisfy $$\delta(420)/d < 1.5 \times 10^{-3}$$

While the chromatic aberrations for 400-nm wavelength and 420-nm wavelength have been discussed, it is understood that even when the chromatic aberrations for 400-nm wavelength are replaced by those for h-line (404.7 nm) and the chromatic aberrations for 420-nm wavelength are replaced by those for g-line (435.8 nm), the same effects are achievable.

Referring to the chromatic aberration of magnification, it is preferable that the distance between the peak of a d-line spot and the peak of a g-line spot is equivalent to seven or less pixels all over the effective screen of the electronic image pickup device. More preferably in this case, the distance between the d-line and the g-line should be equivalent to ten or more pixels.

Alternatively, let Δdh, Δdg and d represent the distance between the peaks of d- and h-lines, the distance between the peaks of d- and g-lines and the effective diagonal length of the electronic image pickup device, respectively. It is then preferable that at least a part of the screen satisfies $$\Delta dh/d > 6.0 \times 10^{-3}$$

More preferably in this case, the whole screen satisfies $$\Delta dg/d < 4.5 \times 10^{-3}$$

The aspects of the present invention as mentioned above are effective for making correction for the "color running" found on high-contrast boundaries (e.g., edge portions of an object image) of the phototaking image.

In summary, the present invention can provide an electronic image pickup system comprising:

a phototaking optical system on which a light beam from an object is incident, a color filter for splitting a light beam passing through the phototaking optical system into a plurality of colors, an electronic image pickup device for sensing a light beam upon passing through the color filter, and a color running correction means for reducing a color running that occurs at a brightness boundary in an output image from an object image sensed by the electronic image pickup device and is included in the range defined by $$0.25 \leq x \leq 0.65$$

$$0.465x - 0.076 \leq y \leq 0.25$$

as represented in terms of x-y chromaticity coordinates.

The aforesaid range corresponds to a hatched region on a well-known x-y chromaticity diagram as shown in FIG. 83 or, in color parlance, corresponds to reddish purple or the like.

The color in this range is a color component perceived by the observer as color flares, as already explained. By making satisfactory correction for this color with the constructions explained above, it is possible to obtain satisfactory images.

If the aforesaid "color running" correction mechanism is used to reduce down to 1% or less an output included in the range defined by $$0.25 \leq x \leq 0.65$$

$$0.465x - 0.076 \leq y \leq 0.25$$

as represented in terms of x-y chromaticity coordinates, provided that the upper limit to a dynamic range is given by white.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 26 is a schematic representation of a so-called digital camera that is one embodiment of the electronic image pickup system according to the second aspect of the invention.

FIG. 41 is a diagram illustrative of the spherical aberration at the wide-angle end and chromatic aberration of magnification with respect to g-line of the image pickup optical system of FIG. 40 upon focused at an infinite object point.

DESCRIPTION OF THE PREFERRED EMBODIMENTS

Embodiments and examples of the image pickup system according to the first aspect of the present invention are now explained with reference to the accompanying drawings.

Figure 1:
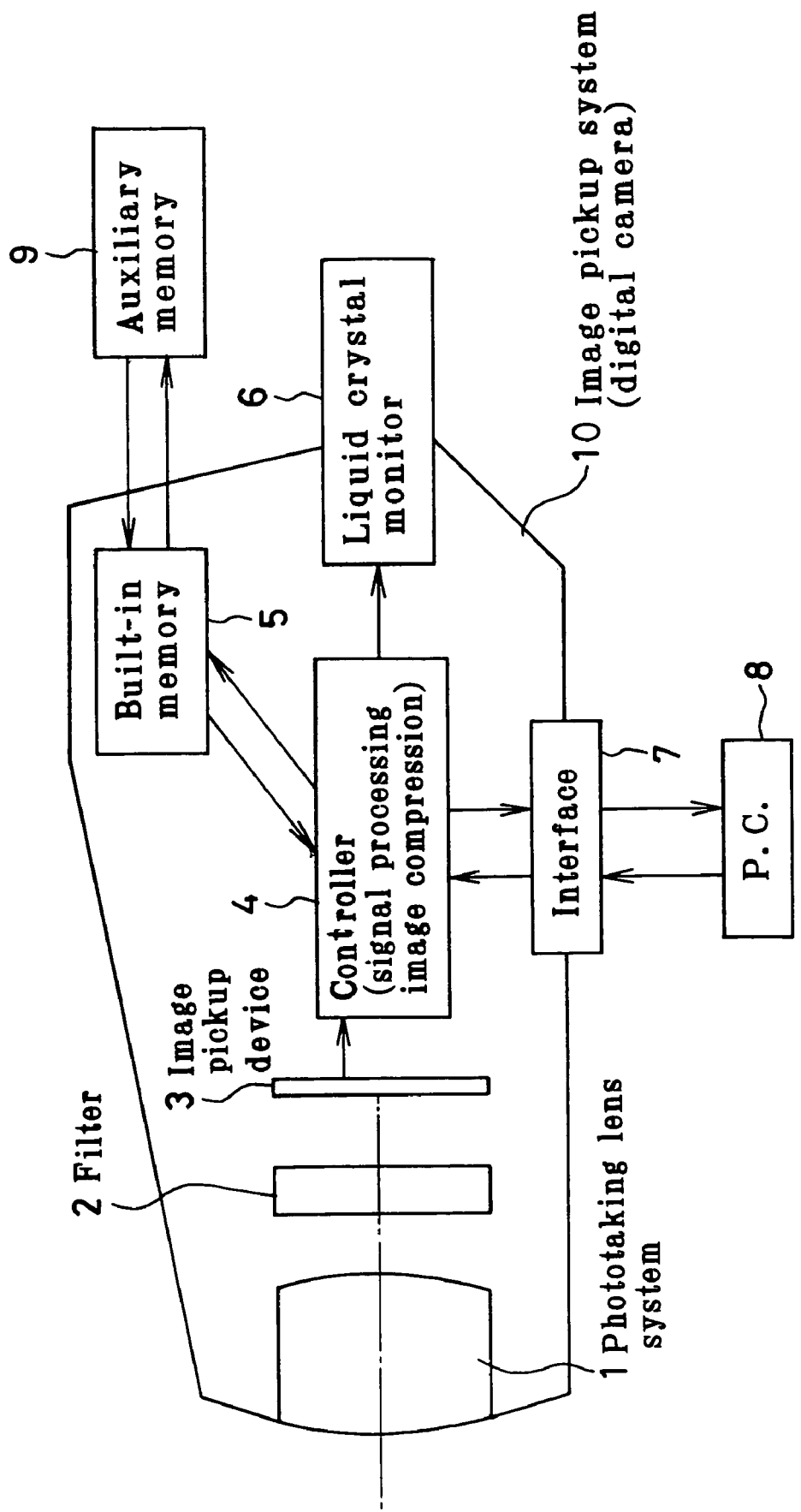
FIG. 1 is a block diagram illustrative of the first embodiment of the digital camera according to the first aspect of the invention.

FIG. 1 is a schematic illustrative of a so-called digital camera 10. A light beam emanating from an object point is subjected to image formation by a phototaking lens system 1 made up of optical elements making use of a refraction phenomenon alone to form an image on an image pickup device 3 such as a CCD. To prevent a so-called moire phenomenon resulting from the fact that the image pickup device 3 is an array of regularly located photoelectric converters, a filter 2 having a low-pass effect is located in front of the image pickup surface 3. In addition, a filter having an IR cutoff effect for cutting off infrared light may be located. The light beam incident on the image pickup device 3 is converted by the photoelectric converters to electric signals, which are then entered into a controller 4. The electric signals are subjected at the controller 4 to signal processing such as gamma correction or image compression processing, and sent via a built-in memory 5 and an interface 7 to a personal computer 8 or the like. The resulting signals may be transmitted from the controller 4 to a liquid crystal monitor 6 which makes it possible for the operator to check up the image to be phototaken or the phototaken image. Alternatively, image data may be transmitted from the built-in memory 5 to an auxiliary memory 9 such as a so-called smart medium (trade mark). In this embodiment, the image pickup system is constructed such that the 400-nm wavelength input/output ratio is preferably 5% or less, and more preferably 2% or less, with respect to the input/output ratio for a wavelength of 400 nm to 700 nm incident on the phototaking optical system 1 at which the ratio of the output signal strength with respect to the input quantity of light is high (the ratio of the output signal strength with respect to the input quantity of light).

Alternatively, the image pickup system may be constructed such that the 420-nm wavelength input/output ratio is preferably 10% or greater, more preferably 15% or greater and more preferably 20% or greater with respect to the input/output ratio for the wavelength of 400 nm to 700 nm at which the ratio of the output signal strength with respect to the input quantity of light is high (the ratio of the output signal strength with respect to the input quantity of light).

Figure 2:
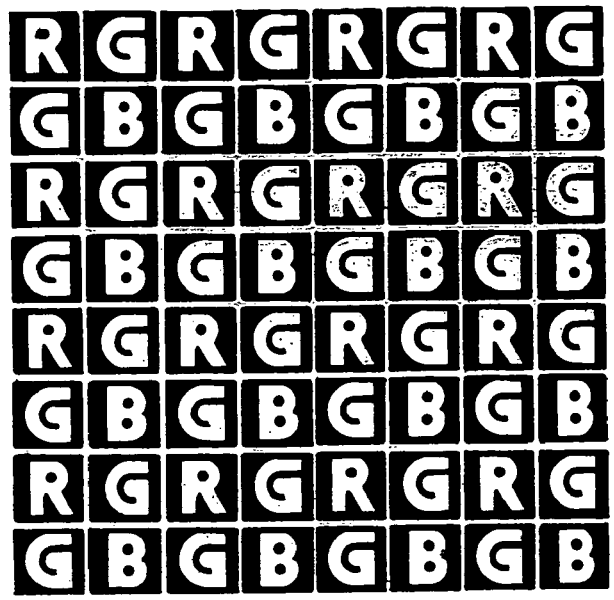
FIG. 2 is a schematic illustrative of the filter arrangement of a primary colors filter.
Figure 3:
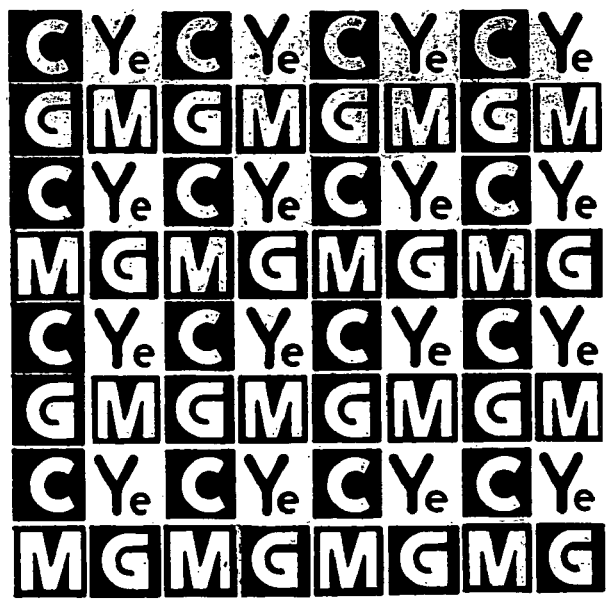
FIG. 3 is a schematic illustrative of the filter arrangement of a complementary colors filter.
Figure 4:
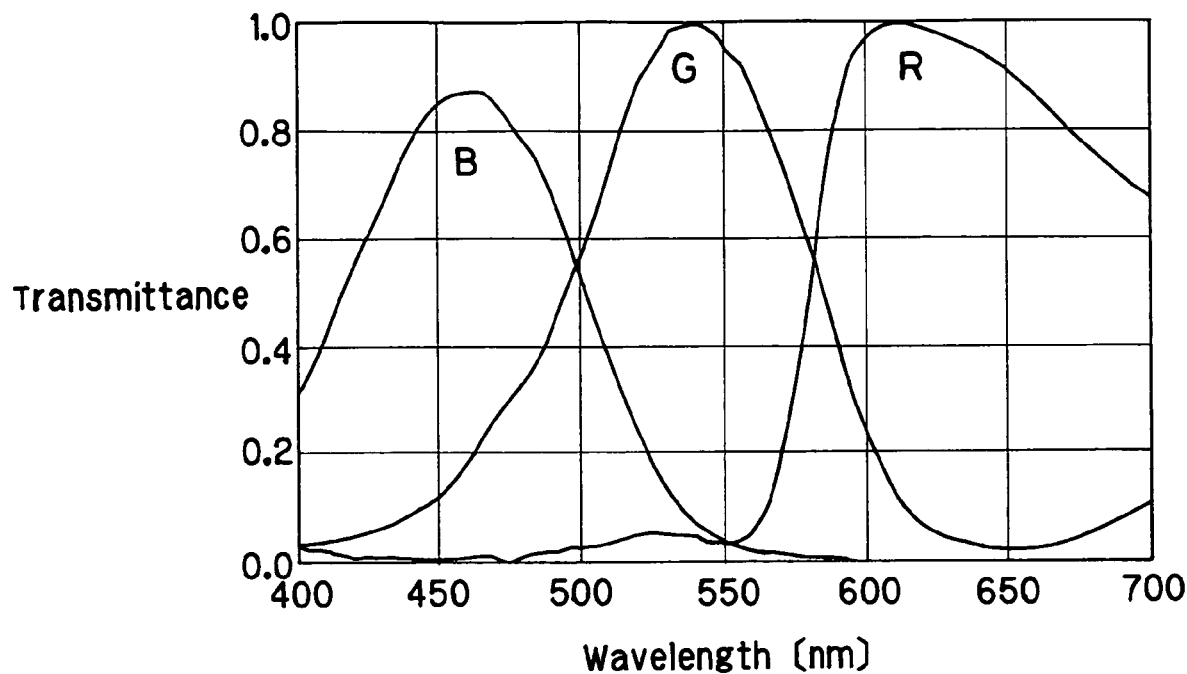
FIG. 4 is a diagram illustrative of the wavelength characteristics of FIG. 2.
Figure 5:
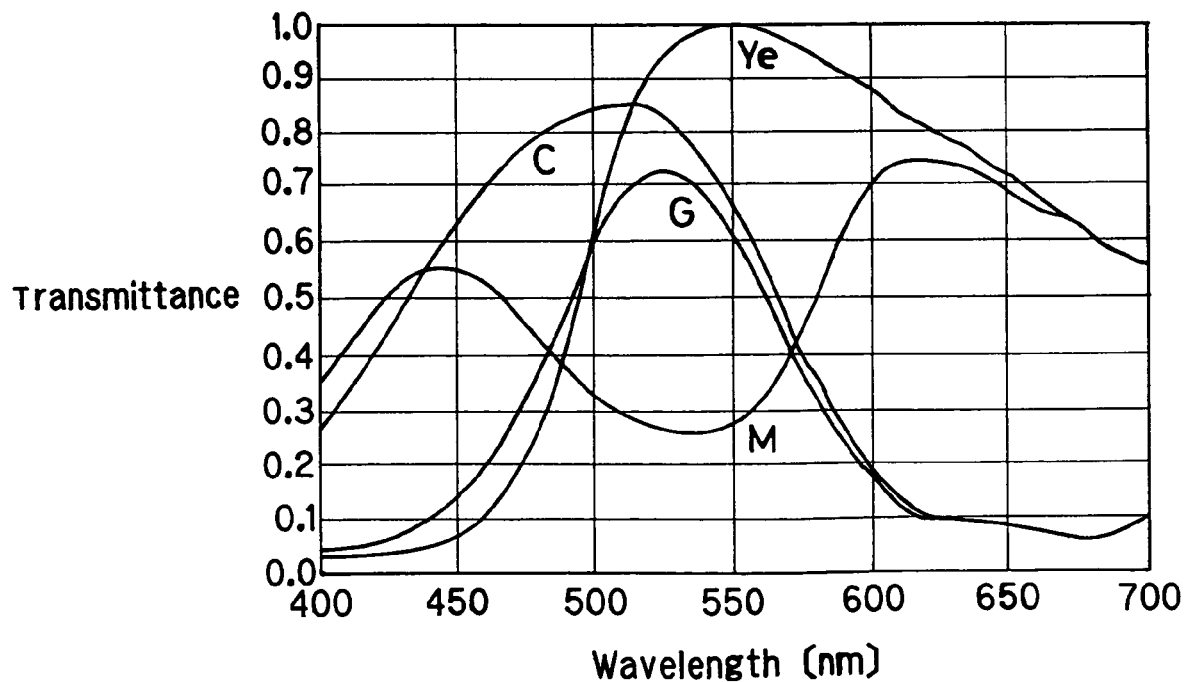
FIG. 5 is a diagram illustrative of the wavelength characteristics of FIG. 3.

To obtain a color image, a color filter having such a filter arrangement as shown in FIG. 2 or 3 is located in front of the image pickup device so as to achieve a photoelectric conversion device having at least three different wavelength characteristics. The filter shown in FIG. 2 is of the type called a primary color filter comprising red (R), green (G) and blue (B) filter elements. The respective wavelength characteristics of these filter elements are shown in FIG. 4. The filter shown in FIG. 3 is of the type called a complementary color filter comprising cyan (C), magenta (M) and yellow ($Y_e$) filter elements. The respective wavelength characteristics of these filter elements are shown in FIG. 5. When the complementary color filter is used as the filter, the filtered light is converted by the controller 4 to R, G and B according to the following processing:

for luminance signals $$Y=|G+M+Y_e+C|*\tfrac{1}{4}$$

for color signals $$R-Y=|(M+Y_e)-(G+C)|$$

$$B-Y=|(M+C)-(G+Y_e)|$$

With the primary color filter, it is easy to carry out processing for color reproduction, and with the complementary color filter, it is possible to increase the quantity of light with respect to the photoelectric conversion surface.

Figure 6:
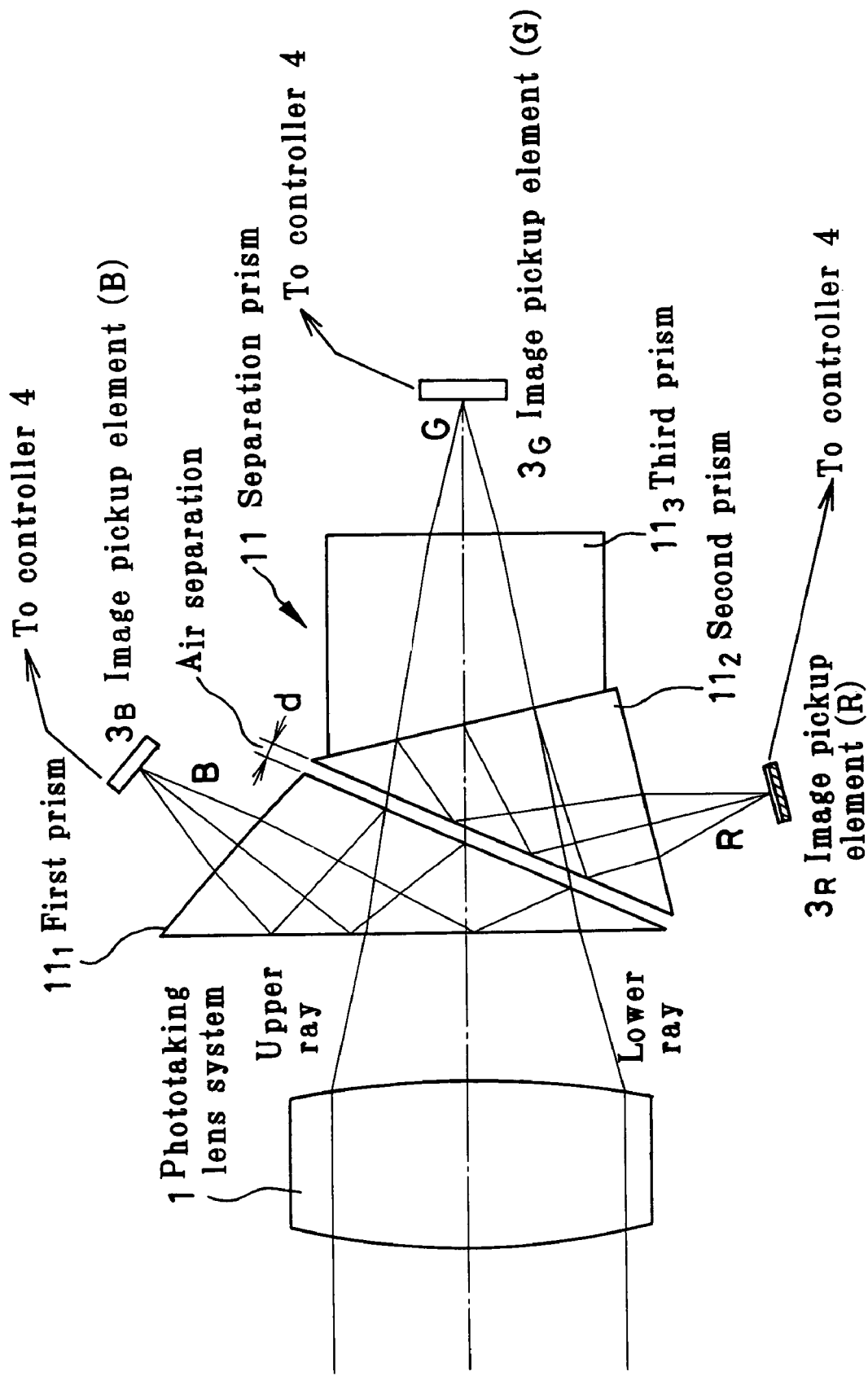
FIG. 6 is a schematic illustrative of another embodiment of the digital camera according to the invention.

The color image may also be obtained by locating a color separation filter on the image side of the phototaking lens system 1 to form images on three or more image pickup elements. In FIG. 6, light is separated into R, G and B. More specifically, a light beam emanating from an object point is subjected to image formation by the phototaking lens system 1 made up of optical elements making use of a refraction phenomenon alone, and then separated by a color separation prism 11 into R, G and B, said prism 11 comprising a first prism element $11_1$, a second prism element $11_2$ and a third prism element $11_3$ with a dichroic mirror applied on the interface between adjacent prism elements. The thus color-separated R, G and B image-formation light beams form images on R, G and B phototaking image pickup elements $3_R$, $3_G$ and $3_B$, respectively.

Figure 7:
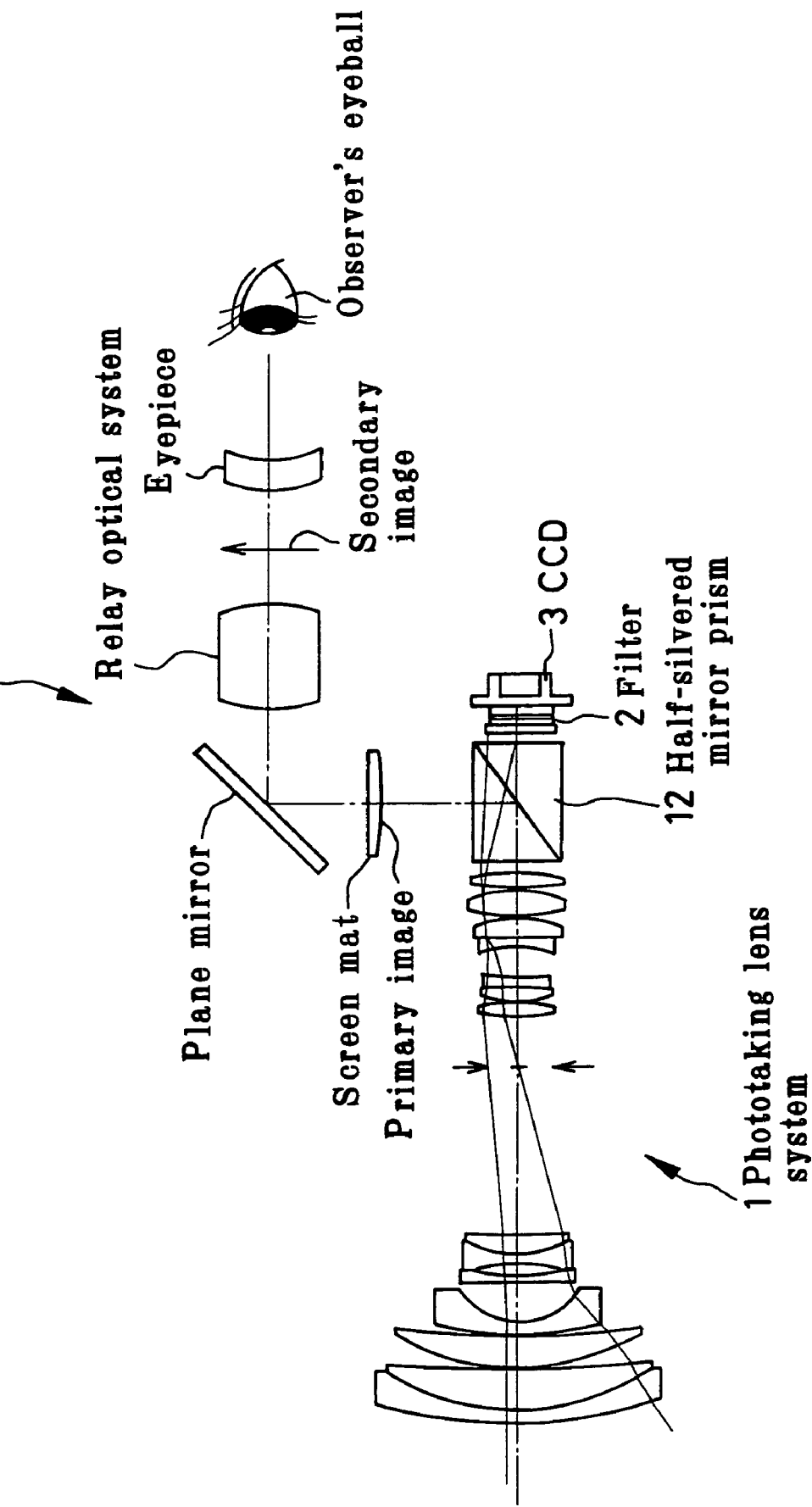
FIG. 7 is a schematic illustrative of yet another embodiment of the digital camera according to the invention.

FIG. 7 shows a modification to the FIG. 1 embodiment, using a so-called TTL finder type wherein a light beam is split by a half-silvered mirror prism 12 located on the object side of an image pickup element 3 for guidance to a finder optical system 13. This type is characterized in that a subject can be observed with reduced power consumption. Between the finder optical system and a phototaking system, the ratio of a light beam emerging from the optical path splitter means 12 toward the image pickup element 3 with respect to a light beam incident on the optical path splitter means 12 may be set at less than 1 at 400-nm wavelength. In the FIG. 7 embodiment, the image pickup device 3 is located on the transmission side and the finder optical system 13 is positioned on the opposite side. However, it is noted that it is acceptable to locate the image pickup device on the opposite side and dispose the finder optical system on the transmission side.

Here the strength of the signal produced from the image pickup device in response to the incident light beam is defined as the output signal strength ratio. In an image pickup device having spectral sensitivity characteristics with respect to every image formation, too, it is desired that the 400-nm wavelength input/output ratio be preferably 10% or less, more preferably 5% or less and even more preferably 2% or less with respect to the input/output ratio for a 400-nm to 700-nm wavelength at which the ratio of the output signal strength with respect to the input quantity of light (the output signal strength ratio with respect to the input quantity of light) is high.

Figure 8:
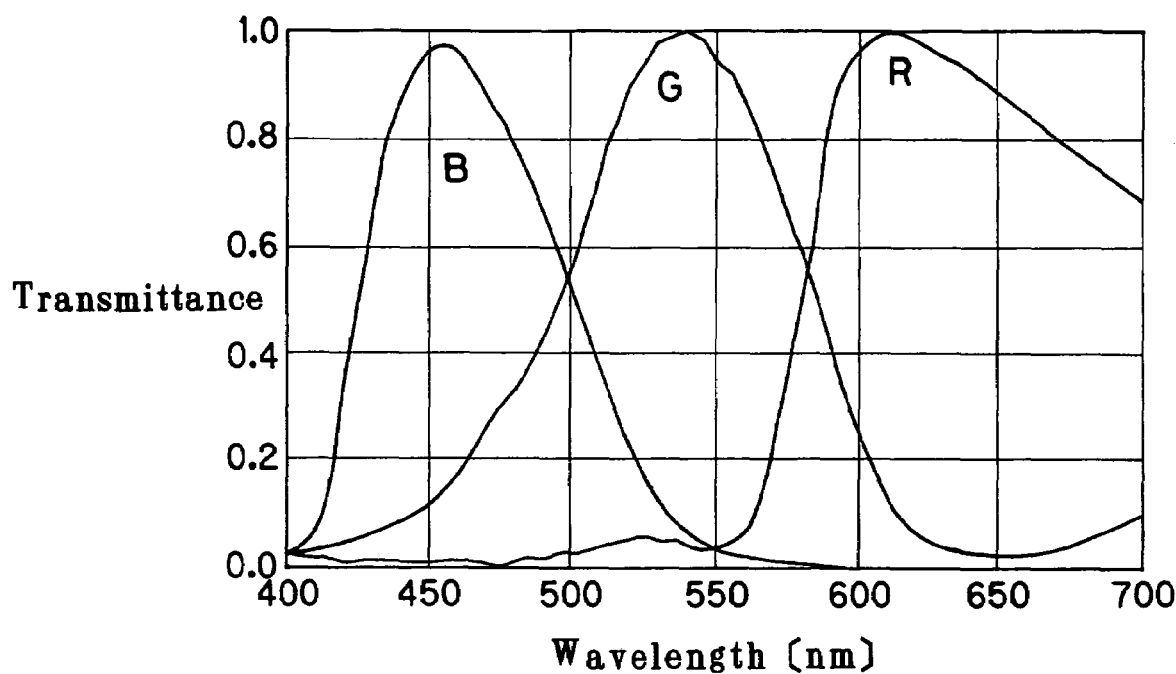
FIG. 8 is a diagram illustrative of one example of the characteristics of the primary colors filter.
Figure 9:
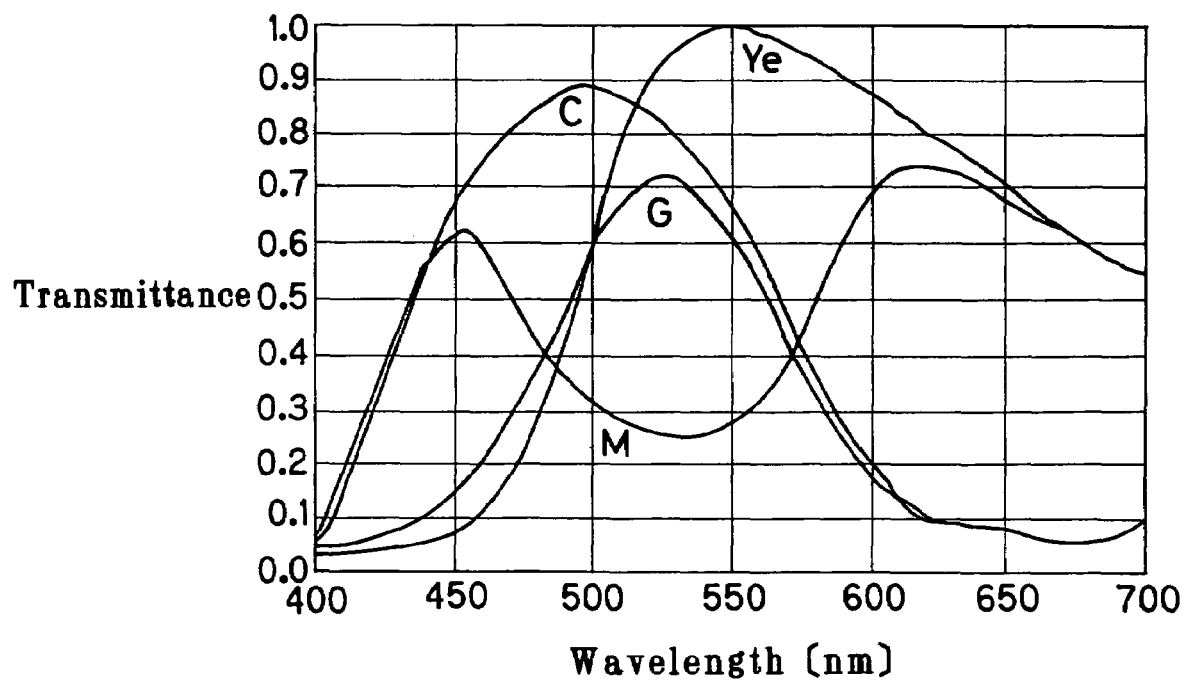
FIG. 9 is a diagram illustrative of one example of the characteristics of the complementary colors filter.
Figure 10:
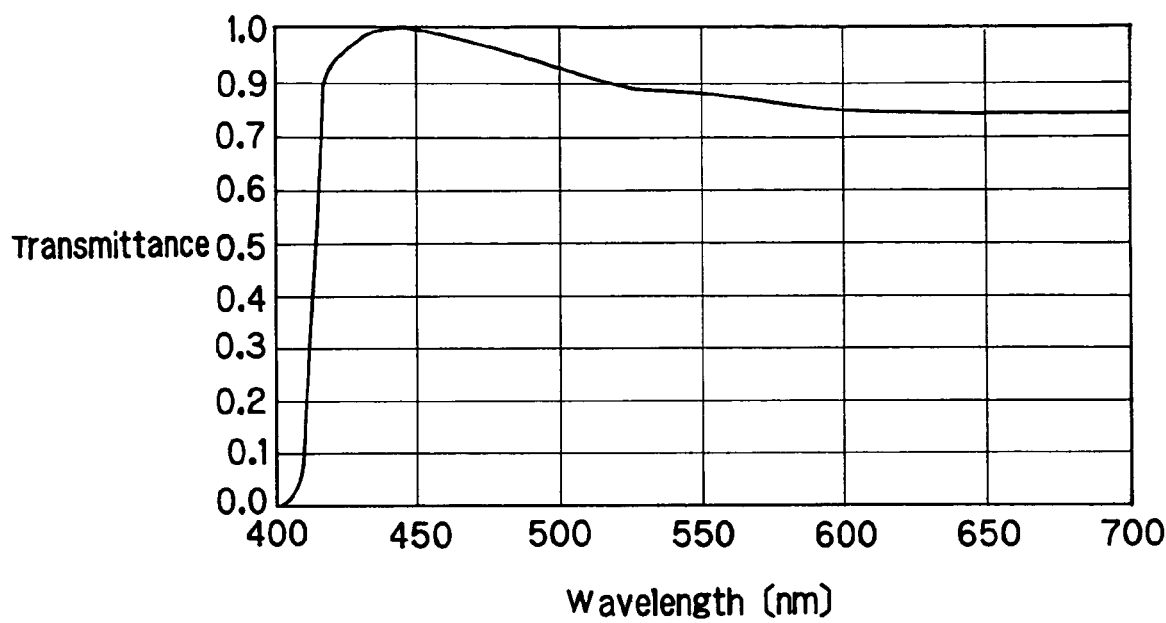
FIG. 10 is a diagram illustrative of the characteristics of the filter used to obtain the characteristics of FIG. 9 by its superposition on the filter having the characteristics of FIG. 5.

For these embodiments, a color filter having such characteristics as shown in FIG. 8 or FIG. 9 may be used. Referring to FIG. 9, the filter having such characteristics shown in FIG. 5 is superposed on the filter having such characteristics as shown in FIG. 10, so that the characteristics of magenta can be easily achieved.

Figure 11:
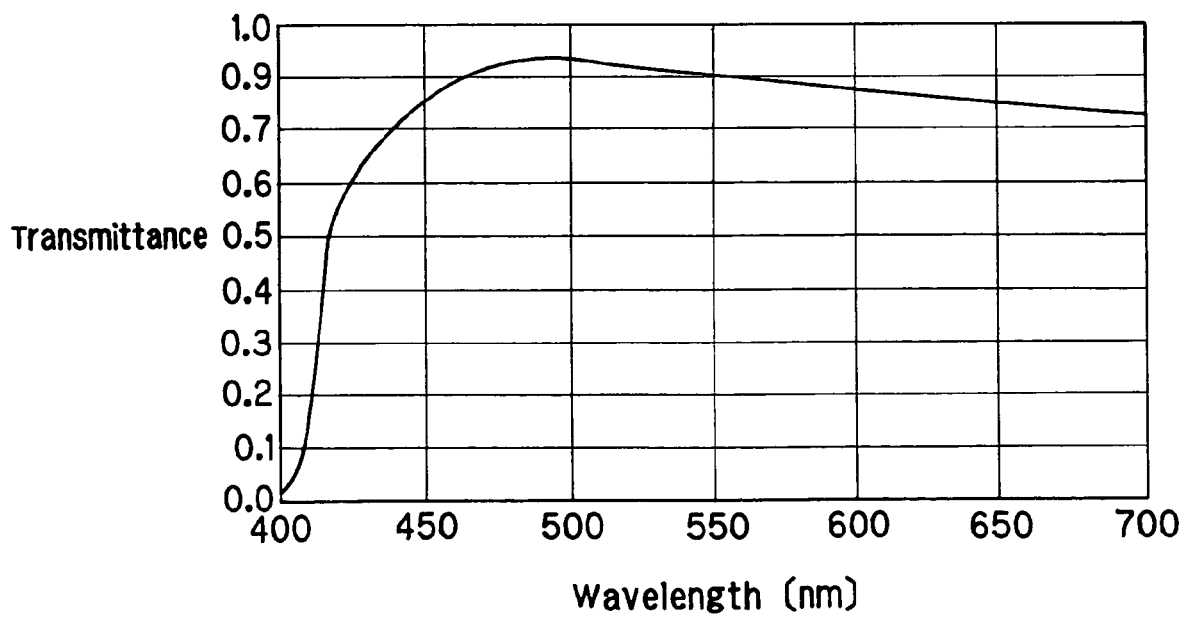
FIG. 11 is a diagram illustrative of one example of the transmittance characteristics of an image pickup lens.
Figure 12:
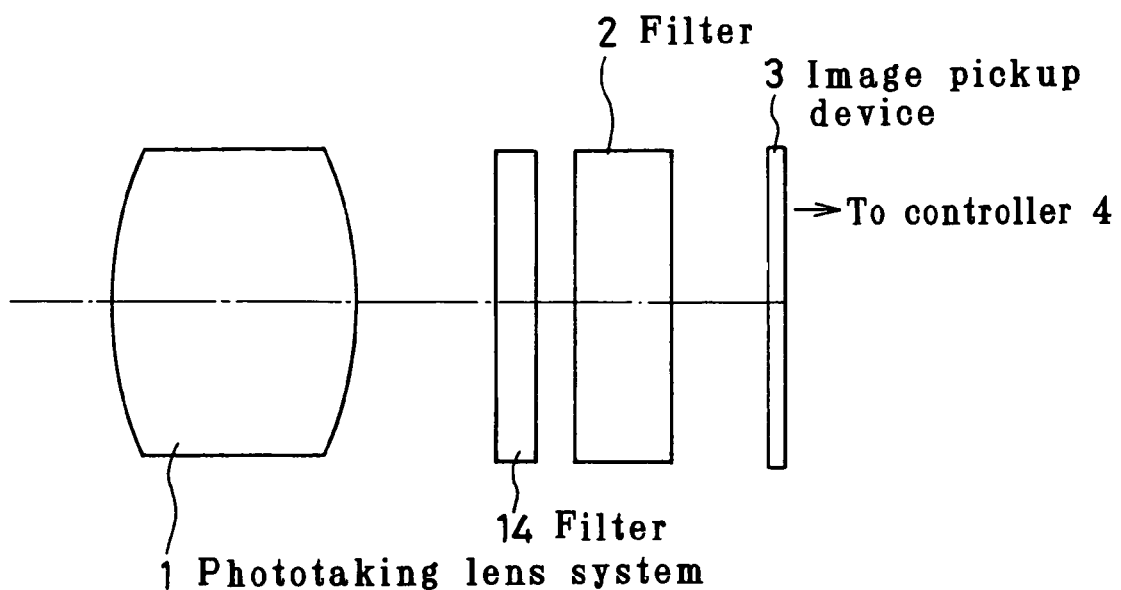
FIG. 12 is a schematic illustrative of the embodiment of the invention wherein the transmittance control filter is located on the object side of the system with respect to the image pickup device.
Figure 13:
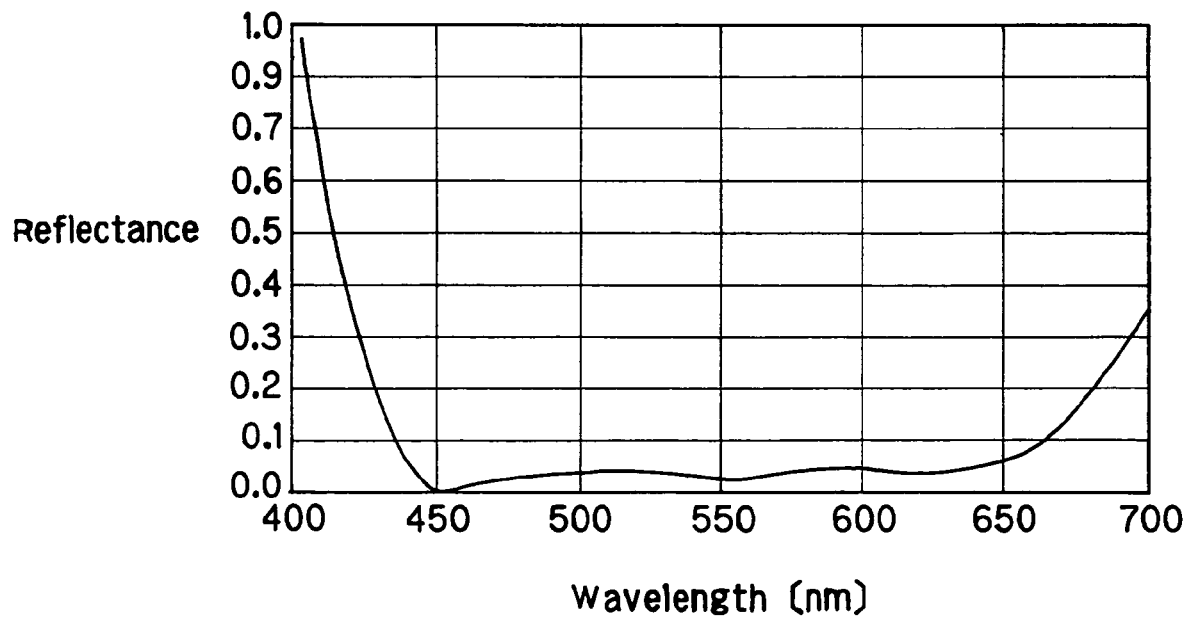
FIG. 13 is a diagram illustrative of one example of the characteristics of the antireflection coating.

As shown in FIG. 11, the transmittance of the image pickup lens may be designed such that the sensitivity of the lens to 400-nm wavelength is kept low while the sensitivity of the lens to 420-nm wavelength is maintained intact. Then, a transmittance control filter 14 may be spaced away from the object side of the image pickup device 3 as shown in FIG. 12. Alternatively, this control function may be offloaded from the filter 14 and placed on other filter. It is also acceptable to apply an antireflection coating having such characteristics as shown in FIG. 13 on a lens element that forms a phototaking lens system. This coating may be applied on the lens element by the evaporation of materials such as $MgF_2$ and $SiO_2$ in an appropriately multilayered form.

Figure 14:
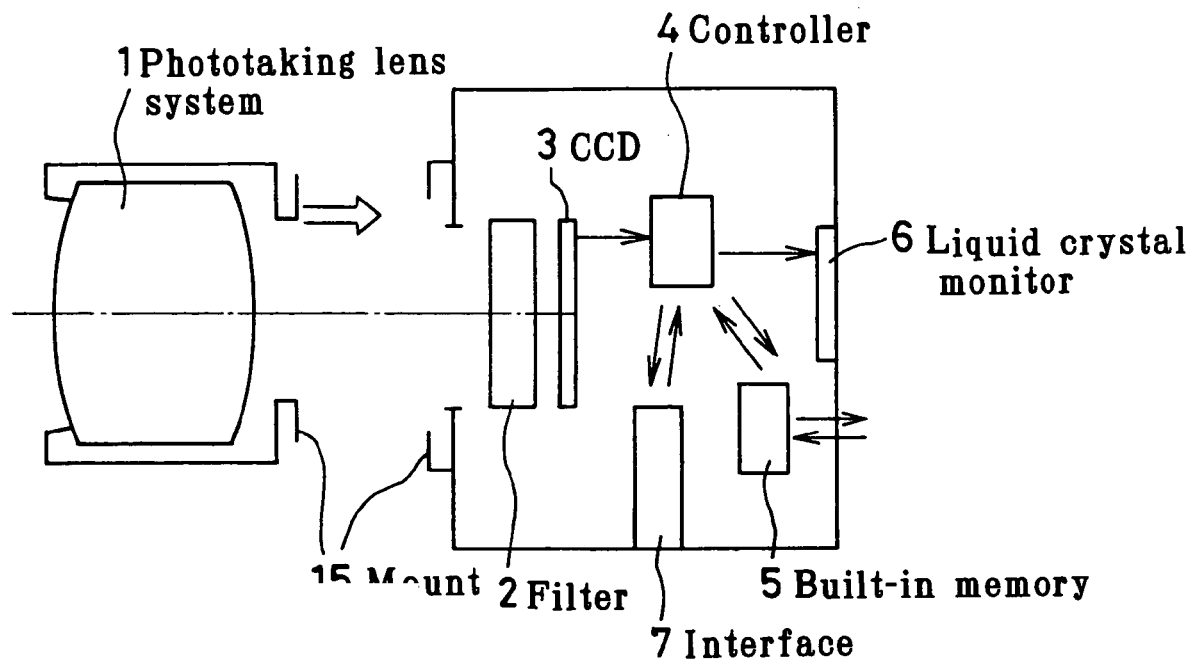
FIG. 14 is a schematic illustrative of another embodiment of the digital camera according to the first aspect of the invention.

In another embodiment, a phototaking lens system 1 may be detachable from a body including an image pickup device 3 as shown in FIG. 14. A mount 15 used to this end, for instance, may be of either the screw coupling type or the bayonet coupling type. Then, control of transmittance with respect to 400-nm and 420-nm wavelengths may be carried out by the phototaking lens system 1. Alternatively, control of output signals with respect to incident light of 400-nm and 420-nm wavelengths may be carried out with the body including image pickup device 3. By controlling the 400-nm and 420-nm wavelength transmittance with the phototaking lens system 1, for instance, it is possible to achieve the economies of mass production of image pickup devices 3. For applications where the quantity of light on the short wavelength side in particular must be ensured depending on color reproducibility, another phototaking lens system may be provided. By controlling the output signals with respect to incident light of 400-nm and 420-nm wavelengths with the body including image pickup device 3, it is possible to achieve satisfactory color reproduction with high image-formation capability, even when a conventional phototaking lens system is used.

Set out below are Examples A through F of the optical system suitable for use with the aforesaid embodiments of the present invention. Some examples use filters and some do not; the filters may be optionally used.

Figure 15:
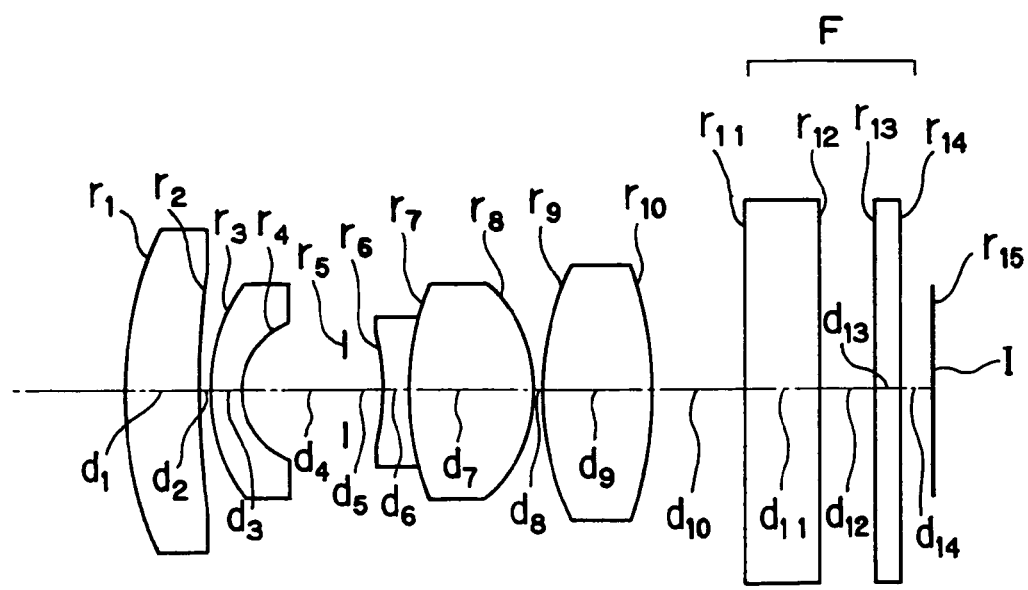
FIG. 15 is a sectional representation of Example A including its optical axis.
Figure 16:
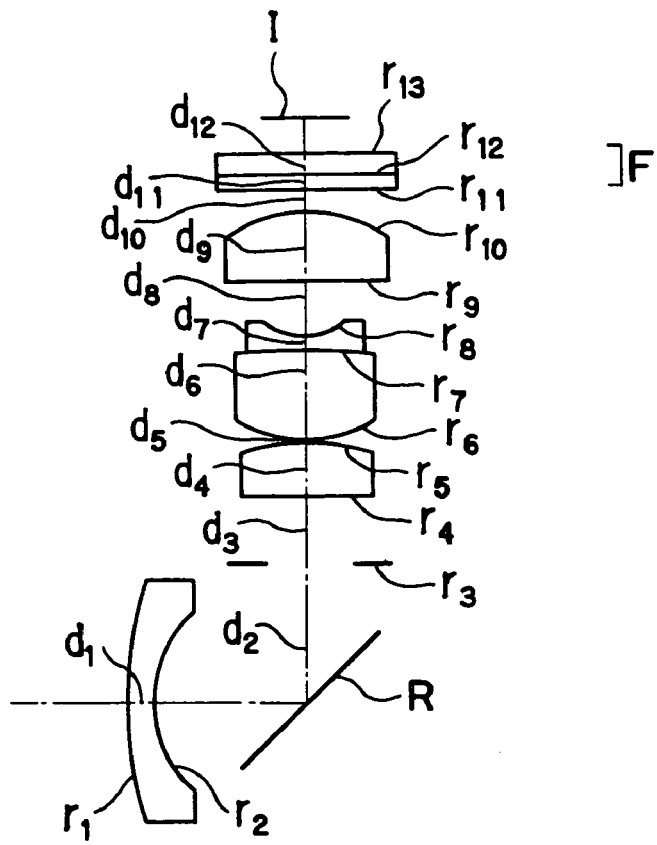
FIG. 16 is a sectional representation of Example B including its optical axis.
Figure 17:
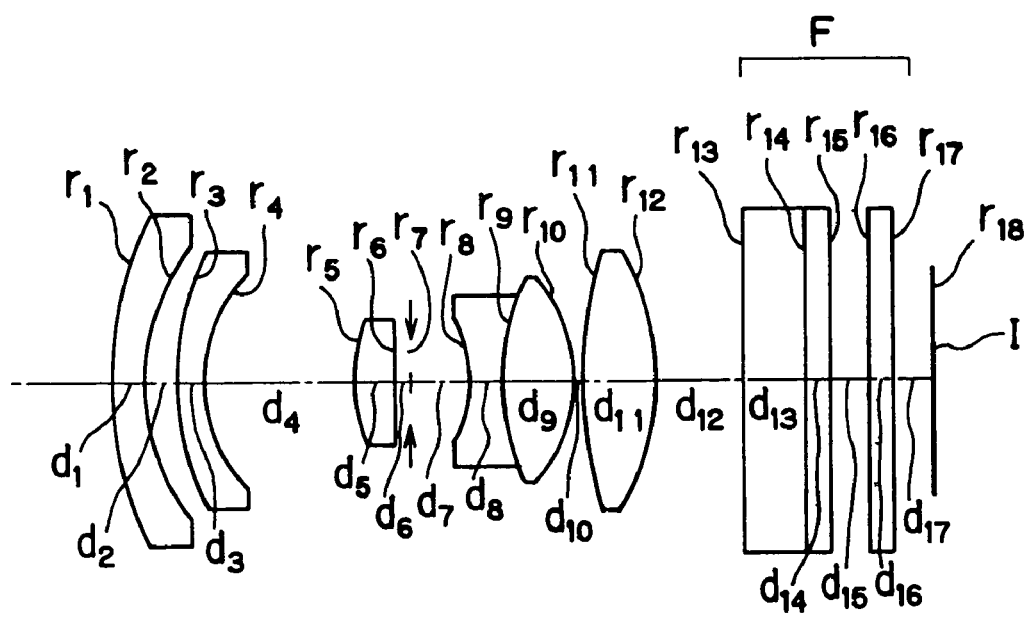
FIG. 17 is a sectional representation of Example C including its optical axis.
Figure 18:
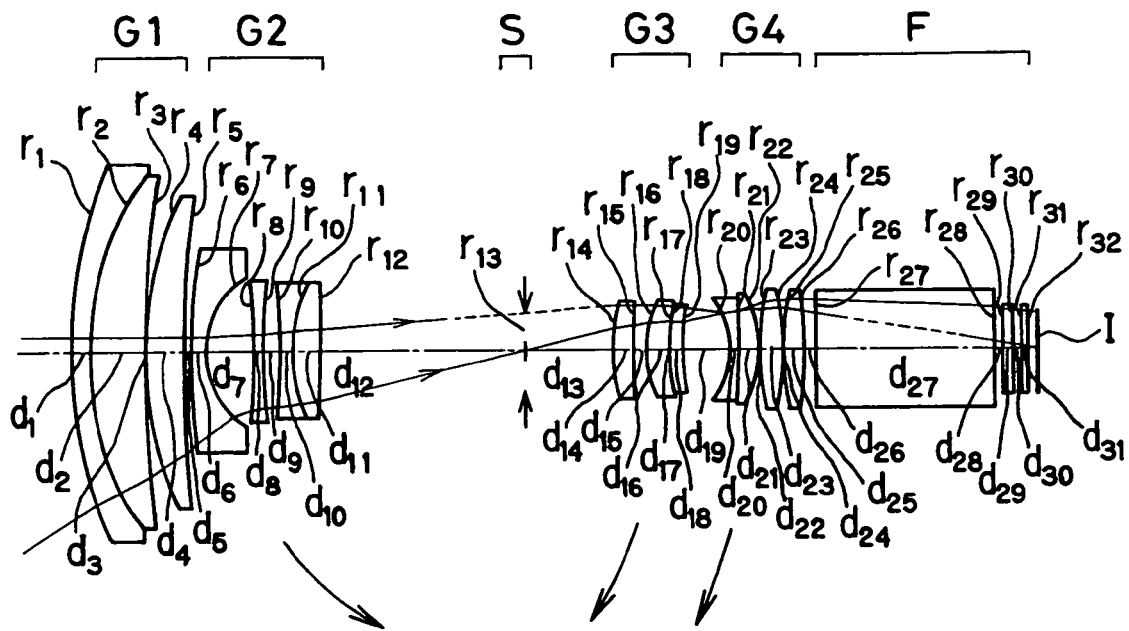
FIG. 18 is a sectional representation at the wide-angle end of Example D including its optical axis.
Figure 19:
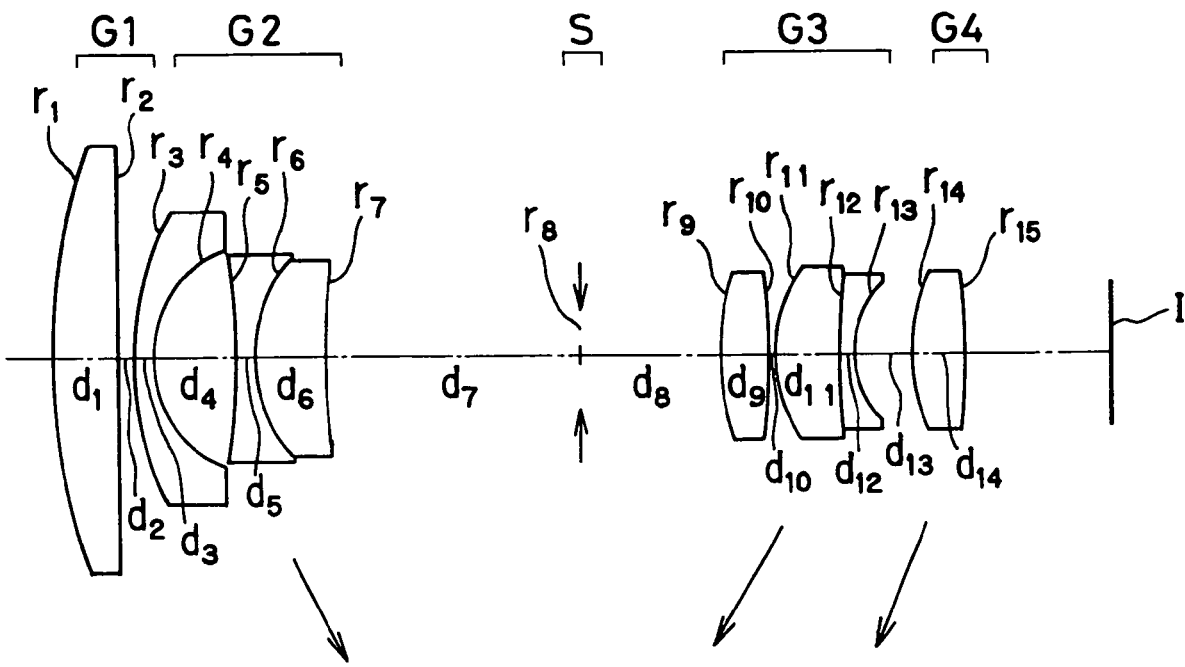
FIG. 19 is a sectional representation at the wide-angle end of Example E including its optical axis.
Figure 20:
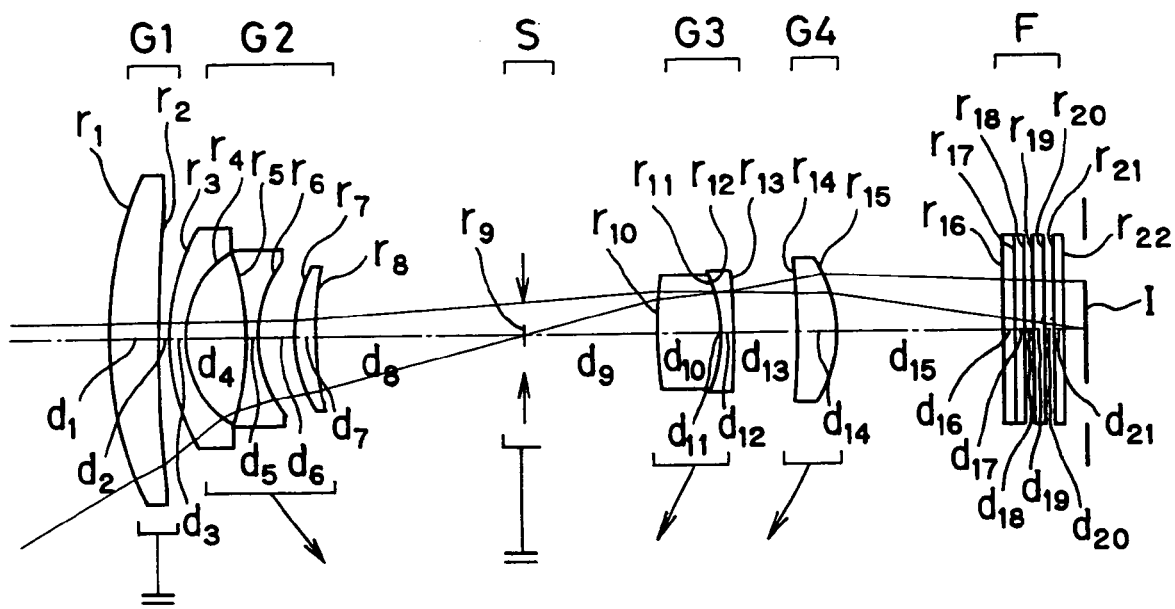
FIG. 20 is a sectional representation at the wide-angle end of Example F including its optical axis.
Figure 25:
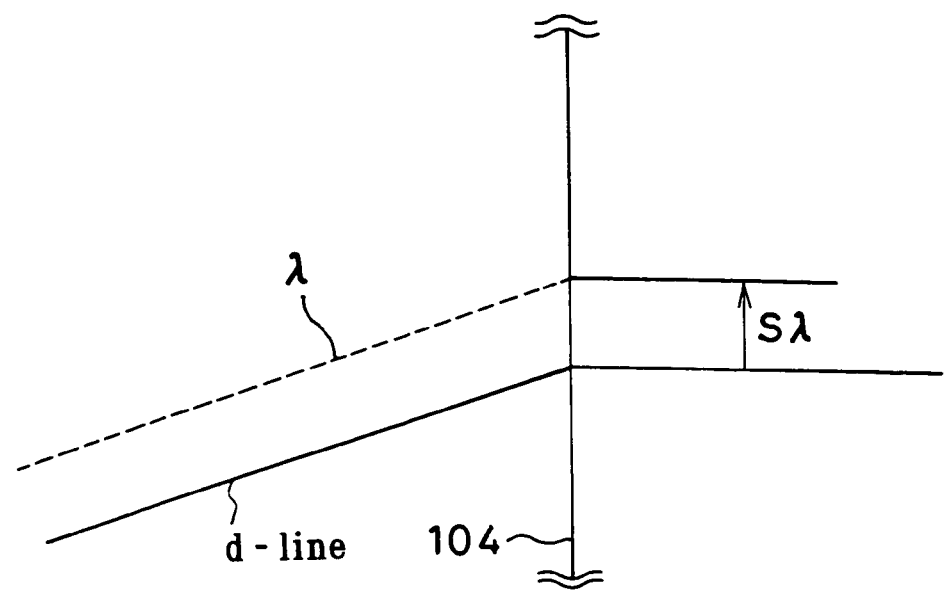
FIG. 25 is illustrative of how chromatic aberrations of the image pickup optical system of FIG. 21 are seen at the image height ratio of 0.9 on the image plane.
Figure 21:
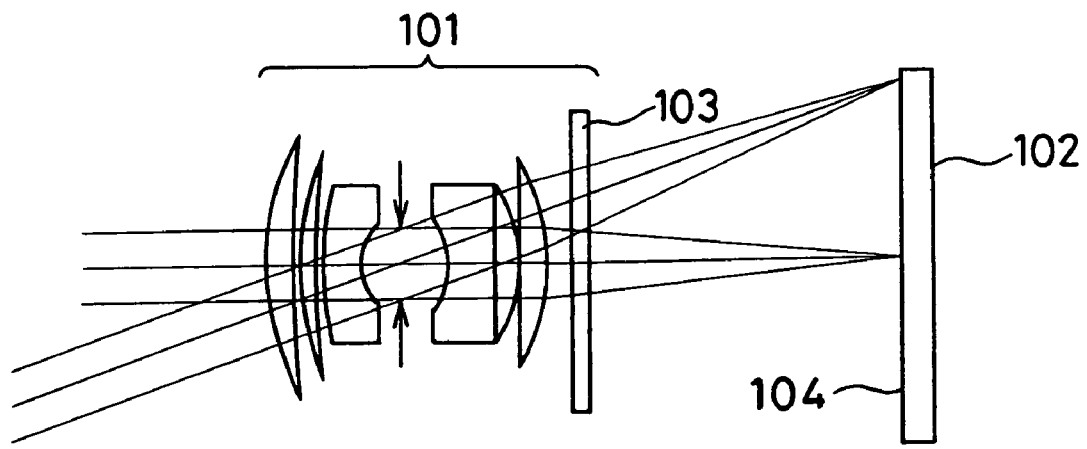
FIG. 21 is a conceptual representation of the image pickup optical system according to the second aspect of the invention.
Figure 22:
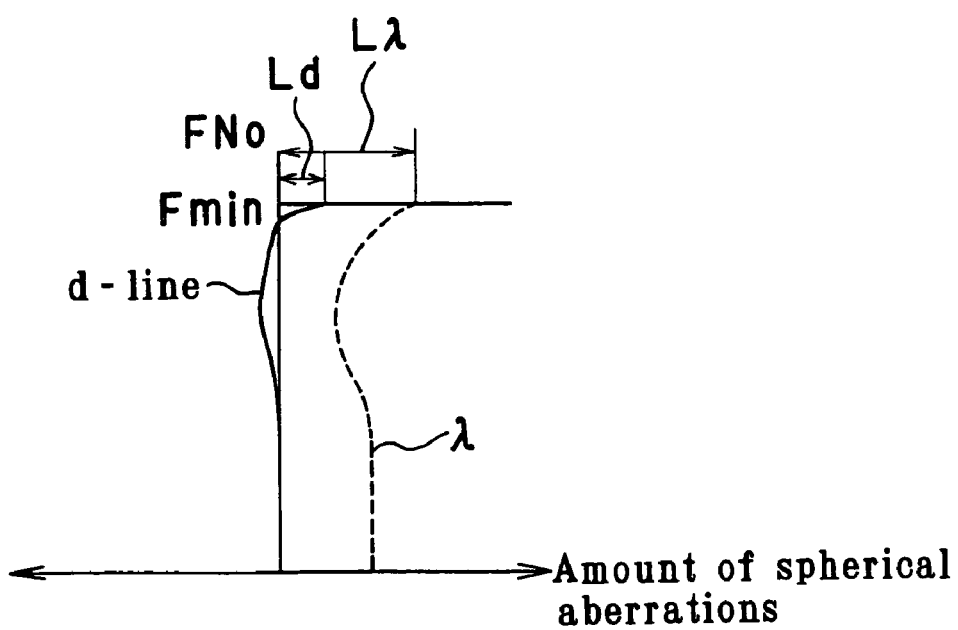
FIG. 22 is a spherical aberration diagram for the image pickup optical system of FIG. 21.
Figure 23:
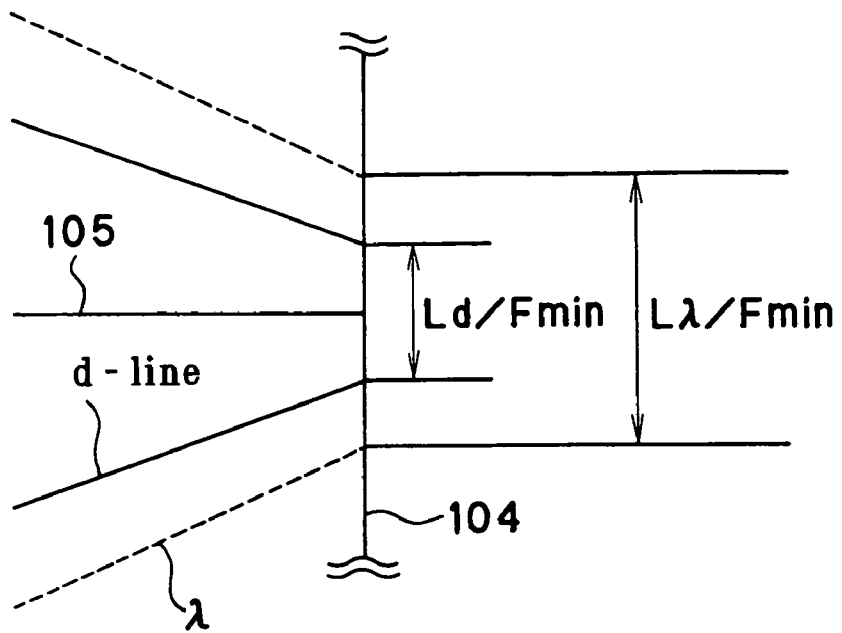
FIG. 23 is illustrative of the amount of a focal position displacement at the maximum height of incident ray when the image pickup optical system of FIG. 21 is viewed in section of the back focal point.
Figure 24:
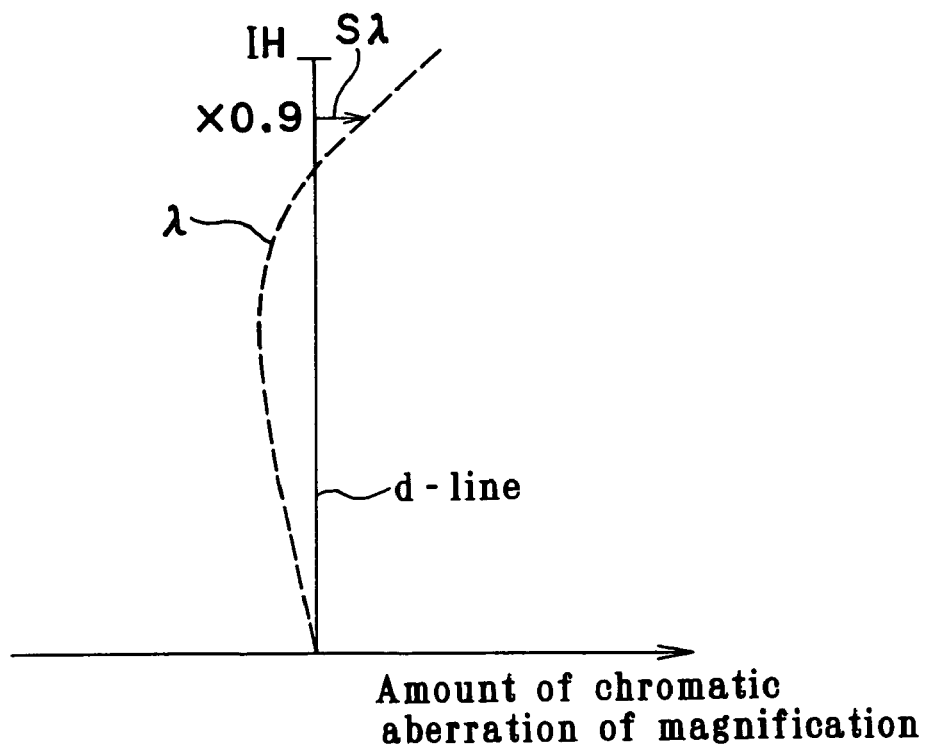
FIG. 24 is an aberration diagram illustrative of chromatic aberration of magnification of the image pickup optical system for a wavelength λ with respect to d-line.

FIGS. 15 to 17 are sectional views of Examples A to C, each including an optical axis. Likewise, FIGS. 18 to 20 are sectional views of Examples D to F, each including an optical axis at a wide-angle end. Examples A to C are each directed to a lens system having a fixed focal length while Examples D to F are each directed to a zoom lens system having a variable focal length. In each figure, F denotes filters and prisms, and I stands for an image plane. Example B is suitable for slimming down a camera because a reflecting member R is located within an image pickup optical system. Alternatively, the reflectivity of this reflecting member R may be designed such that the reflectance of member R at a 420-nm wavelength is kept intact while the reflectance of member 4 at a 400-nm wavelength is reduced. Example D is suitable for use with the so-called TTL finder type or the triple type using a color separation prism.

The lens arrangement of each example is now explained.

The lens system of Example A consists of four groups or five lenses, i.e., a positive meniscus lens convex on its object side, a negative meniscus lens convex on its object side, a stop, a doublet composed of a double-concave lens and a double-convex lens and a double convex lens, as shown in FIG. 15. One aspherical surface is used at the object-side surface of the double-convex lens located nearest to the image plane side of the system.

The lens system of Example B consists of four groups or five lenses, i.e., a negative meniscus lens convex on its object side, a reflecting surface R for turning back an optical path, a stop, a double-convex lens, a doublet composed of a double-convex lens and a double-concave lens and a positive lens having a strong convex surface on its image side, as shown in FIG. 16. Two aspherical surfaces are used, one at the surface of the double-convex lens located in the rear of the stop and another at the surface of the positive lens located nearest to the image plane side of the system.

The system of Example C consists of five groups or six lenses, i.e., two negative meniscus lenses, each convex on its object side, a convex lens, a stop, a doublet composed of a double-concave lens and a double-convex lens, and a double-convex lens, as shown in FIG. 17. Two aspherical surfaces are used, one at the surface of the second negative meniscus lens and another at the surface of the double-convex lens located nearest to the image plane side of the system.

The system of Example D consists of four groups G1 to G4. As shown in FIG. 18, the first group G1 consists of three lenses or a doublet composed of a negative meniscus lens convex on its object side and a positive meniscus lens convex on its object side and a positive meniscus lens convex on its object side, the second group G2 consists of four lenses or a negative meniscus lens convex on its object side, a double-concave lens and a doublet composed of a double-concave lens and a positive meniscus lens convex on its object side, in the rear of which a stop S is located, the third group G3 consists of three lenses or a positive meniscus lens convex on its object side, a double-convex lens and a negative meniscus lens convex on its object side, and the fourth group G4 consists of four lenses or a doublet composed of a negative meniscus lens convex on its image plane side and a positive meniscus lens convex on its image plane side and two double-convex lenses. Two aspherical surfaces are used, one at the object-side surface of the double-convex lens in the third group G3 and another at the surface of the lens in the fourth group G4, which is located nearest to the image plane side of the system. For zooming from the wide-angle end to the telephoto end of the system, the second group G2 moves from the object side to the image plane side and the third and fourth groups G3 and G4 move from the image plane side to the object side, as indicated by arrows, while the first group G1 and stop S remain fixed.

The system of Example E consists of four lens groups G1 to G4. As shown in FIG. 19, the first group G1 consists of one convex lens, the second group G2 consists of a negative meniscus lens convex on its object side and a doublet composed of a double-concave lens and a positive meniscus lens convex on its object side, in the rear of which a stop S is located, the third group G3 consists of a double-convex lens and a doublet composed of a positive meniscus lens convex on its object side and a negative meniscus lens convex on its object side, and the fourth group G4 consists of one double-convex lens. Two aspherical surfaces are used, one at the surface of the lens in the third group G3, which is located nearest to the object side of the system, and another at the surface of the lens in the fourth group G4, which is located nearest to the object side of the system. For zooming from the wide-angle end to the telephoto end of the system, the second group G2 moves from the object side to the image plane side and the third and fourth groups G3 and G4 move from the image plane side to the object side with the separation between them becoming wide, as indicated by arrows, while the first group G1 and stop S remain fixed.

The system of Example F consists of four groups G1 to G4. As shown in FIG. 20, the first group G1 consists of one positive lens convex on its object side, the second group G2 consists of a negative meniscus lens convex on its object side, a double-concave lens and a positive lens having a strong convex surface on its object side, in the rear of which there is a stop S, the third group G3 consists of a double-convex lens and a negative meniscus lens convex on its object side, and the fourth group G4 consists of one positive lens having a strong convex surface on its image plane side. One aspherical surface is used at the object-side surface of the positive lens in the fourth group G4. For zooming from the wide-angle end to the telephoto end of the system, the second group G2 moves from the object side to the image plane side and the third and fourth groups G3 and G4 move from the image plane side to the object side, as indicated by arrows, while the first group G1 and stop S remain fixed.

Enumerated below are numerical data about each example. The symbols used hereinafter but not referred to hereinbefore have the following meanings.

$F_{NO}$: F-number, $2\omega$: field angle, p: pixel pitch, $r_1, r_2, \ldots$: radius of curvature of each lens surface, $d_1, d_2, \ldots$: separation between adjacent lenses, $n_{d1}, n_{d2}, \ldots$: d-line refractive index of each lens, $n_{g1}, n_{g2}, \ldots$: g-line refractive index of each lens, $n_{h1}, n_{h2}, \ldots$: h-line refractive index of each lens, $\Delta\theta_{RN1}, \Delta\theta_{RN2}, \ldots$: value of $\Delta\theta_{RN}$ of each lens, and $\nu_{d1}, \nu_{d2}, \ldots$: d-line Abbe number of each lens.

The radii of curvature and separations are given by the mm unit. Here let x represent an optical axis provided that the direction of propagation of light is defined as positive and y represent the direction perpendicular to the optical axis. Then, aspherical configuration is given by $$x = (y^2/r)/[1+\{1-(K+1)(y/r)^2\}^{1/2}] + A_4 y^4 + A_6 y^6 + A_8 y^8 + A_{10} y^{10} + A_{12} y^{12}$$

where r is the paraxial radius of curvature, K is the conical coefficient, and $A_4, A_6, A_8, A_{10}$ and $A_{12}$ are the fourth, sixth, eighth, tenth and twelfth spherical coefficients, respectively.

Example A

| | | | |
|---|---|---|---|
| | f = 5.55 | | |
| | $F_{NO}$ = 2.88 | | |
| | $2\omega$ = 64.4° | | |
| | p = 4.15 μm | | |
| | D = 6.64 | | |
| $r_1$ = 13.9598 | $d_1$ = 2.4200 | $n_{d1}$ = 1.84666 | $\nu_{d1}$ = 23.78 |
| $r_2$ = 56.3701 | $d_2$ = 0.2700 | | |
| $r_3$ = 7.6185 | $d_3$ = 0.8700 | $n_{d2}$ = 1.48749 | $\nu_{d2}$ = 70.21 |
| $r_4$ = 2.4917 | $d_4$ = 3.3154 | | |
| $r_5$ = ∞ (Stop) | $d_5$ = 1.0735 | | |
| $r_6$ = −8.2879 | $d_6$ = 0.8000 | $n_{d3}$ = 1.84666 | $\nu_{d3}$ = 23.78 |
| $r_7$ = 10.5000 | $d_7$ = 3.7900 | $n_{d4}$ = 1.72916 | $\nu_{d4}$ = 54.68 |
| $r_8$ = −5.2842 | $d_8$ = 0.1500 | | |
| $r_9$ = 9.8776 (Aspheric) | $d_9$ = 3.3700 | $n_{d5}$ = 1.56384 | $\nu_{d5}$ = 60.67 |
| $r_{10}$ = −13.3796 | $d_{10}$ = 2.7100 | | |
| $r_{11}$ = ∞ | $d_{11}$ = 2.3200 | $n_{d6}$ = 1.51633 | $\nu_{d6}$ = 64.14 |
| $r_{12}$ = ∞ | $d_{12}$ = 1.6000 | | |

-continued $$f = 5.55$$
$$F_{NO} = 2.88$$
$$2\omega = 64.4°$$
$$p = 4.15 \text{ μm}$$
$$D = 6.64$$

| | | | |
|---|---|---|---|
| $r_{13} = \infty$ | $d_{13} = 0.800$ | $n_{d7} = 1.51633$ | $\nu_{d7} = 64.14$ |
| $r_{14} = \infty$ | $d_{14} = 1.0048$ | | |
| $r_{15} = \infty$ (Image plane) | | | |

| | | |
|---|---|---|
| $n_{g1} = 1.89419$ | $n_{h1} = 1.91428$ | $\Delta\theta_{RN1} = +0.0174$ |
| $n_{g2} = 1.49596$ | $n_{h2} = 1.49898$ | $\Delta\theta_{RN2} = +0.0022$ |
| $n_{g3} = 1.89419$ | $n_{h3} = 1.91428$ | $\Delta\theta_{RN3} = +0.0174$ |
| $n_{g4} = 1.74570$ | $n_{h4} = 1.75173$ | $\Delta\theta_{RN4} = -0.0086$ |
| $n_{g5} = 1.57532$ | $n_{h5} = 1.57947$ | $\Delta\theta_{RN5} = -0.0031$ |
| $n_{g6} = 1.52621$ | $n_{h6} = 1.52977$ | $\Delta\theta_{RN6} = -0.0024$ |
| $n_{g7} = 1.52621$ | $n_{h7} = 1.52977$ | $\Delta\theta_{RN7} = -0.0024$ |

Aspherical Coefficients

9th surface $K = 0$
$A_4 = -3.6930 \times 10^{-4}$
$A_6 = 7.0898 \times 10^{-7}$ (3) $_sR_{RN}/D = 1.248177$
(4) $n_{RN} = 1.84666$
(5) $\nu_{RN} = 23.78$
(6) $\Delta\theta_{RN} = +0.0174$ Example B $$f = 9.88$$
$$F_{NO} = 2.8$$
$$2\omega = 59.12°$$
$$p = 3.9 \text{ μm}$$
$$D = 11$$

| | | | |
|---|---|---|---|
| $r_1 = 42.746$ | $d_1 = 1.80$ | $n_{d1} = 1.48749$ | $\nu_{d1} = 70.23$ |
| $r_2 = 9.841$ | $d_2 = 21.36$ | | |
| $r_3 = \infty$ (Stop) | $d_3 = 5.09$ | | |
| $r_4 = 96.670$ | $d_4 = 4.16$ | $n_{d2} = 1.69350$ | $\nu_{d2} = 53.20$ |
| $r_5 = -14.943$ (Aspheric) | $d_5 = 0.08$ | | |
| $r_6 = 9.051$ | $d_6 = 6.95$ | $n_{d3} = 1.62041$ | $\nu_{d3} = 60.29$ |
| $r_7 = -33.014$ | $d_7 = 0.98$ | $n_{d4} = 1.80518$ | $\nu_{d4} = 25.42$ |
| $r_8 = 5.859$ | $d_8 = 4.21$ | | |
| $r_9 = -51.618$ | $d_9 = 5.06$ | $n_{d5} = 1.58913$ | $\nu_{d5} = 61.28$ |
| $r_{10} = -7.361$ (Aspheric) | $d_{10} = 1.50$ | | |
| $r_{11} = \infty$ | $d_{11} = 1.00$ | $n_{d6} = 1.51633$ | $\nu_{d6} = 64.14$ |
| $r_{12} = \infty$ | $d_{12} = 1.60$ | $n_{d7} = 1.54771$ | $\nu_{d7} = 62.84$ |
| $r_{13} = \infty$ | | | |

| | | |
|---|---|---|
| $n_{g1} = 1.49596$ | $n_{h1} = 1.49898$ | $\Delta\theta_{RN1} = +0.0022$ |
| $n_{g2} = 1.70972$ | $n_{h2} = 1.71556$ | $\Delta\theta_{RN2} = -0.0081$ |
| $n_{g3} = 1.63315$ | $n_{h3} = 1.63778$ | $\Delta\theta_{RN3} = -0.0012$ |
| $n_{g4} = 1.84729$ | $n_{h4} = 1.86494$ | $\Delta\theta_{RN4} = +0.0158$ |
| $n_{g5} = 1.60103$ | $n_{h5} = 1.60535$ | $\Delta\theta_{RN5} = -0.0018$ |
| $n_{g6} = 1.52621$ | $n_{h6} = 1.52977$ | $\Delta\theta_{RN6} = -0.0024$ |
| $n_{g7} = 1.55843$ | $n_{h7} = 1.56226$ | $\Delta\theta_{RN7} = -0.0045$ |

Aspherical Coefficients

5th surface $K = 0$
$A_4 = 6.18542 \times 10^{-5}$
$A_6 = 3.07784 \times 10^{-7}$ 10th surface $K = 0$
$A_4 = 4.92151 \times 10^{-4}$ -continued $$f = 9.88$$
$$F_{NO} = 2.8$$
$$2\omega = 59.12°$$
$$p = 3.9 \text{ μm}$$
$$D = 11$$

$A_6 = -3.57904 \times 10^{-6}$
$A_8 = 4.22919 \times 10^{-8}$ (3) $_sR_{RN}/D = 0.532636$
(4) $n_{RN} = 1.80518$
(5) $\nu_{RN} = 25.42$
(6) $\Delta\theta_{RN} = +0.0158$ Example C $$f = 4.4182$$
$$F_{NO} = 2.4$$
$$2\omega = 80.9°$$
$$p = 4.15 \text{ μm or 3 μm}$$
$$D = 6.64$$

| | | | |
|---|---|---|---|
| $r_1 = 13.2550$ | $d_1 = 0.9000$ | $n_{d1} = 1.60311$ | $\nu_{d1} = 60.64$ |
| $r_2 = 7.0317$ | $d_2 = 1.0000$ | | |
| $r_3 = 12.0000$ (Aspheric) | $d_3 = 0.8000$ | $n_{d2} = 1.56384$ | $\nu_{d2} = 60.67$ |
| $r_4 = 4.9103$ | $d_4 = 4.6372$ | | |
| $r_5 = 7.9159$ | $d_5 = 1.1424$ | $n_{d3} = 1.84666$ | $\nu_{d3} = 23.78$ |
| $r_6 = \infty$ | $d_6 = 0.5000$ | | |
| $r_7 = \infty$ (Stop) | $d_7 = 1.8751$ | | |
| $r_8 = -3.7652$ | $d_8 = 1.0000$ | $n_{d4} = 1.80518$ | $\nu_{d4} = 25.42$ |
| $r_9 = 8.7546$ | $d_9 = 2.1667$ | $n_{d5} = 1.72916$ | $\nu_{d5} = 54.68$ |
| $r_{10} = -4.8805$ | $d_{10} = 0.1500$ | | |
| $r_{11} = 10.0186$ (Aspheric) | $d_{11} = 2.2298$ | $n_{d6} = 1.56384$ | $\nu_{d6} = 60.67$ |
| $r_{12} = -8.4667$ | $d_{12} = 2.3588$ | | |
| $r_{13} = \infty$ | $d_{13} = 1.9000$ | $n_{d7} = 1.51633$ | $\nu_{d7} = 64.14$ |
| $r_{14} = \infty$ | $d_{14} = 0.8000$ | $n_{d8} = 1.51633$ | $\nu_{d8} = 64.14$ |
| $r_{15} = \infty$ | $d_{15} = 1.2000$ | | |
| $r_{16} = \infty$ | $d_{16} = 0.7500$ | $n_{d9} = 1.48749$ | $\nu_{d9} = 70.23$ |
| $r_{17} = \infty$ | $d_{17} = 1.2200$ | | |
| $r_{18} = \infty$ (Image plane) | | | |

| | | |
|---|---|---|
| $n_{g1} = 1.61541$ | $n_{h1} = 1.61987$ | $\Delta\theta_{RN1} = -0.0019$ |
| $n_{g2} = 1.57532$ | $n_{h2} = 1.57947$ | $\Delta\theta_{RN2} = -0.0031$ |
| $n_{g3} = 1.89419$ | $n_{h3} = 1.91428$ | $\Delta\theta_{RN3} = +0.0174$ |
| $n_{g4} = 1.84729$ | $n_{h4} = 1.86494$ | $\Delta\theta_{RN4} = +0.0158$ |
| $n_{g5} = 1.74570$ | $n_{h5} = 1.75173$ | $\Delta\theta_{RN5} = -0.0086$ |
| $n_{g6} = 1.57532$ | $n_{h6} = 1.57947$ | $\Delta\theta_{RN6} = -0.0031$ |
| $n_{g7} = 1.52621$ | $n_{h7} = 1.52977$ | $\Delta\theta_{RN7} = -0.0024$ |
| $n_{g8} = 1.52621$ | $n_{h8} = 1.52977$ | $\Delta\theta_{RN8} = -0.0024$ |
| $n_{g9} = 1.49596$ | $n_{h9} = 1.49898$ | $\Delta\theta_{RN9} = +0.0022$ |

Aspherical Coefficients

3rd surface $K = 0$
$A_4 = 3.1698 \times 10^{-4}$
$A_6 = 6.1083 \times 10^{-5}$
$A_8 = -4.6332 \times 10^{-6}$
$A_{10} = -1.4286 \times 10^{-7}$ 11th surface $K = 0$
$A_4 = -1.0432 \times 10^{-3}$
$A_6 = -2.9351 \times 10^{-5}$
$A_8 = 4.2352 \times 10^{-6}$
$A_{10} = -1.8071 \times 10^{-7}$ (3) $_sR_{RN}/D = 0.567048$
(4) $n_{RN} = 1.80518$
(5) $\nu_{RN} = 25.42$
(6) $\Delta\theta_{RN} = +0.0158$

Example D $f = 9.099 \sim 18.100 \sim 35.998$
$F_{NO} = 2.008 \sim 2.065 \sim 2.481$
$2\omega = 68.4° \sim 35.8° \sim 18.6°$
$p = 3.9\ \mu m$
$D = 11$

| | | | |
|---|---|---|---|
| $r_1 = 74.1213$ | $d_1 = 2.5000$ | $n_{d1} = 1.84666$ | $\nu_{d1} = 23.78$ |
| $r_2 = 45.2920$ | $d_2 = 7.6976$ | $n_{d2} = 1.61800$ | $\nu_{d2} = 63.33$ |
| $r_3 = 200.0000$ | $d_3 = 0.1500$ | | |
| $r_4 = 53.6322$ | $d_4 = 5.1636$ | $n_{d3} = 1.77250$ | $\nu_{d3} = 49.60$ |
| $r_5 = 160.3763$ | $d_5 =$ (Variable) | | |
| $r_6 = 86.4469$ | $d_6 = 1.8938$ | $n_{d4} = 1.77250$ | $\nu_{d4} = 49.60$ |
| $r_7 = 12.9947$ | $d_7 = 6.5582$ | | |
| $r_8 = -633.9388$ | $d_8 = 1.3849$ | $n_{d5} = 1.84666$ | $\nu_{d5} = 23.78$ |
| $r_9 = 53.5036$ | $d_9 = 3.0086$ | | |
| $r_{10} = -70.1852$ | $d_{10} = 1.3000$ | $n_{d6} = 1.48749$ | $\nu_{d6} = 70.21$ |
| $r_{11} = 19.4251$ | $d_{11} = 4.0971$ | $n_{d7} = 1.80518$ | $\nu_{d7} = 25.42$ |
| $r_{12} = 567.6091$ | $d_{12} =$ (Variable) | | |
| $r_{13} = \infty$ (Stop) | $d_{13} =$ (Variable) | | |
| $r_{14} = 35.5332$ | $d_{14} = 2.9155$ | $n_{d8} = 1.84666$ | $\nu_{d8} = 23.78$ |
| $r_{15} = 149.5334$ | $d_{15} = 1.9951$ | | |
| $r_{16} = 23.1874$ (Aspheric) | $d_{16} = 3.2540$ | $n_{d9} = 1.69350$ | $\nu_{d9} = 53.20$ |
| $r_{17} = -136.5790$ | $d_{17} = 0.1500$ | | |
| $r_{18} = 54.2006$ | $d_{18} = 1.1258$ | $n_{d10} = 1.80518$ | $\nu_{d10} = 25.42$ |
| $r_{19} = 17.2110$ | $d_{19} =$ (Variable) | | |
| $r_{20} = -12.6096$ | $d_{20} = 1.1000$ | $n_{d11} = 1.80518$ | $\nu_{d11} = 25.42$ |
| $r_{21} = -55.3792$ | $d_{21} = 3.1600$ | $n_{d12} = 1.61800$ | $\nu_{d12} = 63.33$ |
| $r_{22} = -15.6001$ | $d_{22} = 0.1500$ | | |
| $r_{23} = 74.9447$ | $d_{23} = 3.2661$ | $n_{d13} = 1.61800$ | $\nu_{d13} = 63.33$ |
| $r_{24} = -30.4739$ | $d_{24} = 0.1500$ | | |
| $r_{25} = 124.0475$ | $d_{25} = 2.5117$ | $n_{d14} = 1.69350$ | $\nu_{d14} = 53.20$ |
| $r_{26} = -68.0400$ (Aspheric) | $d_{26} =$ (Variable) | | |
| $r_{27} = \infty$ | $d_{27} = 24.0000$ | $n_{d15} = 1.51633$ | $\nu_{d15} = 64.14$ |
| $r_{28} = \infty$ | $d_{28} = 1.0000$ | | |
| $r_{29} = \infty$ | $d_{29} = 1.5700$ | $n_{d16} = 1.54771$ | $\nu_{d16} = 62.84$ |
| $r_{30} = \infty$ | $d_{30} = 1.0000$ | | |
| $r_{31} = \infty$ | $d_{31} = 0.8000$ | $n_{d17} = 1.51823$ | $\nu_{d17} = 58.96$ |
| $r_{32} = \infty$ | | | |

| | | |
|---|---|---|
| $n_{g1} = 1.89419$ | $n_{h1} = 1.91428$ | $\Delta\theta_{RN1} = +0.0174$ |
| $n_{g2} = 1.63010$ | $n_{h2} = 1.63451$ | $\Delta\theta_{RN2} = +0.0051$ |
| $n_{g3} = 1.79197$ | $n_{h3} = 1.79917$ | $\Delta\theta_{RN3} = -0.0092$ |
| $n_{g4} = 1.79197$ | $n_{h4} = 1.79917$ | $\Delta\theta_{RN4} = -0.0092$ |
| $n_{g5} = 1.89419$ | $n_{h5} = 1.91428$ | $\Delta\theta_{RN5} = +0.0174$ |
| $n_{g6} = 1.49596$ | $n_{h6} = 1.49898$ | $\Delta\theta_{RN6} = +0.0022$ |
| $n_{g7} = 1.84729$ | $n_{h7} = 1.86494$ | $\Delta\theta_{RN7} = +0.0158$ |
| $n_{g8} = 1.89419$ | $n_{h8} = 1.91428$ | $\Delta\theta_{RN8} = +0.0174$ |
| $n_{g9} = 1.70972$ | $n_{h9} = 1.71566$ | $\Delta\theta_{RN9} = -0.0081$ |
| $n_{g10} = 1.84729$ | $n_{h10} = 1.86494$ | $\Delta\theta_{RN10} = +0.0158$ |
| $n_{g11} = 1.84729$ | $n_{h11} = 1.86494$ | $\Delta\theta_{RN11} = +0.0158$ |
| $n_{g12} = 1.63010$ | $n_{h12} = 1.63451$ | $\Delta\theta_{RN12} = +0.0051$ |
| $n_{g13} = 1.63010$ | $n_{h13} = 1.63451$ | $\Delta\theta_{RN13} = +0.0051$ |
| $n_{g14} = 1.70972$ | $n_{h14} = 1.71566$ | $\Delta\theta_{RN14} = -0.0081$ |
| $n_{g15} = 1.52621$ | $n_{h15} = 1.52977$ | $\Delta\theta_{RN15} = -0.0024$ |
| $n_{g16} = 1.55843$ | $n_{h16} = 1.56226$ | $\Delta\theta_{RN16} = -0.0045$ |
| $n_{g17} = 1.52915$ | $n_{h17} = 1.53314$ | $\Delta\theta_{RN17} = +0.0035$ |

Zooming Spaces

| | f | | |
|---|---|---|---|
| | 9.099 | 18.100 | 35.998 |
| $d_5$ | 1.006 | 18.105 | 28.360 |
| $d_{12}$ | 28.950 | 11.850 | 1.597 |
| $d_{13}$ | 12.005 | 9.317 | 1.499 |

-continued $f = 9.099 \sim 18.100 \sim 35.998$
$F_{NO} = 2.008 \sim 2.065 \sim 2.481$
$2\omega = 68.4° \sim 35.8° \sim 18.6°$
$p = 3.9\ \mu m$
$D = 11$

| | | | |
|---|---|---|---|
| $d_{19}$ | 7.213 | 7.088 | 10.629 |
| $d_{26}$ | 1.500 | 4.313 | 8.589 |

Aspherical Coefficients

16th surface $K = 0$
$A_4 = -1.3659 \times 10^{-5}$
$A_6 = -5.3156 \times 10^{-9}$
$A_8 = -2.4548 \times 10^{-11}$
$A_{10} = 2.2544 \times 10^{-12}$ 26th surface $K = 0$
$A_4 = 6.6763 \times 10^{-6}$
$A_6 = 3.7977 \times 10^{-8}$
$A_8 = -4.9995 \times 10^{-10}$
$A_{10} = 2.3437 \times 10^{-12}$

| | | |
|---|---|---|
| (3) $_S R_{RN}/D = 1.5645$ | | 1.14632 |
| (4) $n_{RN} = 1.80518$ | | 1.80518 |
| (5) $\nu_{RN} = 25.42$ | | 25.42 |
| (6) $\Delta\theta_{RN} = +0.0158$ | | +0.0158 |

Example E $f = 6.608 \sim 11.270 \sim 19.098$
$F_{NO} = 2.03 \sim 2.36 \sim 2.91$
$p = 3.9\ \mu m$
$D = 8$

| | | | |
|---|---|---|---|
| $r_1 = 36.688$ | $d_1 = 4.14$ | $n_{d1} = 1.48749$ | $\nu_{d1} = 70.23$ |
| $r_2 = \infty$ | $d_2 =$ (Variable) | | |
| $r_3 = 21.750$ | $d_3 = 1.25$ | $n_{d2} = 1.84666$ | $\nu_{d2} = 23.78$ |
| $r_4 = 8.054$ | $d_4 = 5.45$ | | |
| $r_5 = -27.511$ | $d_5 = 1.00$ | $n_{d3} = 1.48749$ | $\nu_{d3} = 70.23$ |
| $r_6 = 10.412$ | $d_6 = 4.50$ | $n_{d4} = 1.84666$ | $\nu_{d4} = 23.78$ |
| $r_7 = 40.550$ | $d_7 =$ (Variable) | | |
| $r_8 = \infty$ (Stop) | $d_8 =$ (Variable) | | |
| $r_9 = 17.583$ (Aspheric) | $d_9 = 3.42$ | $n_{d5} = 1.58913$ | $\nu_{d5} = 61.30$ |
| $r_{10} = -35.670$ | $d_{10} = 0.20$ | | |
| $r_{11} = 9.390$ | $d_{11} = 4.35$ | $n_{d6} = 1.77250$ | $\nu_{d6} = 49.60$ |
| $r_{12} = 87.943$ | $d_{12} = 0.90$ | $n_{d7} = 1.84666$ | $\nu_{d7} = 23.78$ |
| $r_{13} = 6.609$ | $d_{13} =$ (Variable) | | |
| $r_{14} = 13.553$ (Aspheric) | $d_{14} = 3.28$ | $n_{d8} = 1.58913$ | $\nu_{d8} = 61.30$ |
| $r_{15} = -30.808$ | | | |

| | | |
|---|---|---|
| $n_{g1} = 1.49596$ | $n_{h1} = 1.49898$ | $\Delta\theta_{RN1} = +0.0022$ |
| $n_{g2} = 1.89419$ | $n_{h2} = 1.91428$ | $\Delta\theta_{RN2} = +0.0174$ |
| $n_{g3} = 1.49596$ | $n_{h3} = 1.49898$ | $\Delta\theta_{RN3} = +0.0022$ |
| $n_{g4} = 1.89419$ | $n_{h4} = 1.91428$ | $\Delta\theta_{RN4} = +0.0174$ |
| $n_{g5} = 1.60103$ | $n_{h5} = 1.60535$ | $\Delta\theta_{RN5} = -0.0018$ |
| $n_{g6} = 1.79197$ | $n_{h6} = 1.79917$ | $\Delta\theta_{RN6} = -0.0092$ |

-continued $$f = 6.608\sim11.270\sim19.098$$
$$F_{NO} = 2.03\sim2.36\sim2.91$$
$$p = 3.9\ \mu m$$
$$D = 8$$

| $n_{g7} = 1.89419$ | $n_{h7} = 1.91428$ | $\Delta\theta_{RN7} = +0.0174$ |
| $n_{g8} = 1.60103$ | $n_{h8} = 1.60535$ | $\Delta\theta_{RN8} = -0.0018$ |

Zooming Spaces

| | f | | |
|---|---|---|---|
| | 6.608 | 11.270 | 19.098 |
| $d_2$ | 1.00 | 9.66 | 15.80 |
| $d_7$ | 16.20 | 7.55 | 1.50 |
| $d_8$ | 8.66 | 5.46 | 1.50 |
| $d_{13}$ | 3.46 | 5.00 | 5.71 |

Aspherical Coefficients

9th surface $K = 0.000$
$A_4 = -4.66054 \times 10^{-5}$
$A_6 = -1.33346 \times 10^{-6}$
$A_8 = 6.88261 \times 10^{-8}$
$A_{10} = -1.18171 \times 10^{-9}$
$A_{12} = 1.21868 \times 10^{-12}$ 14th surface $K = 0.000$
$A_4 = -9.93375 \times 10^{-5}$
$A_6 = -9.76311 \times 10^{-7}$
$A_8 = 3.21037 \times 10^{-7}$
$A_{10} = -1.95172 \times 10^{-8}$
$A_{12} = 3.74139 \times 10^{-10}$ (3) $_sR_{RN}/D = 0.826125$
(4) $n_{RN} = 1.84666$
(5) $v_{RN} = 23.78$
(6) $\Delta\theta_{RN} = +0.0174$ Example F $$f = 9.000\sim15.590\sim27.000$$
$$F_{NO} = 2.800\sim3.030\sim4.069$$
$$2\omega = 67.094°\sim39.462°\sim23.030°$$
$$p = 6.7\ \mu m$$
$$D = 11$$

| $r_1 = 44.5137$ | $d_1 = 4.4000$ | $n_{d1} = 1.69680$ | $v_{d1} = 55.53$ |
| $r_2 = 137.7320$ | $d_2 = $ (Variable) | | |
| $r_3 = 23.5602$ | $d_3 = 1.6000$ | $n_{d2} = 1.69680$ | $v_{d2} = 55.53$ |
| $r_4 = 12.0406$ | $d_4 = 5.7412$ | | |
| $r_5 = -54.8255$ | $d_5 = 1.5000$ | $n_{d3} = 1.56384$ | $v_{d3} = 60.70$ |
| $r_6 = 13.6238$ | $d_6 = 3.8135$ | | |
| $r_7 = 16.0196$ | $d_7 = 2.2000$ | $n_{d4} = 1.84666$ | $v_{d4} = 23.78$ |
| $r_8 = 23.3091$ | $d_8 = $ (Variable) | | |
| $r_9 = \infty$ (Stop) | $d_9 = $ (Variable) | | |
| $r_{10} = 31.1300$ | $d_{10} = 6.5179$ | $n_{d5} = 1.77250$ | $v_{d5} = 49.60$ |
| $r_{11} = -15.0403$ | $d_{11} = 0.1939$ | | |
| $r_{12} = -13.3787$ | $d_{12} = 0.8893$ | $n_{d6} = 1.84666$ | $v_{d6} = 23.78$ |
| $r_{13} = -65.0570$ | $d_{13} = $ (Variable) | | |
| $r_{14} = -2370.3961$ (Aspheric) | $d_{14} = 4.3000$ | $n_{d7} = 1.49241$ | $v_{d7} = 57.66$ |
| $r_{15} = -14.2694$ | $d_{15} = $ (Variable) | | |

-continued $$f = 9.000\sim15.590\sim27.000$$
$$F_{NO} = 2.800\sim3.030\sim4.069$$
$$2\omega = 67.094°\sim39.462°\sim23.030°$$
$$p = 6.7\ \mu m$$
$$D = 11$$

| $r_{16} = \infty$ | $d_{16} = 1.1400$ | $n_{d8} = 1.54771$ | $v_{d8} = 62.84$ |
| $r_{17} = \infty$ | $d_{17} = 0.8100$ | $n_{d9} = 1.54771$ | $v_{d9} = 62.84$ |
| $r_{18} = \infty$ | $d_{18} = 1.0000$ | | |
| $r_{19} = \infty$ | $d_{19} = 1.0000$ | $n_{d10} = 1.48749$ | $v_{d10} = 70.23$ |
| $r_{20} = \infty$ | $d_{20} = 1.0000$ | | |
| $r_{21} = \infty$ | $d_{21} = 0.8000$ | $n_{d11} = 1.51823$ | $v_{d11} = 58.96$ |
| $r_{22} = \infty$ | | | |

| $n_{g1} = 1.71234$ | $n_{h1} = 1.71800$ | $\Delta\theta_{RN1} = -0.0082$ |
| $n_{g2} = 1.71234$ | $n_{h2} = 1.71800$ | $\Delta\theta_{RN2} = -0.0082$ |
| $n_{g3} = 1.57532$ | $n_{h3} = 1.57947$ | $\Delta\theta_{RN3} = -0.0031$ |
| $n_{g4} = 1.89419$ | $n_{h4} = 1.91428$ | $\Delta\theta_{RN4} = +0.0174$ |
| $n_{g5} = 1.79197$ | $n_{h5} = 1.79917$ | $\Delta\theta_{RN5} = -0.0092$ |
| $n_{g6} = 1.89419$ | $n_{h6} = 1.91428$ | $\Delta\theta_{RN6} = +0.0174$ |
| $n_{g7} = 1.50320$ | $n_{h7} = 1.50713$ | $\Delta\theta_{RN7} = +0.0104$ |
| $n_{g8} = 1.55843$ | $n_{h8} = 1.56226$ | $\Delta\theta_{RN8} = -0.0045$ |
| $n_{g9} = 1.55843$ | $n_{h9} = 1.56226$ | $\Delta\theta_{RN9} = -0.0045$ |
| $n_{g10} = 1.49596$ | $n_{h10} = 1.49898$ | $\Delta\theta_{RN10} = +0.0022$ |
| $n_{g11} = 1.52915$ | $n_{h11} = 1.53314$ | $\Delta\theta_{RN11} = +0.0035$ |

Zooming Spaces

| | f | | |
|---|---|---|---|
| | 9.000 | 15.590 | 27.000 |
| $d_2$ | 1.000 | 13.349 | 18.974 |
| $d_8$ | 20.474 | 8.125 | 2.500 |
| $d_9$ | 13.221 | 9.796 | 2.000 |
| $d_{13}$ | 6.416 | 6.356 | 7.516 |
| $d_{15}$ | 15.209 | 18.694 | 25.330 |

Aspherical Coefficients

14th surface $K = 0.0000$
$A_4 = -7.8946 \times 10^{-5}$
$A_6 = 3.2441 \times 10^{-8}$
$A_8 = -1.6090 \times 10^{-9}$
$A_{10} = 1.6631 \times 10^{-11}$ (3) $_sR_{RN}/D = 1.21624$
(4) $n_{RN} = 1.84666$
(5) $v_{RN} = 23.78$
(6) $\Delta\theta_{RN} = +0.0174$ Next, embodiments of the second aspect of the present invention are explained with reference to the accompanying drawings.

FIG. 26 is a schematic illustrative of a so-called digital camera 113 that is the first embodiment of the electronic image pickup system according to the second aspect of the present invention.

According to this embodiment, a light beam emanating from an object point is subjected to image formation by a phototaking lens system 101' made up of an optical element making use of a refraction phenomenon alone and designed to produce chromatic aberrations, thereby forming an image on an electronic image pickup device 102 such as a CCD. To prevent a so-called moire phenomenon resulting from the fact that the image pickup device is an array of regularly located photoelectric converters (pixels), a low-pass filter 106 having a low-pass effect is located in front of the image pickup surface 104 of the electronic image pickup device 102. In addition, a filter having an IR cutoff effect for cutting off infrared light may be located depending of the designee needed.

The entrance surface of the electronic image pickup device 102 is provided with a mosaic filter having at least three spectral characteristics for obtaining a color image, wherein each wavelength range of light beam is incident on each pixel.

The light beam incident on the electronic image pickup device 102 is converted by the photoelectric converters or pixels to electric signals containing luminance information and color information, which are then entered into a controller 107. The electric signals are subjected at the controller 107 to signal processing such as gamma correction or image compression processing, and sent via a built-in memory 108 and an interface 109 to a personal computer 110 or the like. The resulting signals may be transmitted from the controller 107 to a liquid crystal monitor 111 which makes it possible for the operator to check the image to be phototaken or the phototaken image. Alternatively, image data may be transmitted from the built-in memory 105 to an auxiliary memory 112 such as a so-called smart medium (trade mark).

The electronic image pickup system according to this embodiment is characterized in that an optical path splitter means comprising a cemented prism 114 is located on an optical path passing through an phototaking optical system 101 and a two-dimensional area photometric sensor 115 is located as a high luminance difference boundary detection means on one of the split optical paths. Then, the two-dimensional area sensor 115 is provided on its surface with an ND filter in such a way that its sensitivity is reduced down to −3 level, i.e., ⅛ of that of the image pickup device 102.

Figure 27:
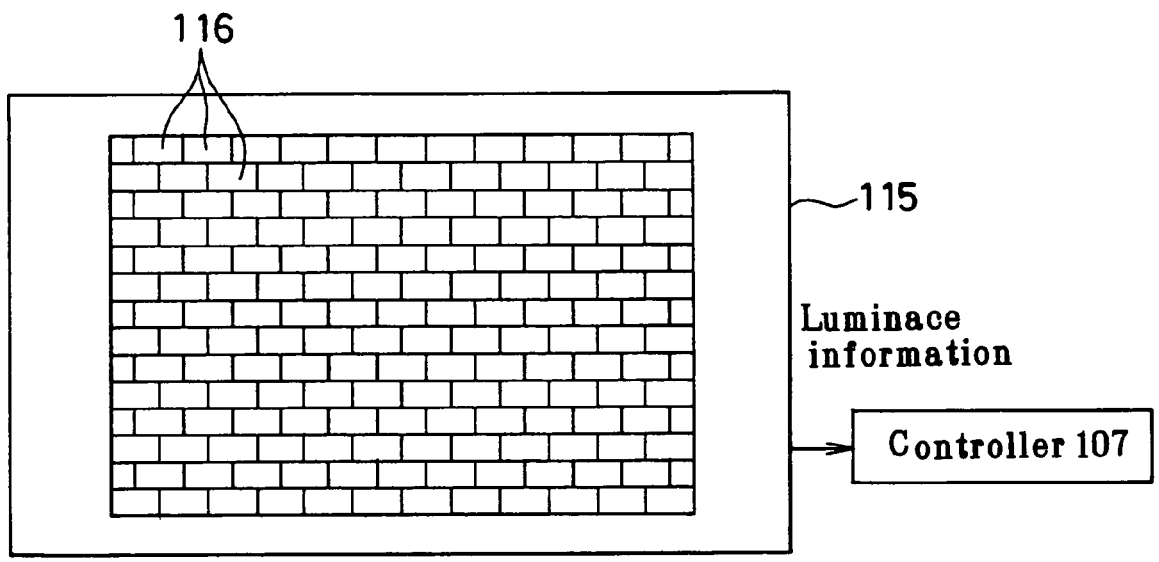
FIG. 27 is a schematic representation of a two-dimensional area photometric sensor used with this electronic image pickup system.

An image substantially identical with that on the image pickup surface 104 is formed on the two-dimensional area photometric sensor 115. The two-dimensional area photometric sensor 115 has a light-sensing surface with a plurality of photometric areas 116 regularly located thereon, as shown in FIG. 27, so that an electric signal including information about the luminance of a subject can be transmitted from each photometric area 116 to the controller 107.

At the controller 107, the image reading time (corresponding to a shutter speed in the case of a silver-salt camera) and relative aperture (F-number) are determined on the basis of the luminance information included in the electric signal sent out of the image pickup device 3 together with luminance information and color information, thereby providing correct exposure. Alternatively, the image reading time and relative aperture may be controlled on the basis of electric signals from the two-dimensional area photometric sensor 115 including luminance information rather than the luminance information form the image pickup device 103, thereby providing correct exposure.

Figure 28:
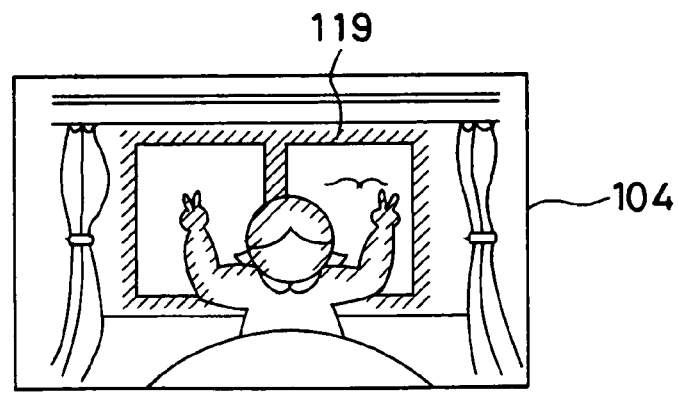
FIG. 28 is illustrative of how a high-contrast subject is phototaken in a room with a clear sky in the background.

Here consider the case where a high-contrast subject is phototaken in a back-light room with a clear sky in the background, using the electronic image pickup system constructed according to the instant embodiment, as shown in FIG. 28. The condition where pixels with a luminance difference equal to or greater than a certain level (for instance, a pixel having a light-sensing level of +2 EV or greater and a pixel having a light-sensing level of −1 EV or less) are found among a certain number of juxtaposed pixels (for instance, 6 pixels) on the electronic image pickup device 102 is calculated from luminance information bearing electric signals from the two-dimensional area photometric sensor 115 via the controller 107. In this case, color flares 119 become striking to the eye due to chromatic aberrations produced by the phototaking optical system 101.

Then, the liquid crystal monitor 111 indicates that an area having a large luminance difference is found on the screen, thereby urging the observer to change the camera angle and automatically popping up an electronic flash mechanism for preparation for auxiliary illumination, so that high contrasts can be reduced for color flare reductions. Alternatively, the system may be designed to actuate a buzzer 118 to sound a beep as a warning.

When the subject is phototaken with a high-contrast area, an image having large chromatic aberrations is formed on the image pickup surface 104. The system is thus designed such that a boundary where the luminance difference found among a certain number of pixels reaches or exceeds a certain level is detected through the controller 107 and color flares in the vicinity of the detected boundary (those found at the boundary and one pixel adjacent thereto) are reduced. To this end, the luminance- and color-information bearing electric signals from the image pickup device 103 are electrically controlled.

Figure 29:
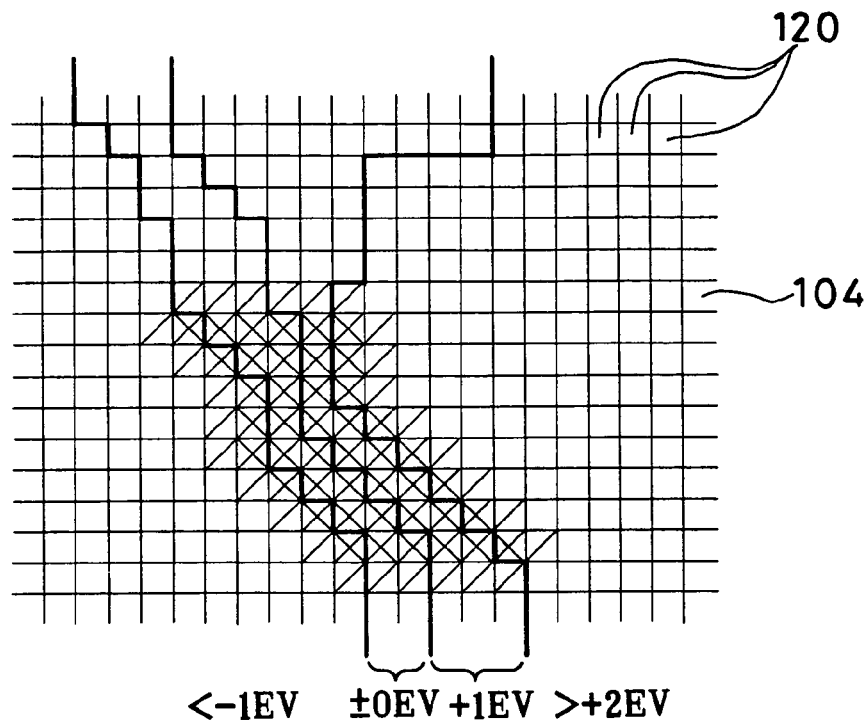
FIG. 29 is an enlarged view of a part of the image pickup surface, which is illustrative of one exemplary luminance difference with respect to correct exposure for each pixel.

FIG. 29 is an enlarged view of a part of the image pickup surface 104, which is illustrative of one exemplary luminance difference with respect to correct exposure for each pixel. In FIG. 29, each measure represents a pixel 120. Luminance signals from pixels 120 are analyzed to calculate an area of +2 EV or greater and an area of −1 EV or less, each with respect to correct exposure, thereby identifying a boundary across which 6 or less pixels exist. In FIG. 29, pixels corresponding to the boundary are marked with X. Then, signal processing is carried out via the controller 107 in such a way as to eliminate color flares in the boundary range including pixels adjacent to the boundary (those marked with slashes). This signal processing may be carried out in any desired mode provided that the vicinity of the boundary can be corrected. For instance, it is acceptable to make correction for the boundary alone or exclude the pixels nearest to the boundary from correction.

It is here noted that, instead of using the signals from the image pickup device, the signals from the two-dimensional area photometric sensor 115 may be used with each photometric area 116 on the photometric sensor 115 corresponding to each pixel 120, thereby identifying the boundary.

How the signal processing is carried out is now explained.

According to one exemplary signal processing method, the saturation of an image in the vicinity of the boundary may be decreased to reduce "color running". The "color running" makes the colors of the image unnaturally bright, because color flares of long and short wavelengths easily occurring from the light to dark portion make blue and red brighter as compared with those of an actual image. This "color running" may be reduced by bringing the reproducibility of one color corresponding to a pixel of strong luminance down to the luminance level of other color, thereby achieving saturation and luminance reductions.

Alternatively, the "color running" may be reduced by using the controller 107 as the signal processing means to control the chromaticity of the boundary and the vicinity of a portion of the dark side located adjacent to the boundary and having low luminance in such a way as to bring that chromaticity close to the chromaticity of a portion of the dark side spaced away from the boundary by a certain number of pixels (for instance, 2 pixels).

Figure 30:
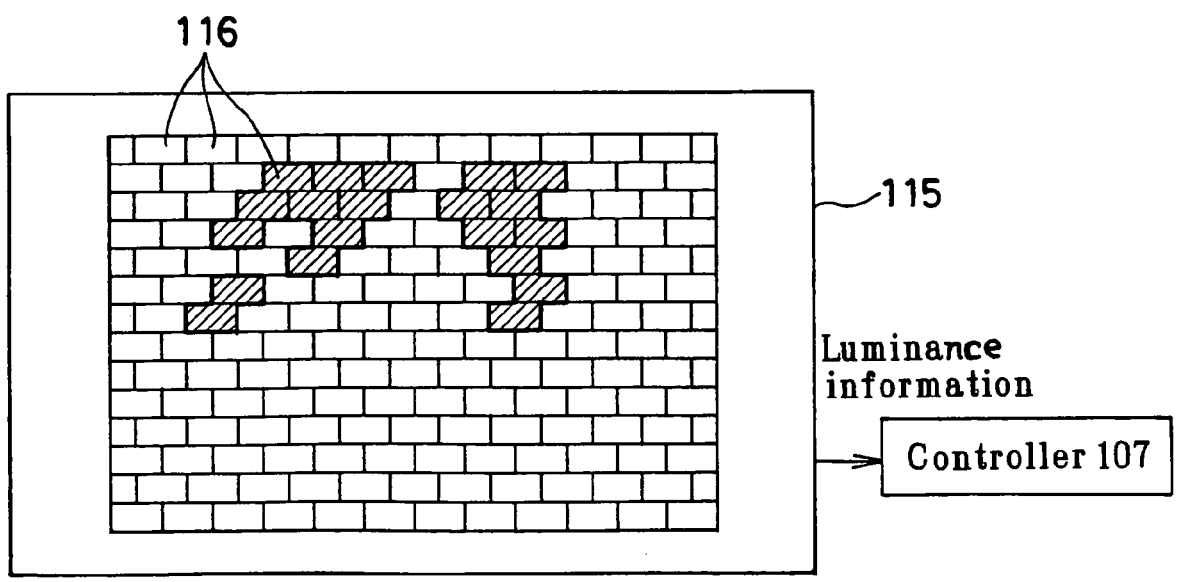
FIG. 30 is illustrative of the state of the two-dimensional area photometric sensor used with this electronic image pickup system.

The boundary having a large luminance difference may also be detected by producing correct exposure via the controller 107 and using a two-dimensional area photometric sensor 115 shown in FIG. 30 simultaneously with or before or after phototaking to detect pixels corresponding to an area (hatched) where the exposure level is saturated upon 3 EV-underexposure with respect to correct exposure and unsaturated pixels adjacent to the saturated pixels, so that pixels between these area can be identified as the boundary having a large luminance difference.

Figure 31:
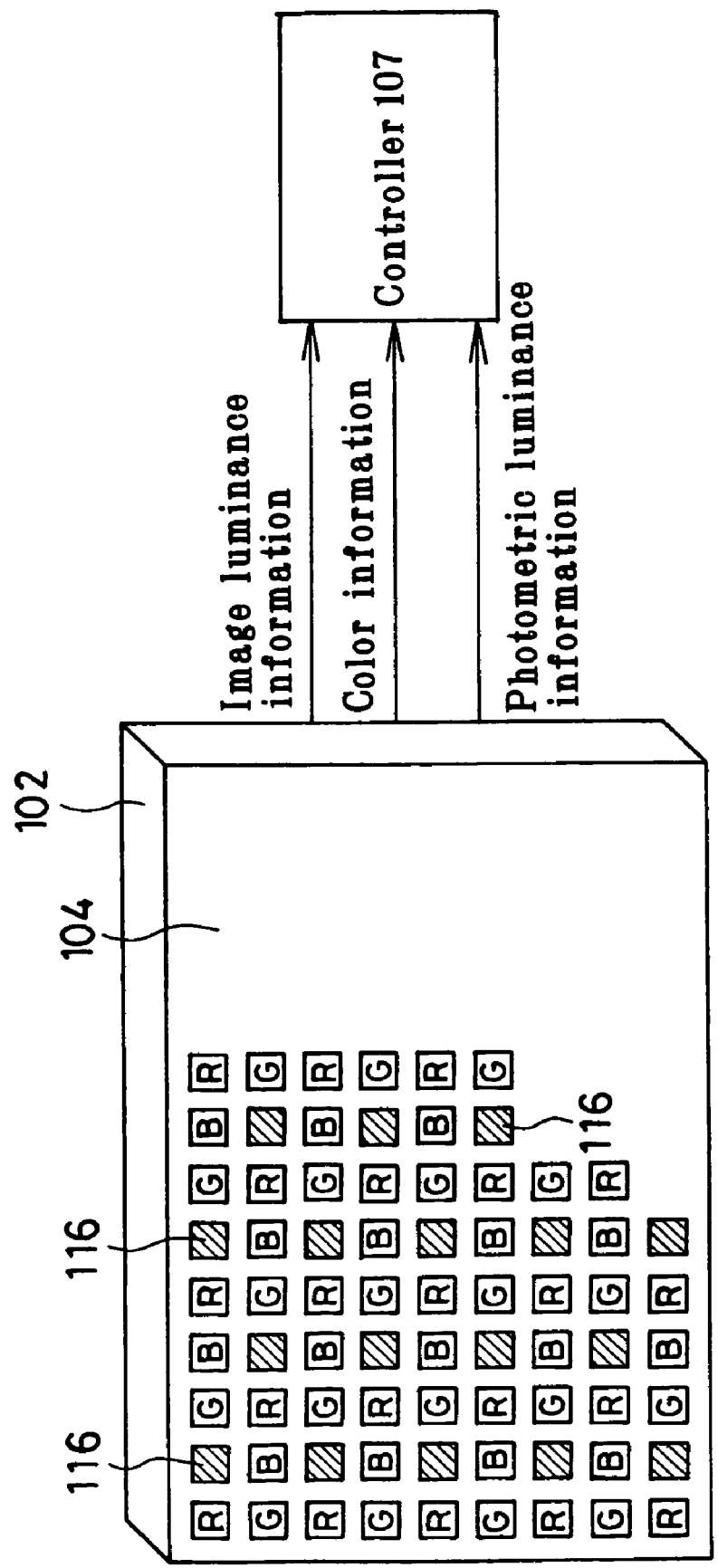
FIG. 31 is a schematic illustrative of an electronic image pickup device which is provided on its image pickup surface with a plurality of photometric areas as pixels, each provided with an ND filter as a sensitivity reducing means, so that a luminance signal sensed by each pixel can be used to identify the boundary as mentioned above.

Instead of the two-dimensional area photometric sensor 115 shown in FIG. 26, it is acceptable to use an electronic image pickup device 102 which, as shown in FIG. 31, is provided on an image pickup surface 104 with a plurality of photometric areas 116 acting as pixels, each provided with an ND filter as a sensitivity reducing means. Then, the boundary may be detected as mentioned above, using luminance information included in an electric signal containing information about the luminance of light sensed by each pixel.

Figure 32:
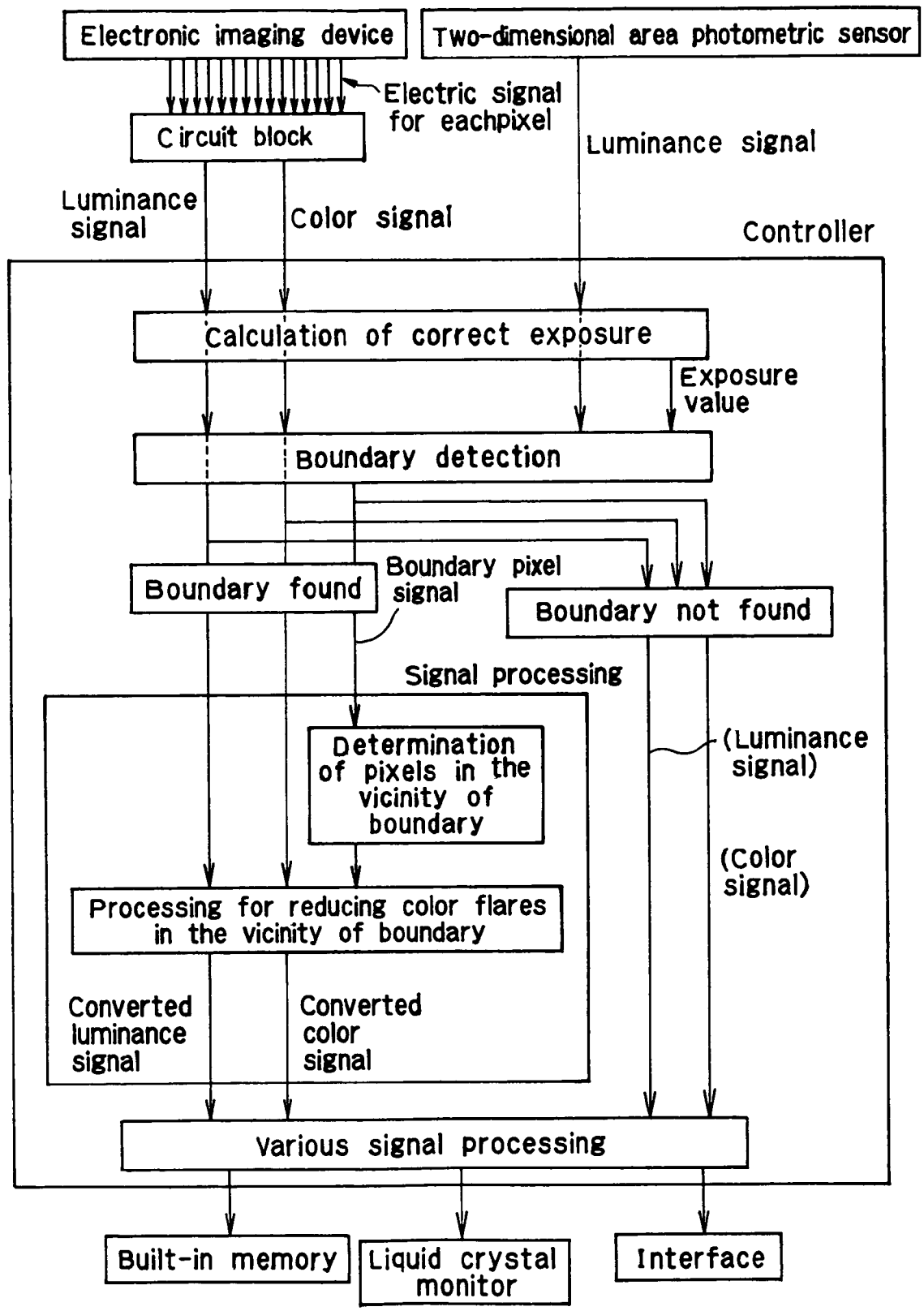
FIG. 32 is a flowchart illustrative of signal processing in a controller 7 built in this electronic image pickup system.

FIG. 32 is a schematic flowchart of the signal processing in the controller 107. As shown in FIG. 32, electric signals containing information about the luminance and color of light sensed by the pixels of the electronic image pickup device are converted by a circuit block to luminance signals and color signals. These luminance signals and/or color signals are also embraced in the concept of electric signals containing information about luminance and color used in the present disclosure.

A color filter used with the electronic image pickup device 102 is now explained.

Figure 33:
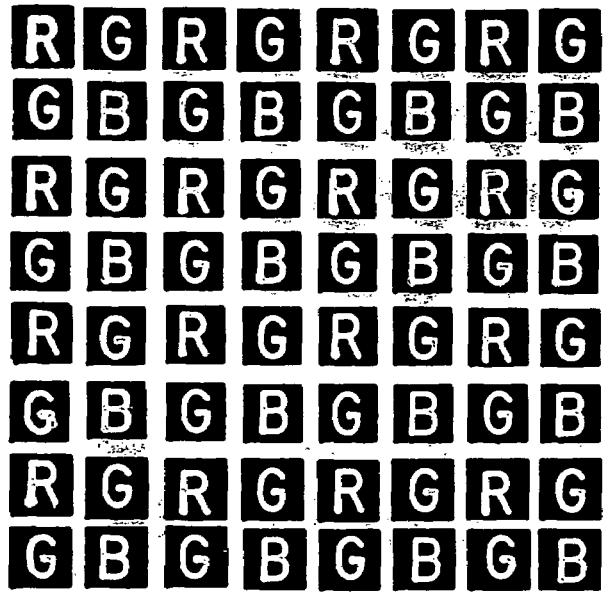
FIG. 33 is a schematic representation of a primary color filter used with this electronic image pickup system.
Figure 34:
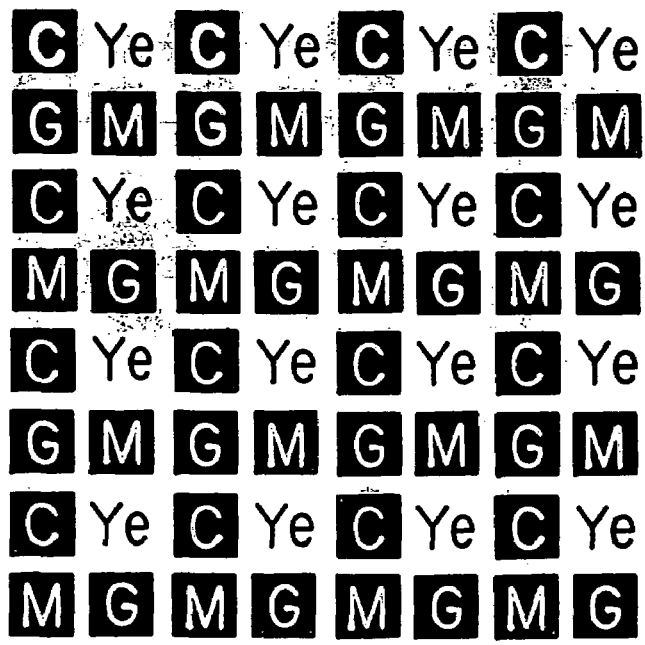
FIG. 34 is a schematic representation of a complementary color filter used with this electronic image pickup system.
Figure 35:
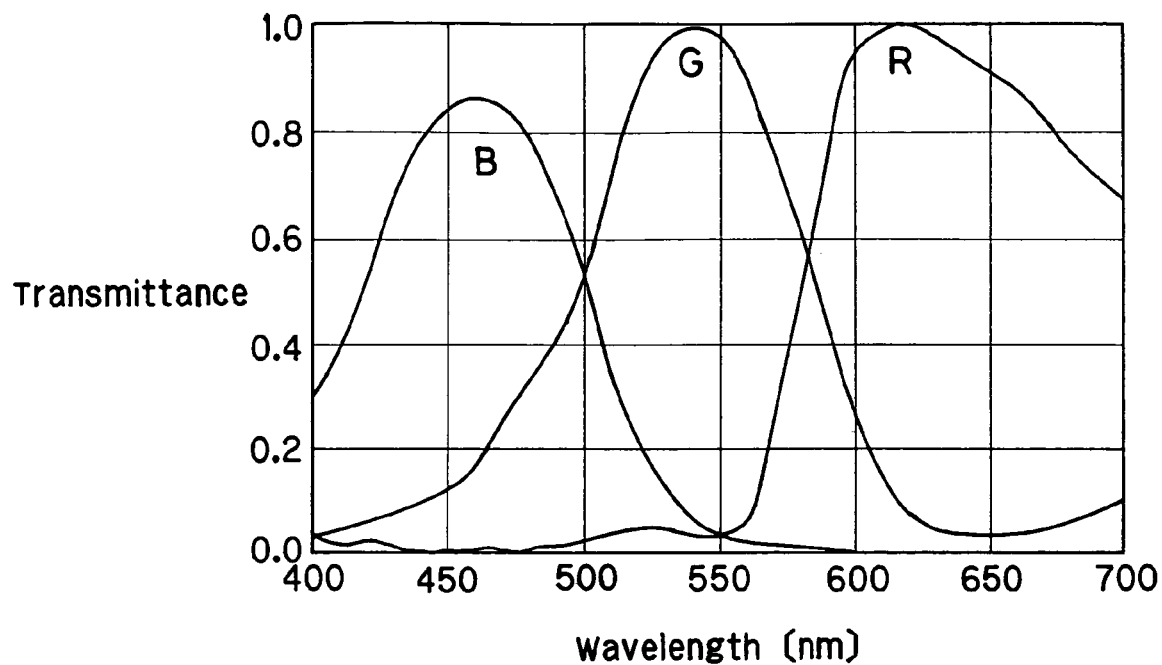
FIG. 35 is a wavelength characteristic diagram of the primary color filter of FIG. 33.
Figure 36:
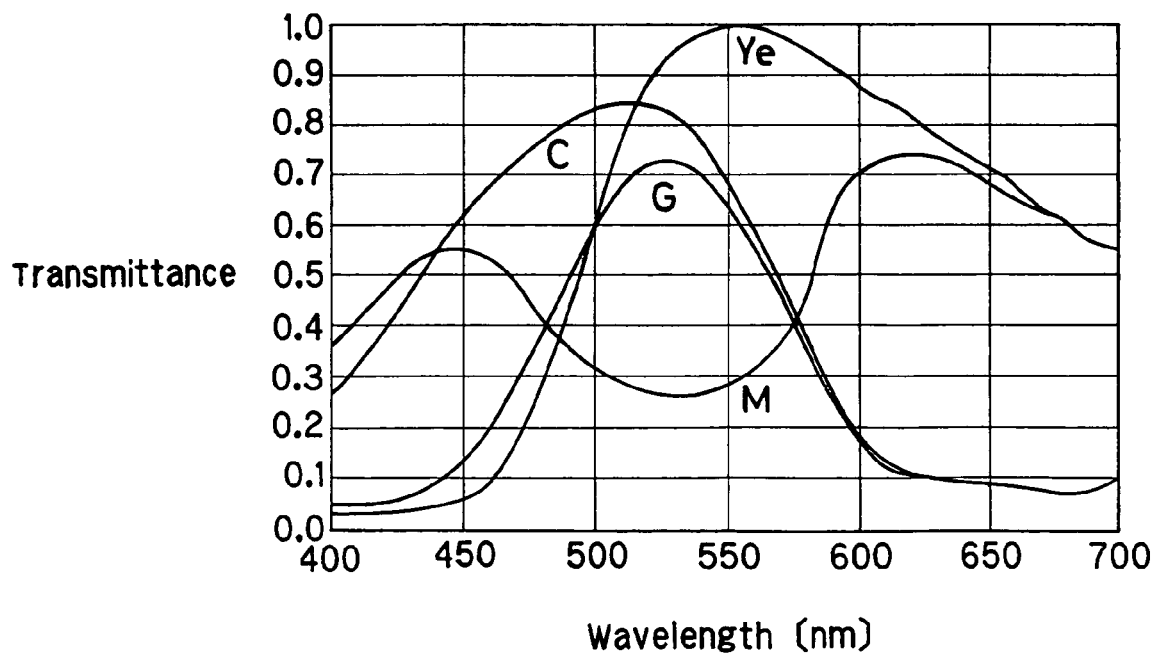
FIG. 36 is a wavelength characteristic diagram of the complementary color filter of FIG. 34.

To obtain a color image, a color filter having such a filter arrangement as shown in FIG. 33 or 34 is located in front of the image pickup device so as to achieve a photoelectric conversion device having at least three different wavelength characteristics. The filter shown in FIG. 33 is of the type called a primary color filter comprising red (R), green (G) and blue (B) filter elements. The respective wavelength characteristics of these filter elements are shown in FIG. 35. The filter shown in FIG. 34 is of the type called a complementary color filter comprising cyan (C), magenta (M), yellow ($Y_e$) and green (G) filter elements. The respective wavelength characteristics of these filter elements are shown in FIG. 36.

When the complementary color filter is used as the filter, C, M, $Y_e$ and G are converted by a controller 7 to R, G and B according to the following processing:

for luminance signals $$Y=|G+M+Y_e+C|\times\frac{1}{4}$$

for color signals $$R-Y=|(M+Y_e)-(G+C)|$$

$$B-Y=|(M+C)-(G+Y_e)|$$

With the primary color filter, it is easy to carry out color reproduction processing, and with the complementary color filter, it is possible to increase the quantity of light with respect to the photoelectric conversion surface.

The color image may also be obtained by locating a color separation prism 124—which comprises a first prism 120, a second prism 121 and a third prism 123 as an example—on the image side of a phototaking lens system 101, by which light from the phototaking optical system is separated into R, G and B to form images on three or more image pickup elements 102R, 102G and 102G.

Examples of the chromatic aberration-producing image pickup optical system used with the aforesaid construction are now given in the form of numerical data.

Example 1

Figure 38:
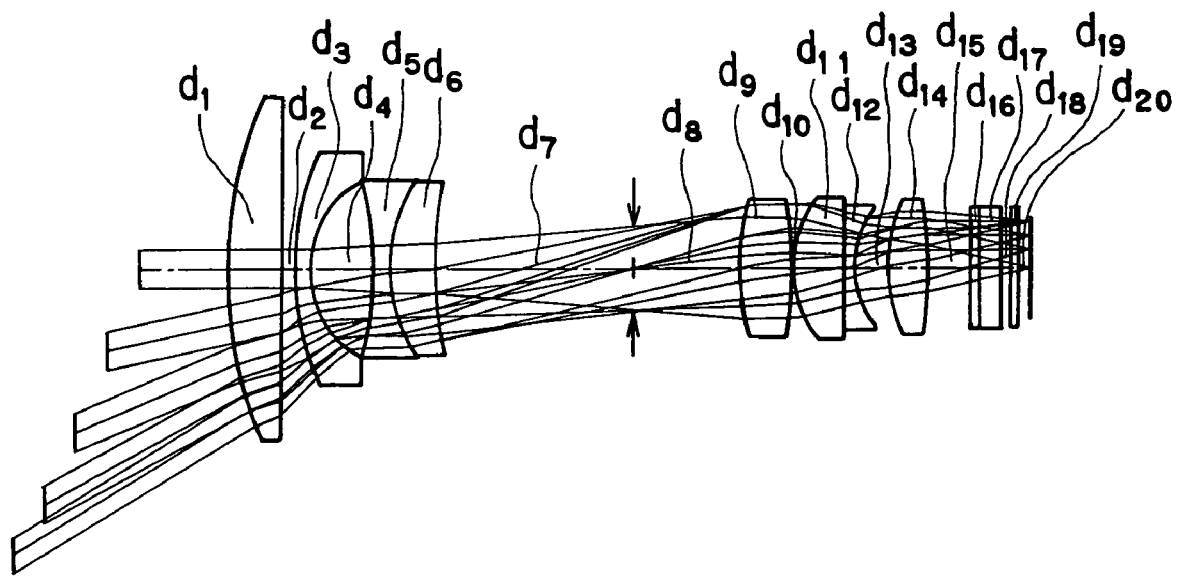
FIG. 38 is a lens section view of the first example (Numerical Example 1) of the image pickup optical system according to this embodiment.
Figure 39:
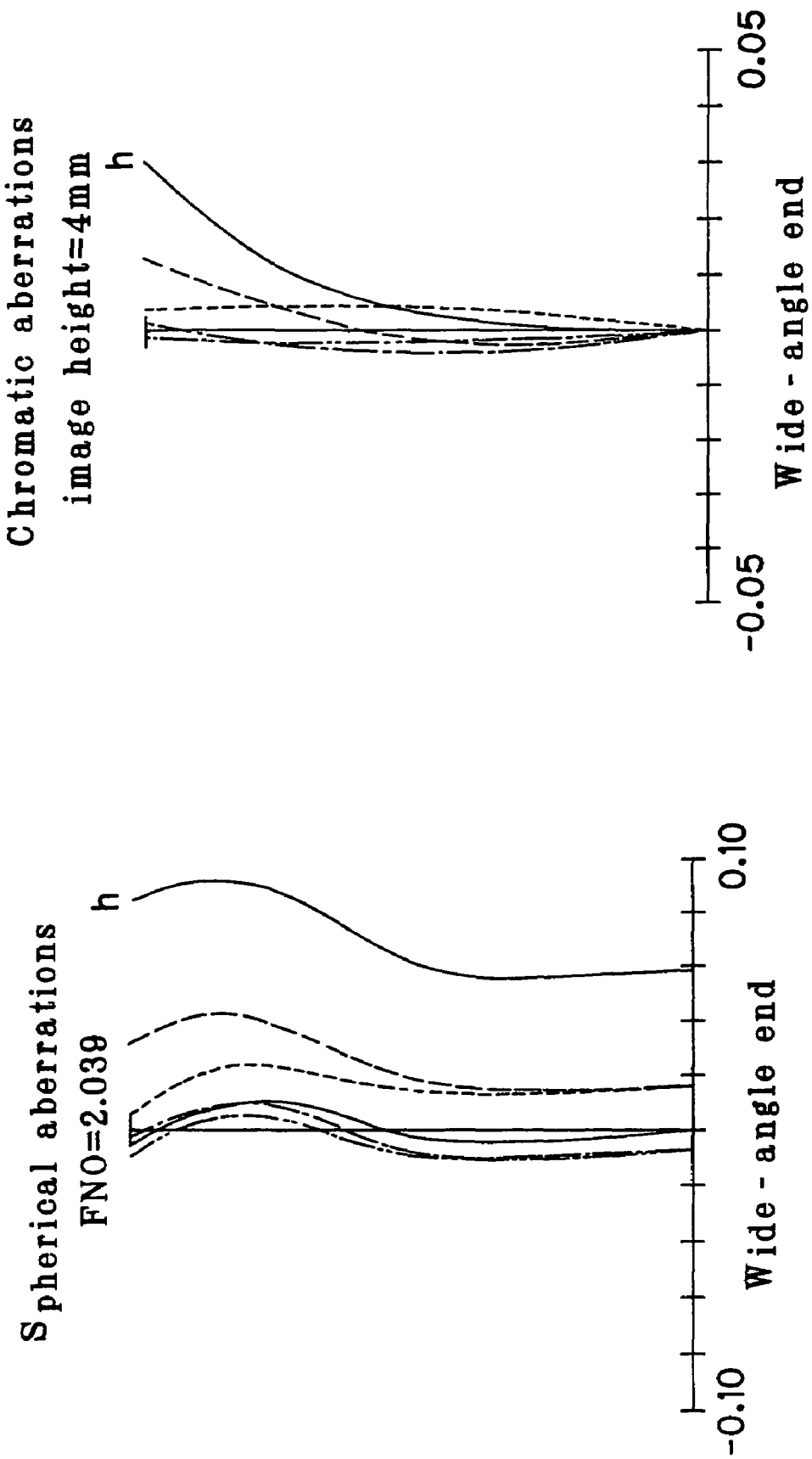
FIG. 39 is a diagram illustrative of the spherical aberration at the wide-angle end and chromatic aberration of magnification with respect to g-line of the image pickup optical system of FIG. 38 upon focused on an infinite object point.

FIG. 38 is a lens section view of the first example (Numerical Example 1) of the image pickup optical system according to this embodiment, and FIG. 39 is a diagram illustrative of the spherical aberration at the wide-angle end and chromatic aberration of magnification with respect to g-line of the image pickup optical system of FIG. 38 upon focused at infinity.

In the following numerical data, $r_1$, $r_2$, $r_3$, . . . are the radii of curvature of lens surfaces, $d_1$, $d_2$, $d_3$, . . . are the thicknesses or air separations of lenses, $n_1$, $n_2$, $n_3$, . . . are the d-line (587.56 nm) refractive indices of lenses, and $v_2$, $v_2$, $v_3$, . . . are the Abbe's numbers of lenses.

Here let z represent an optical axis direction and y represent the direction perpendicular to the optical axis. Then, aspherical configuration is given by $$z=(y^2/r)/[1+\sqrt{\{1-(1+k)\cdot(y/r)^2\}}]+AC_2y^2AC_4y^4+AC_6y^6+AC_8y^8+AC_{10}y^{10}+AC_{12}y^{12}$$

where r is the paraxial radius of curvature, K is the conical coefficient, and $AC_2$, $AC_4$, $AC_6$, $AC_8$, $AC_{10}$ and $AC_{12}$ are the spherical coefficients, respectively.

In the following numerical data, the minimum pixel pitch of the electronic image pickup device is P=0.003 mm.

The numerical data about this example are given in the form of Numerical Example 1.

Numerical Example 1

$F_{min}$ = 2.039
Focal length 6.5 mm-19.5 mm F-number 2.039-2
Upon focused on an infinite object point

| | | | |
|---|---|---|---|
| $r_1$ = 36.6880 | $d_1$ = 4.1400 | $n_1$ = 1.48749 | $v_1$ = 70.23 |
| $r_2$ = ∞ | $d_2$ = variable | | |
| $r_3$ = 21.7500 | $d_3$ = 1.2500 | $n_3$ = 1.84666 | $v_3$ = 23.78 |
| $r_4$ = 8.0540 | $d_4$ = 5.4500 | | |
| $r_5$ = −27.5110 | $d_5$ = 1.0000 | $n_5$ = 1.48749 | $v_5$ = 70.23 |
| $r_6$ = 10.4120 | $d_6$ = 4.5000 | $n_6$ = 1.84666 | $v_6$ = 23.78 |
| $r_7$ = 40.5500 | $d_7$ = variable | | |
| $r_8$ = ∞ (stop) | $d_8$ = variable | | |
| $r_9$ = 17.5830 (aspheric) | $d_9$ = 3.4200 | $n_9$ = 1.58913 | $v_9$ = 61.30 |
| $r_{10}$ = −35.6700 | $d_{10}$ = 0.2000 | | |
| $r_{11}$ = 9.3900 | $d_{11}$ = 4.3500 | $n_{11}$ = 1.77250 | $v_{11}$ = 49.60 |
| $r_{12}$ = 87.9430 | $d_{12}$ = 0.9000 | $n_{12}$ = 1.84666 | $v_{12}$ = 23.78 |
| $r_{13}$ = 6.6090 | $d_{13}$ = variable | | |
| $r_{14}$ = 13.5530 (aspheric) | $d_{14}$ = 3.2800 | $n_{14}$ = 1.58913 | $v_{14}$ = 61.30 |
| $r_{15}$ = −30.8080 | $d_{15}$ = variable | | |
| $r_{16}$ = ∞ | $d_{16}$ = 0.8000 | $n_{16}$ = 1.51633 | $v_{16}$ = 64.14 |
| $r_{17}$ = ∞ | $d_{17}$ = 1.8000 | $n_{17}$ = 1.54771 | $v_{17}$ = 62.84 |
| $r_{18}$ = ∞ | $d_{18}$ = 0.8000 | | |
| $r_{19}$ = ∞ | $d_{19}$ = 0.7500 | $n_{19}$ = 1.51633 | $v_{19}$ = 64.14 |
| $r_{20}$ = ∞ | $d_{20}$ = variable | | |

Electronic image pickup device ∞

Ninth surface k = 0.
$AC_2$ = 0.0000  $AC_4$ = −4.6605 × $10^{−5}$  $AC_6$ = −1.3335 × $10^{−6}$
$AC_8$ = 6.8826 × $10^{−8}$  $AC_{10}$ = −1.1817 × $10^{−9}$
$AC_{12}$ = 1.2187 × $10^{−12}$ Fourteenth Surface k = 0.
$AC_2$ = 0.0000  $AC_4$ = −9.9337 × $10^{−5}$  $AC_6$ = −9.7631 × $10^{−7}$
$AC_8$ = 3.2104 × $10^{−7}$  $AC_{10}$ = −1.9517 × $10^{−8}$
$AC_{12}$ = 3.7414 × $10^{−10}$ Surface separation

| Surface No. | Wide-Angle End | Intermediate Focal Length | Telephoto End |
|---|---|---|---|
| 2 | 1.00000 | 9.66000 | 15.80000 |
| 7 | 16.20000 | 7.55000 | 1.50000 |
| 8 | 8.66000 | 5.46000 | 1.50000 |
| 13 | 3.46000 | 5.00000 | 5.71000 |
| 15 | 3.39200 | 5.16000 | 8.51000 |
| 20 | 1.16922 | 1.01169 | 0.91052 |

| Surface No. | Vitreous Material (OHARA trade mark) | 435.84 g-line RI | 404.656 h-line RI |
|---|---|---|---|

-continued

| | | $F_{min}$ = 2.039 | |
|---|---|---|---|
| | | Focal length 6.5 mm–19.5 mm F-number 2.039-2 | |
| | | Upon focused on an infinite object point | |
| 1 | S-FSL5-0 | 1.49596 | 1.49898 |
| 3 | S-TIH53-0 | 1.89418 | 1.91428 |
| 5 | S-FSL5-0 | 1.49596 | 1.49898 |
| 6 | S-TIH53-0 | 1.89418 | 1.91428 |
| 9 | BACD5-H | 1.60100 | 1.60531 |
| 11 | S-LAH66-0 | 1.79197 | 1.79917 |
| 12 | S-TIH53-0 | 1.89418 | 1.91428 |
| 14 | BACD5-H | 1.60100 | 1.60531 |
| 16 | S-BSL7-0 | 1.52621 | 1.52977 |
| 17 | BAL21-0 | 1.55843 | 1.56226 |
| 19 | S-BSL7-0 | 1.52621 | 1.52977 |

RI: Refractive index

Amounts of aberrations

Lh = 0.0865 mm
Lg = 0.0324 mm
Ld = 0.0061 mm
(Lh − Ld)/$F_{min}$ = 0.0394 mm = 13.1 P
When (L$\lambda$ − Ld)/$F_{min}$ = 0.05 mm,
L$\lambda$ = 0.0959 mm
$\lambda 1$ = 401 nm
When (L$\lambda$ − Ld)/$F_{min}$ = 0.04 mm,
L$\lambda$ = 0.0755 mm
$\lambda 1$ = 409 nm
When (L$\lambda$ − Ld)/$F_{min}$ = 0.03 mm,
L$\lambda$ = 0.0551 mm
$\lambda 1$ = 420 nm
|Sh| = 0.0218 mm = 7.3 P
|Sg| = 0.0083 mm
When |S$\lambda$| = 0.025 mm,
$\lambda 2$ = 400 nm
When |S$\lambda$| = 0.02 mm,
$\lambda 2$ = 408 nm
When |S$\lambda$| = 0.015 mm,
$\lambda 2$ = 418 nm Example 2

Figure 40:
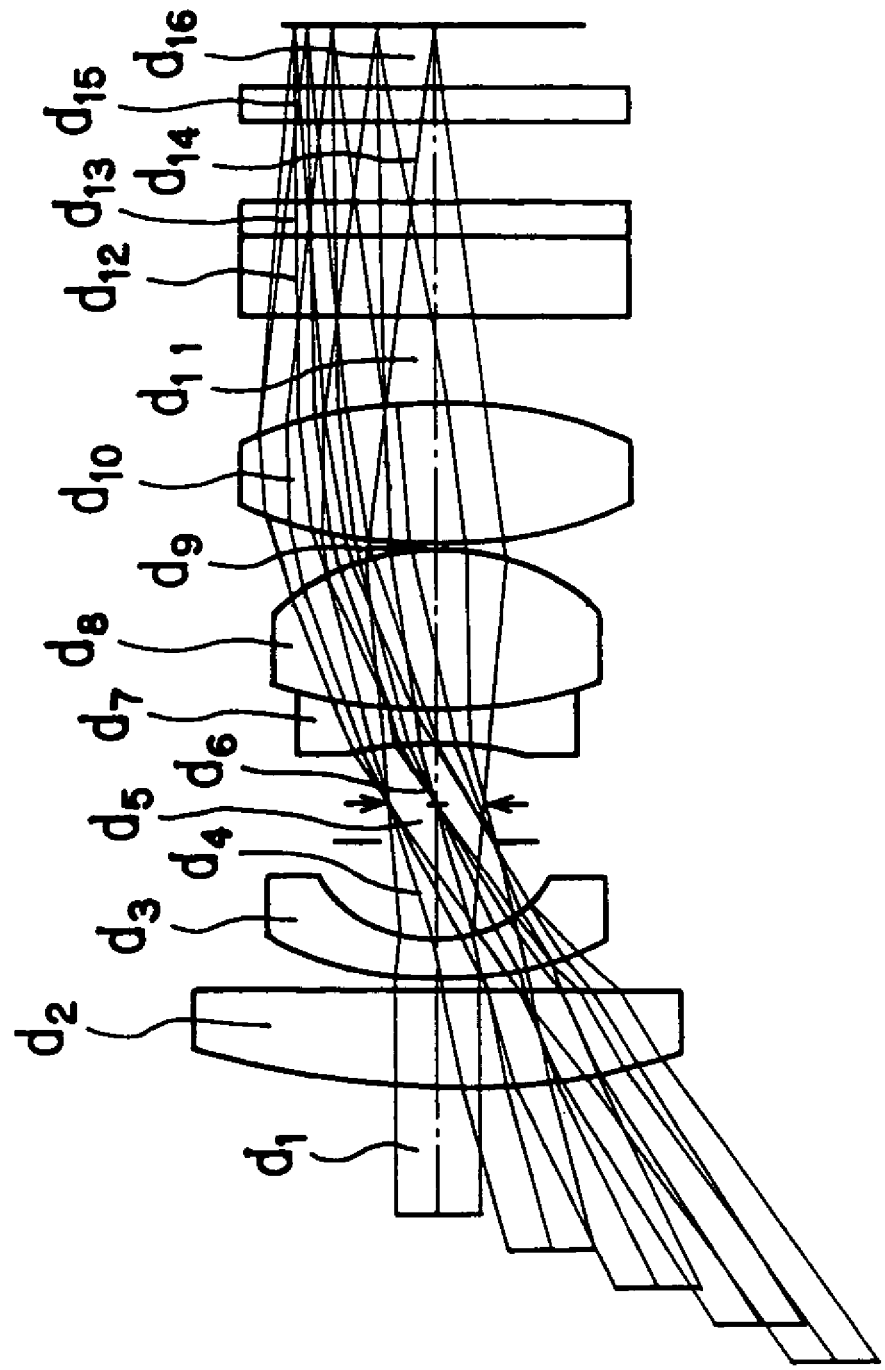
FIG. 40 is a lens section view of the second example (Numerical Example 2) of the image pickup optical system according to this embodiment.

FIG. 40 is a lens section view of the second example of the image pickup optical system according to this embodiment, and FIG. 41 is a diagram illustrative of the spherical aberration and chromatic aberration of magnification with respect to d-line of the image pickup optical system upon focused at infinity.

In the second example, axial chromatic aberrations are well corrected, but chromatic aberrations of magnification remain undercorrected.

The numerical data about this example are given in the form of Numerical Example 1.

Numerical Example 1

| | | $F_{min}$ = 2.881 | | |
|---|---|---|---|---|
| | | Focal length 5.56 mm F-number 2.881 | | |
| | | Upon focused on an infinite object point | | |
| $r_1$ = 14.0020 | $d_1$ = 2.4200 | $n_1$ = 1.84666 | $v_1$ = 23.78 | |
| $r_2$ = 56.9710 | $d_2$ = 0.2500 | | | |
| $r_3$ = 8.4400 | $d_3$ = 0.8700 | $n_3$ = 1.48749 | $v_3$ = 70.21 | |
| $r_4$ = 2.5510 | $d_4$ = 2.4300 | | | |
| $r_5$ = ∞ | $d_5$ = 1.0000 | | | |
| $r_6$ = ∞ | $d_6$ = 1.2000 | | | |

-continued

| | | $F_{min}$ = 2.881 | | |
|---|---|---|---|---|
| | | Focal length 5.56 mm F-number 2.881 | | |
| | | Upon focused on an infinite object point | | |
| $r_7$ = −8.7540 | $d_7$ = 0.8000 | $n_7$ = 1.84666 | $v_7$ = 23.78 | |
| $r_8$ = 10.5000 | $d_8$ = 3.7700 | $n_8$ = 1.72916 | $v_8$ = 54.68 | |
| $r_9$ = −5.4690 | $d_9$ = 0.1500 | | | |
| $r_{10}$ = 10.2500 (aspheric) | $d_{10}$ = 3.3300 | $n_{10}$ = 1.56384 | $v_{10}$ = 60.67 | |
| $r_{11}$ = −12.6780 | $d_{11}$ = 2.0000 | | | |
| $r_{12}$ = ∞ | $d_{12}$ = 1.9100 | $n_{12}$ = 1.51633 | $v_{12}$ = 64.14 | |
| $r_{13}$ = ∞ | $d_{13}$ = 0.8000 | $n_{13}$ = 1.51633 | $v_{13}$ = 64.14 | |
| $r_{14}$ = ∞ | $d_{14}$ = 1.8700 | | | |
| $r_{15}$ = ∞ | $d_{15}$ = 0.7500 | $n_{15}$ = 1.48749 | $v_{15}$ = 70.23 | |
| $r_{16}$ = ∞ | $d_{16}$ = 1.4633 | | | |

Electronic image pickup device ∞

Tenth surface k = 0.
$AC_2$ = 0.0000    $AC_4$ = −3.6137 × 10$^{-4}$    $AC_6$ = 6.0453 × 10$^{-7}$
$AC_8$ = 0.0000    $AC_{10}$ = 0.0000    $AC_{12}$ = 0.0000

| Surface No. | Vitreous Material (OHARA trade mark) | 435.84 g-line RI | 404.656 h-line RI |
|---|---|---|---|
| 1 | S-TIH53-0 | 1.89416 | 1.91428 |
| 3 | S-FSL5-0 | 1.49597 | 1.49898 |
| 7 | S-TIH53-0 | 1.89416 | 1.91428 |
| 8 | S-LAL18-0 | 1.74570 | 1.75173 |
| 10 | S-BAL41-0 | 1.57532 | 1.57947 |
| 12 | S-BSL7-0 | 1.52621 | 1.52977 |
| 13 | S-BSL7-0 | 1.52621 | 1.52977 |
| 15 | S-FSL5-0 | 1.49596 | 1.49898 |

RI: Refractive index

Amounts of aberrations

Figure 42:
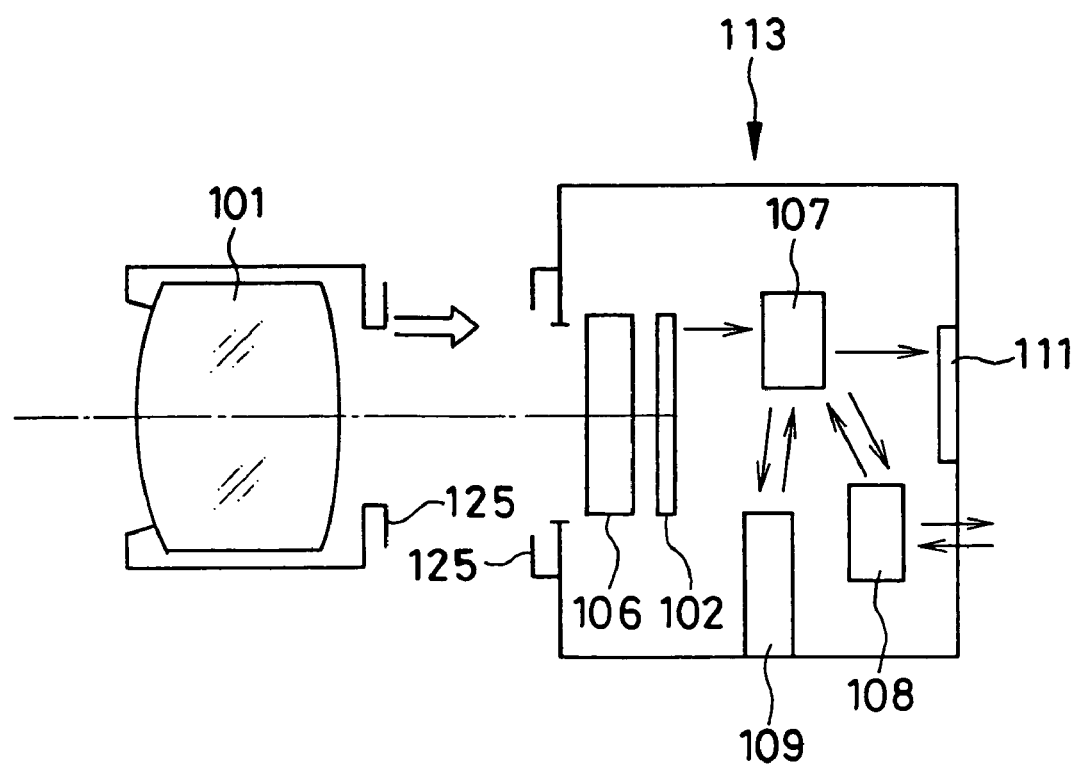
FIG. 42 is a schematic representation of a modification to the instant embodiment.

Lh = 0.02972 mm
Lg = 0.04734 mm
Ld = 0.04041 mm
(Lh − Ld)/$F_{min}$ = −0.003 mm = −1 P
When (L$\lambda$ − Ld)/$F_{min}$ = 0.05 mm,
L$\lambda$ = 0.1036 mm
$\lambda 1$ = 344 nm
When (L$\lambda$ − Ld)/$F_{min}$ = 0.04 mm,
L$\lambda$ = 0.0748 mm
$\lambda 1$ = 351 nm
When (L$\lambda$ − Ld)/$F_{min}$ = 0.03 mm,
L$\lambda$ = 0.0460 mm
$\lambda 1$ = 360 nm
|Sh| = 0.0226 mm = 7.5 P
|Sg| = 0.0100 mm
When |S$\lambda$| = 0.025 mm,
$\lambda 2$ = 400 nm
When |S$\lambda$| = 0.02 mm,
$\lambda 2$ = 409 nm
When |S$\lambda$| = 0.015 mm,
$\lambda 2$ = 420 nm As shown in FIG. 42, the electronic image pickup system according to the instant embodiment may have a mount 125 so as to detachably mount a phototaking optical system 101 on an electronic image pickup system body 113 including an electronic image pickup device 102. It is thus possible to mount a variety of phototaking optical systems 101 on the electronic image pickup system depending on phototaking conditions, and make correction for color flares in various states. It is here noted that the mount 125 may be of the screw coupling type or the bayonet coupling type. Otherwise, this electronic image pickup system is fundamentally similar to the image pickup system shown in FIG. 26.

With the instant embodiment of the second aspect of the present invention, it is possible to control the luminance or color signals of the image to be phototaken, thereby reducing the "color running", even when chromatic aberrations are produced as a result of slimming down the phototaking optical system.

Figure 43:
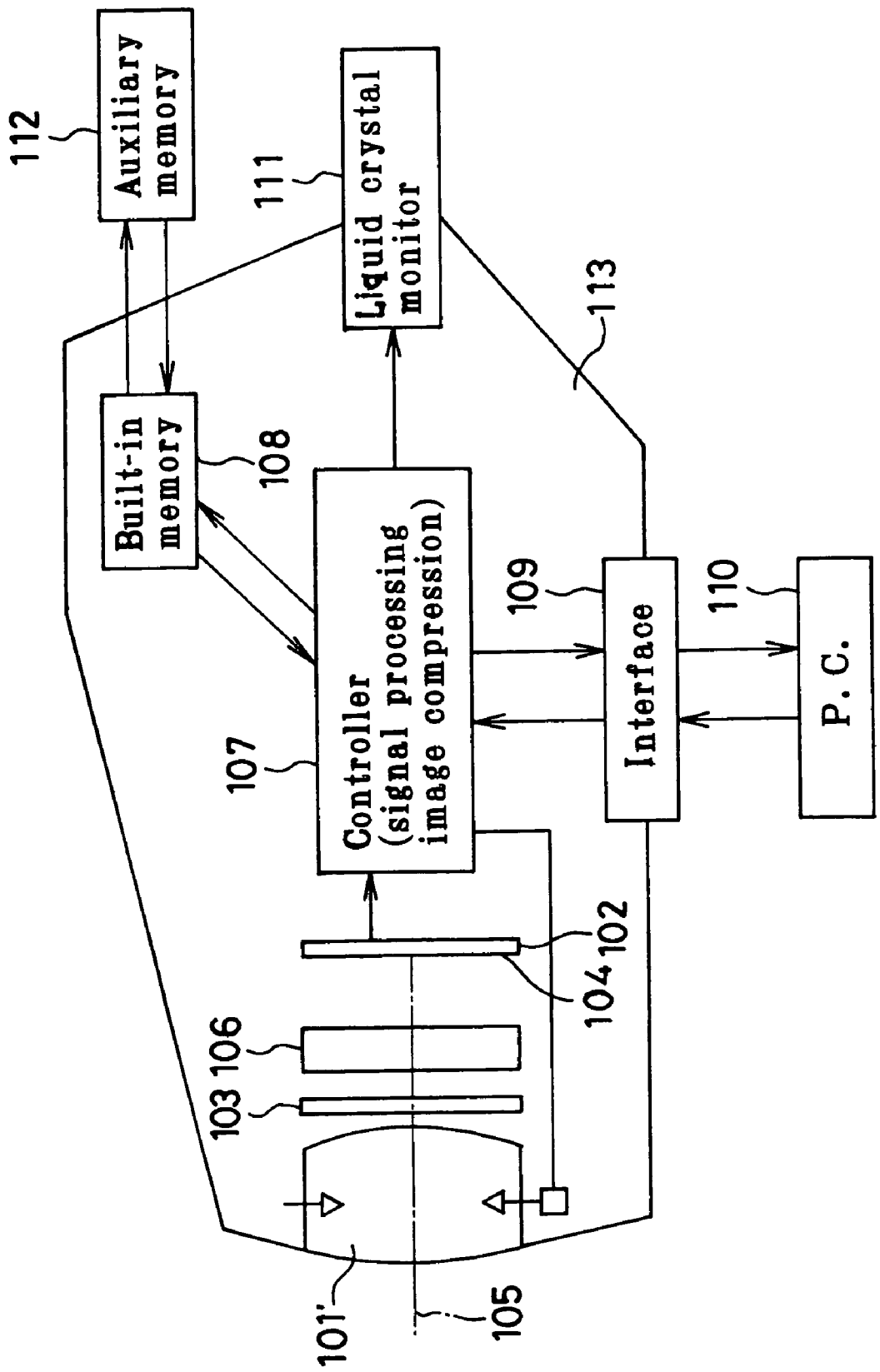
FIG. 43 is a schematic representation of the second embodiment of the electronic image pickup system according to the second aspect of the present invention, wherein a wavelength correction filter for making correction for wavelengths is used of the optical elimination of color flares.

The second embodiment of the second aspect of the present invention is shown in FIG. 43. The same parts as in the first embodiment are indicated by the same references, and so their detailed explanations are omitted.

The electronic image pickup system according to this embodiment is designed in such a way as to optically eliminate color flares by use of a wavelength correction filter for making correction for wavelengths.

More specifically, this embodiment is structurally different from the first embodiment in that a phototaking optical system 101 is provided in its optical path with a wavelength correction filter 103, instead of the means for reducing color flares, said filter being made up of a plane-parallel plate coated on one side with a film for making correction for wavelengths, thereby decreasing its transmittance with respect to light rays in the short wavelength range.

For the image pickup optical system 101, use may be made of those explained in the numerical examples of the first and second examples.

It is here noted that the optical elements that take part in the determination of a focal length in this image pickup optical system are made up of those making use of a refraction phenomenon alone.

Figure 44:
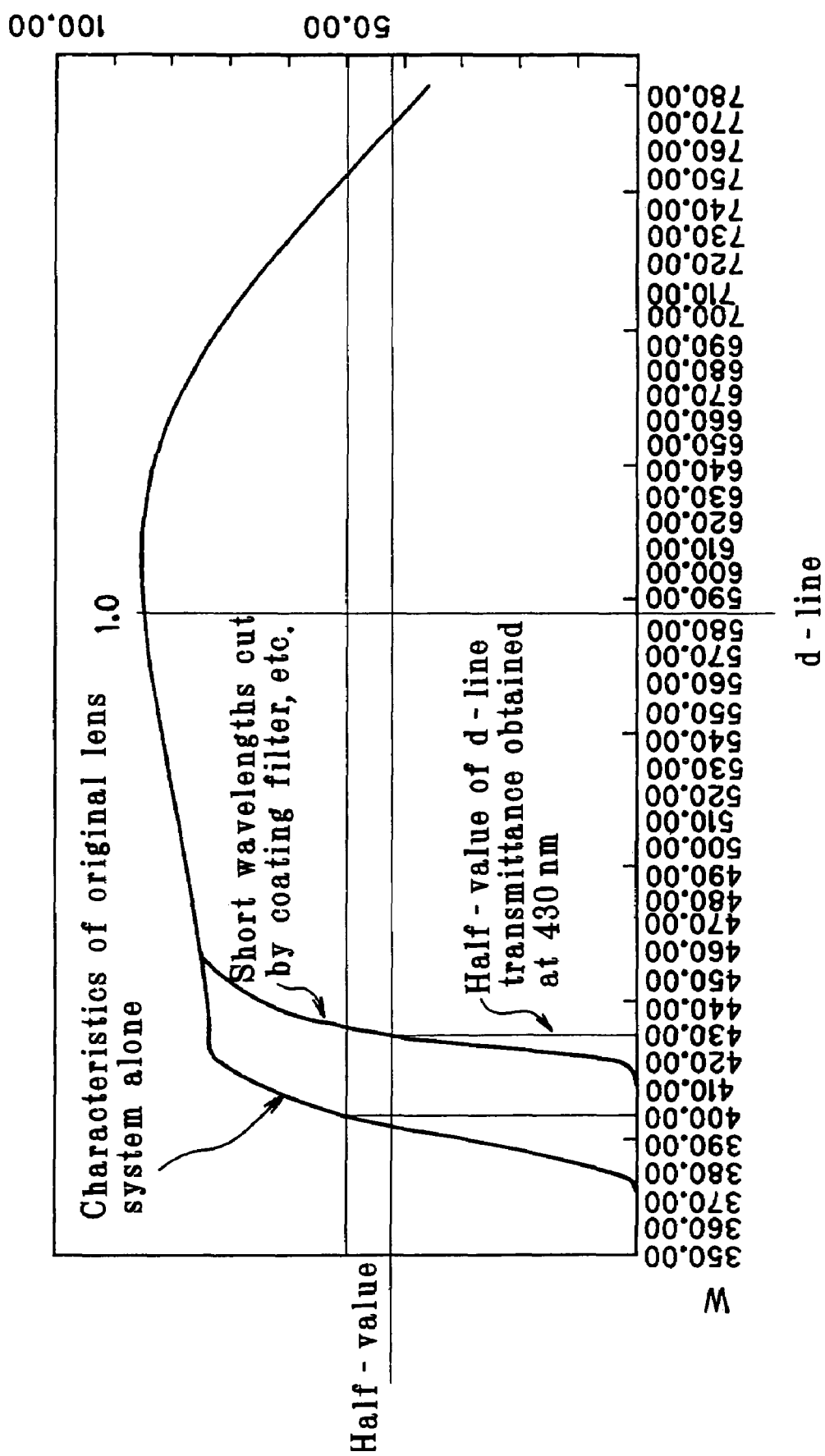
FIG. 44 is a diagram showing a spectral transmittance curve for the phototaking optical system alone in the image pickup optical system according to the instant embodiment and a spectral transmittance curve for the phototaking optical system plus wavelength correction filter 3.

The spectral transmittance curve for only the optical element in the image pickup optical system (phototaking optical system 101') and the spectral transmittance curve for the phototaking optical system plus wavelength correction filter 103 are shown in FIG. 44.

As shown in FIG. 44, the phototaking optical system 101' plus wavelength correction filter 103 enables the quantity of light on the short wavelength side—where color flares are likely to occur—to become smaller as compared with the phototaking optical system 101' alone, so that more satisfactory images can be obtained.

Specific numerical data about the image pickup optical system according to the instant embodiment are now given in the form of Numerical Example 3.

NUMERICAL EXAMPLE 3

$\lambda c=430$ nm
$\tau h=0\%$
$\tau g=60\%$

In the electronic image pickup device, g-line sensitivity characteristics/e-line sensitivity characteristics=0.35.

Figure 45:
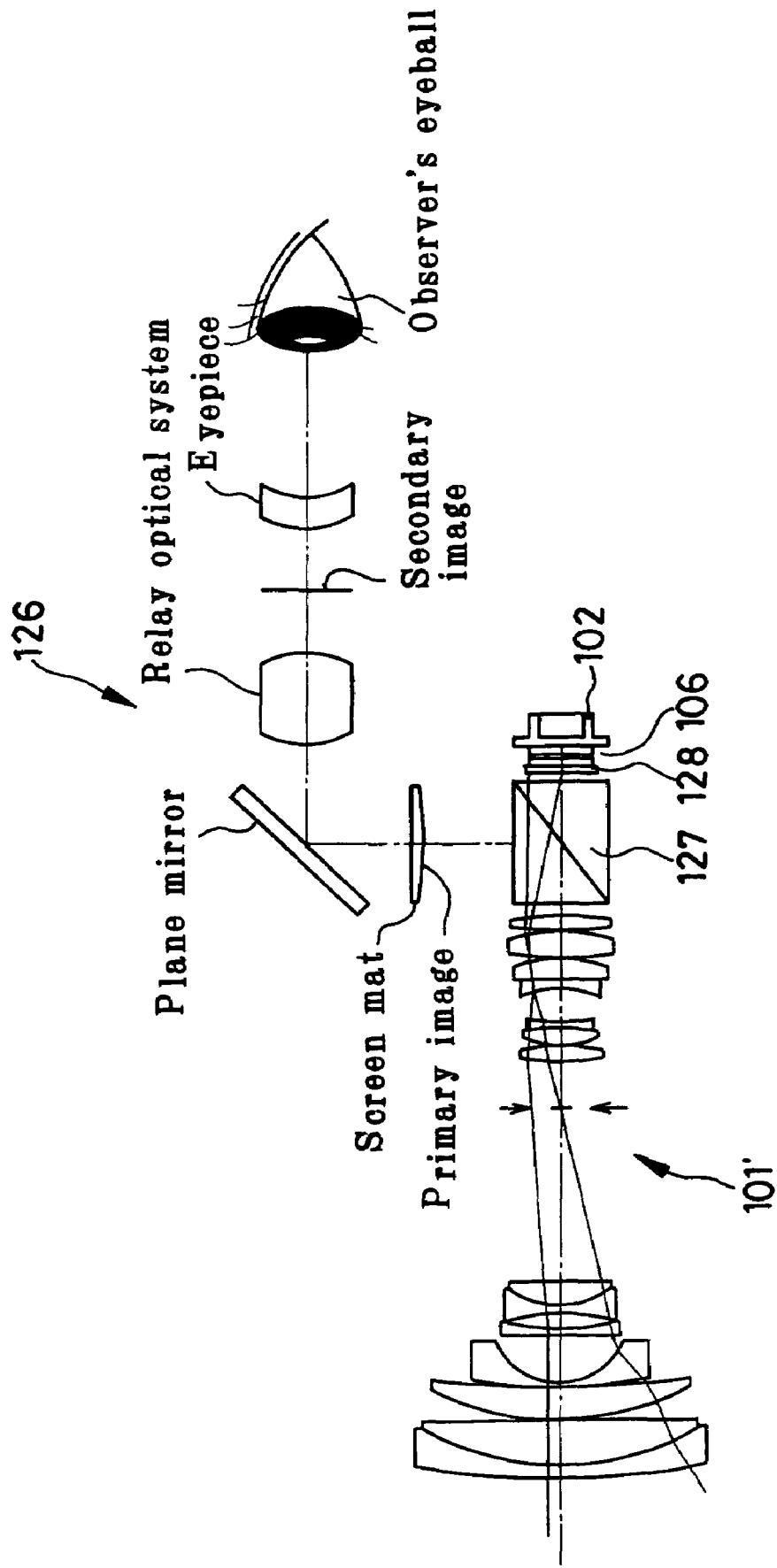
FIG. 45 is a schematic representation illustrative of a modification to the instant embodiment or a so-called TTL finder type observation optical system wherein a light beam is split in front of an image pickup device to guide one optical path to the eyeball of an observer and another to a finder optical system 26.

In combination with Numerical Example 1:
When $(L\lambda-Ld)/F_{min}=0.05$ mm,
$\tau(\lambda 1)=0\%$
$\tau(\lambda 1+30)=52\%$
When $(L\lambda-Ld)/F_{min}=0.04$ mm,
$\tau(\lambda 1)=0\%$
$\tau(\lambda 1+30)=62\%$
When $(L\lambda-Ld)/F_{min}=0.03$ mm,
$\tau(\lambda 1)=5\%$
$\tau(\lambda 1+30)=82\%$
When $|S\lambda|=0.025$ mm,
$\tau(\lambda 2)=0\%$
$\tau(\lambda 2+30)=50\%$
When $|S\lambda|=0.02$ mm,
$\tau(\lambda 2)=0\%$
$\tau(\lambda 2+30)=63\%$
When $|S\lambda|=0.015$ mm,
$\tau(\lambda 2)=4\%$
$\tau(\lambda 2+30)=80\%$
$(Lh-Ld)/F_{min}\times\tau h=0$
$(Lg-Ld)/F_{min}\times\tau g=0.01133$ mm
$|Sh|\times\tau h=0$
$|Sg|\times\tau g=0.00498$ mm
In combination with Numerical Example 2:
When $(L\lambda-Ld)/F_{min}=0.05$ mm,
$\tau(\lambda 1)=0\%$
$(\lambda 1+30)=0\%$
When $(L\lambda-Ld)/F_{min}=0.04$ mm,
$\tau(\lambda 1)=0\%$
$\tau(\lambda 1+30)=0\%$
When $(L\lambda-Ld)/F_{min}=0.03$ mm,
$\tau(\lambda 1)=0\%$
$\tau(\lambda 1+30)=0\%$
When $|S\lambda|=0.025$ mm,
$\tau(\lambda 2)=0\%$
$\tau(\lambda 2+30)=50\%$
When $|S\lambda|=0.02$ mm,
$\tau(\lambda 2)=0\%$
$\tau(\lambda 2+30)=65\%$
When $|S\lambda|=0.015$ mm,
$\tau(\lambda 2)=5\%$
$\tau(\lambda 2+30)=82\%$
$(Lh-Ld)/F_{min}\times\tau h=0$
$(Lg-Ld)/F_{min}\times\tau g=0.004158$ mm
$|Sh|\times\tau h=0$
$|Sg|\times\tau g=0.006$ mm The image pickup system according to the instant embodiment may be applied to an image pickup system different in type from that shown in FIG. 43, for instance, a so-called TTL finder type image pickup system wherein a light beam is split in front of an electronic image pickup device to guide an observation optical path to the eyeball of an observer and an optical path leading to a finder optical system 126, as shown in FIG. 4. For the image pickup optical system shown in FIG. 45, too, the phototaking optical system explained in each of the aforesaid numerical examples may be used as the optical system 101. This TTL finder type is characterized in that the subject can be observed with reduced power consumption. The image pickup system of the type shown in FIG. 45 uses a half-silvered mirror prism 127 as the optical path splitter means for the finder optical system 126 and phototaking optical system 101'. The electronic image pickup device or CCD 102 has an image pickup area where its g-line sensitivity is at least 30% of its e-line sensitivity. On only the optical path on the electronic image pickup device side, there is located a low-pass filter 106 having an irregular entrance surface and an exit surface coated with a film 128 for making the aforesaid correction for wavelengths.

It is noted that instead of using an infrared cutoff filter, the low-pass filter 106 may be coated on one side with the aforesaid film.

By carrying out coating in such a way as to ensure the wavelength whose transmittance becomes a half of the d-line transmittance between g-line and h-line as well as between 600 nm and 700 nm, the functions of cutting off infrared rays and reducing color flares are achievable.

Figure 37:
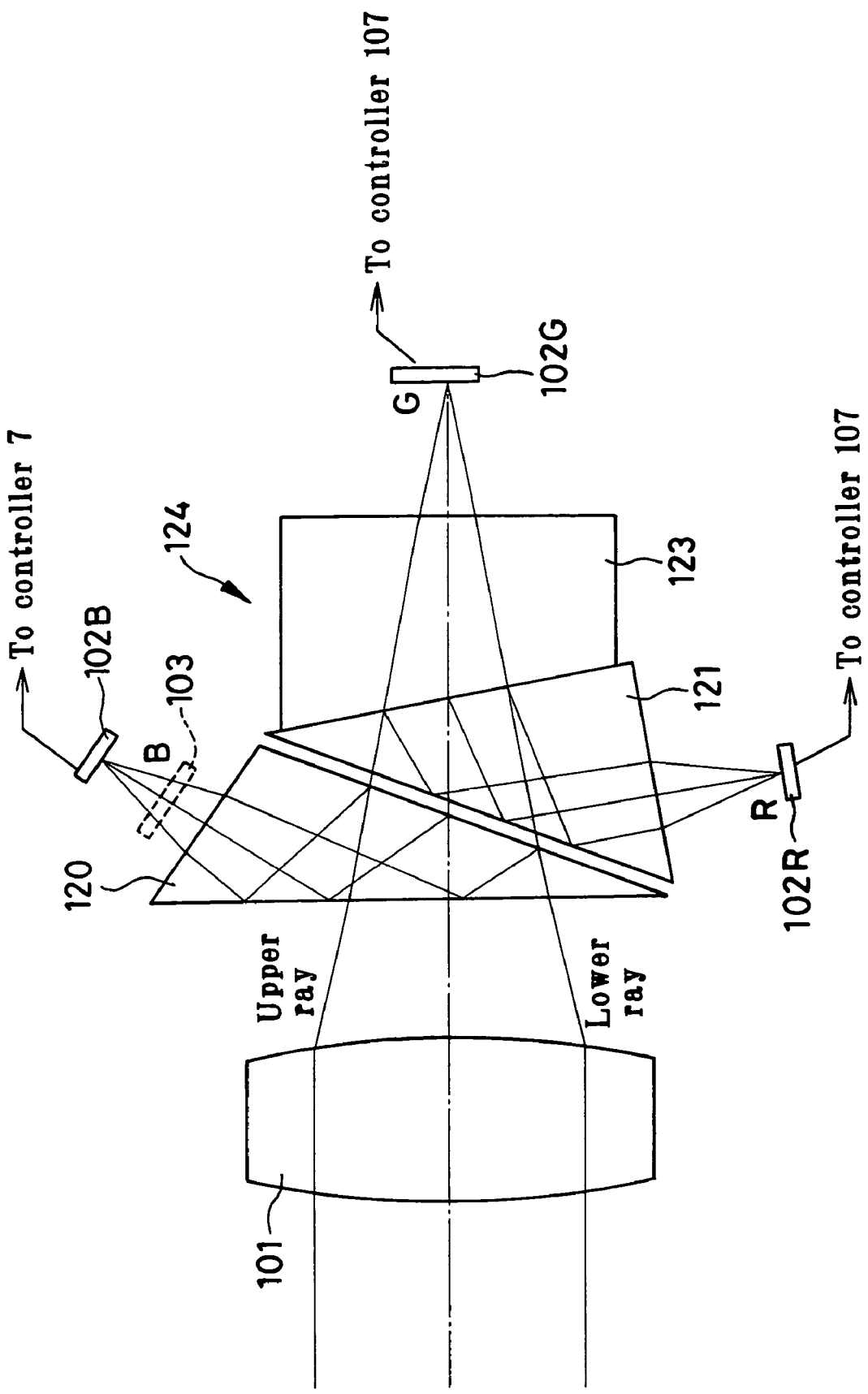
FIG. 37 is a schematic representation of a modification to the image pickup optical system of this embodiment, in which a color separation prism is used.

Referring to such a triple plate type image pickup device as shown in FIG. 37, the wavelength correction element 3 may be disposed on only an optical path on the side of a blue image pickup device (B) which has an image pickup area where its g-line sensitivity is 30% or greater of its e-line sensitivity.

Figure 46:
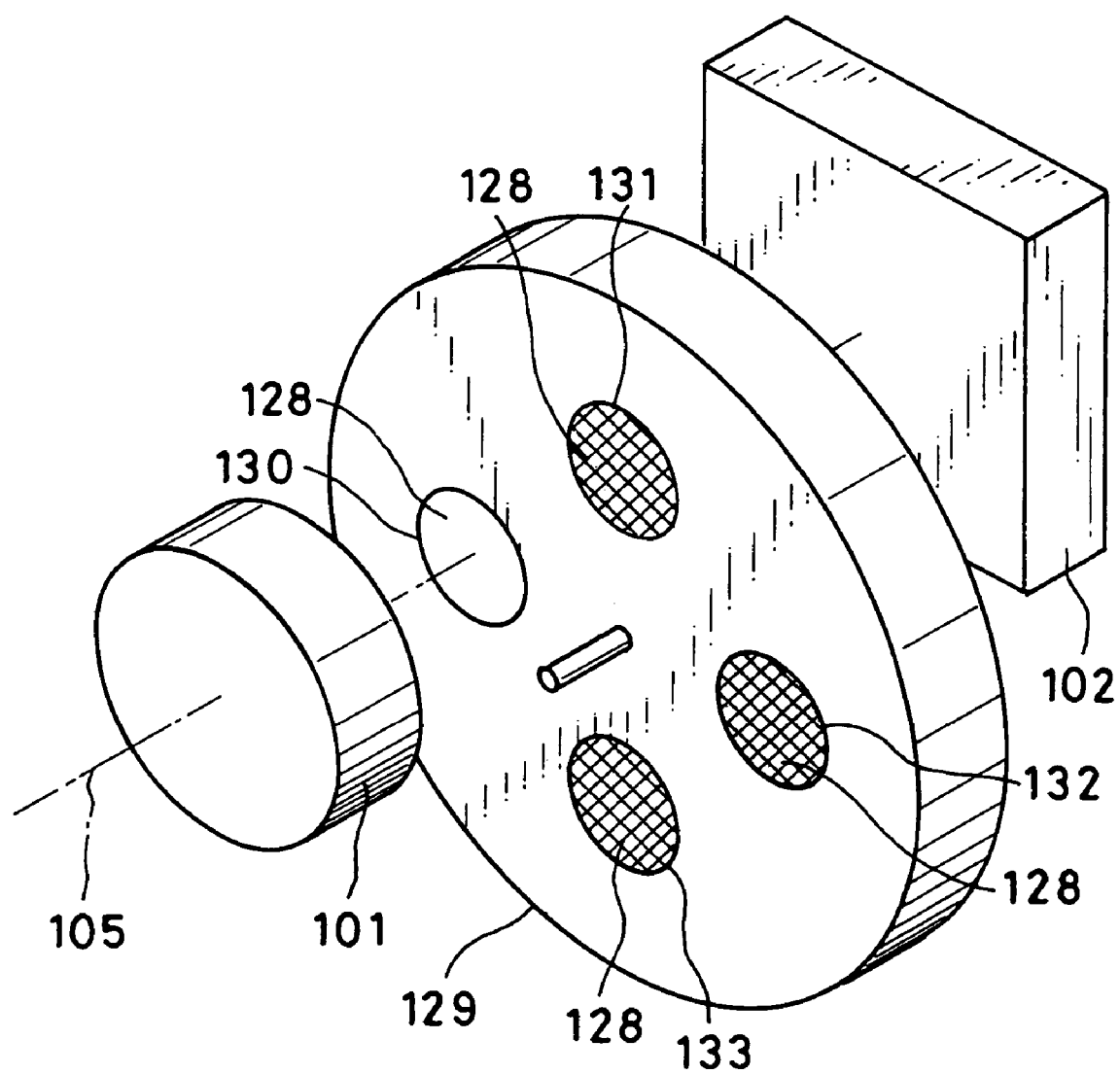
FIG. 46 is a schematic of part of another embodiment of the electronic image pickup system according to the second aspect of the present invention.

FIG. 46 is a schematic of part of another embodiment of the electronic image pickup system according to the second aspect of the present invention. In this embodiment, a turret 129 is disposed on an optical axis 105 between an image pickup optical system 101 and an electronic image pickup device 102 so as to control brightness to 0, −1, −2 and −3 levels. Otherwise, the construction of the image pickup optical system or the like is the same as that of each of the aforesaid embodiments.

The turret 129 is provided thereon with a plane-parallel plate 130, a −1 level ND filter 131, −2 level ND filter 132 and −3 level ND filter 133, which are successively positioned on an optical path defined by an optical axis in unison with the rotation of the turret 129, thereby controlling the quantity of light incident on the image pickup device 102. The plane-parallel plate 130 and ND filters are each provided on its surface with a coating film 128 having a wavelength correction function of allowing its transmittance to become a half-value of its e-line transmittance between g-line and h-line, thereby reducing color flares due to chromatic aberrations occurring on the shorter wavelength side. It is noted that the spectral sensitivities of the coating films and the optical system are the same as shown in FIG. 44. In association with each ND filter, the overall transmittance drops to ½, ¼ and ⅛, respectively.

Embodiments of the third aspect of the present invention are now explained with reference to the accompanying drawings.

Figure 47:
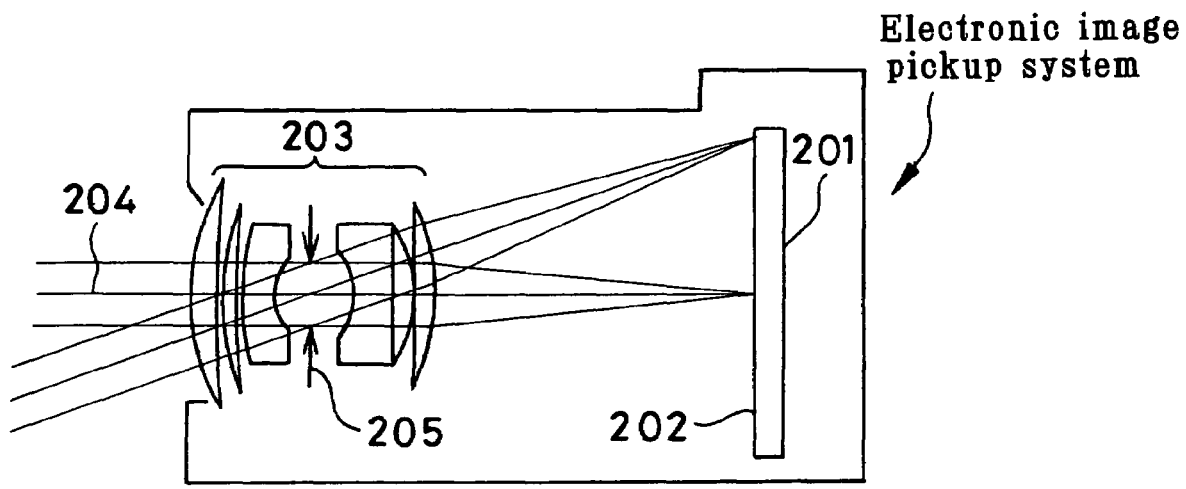
FIG. 47 is a schematic representation of an image pickup optical system that shows one embodiment of the electronic image pickup system according to the third aspect of the present invention.

FIG. 47 is a schematic representation of a digital camera that is one embodiment of the electronic image pickup system according to the third aspect of the present invention.

The electronic image pickup system according to the instant embodiment comprises an electronic image pickup device 201 including a plurality of pixels having three or more different spectral characteristics so as to obtain a color image and an image pickup optical system 203 for forming the image of a subject on the image pickup surface 202 of the electronic image pickup device.

Figure 48:
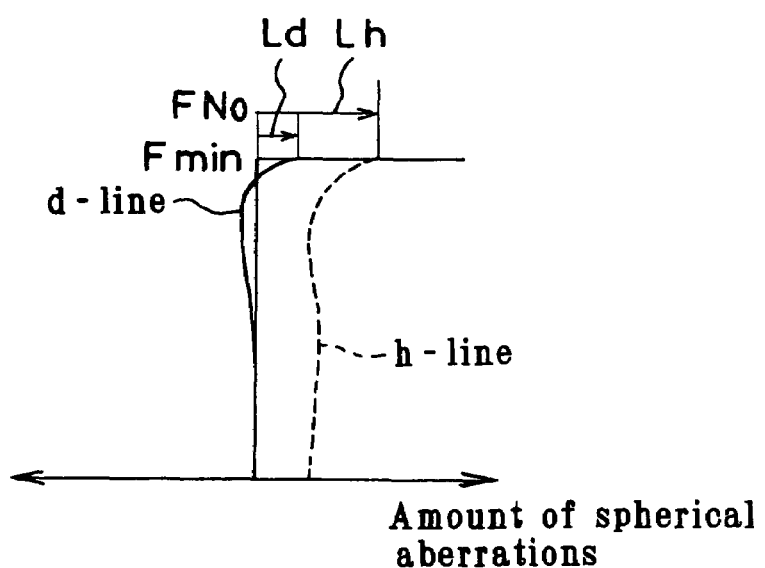
FIG. 48 is a spherical aberration diagram for the image pickup optical system of FIG. 47.

How the image is formed at the center of the image pickup surface 202 may be judged on the basis of a spherical aberration diagram. FIG. 48 is a spherical aberration diagram for the image pickup optical system of FIG. 47 upon focused on an infinite object point. In FIG. 48, Lλ represents an F-number upon stop in, i.e., the absolute value of a difference between a paraxial image point and the position at the minimum F-number or $F_{min}$ of intersection of the optical axis with a marginal ray of each wavelength with the maximum height of incident ray or, in another parlance, the absolute value of the amount of spherical aberrations. If λ is d-line (587.56 nm), then the absolute value of the amount of d-line spherical aberrations is represented by Ld, and if λ is h-line (404.7 nm), then the absolute value of the amount of h-line spherical aberrations is represented by Lh.

Figure 49:
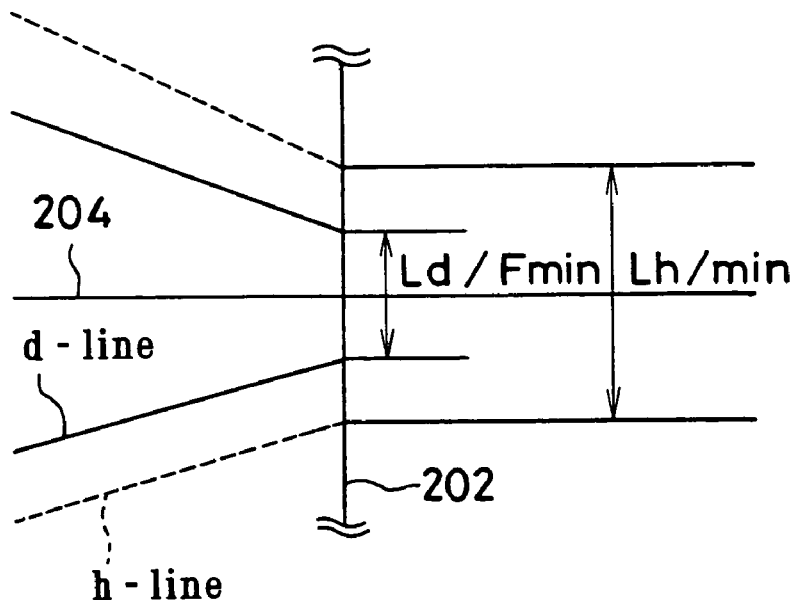
FIG. 49 is a schematic illustrative of the amount of displacements of the focal position of the image pickup optical system of FIG. 47 at the maximum height of incident ray, as viewed in a sectional view of the optical system with the image plane at the center.

In the aberration diagram of FIG. 48, Ld and Lh represent the amount of a focal point displacement at the maximum height of incident ray. FIG. 49 is illustrative of how this amount is seen in a sectional view of the vicinity of the center of the image plane of the image pickup optical system in the electronic image pickup system 203 of FIG. 47, i.e., the vicinity of the center of the image pickup surface 202.

In FIG. 49, a solid line indicates a d-line marginal ray at the maximum height of incident ray and a broken line indicates an h-line marginal ray at the maximum height of incident ray. Then, the displacement of the image plane for each wavelength from the paraxial image plane 202 is perceived in the form of color flares on the paraxial image plane.

In FIG. 49, the amounts (diameter) of displacement of the image plane from the optical axis 104 on the paraxial image plane 202 are indicated by $Ld/F_{min}$ and $Lh/F_{min}$, respectively.

A large difference between $Ld/F_{min}$ and $Lh/F_{min}$ makes color flares likely to occur. To reduce color flares on the side of wavelengths shorter than d-line, the difference between $Ld/F_{min}$ and $Lh/F_{min}$ should be 0.07 mm or less. That is, it is required to satisfy the following condition (31):

$$(Lh-Ld)/F_{min} \leq 0.07 \text{ mm} \tag{31}$$

If this condition is satisfied, then it is possible to reduce color flare-causing color shifts between light beams in the vicinity of h-line and light beams in the vicinity of d-line, thereby reducing color flares while color shifts on the shorter wavelength side can be reduced.

When the difference between $Ld/F_{min}$ and $Lh/F_{min}$ exceeds the upper limit of 0.07 in condition (31), color flares become striking to the eye.

Figure 50:
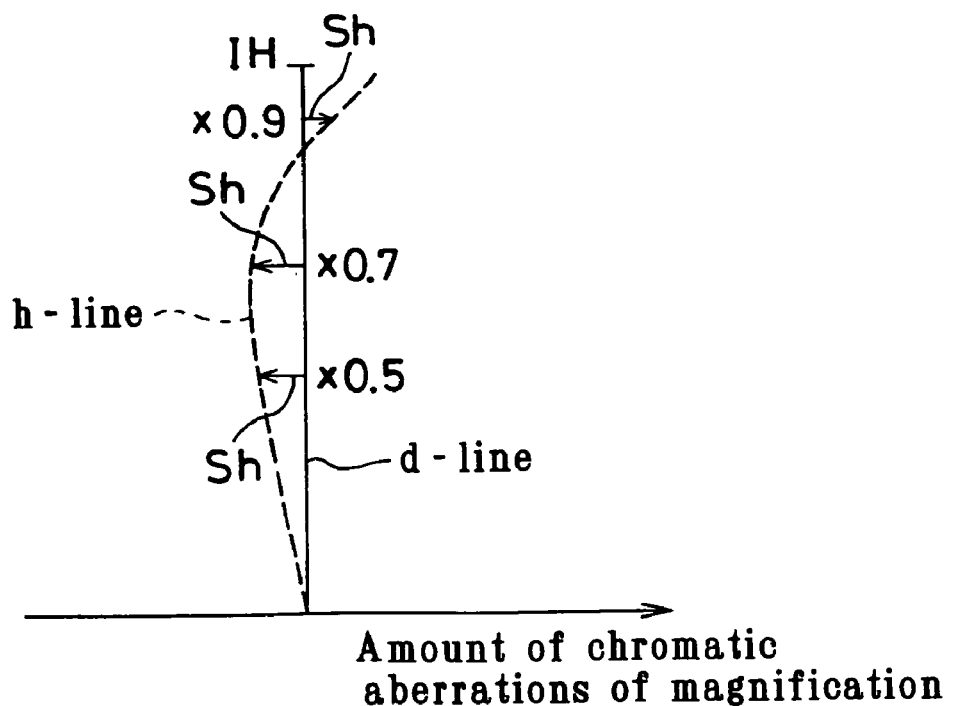
FIG. 50 is an aberration diagram for h-line chromatic aberration of magnification of the image pickup optical system of FIG. 47 with respect to d-line.
Figure 51:
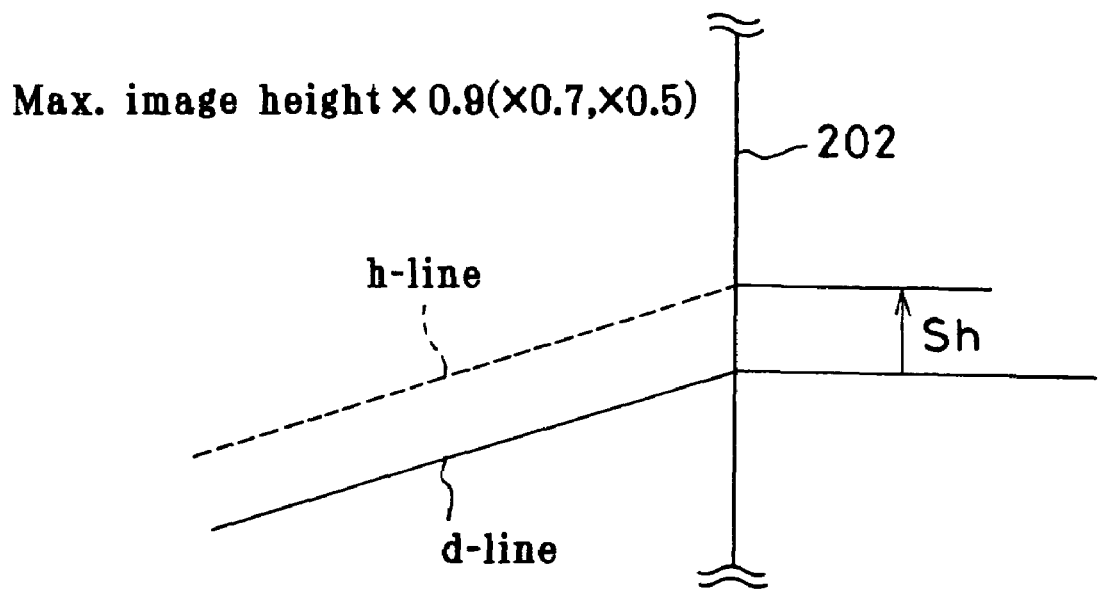
FIG. 51 is a schematic illustrative of the state of chromatic aberrations of the image pickup optical system of FIG. 47 at the image height ratios of 0.9, 0.7 and 0.5, as viewed on a paraxial image plane.

While the axial chromatic aberrations have so far been explained, it is understood that the same also holds for chromatic aberrations of magnification. FIG. 50 is an aberration diagram for h-line chromatic aberration of magnification with respect to d-line. In FIG. 50, the amount Sh of h-line transverse chromatic aberration of magnification with respect to d-line at image height ratios of 0.9, 0.7 and 0.5 with respect to the maximum image height IH is indicated by arrows. FIG. 51 is illustrative of how chromatic aberrations are produced at the image height ratios of 0.9, 0.7 and 0.5 on the paraxial image plane 202 of FIG. 47. The amount of transverse chromatic aberration of magnification that is a chief ray difference between d-line and h-line is perceived in the form of color flares. To reduce color flares, it is thus required to reduce the amount of shifts at the respective image height ratios to 0.04 mm or less or satisfy the following condition (32):

$$|Sh| \leq 0.04 \text{ mm} \tag{32}$$

When the amount of shifts |Sh| exceeds the upper limit of 0.04 mm in condition (32), color flares becomes striking to the eye because chromatic aberrations of magnification occur.

According to the instant embodiment, the electronic image pickup system is constructed in such a way as to satisfy the aforesaid conditions (31) and (32) simultaneously. It is thus possible to reduce color shifts over all the image plane and thereby reproduce a satisfactory image with an unobtrusive color shift even when the subject is of high contrast.

Preferably in the instant embodiment, the upper limit to the aforesaid condition (31) should be set at 0.05 mm and especially 0.03 mm, because more satisfactory images are obtainable.

Preferably in the instant embodiment, the upper limit to the aforesaid condition (32) should be set at 0.03 mm and especially 0.02 mm, because more satisfactory images are obtainable.

The electronic image pickup device 201 is provided with a matrix array of pixels. Here the minimum pitch for each pixel is represented by P. Then, the aforesaid condition (31) may be replaced by the following condition (33) and the aforesaid condition (32) may be replaced by the following condition (34). In this case, too, it is possible to reduce color shifts over all the image plane and thereby reproduce a satisfactory image with an unobtrusive color shift even when the subject is of high contrast.

$$(Lh-Ld)/F_{min} \leq 6P \tag{33}$$

$$|Sh| \leq 5P \tag{34}$$

When $(Lh-Ld)/F_{min} > 6P$ or $|Sh| > 5P$, color flares become striking to the eye.

Preferably, the upper limit to the aforesaid condition (33) should be set at 4P and especially 2P, because more satisfactory images are obtainable.

Preferably, the upper limit to the aforesaid condition (34) should be set at 3P and especially 2P, because more satisfactory images are obtainable.

On the other hand, between the pixels of the electronic image pickup device 201 there is an area where any light beam cannot be sensed. The light sensing efficiency may be increased by the provision of microlenses corresponding to pixels to some degrees, as well known in the art. However, the area used for light sensing is 40 to 80% with respect to the image pickup area. For this reason, some chromatic aberrations, if any, have no influence on reproduced images. In consideration of influences of overcorrection of each chromatic aberration on other aberrations, it is preferable to satisfy the following conditions (35) and/or (36):

$$(Lh-Ld)/F_{min} \geq 0.5P \quad (35)$$

$$|Sh| \geq 0.03P \quad (36)$$

When the lower limits to the aforesaid conditions (35) and (36) are not reached, there is no influence of chromatic aberrations on reproduced images. However, it is rather difficult to make correction for other aberrations.

It is noted that Sh is the amount of transverse chromatic aberration of magnification for h-line with respect to d-line at any one of the image height ratios of 0.9, 0.7 and 0.5 with respect to the maximum image height.

The construction and action of an image pickup optical system suitable to achieve the electronic image pickup system according to the instant embodiment are now explained.

The image pickup optical system 203 shown in FIG. 47 comprises a stop S, and an optical system portion located on the image side with respect to the stop S comprises three lenses or, in order from its object side, a negative lens, a positive lens and a positive lens.

Preferably in this case, the negative lens should be cemented with the positive lens on the image side.

It is also preferable that the optical system portion located on the image side with respect to the stop comprises three lenses or, in order from its object side, a positive lens, a positive lens and a negative lens, optionally with a positive lens group located on the image side of the three lenses.

Of the aforesaid positive lenses, the image-side positive lens should preferably be cemented with the aforesaid negative lens.

It is also preferable that the image pickup optical system according to the instant embodiment should comprise, in order from its object side, a first group having positive refracting power, a second group having negative refracting power, a stop, a third group having positive refracting power and a fourth group having positive refracting power, with the third group comprising, in order from its object side, one or two positive lens and a negative lens.

It is also preferable that the aforesaid third group should comprise a doublet consisting of one positive lens and one negative lens.

It is also preferable that a vitreous material with g- and F-line anomalous dispersion defined by $\Delta\theta gF>0.025$ is used for a positive lens(es) in the third and fourth groups, and a vitreous material with anomalous dispersion defined by $\Delta\theta gF<0.01$ is used for a negative lens(es) therein.

More preferably in this case, the anomalous dispersion of the positive lens should be $\Delta\theta gF \geq 0.027$ or the anomalous dispersion of the negative lens should be $\Delta\theta gF<0.008$.

It is also preferable that the image pickup optical system according to the instant embodiment should comprise, in order from its object side, a front group comprising a negative meniscus lens convex on its object side, a stop and a rear group having positive refracting power, with the rear group having at least one aspherical surface and at least one positive lens capable of satisfying the following conditions (37) and (38):

$$\Delta\theta gF(r)>0.025 \quad (37)$$

$$-0.5<(R1+R2)/(R1-R2)<0.5 \quad (38)$$

where $\Delta\theta gF(r)$ is the anomalous dispersion of a medium of at least one positive in the rear group, and R1 and R2 are the paraxial radii of curvature on the object and image sides of at least one positive lens in the rear group, respectively.

Generally in the case of a positive lens, the positive value of g-line chromatic aberration of magnification increases drastically with increasing field angle. The positive value of g-line longitudinal chromatic aberrations is likely to increase, too.

In this type of positive lens in particular, g-line spherical aberration is likely to assume a plus value, and so flares are likely to occur at wavelengths shorter than d-line.

To prevent both g-line chromatic aberration of magnification and axial chromatic aberration from assuming large plus values, the medium capable of meeting the aforesaid condition (37) should be used for the positive lens located in the rear group and spaced slightly away from the stop and having some axial height of rays.

When the anomalous dispersion of the positive lens medium is $\Delta\theta gF(r)<0.025$, it is difficult to make correction for chromatic aberrations.

For the purpose of correcting chromatic aberrations with the positive lens located in the rear group and spaced slightly away from the stop and having some axial height of rays, it is preferable to use a double-convex lens which can meet the aforesaid condition (38) and both surfaces of which have close radii of curvature, because the angles of rays are generally small.

When the radii of curvature R1 and R2 of both surfaces exceed the upper limit to the aforesaid condition (38), color flares of shorter wavelengths are likely to occur.

Preferably in the image pickup optical system according to the instant embodiment, an additional positive lens is incorporated in the rear group, said positive lens being formed of a medium having a refractive index that is at least 0.17 higher than the d-line refractive index of the medium of at least one positive lens already used in the rear group. More preferably, the refractive index difference between these positive lenses should be 0.22 or greater.

A medium having a large Abbe number and such large anomalous dispersion as to meet the aforesaid condition (37) often tends to decrease to, say, 1.4 to 1.5 in the index of refraction. With such a lens medium, it is difficult to make correction for spherical aberrations and field curvature. For this reason, it is required to use a lens medium having such a high refractive index as mentioned above for other convex lens in the rear group.

When the refractive index of the convex lens does not reach the lower limit of 0.17, it is difficult to make correction for spherical aberrations and field curvature.

To make correction for chromatic aberrations with a reduced number of lenses, the rear group should preferably be made up of, in order from its object side, a doublet component consisting of a negative lens and a positive lens, and a positive lens.

In order to correct various aberrations as well, the front group should preferably be made up of two lenses or, in order from its object side, a positive lens and a negative lens.

In order to make correction for chromatic aberrations with a four-group zoom lens system, the image pickup optical system should preferably comprise, in order from its object side, a first group having positive refracting power, a second group having negative refracting power and movable for zooming, a stop, a third group having positive refracting power and a fourth group having positive refracting power and movable for zooming and focusing, with the four group having at least one aspherical surface and at least one positive lens capable of satisfying the following conditions (39) and (40):

$$\Delta\theta gF(4) > 0.025 \quad (39)$$

$$-0.5 < (R14+R24)/(R14-R24) < 0.5 \quad (40)$$

where $\Delta\theta gF(4)$ is the anomalous dispersion of a medium of at least one positive in the rear group, and R14 and R24 are the paraxial radii of curvature on the object and image sides of at least one positive lens in the rear group, respectively.

When the anomalous dispersion of the positive lens medium is $\Delta\theta gF(4) < 0.025$, it is difficult to make correction for chromatic aberrations.

When the radii of curvature R14 and R24 of both surfaces exceed the upper limit to the aforesaid condition (40), color flares of shorter wavelengths are likely to occur.

Preferably in the image pickup optical system according to the instant embodiment, an additional positive lens is incorporated in the third or fourth group, said positive lens being formed of a medium having a refractive index that is at least 0.17 higher than the d-line refractive index of the medium of at least one positive lens already used in the fourth group.

More preferably, the refractive index difference between these positive lenses should be 0.22 or greater.

It is also preferable that the optical system portion located on the image side with respect to the stop comprises, in order from its object side, a positive lens, a doublet component consisting of a positive lens and a negative lens and a positive lens. This is favorable for reducing the size of the image pickup system and making correction for chromatic aberrations.

Color filters used with the electronic image pickup device positioned in the vicinity of a subject image in the image pickup system are now explained.

Figure 52:
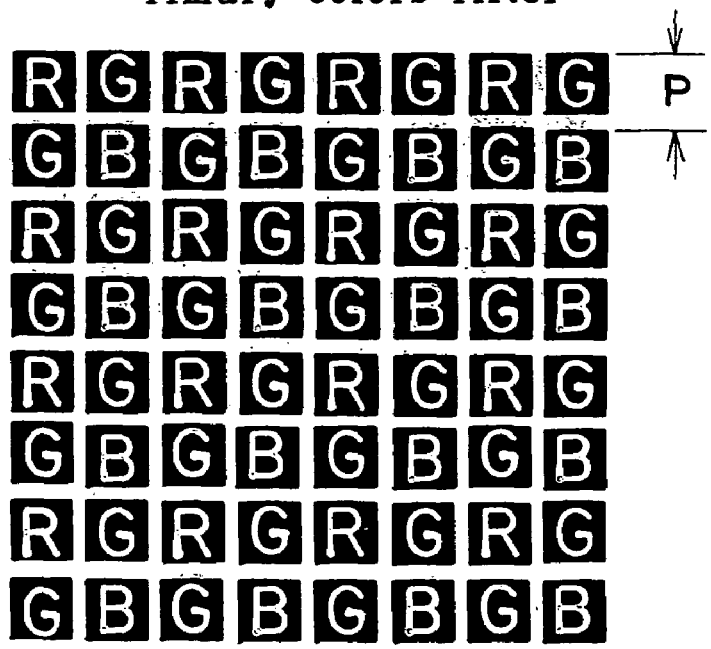
FIG. 52 is a schematic representation of the primary color filter used with the electronic image pickup system according to the third aspect of the invention.
Figure 53:
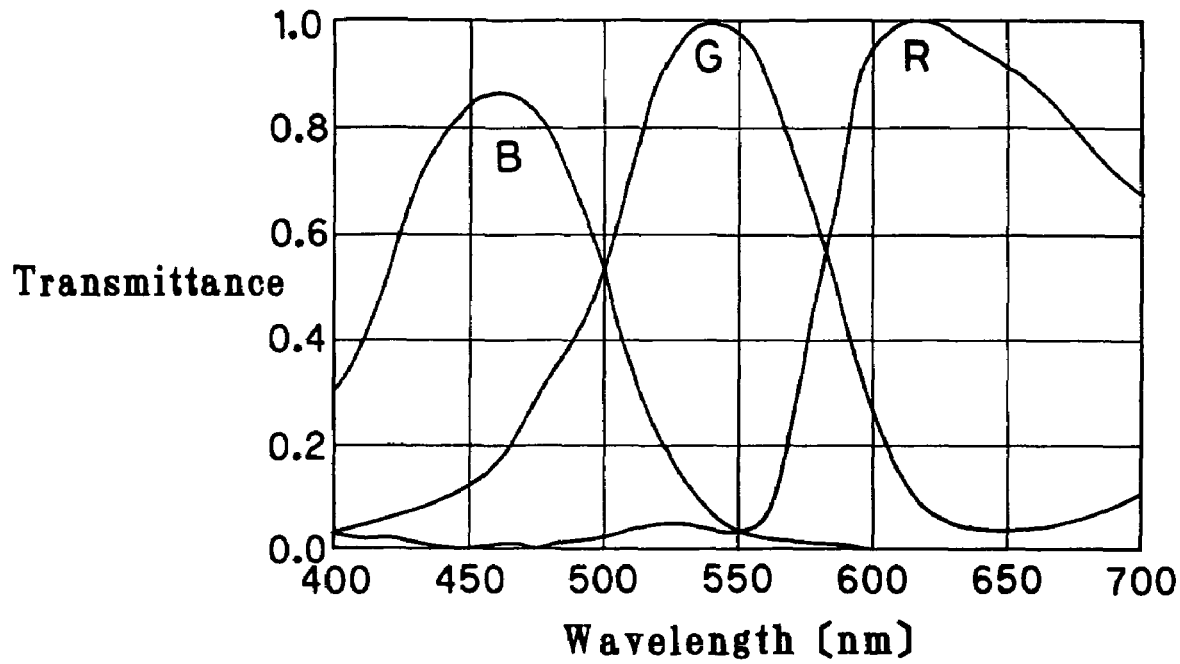
FIG. 53 is a schematic representation of the complementary color filter used with the electronic image pickup system according to the third aspect of the invention.

To obtain a color image, such a color filter as shown in FIG. 52 or FIG. 53 is used with an electronic image pickup device wherein an array of pixels (photoelectric conversion elements) having three or more different spectral characteristics are arranged at a pitch P.

FIG. 52 is a schematic illustrative of a color filter of the type called a primary color filter composed of red (R). The primary color filter is constructed of red (r), green (G) and blue (B) filter elements, the respective wavelength characteristics of which are shown in FIG. 53.

Figure 54:
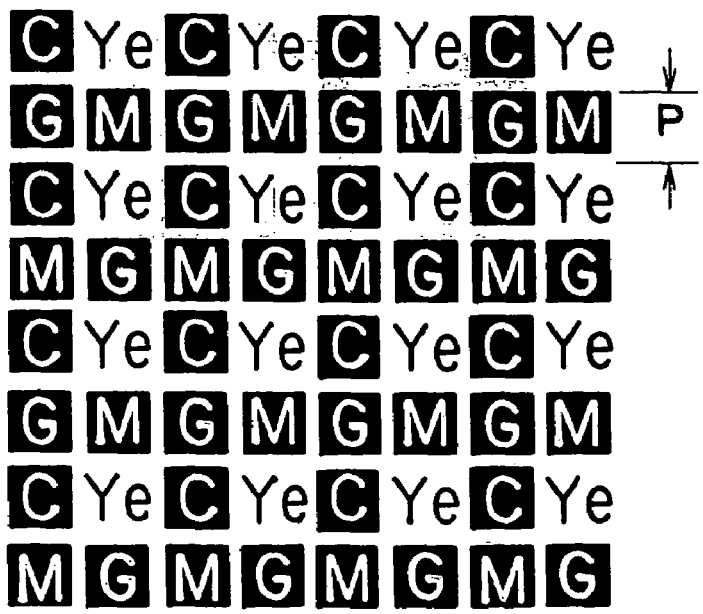
FIG. 54 is illustrative of the wavelength characteristics of the primary color filter of FIG. 52.
Figure 55:
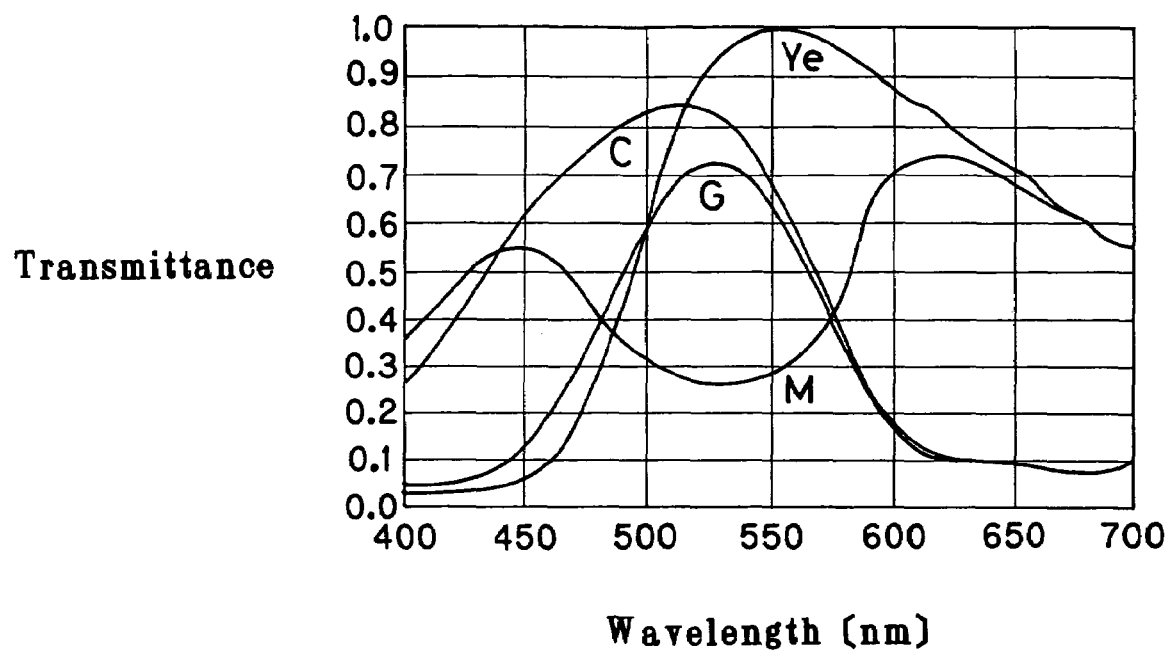
FIG. 55 is illustrative of the spectral characteristics of the complementary color filter of FIG. 53.

FIG. 54 is a schematic illustrative of a color filter of the type called a complementary color filter. The complementary color filter is constructed of cyan (C), magenta (M), yellow ($Y_e$) and green (G) filter elements, the respective characteristics of which are shown in FIG. 55.

The third aspect of the present invention is now explained more specifically with reference to examples using numerical data.

Figure 56A:
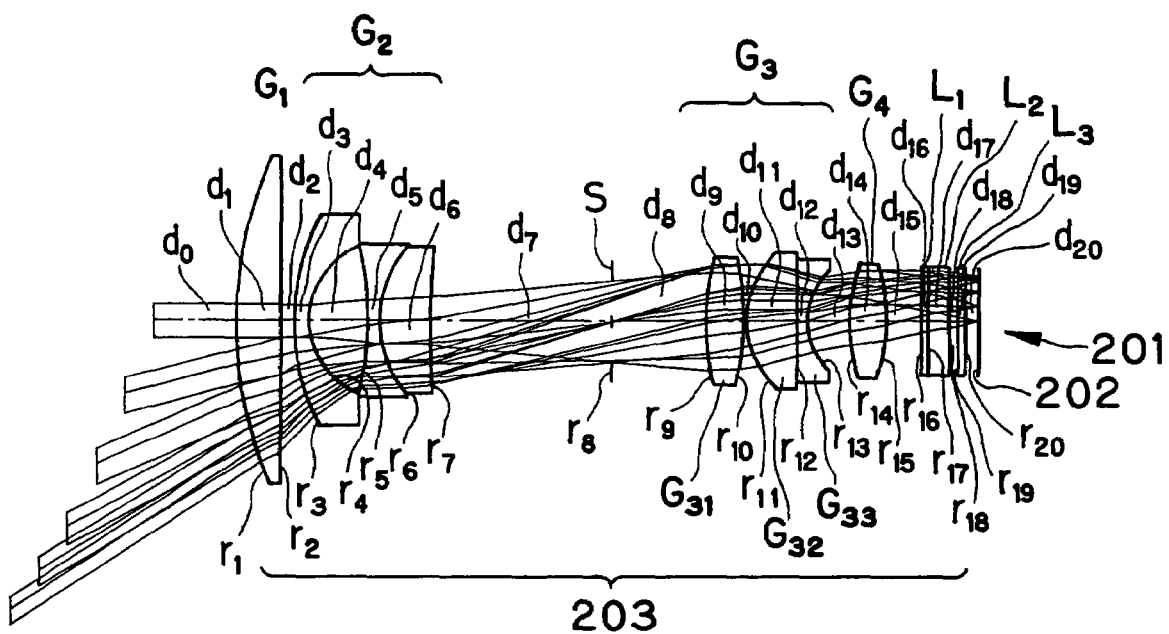
FIGS. 56(*a*), 56(*b*) and 56(*c*) are sectional views illustrative of the lens arrangement of the first example of the electronic image pickup system according to the third aspect of the invention, each including its optical axis, with (a), (b) and (c) illustrating the states of lenses at its wide-angle end, intermediate settings and telephoto end, respectively.
Figure 56B:
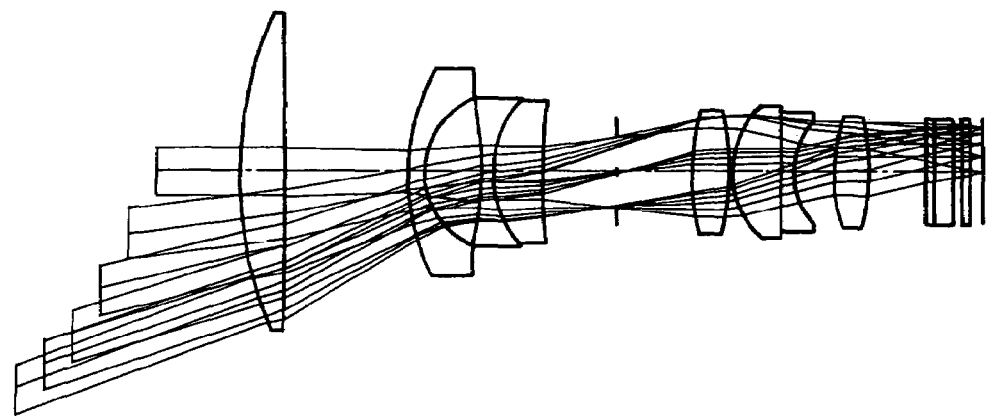
Figure 56C:
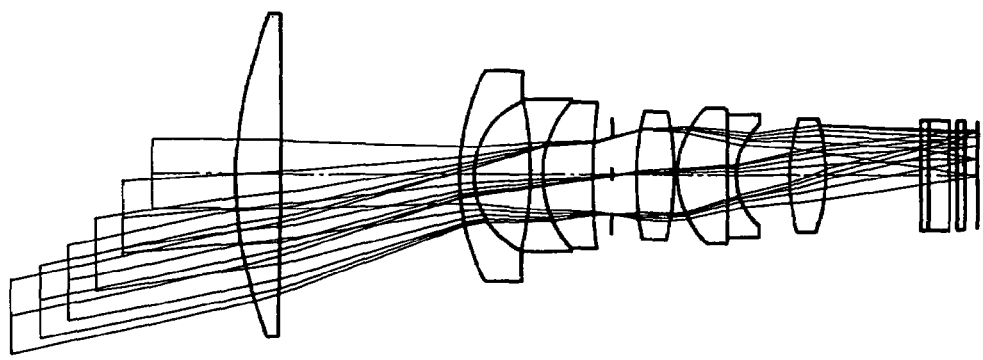
Figure 57A:
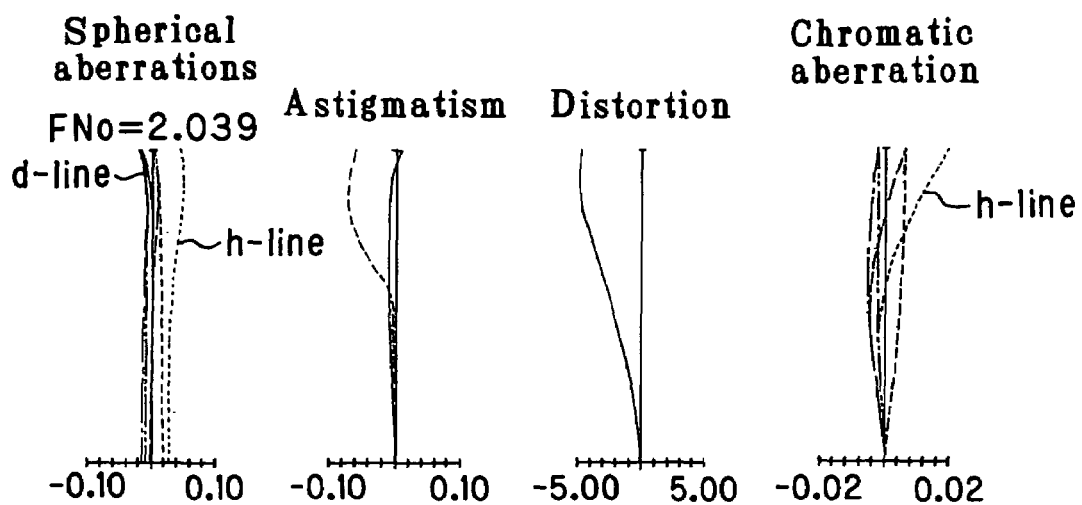
FIGS. 57(a), 57(b) and 57(c) are aberration diagrams for spherical aberrations, astigmatism, distortion and chromatic aberrations at the wide-angle end, intermediate settings and telephoto end of the first example, respectively.
Figure 57B:
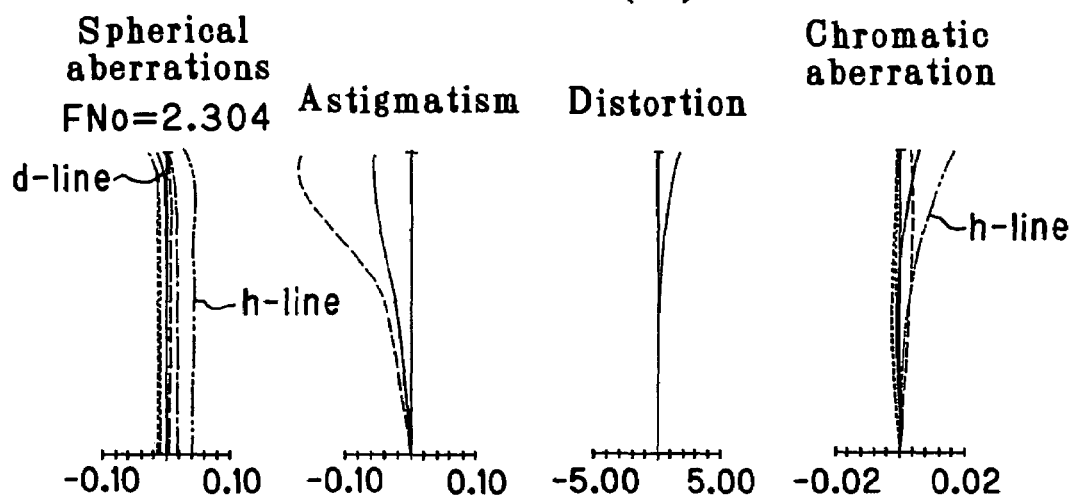
Figure 57C:
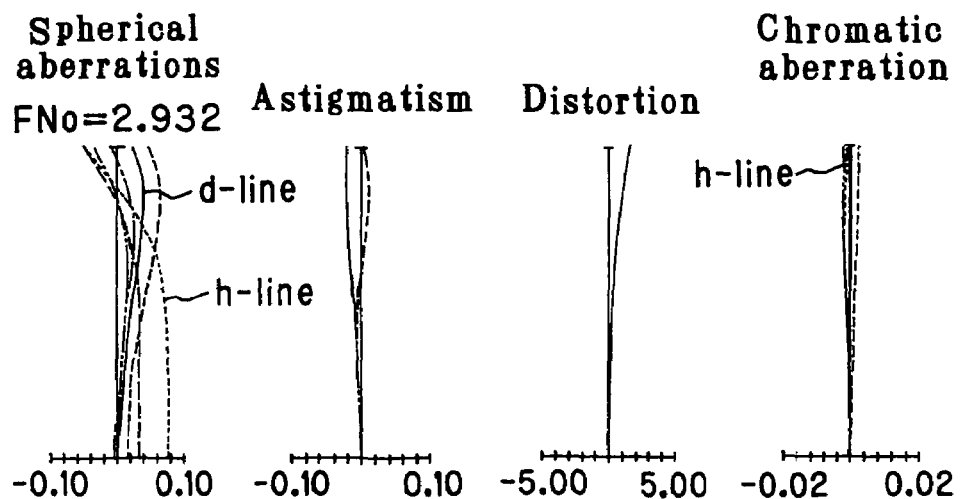

FIGS. 56(a), 56(b) and 56(c) are sectional views of the lens arrangement of the first example of the electronic image pickup system according to the third aspect of the present invention, as taken along its optical axis, with (a), (b) and (c) illustrating the states of the first example at its wide-angle end, its intermediate settings and its telephoto end, respectively. FIGS. 57(a), 57(b) and 57(c) are diagrams illustrative of spherical aberrations, astigmatism, distortion and chromatic aberrations for the first example, with (a), (b) and (c) being aberration diagrams at its wide-angle end, its intermediate settings and its telephoto end, respectively.

The electronic image pickup system according to the first example comprises an electronic image pickup device 201 having three or more different spectral characteristics so as to obtain a color image and an image pickup optical system 203 for forming a subject image on the image pickup surface 202 of the electronic image pickup device.

The image pickup optical system 203 consists of, in order from its object side, a first group G1 having positive refractive power, a second group G2 that has negative refracting power and is movable for zooming, a stop S, a third group G3 that has positive refracting power and is movable for zooming and a fourth group G4 that has positive refracting power and is movable for zooming and focusing. The third group G3 located on the image side with respect to the stop S consists of, in order from its object side, a positive lens G31, a positive lens G32 and a negative lens G33, with the positive lens G32 and negative lens G33 being cemented together.

The fourth group G4 consists of a double-convex lens having an aspherical surface on its object side.

For zooming from the wide-angle end to the telephoto end of the optical system, the second to fourth lens groups G2 to G4 move on the optical axis while the first lens group G1 remains fixed. For focusing, the fourth lens group G4 moves on the optical axis.

In FIGS. 56(a) to 56(c), L1, L2 and L3 stand for an optical low-pass filter, an infrared cutoff filter and a cover glass on the electronic image pickup device 201, respectively.

Set out below are numerical data about the optical elements that constitute the electronic image pickup system according to this example. In the following numerical data, ω is the half field angle, $r_1, r_2, \ldots$ are the radii of curvature of lens surfaces, $d_1, d_2, \ldots$ are the thicknesses or air separations of lenses, $\Delta\theta gF_1, \Delta\theta gF_2, \ldots$ are the anomalous dispersion of lens media, $n_{d1}, n_{d2}, \ldots$ are the d-line refractive indices of lenses, $\nu_1, \nu_2, \ldots$ are the Abbe numbers of lenses, and $nh_1, nh_2, \ldots$ are the h-line refractive indices of lenses.

Here let Z represent an optical axis direction and y represent the direction perpendicular to the optical axis. Then, aspherical configuration is given by $$Z=(y^2/r)/[1+\sqrt{\{1-(1+k)\sim(y/r)^2\}}]+AC_2y^2AC_4y^4+AC_6Y^6+AC_8y^8+AC_{10}y^{10}+AC_{12}y^{12}$$

where K is the conical coefficient, and $AC_2$, $AC_4$, $AC_6$, $AC_8$, $AC_{10}$ and $AC_{12}$ are the spherical coefficients, respectively.

These symbols are common to the numerical data about the following examples.

Numerical Data 1

Focal length f = 6.5-10.96-19.5 (mm) F-number 2.0-2.3-2.9

Half field angle ω = 33-21-12 (°)

| | | | | | |
|---|---|---|---|---|---|
| $r_1 = 39.6531$ | $d_1 = 4.1900$ | $\Delta\theta gF_1 = 0.0386$ | $n_{d1} = 1.45600$ | $\nu_1 = 90.33$ | $nh_1 = 1.46441$ |
| $r_2 = -753.3169$ | $d_2 = $ variable | | | | |
| $r_3 = 22.5664$ | $d_3 = 1.2500$ | $\Delta\theta gF_3 = 0.0174$ | $n_{d3} = 1.84666$ | $\nu_3 = 23.78$ | $nh_3 = 1.91428$ |
| $r_4 = 7.9565$ | $d_4 = 5.4000$ | | | | |
| $r_5 = -28.6765$ | $d_5 = 1.0000$ | $\Delta\theta gF_5 = -0.0005$ | $n_{d5} = 1.51823$ | $\nu_5 = 58.90$ | $nh_5 = 1.53315$ |
| $r_6 = 10.2176$ | $d_6 = 4.5200$ | $\Delta\theta gF_6 = 0.0174$ | $n_{d6} = 1.84666$ | $\nu_6 = 23.78$ | $nh_6 = 1.91428$ |
| $r_7 = 52.1549$ | $d_7 = $ variable | | | | |
| $r_8 = \infty$ (stop) | $d_8 = $ variable | | | | |
| $r_9 = 20.6787$ (aspheric) | $d_9 = 3.3600$ | $\Delta\theta gF_9 = 0.0023$ | $n_{d9} = 1.58913$ | $\nu_9 = 61.25$ | $nh_9 = 1.60531$ |
| $r_{10} = -25.0033$ | $d_{10} = 0.2000$ | | | | |
| $r_{11} = 9.0354$ | $d_{11} = 4.5000$ | $\Delta\theta gF_{11} = -0.0096$ | $n_{d11} = 1.74100$ | $\nu_{11} = 52.64$ | $nh_{11} = 1.76491$ |
| $r_{12} = 215.0441$ | $d_{12} = 0.9000$ | $\Delta\theta gF_{12} = 0.0075$ | $n_{d12} = 1.80518$ | $\nu_{12} = 25.46$ | $nh_{12} = 1.86430$ |
| $r_{13} = 6.3536$ | $d_{13} = $ variable | | | | |
| $r_{14} = 15.4926$ (aspheric) | $d_{14} = 3.2200$ | $\Delta\theta gF_{14} = 0.0280$ | $n_{d14} = 1.49700$ | $\nu_{14} = 81.54$ | $nh_{14} = 1.50720$ |
| $r_{15} = -23.1797$ | $d_{15} = $ variable | | | | |
| $r_{16} = \infty$ | $d_{16} = 0.8000$ | $\Delta\theta gF_{16} = -0.0024$ | $n_{d16} = 1.51633$ | $\nu_{16} = 64.14$ | $nh_{16} = 1.52977$ |
| $r_{17} = \infty$ | $d_{17} = 1.8000$ | $\Delta\theta gF_{17} = -0.0045$ | $n_{d17} = 1.54771$ | $\nu_{17} = 62.84$ | $rh_{17} = 1.56226$ |
| $r_{18} = \infty$ | $d_{18} = 0.8000$ | | | | |
| $r_{19} = \infty$ | $d_{19} = 0.7500$ | $\Delta\theta gF_{19} = -0.0024$ | $n_{d19} = 1.51633$ | $\nu_{19} = 64.14$ | $nh_{19} = 1.52977$ |
| $r_{20} = \infty$ | $d_{20} = $ variable | | | | |

Electronic image pickup device (image plane) ∞

Aspherical surface

Ninth surface $k = 0.$
$AC_2 = 0.0000 \times 10^0$
$AC_4 = -6.2681 \times 10^{-5}$
$AC_6 = 2.5583 \times 10^{-7}$
$AC_8 = -3.6774 \times 10^{-8}$
$AC_{10} = 1.8093 \times 10^{-9}$
$AC_{12} = -2.8329 \times 10^{-11}$ Fourteenth surface $k = 0$
$AC_2 = 0.0000 \times 10^0$
$AC_4 = -7.6728 \times 10^{-5}$
$AC_6 = -3.6402 \times 10^{-6}$
$AC_8 = 6.1375 \times 10^{-7}$
$AC_{10} = -3.5417 \times 10^{-8}$
$AC_{12} = 7.0508 \times 10^{-10}$ Zooming data

| | Wide-Angle | Intermediate | Telephoto |
|---|---|---|---|
| $d_0 =$ | ∞ | ∞ | ∞ |
| $d_2 =$ | 1.00000 | 10.95361 | 15.77923 |
| $d_7 =$ | 16.29024 | 6.33662 | 1.51100 |
| $d_8 =$ | 8.57300 | 6.78687 | 1.49700 |
| $d_{13} =$ | 3.56500 | 3.36931 | 5.12785 |

-continued

Numerical Data 1
Focal length f = 6.5-10.96-19.5 (mm) F-number 2.0-2.3-2.9
Half field angle ω = 33-21-12 (°)

| | | | |
|---|---|---|---|
| $d_{15}=$ | 3.16176 | 5.14358 | 8.67492 |
| $d_{20}=$ | 1.11946 | 1.11936 | 1.11885 |

Conditions (37), (38), (39), (40)

$\Delta\theta gF(r) = \Delta\theta gF(4) = \Delta\theta gF_{14} = 0.0280$
$(R1 + R2)/(R1 - R2) = (R14 + R24)/(R14 - R24) =$
$(r_{14} + r_{15})/(r_{14} - r_{15}) =$
$\{15.4926 + (-23.1797)\}/$
$\{15.4926 - (-23.1797)\} \approx -1.9877$ d-line Refractive index difference between positive lenses $n_{d11} - n_{d14} = 1.74100 - 1.49700 = 0.244$
$(Lh - Ld)/F_{min}$

| Wide-Angle End | Intermediate | Telephoto End |
|---|---|---|
| 0.060919 | 0.053495 | 0.059700 |

Amount Sh of transverse chromatic aberrations of magnification
for h-line with respect to d-line at image height
ratios of 0.9, 0.7 and 0.5 with respect to maximum image height

| Image Height Ratio | Wide-Angle End | Intermediate | Telephoto End |
|---|---|---|---|
| 0.9× | 0.010516 (mm) | 0.010123 (mm) | 0.000658 (mm) |
| 0.7× | 0.002456 (mm) | 0.004998 (mm) | 0.000839 (mm) |
| 0.5× | 0.001354 (mm) | 0.002167 (mm) | 0.000775 (mm) |
| Pixel pitch P | 0.033 (mm) | | |

Example 2

Figure 58:
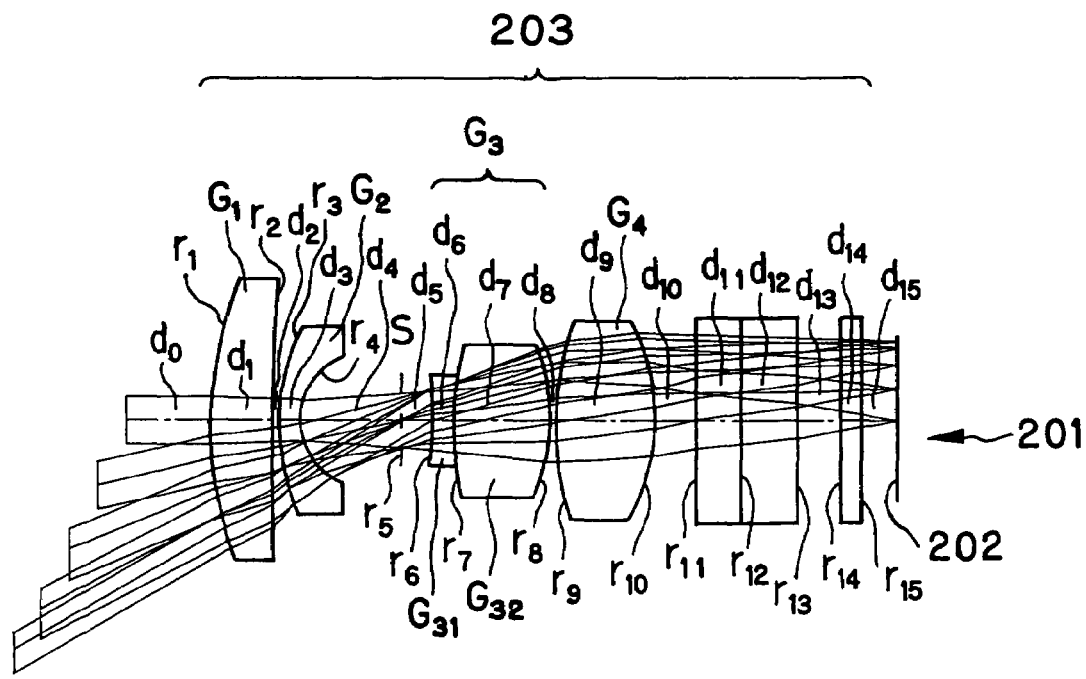
FIG. 58 is a sectional view of the lens arrangement of the second example of the electronic image pickup system according to the third aspect of the invention, as taken along its optical axis.
Figure 59:
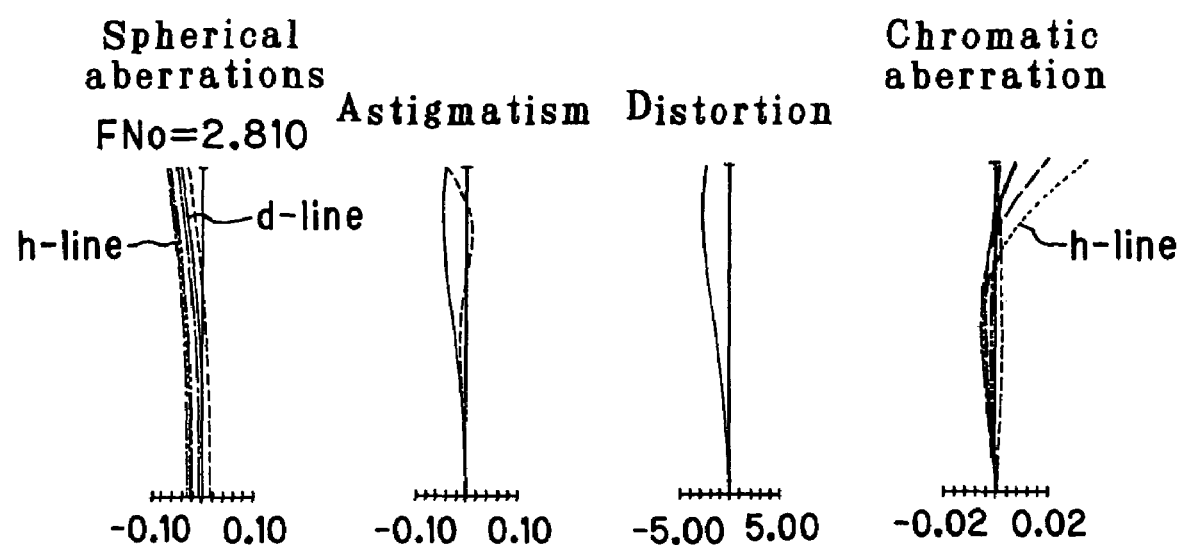
FIG. 59 is an aberration diagram for spherical aberrations, astigmatism, distortion and chromatic aberrations in the second example.

FIG. 58 is a schematic illustrative of the lens arrangement of the second example of the electronic image pickup system according to the third aspect of the present invention, as taken along the optical axis, and FIG. 59 is an aberration diagram illustrative of the spherical aberrations, astigmatism, distortion and chromatic aberrations of the second example.

The electronic image pickup system according to this example comprises an electronic image pickup device 201 including a plurality of pixels having three or more spectral characteristics so as to obtain a color image, and an image pickup optical system 203 for forming a subject image on the image pickup surface 202 of the electronic image pickup device.

The image pickup optical system 203 consists of, in order from its object side, a first group G1 having positive refracting power, a second group G2 having negative refracting power, a stop S, a third group G3 having positive refracting power and a fourth group G4 having positive refracting power.

The first group G1 consists of one positive lens, and the second group G2 consists of one negative meniscus lens. The third group G3 located on the image side of the system with respect to the stop S consists of, in order from its object side, a negative lens G31 and a positive lens G32 which are cemented together. The fourth group G4 consists of a double-convex lens having an aspherical surface on its object side.

Focusing is carried out by moving the first through fourth lens group G1 through G4 on the optical axis while the relative positions thereof are kept.

In FIG. 58, L1, L2 and L3 stand for an optical low-pass filter, an infrared cutoff filter and a cover glass for the electronic image pickup device 201, respectively.

Set out below are numerical data about the optical elements constituting the electronic image pickup system according to this example.

Numerical Data 2
Focal length f = 5 (mm) F-number 2.8
Half field angle ω = 31 (°)

| | | | | | |
|---|---|---|---|---|---|
| $r_1 = 14.3151$ | $d_1 = 2.3000$ | $\Delta\theta gF_1 = 0.0158$ | $n_{d1} = 1.80518$ | $v_1 = 25.42$ | $nh_1 = 1.86494$ |
| $r_2 = 89.2153$ | $d_2 = 0.2500$ | | | | |
| $r_3 = 9.1137$ | $d_3 = 0.7500$ | $\Delta\theta gF_3 = 0.0280$ | $n_{d3} = 1.49700$ | $v_3 = 81.54$ | $nh_3 = 1.50720$ |
| $r_4 = 2.6148$ | $d_4 = 3.7697$ | | | | |
| $r_5 = \infty$ (stop) | $d_5 = 1.1000$ | | | | |
| $r_6 = -7.9912$ | $d_6 = 0.8000$ | $\Delta\theta gF_6 = 0.0075$ | $n_{d6} = 1.80518$ | $v_6 = 25.46$ | $nh_6 = 1.86430$ |
| $r_7 = 15.0577$ | $d_7 = 3.5000$ | $\Delta\theta gF_7 = -0.0086$ | $n_{d7} = 1.72916$ | $v_7 = 54.68$ | $nh_7 = 1.75173$ |
| $r_8 = -5.5506$ | $d_8 = 0.1500$ | | | | |

-continued

Numerical Data 2
Focal length f = 5 (mm) F-number 2.8
Half field angle ω = 31 (°)

| | | | | | |
|---|---|---|---|---|---|
| $r_9$ = 9.6764 (aspheric) | $d_9$ = 3.6000 | $\Delta\theta gF_9$ = 0.0280 | $n_{d9}$ = 1.49700 | $v_9$ = 81.54 | $nh_9$ = 1.50720 |
| $r_{10}$ = −8.2960 | $d_{10}$ = 1.5000 | | | | |
| $r_{11}$ = ∞ | $d_{11}$ = 1.6000 | $\Delta\theta gF_{11}$ = −0.0024 | $n_{d11}$ = 1.51633 | $v_{11}$ = 64.15 | $nh_{11}$ = 1.52977 |
| $r_{12}$ = ∞ | $d_{12}$ = 2.0200 | $\Delta\theta gF_{12}$ = −0.0024 | $n_{d12}$ = 1.51633 | $v_{12}$ = 64.15 | $nh_{12}$ = 1.52977 |
| $r_{13}$ = ∞ | $d_{13}$ = 1.6000 | | | | |
| $r_{14}$ = ∞ | $d_{14}$ = 0.7500 | $\Delta\theta gF_{14}$ = 0.0022 | $n_{d14}$ = 1.48749 | $v_{14}$ = 70.21 | $nh_{14}$ = 1.49898 |
| $r_{15}$ = ∞ | $d_{15}$ = 1.1866 | | | | |

Electronic image pickup device (image plane) ∞
Aspherical surface

Ninth surface k = 0
$AC_2$ = 0.0000 × 10⁰  $AC_4$ = −7.1869 × 10⁻⁴  $AC_6$ = −1.4974 × 10⁻⁵
$AC_8$ = 1.8101 × 10⁻⁶  $AC_{10}$ = −7.6598 × 10⁻⁸

Conditions (37), (38)

$\Delta\theta gF(r) = \Delta\theta gF_9 = 0.0280$
$(R1 + R2)/(R1 − R2) = (r_9 + r_{10})/(r_9 − r_{10}) =$
$\{9.6764 + (−8.2960)\}/$
$\{9.6764 − (−8.2960)\} \approx −0.07681$ d-line Refractive index difference between positive lenses $n_{d7} − n_{d9} = 1.72916 − 1.49700 = 0.232$
$(Lh − Ld)/F_{min}$
0.024384 (mm)

| Wide-Angle End | Intermediate | Telephoto End |
|---|---|---|
| 0.060919 | 0.053495 | 0.059700 |

Amount Sh of transverse chromatic aberrations of magnification
for h-line with respect to d-line at image height
ratios of 0.9, 0.7 and 0.5 with respect to maximum image height

| Image height ratio | Sh |
|---|---|
| 0.9× | 0.017038 (mm) |
| 0.7× | 0.000308 (mm) |
| 0.5× | 0.004529 (mm) |
| Pixel pitch P | 0.033 (mm) |

Embodiments and examples of the image pickup system according to the fourth aspect of the present invention are now explained with reference to the accompanying drawings.

Figure 60:
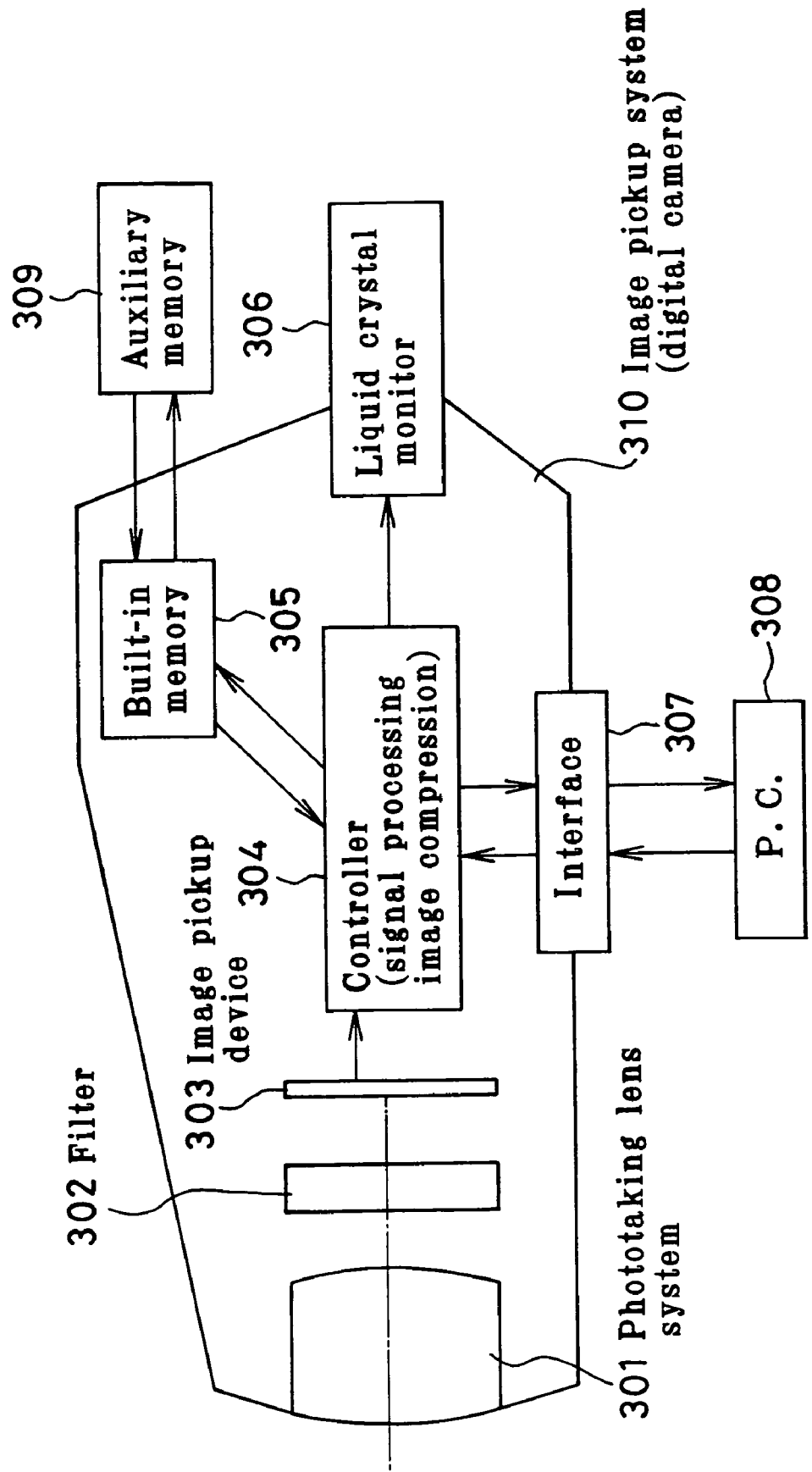
FIG. 60 is a schematic illustrative of one embodiment of the digital camera according to the fourth aspect of the invention.
Figure 61:
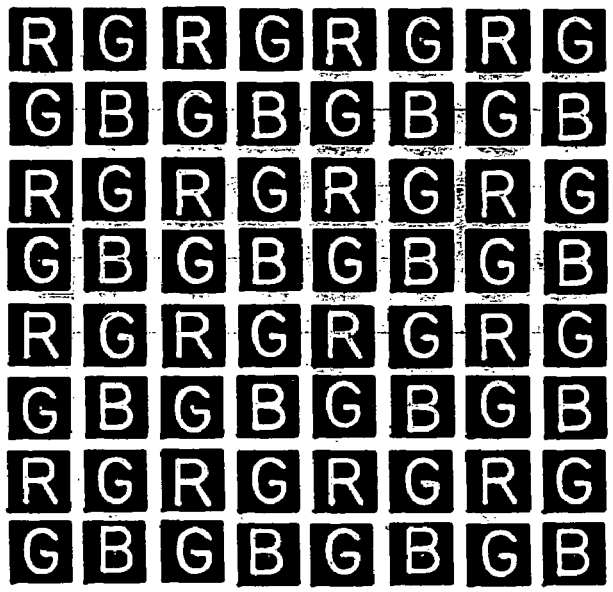
FIG. 61 is a schematic illustrative of an example of the primary filter arrangement of the primary color filter.

FIG. 60 is a schematic illustrative of a so-called digital camera 310. A light beam emanating from an object point is subjected to image formation by a phototaking lens system 301 made up of an optical element to form an image on an image pickup device 303 such as a CCD. To prevent a so-called moire phenomenon resulting from the fact that the image pickup device 303 is an array of regularly located photoelectric converters, a filter 302 having a low-pass effect is located on the object side of the system with respect to the image pickup surface 303. In addition, a filter having an IR cutoff effect for cutting off infrared light may be located. The light beam incident on the image pickup element 303 is converted by the photoelectric converters to electric signals, which are then entered into a controller 304. The electric signals are subjected at the controller 4 to signal processing such as gamma correction or image compression processing, and sent via a built-in memory 305 and an interface 307 to a personal computer 308 or the like. The resulting signals may be transmitted from the controller 304 to a liquid crystal monitor 306 which makes it possible for the operator to check up the image to be phototaken or the phototaken image. Alternatively, image data may be transmitted from the built-in memory 5 to an auxiliary memory 309 such as a so-called smart medium (trade mark).

In this embodiment, d represents the diagonal length of an effective image pickup area of the image pickup device 303 and p represents the center separation between horizontal pixels. Then, the image pickup device should satisfy the following condition (41), and has a complementary color filter comprising at least four color filter elements.

$$1.0 \times 10^{-4} < p/d < 6.0 \times 10^{-4} \quad (41)$$

The combined transmittance of the image pickup lens system 301 and filter 302 should satisfy the following conditions (42) and (43):

$$8 \times T_{700} < T_{600} \quad (42)$$

$$T_{400} < T_{600} \quad (43)$$

Here $T_{400}$ is the 400-nm transmittance, $T_{600}$ is the 600-nm transmittance and $T_{700}$ is the 700-nm transmittance.

Alternatively, the output signals from the image pickup device 303 have the following characteristics. That is, the system is designed in such a way that the spectral strength curve for output signals from at least one color filter (which curve is obtained by plotting the strengths of output signals of each wavelength when light is incident on the phototaking optical system with uniform strength for each wavelength) satisfies the following condition (44):

$$0.45<(S_{600}-S_{650})/S_p<0.85 \tag{44}$$

where $S_p$ is the spectral strength peak, $S_{600}$ is the strength of 600 nm and $S_{650}$ is the strength of 650 nm.

Figure 62:
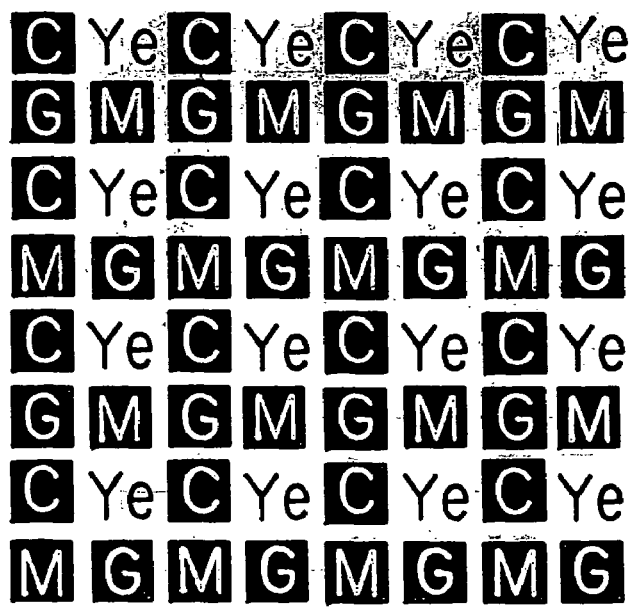
FIG. 62 is a schematic illustrative of an example of the complementary color filter used in accordance with the fourth aspect of the invention.
Figure 63:
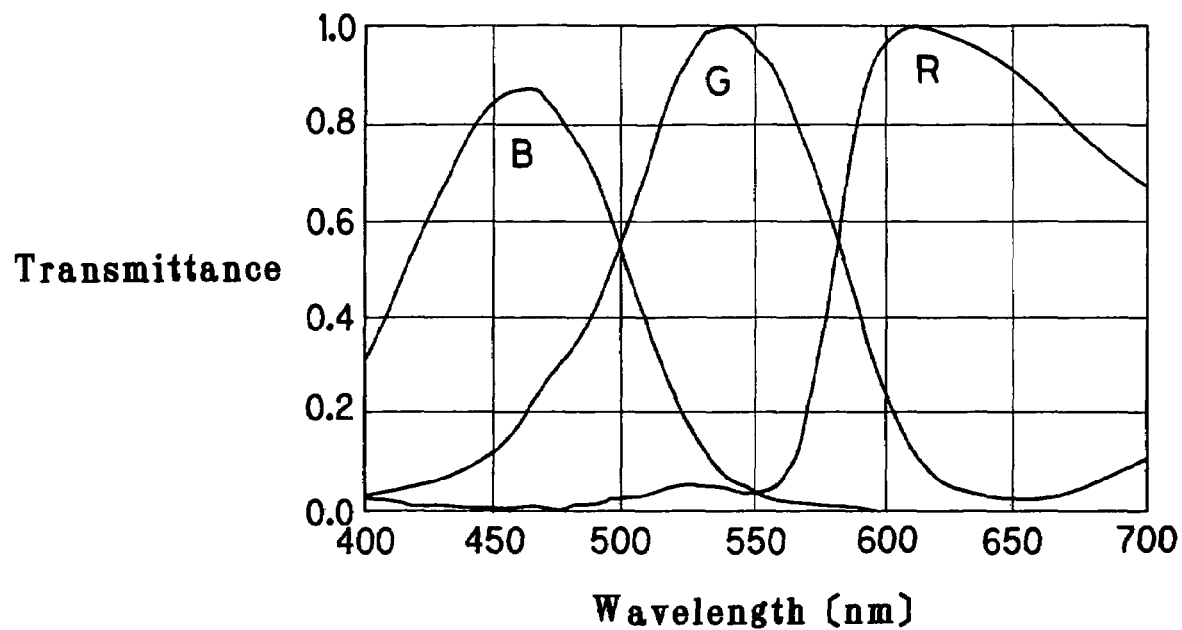
FIG. 63 is a diagram illustrative of the wavelength characteristics of FIG. 61.
Figure 64:
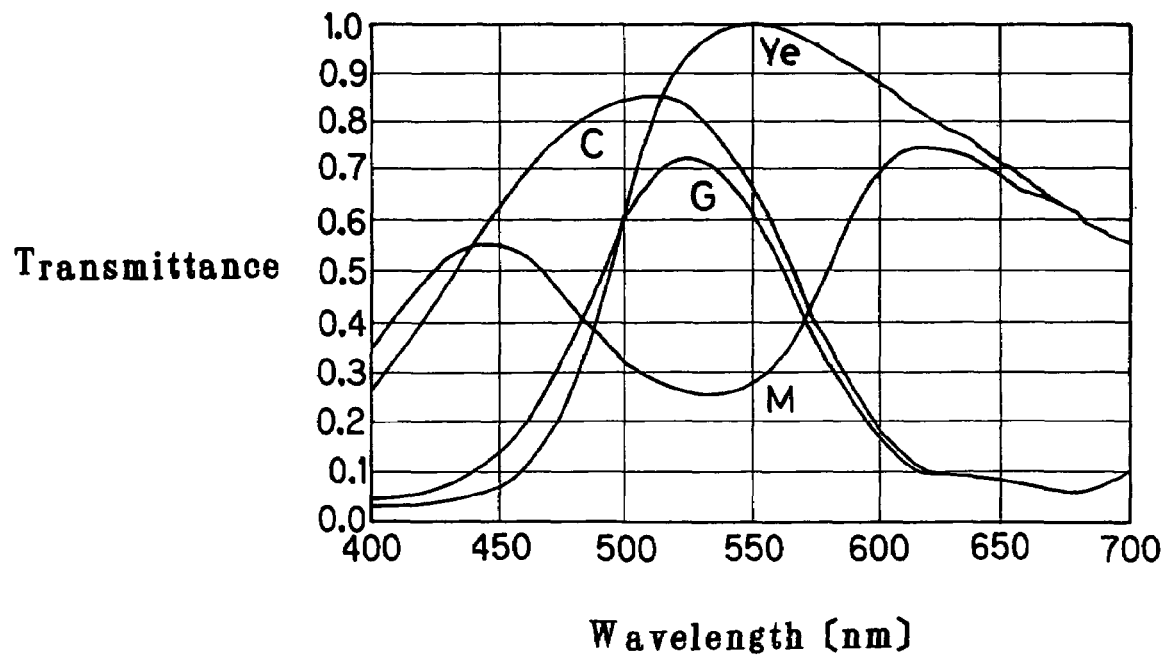
FIG. 64 is a diagram illustrative of the wavelength characteristics of FIG. 62.

The image pickup device 303 is provided with a color filter at such settings as shown in FIG. 62. This color filter is a filter of the type called a complementary color mosaic filter comprising cyan (C), magenta (M), yellow ($Y_e$) and green (G) filter elements, each used in much the same number. One example of the wavelength characteristics of each filter element is shown in FIG. 64. When the complementary color filter is used as the filter, the filtered light is converted by the controller 304 to R, G and B according to the following processing:

for luminance signals $$Y=|G+M+Y_e+C|*¼$$

for color signals $$R-Y=|(M+Y_e)-(G+C)|$$

$$B-Y=|(M+C)-(G+Y_e)|$$

With the complementary color filter, it is possible to increase the quantity of light with respect to the photoelectric conversion surfaces.

Figure 65:
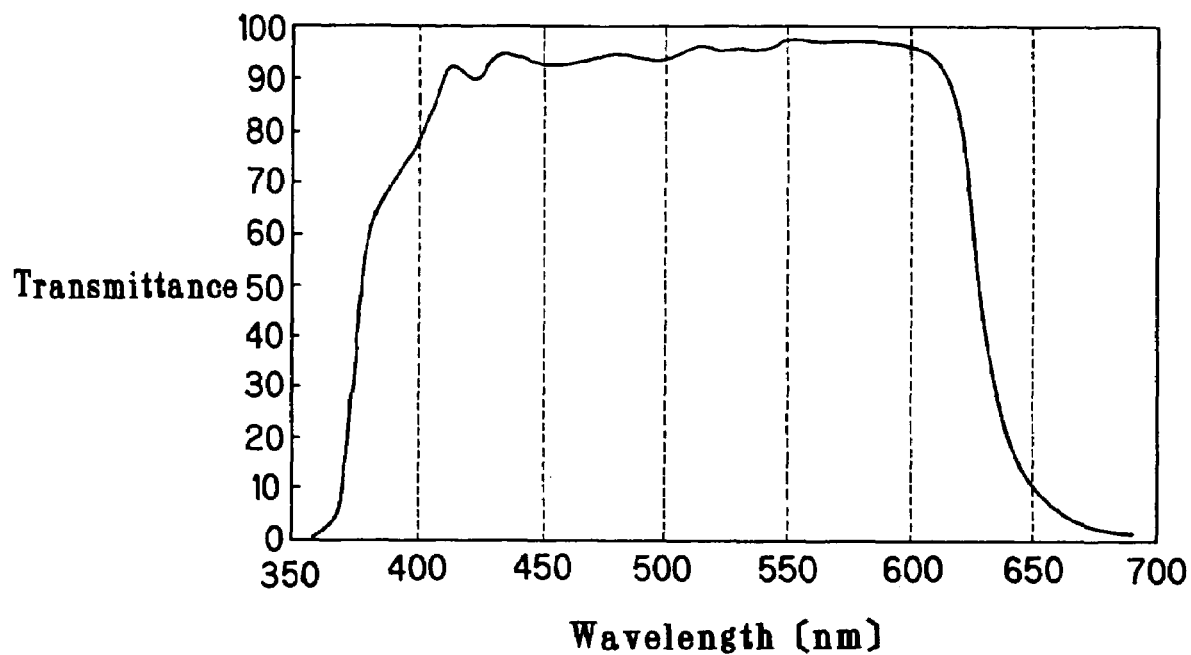
FIG. 65 is a diagram illustrative of the spectral characteristics of an infrared cutoff filter used with the first embodiment of the fourth aspect of the invention.
Figure 66:
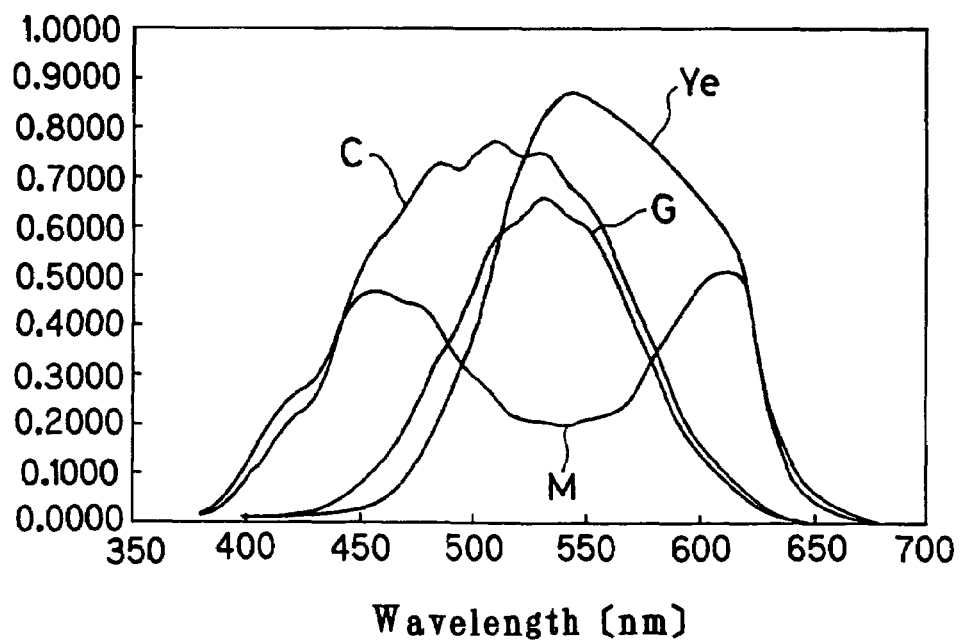
FIG. 66 is a diagram illustrative of the whole spectral characteristics of the phototaking optical system comprising a complementary color filter according to one embodiment of the fourth aspect of the invention.
Figure 67:
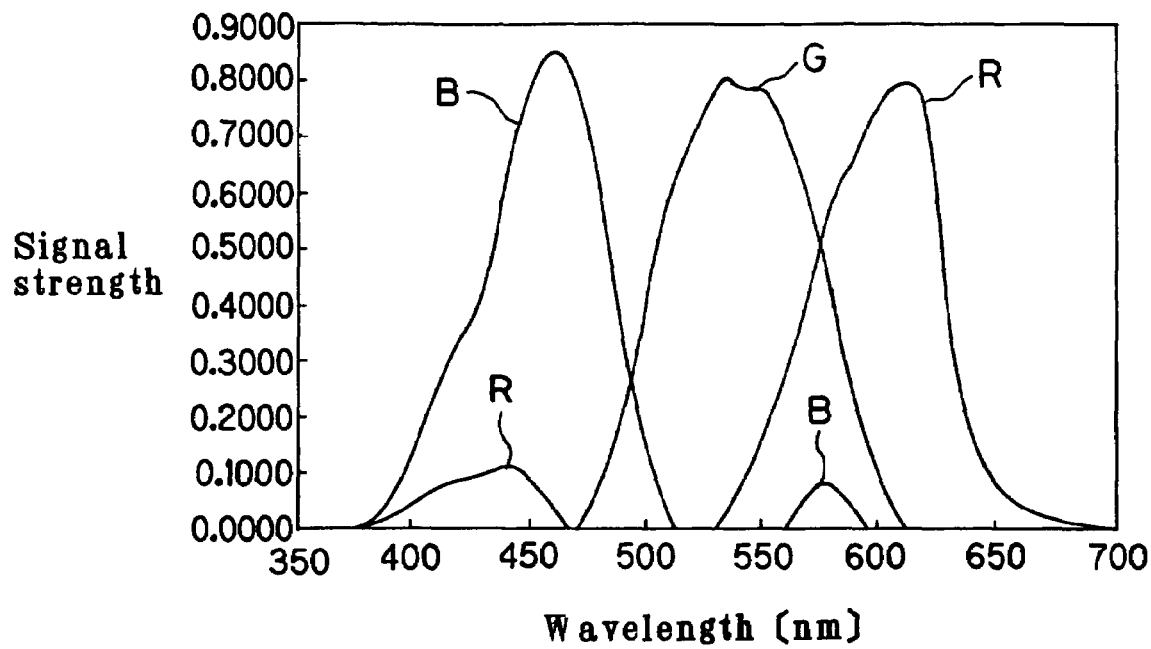
FIG. 67 is illustrative of the R, G and B signal strength profile calculated from the spectral characteristics of FIG. 66.
Figure 68:
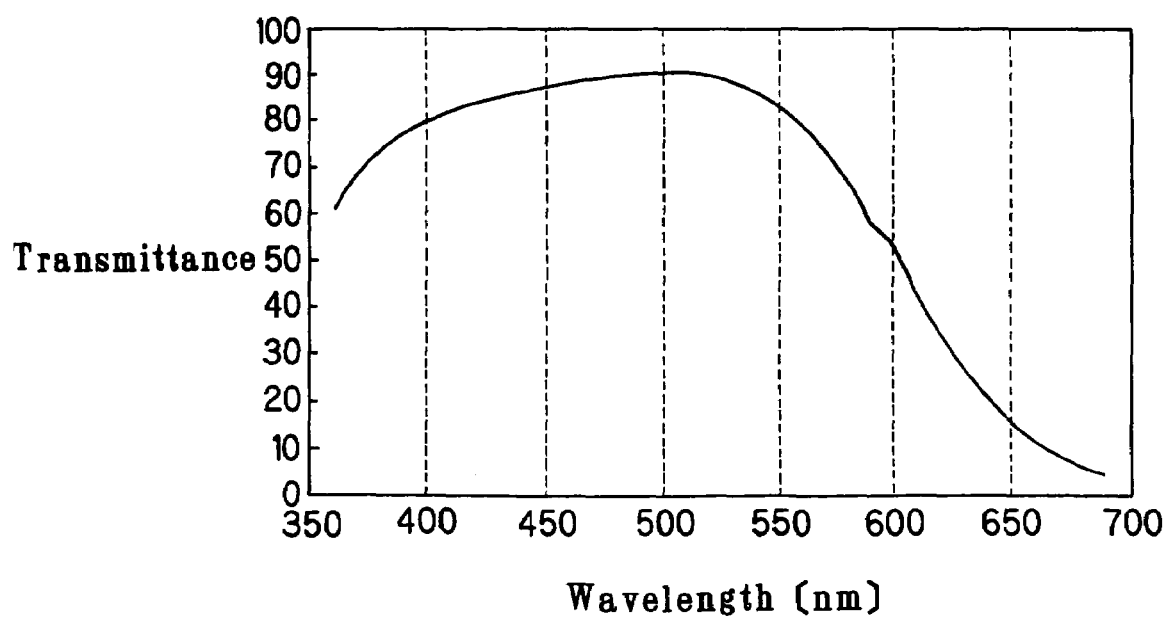
FIG. 68 is illustrative of the spectral characteristics of a general infrared cutoff filter.
Figure 69:
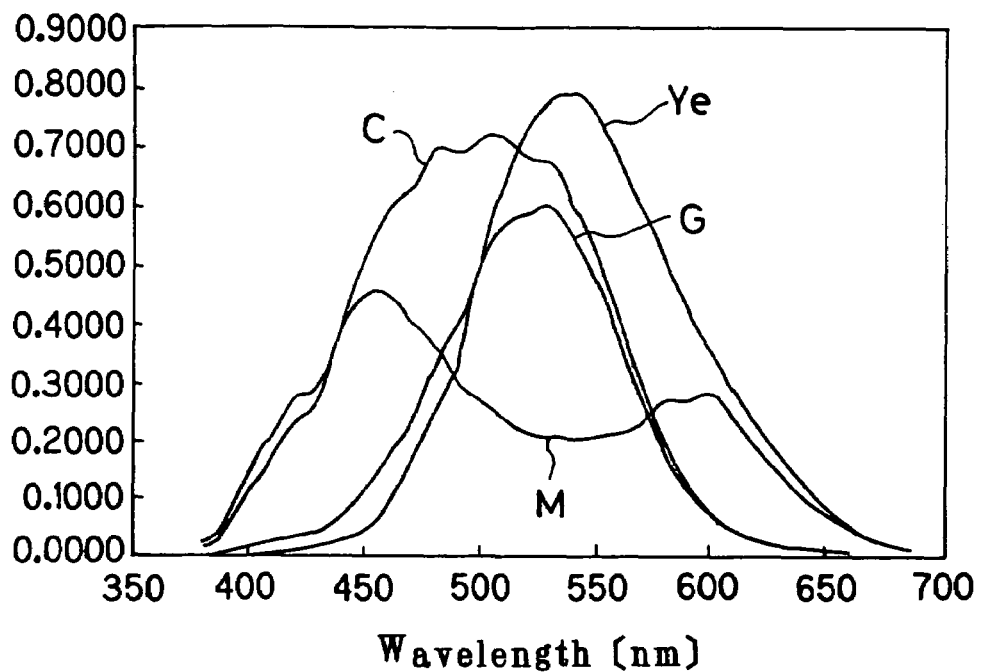
FIG. 69 is illustrative of the whole spectral characteristics of a phototaking optical system set up with the use of the infrared cutoff filter of FIG. 68.
Figure 71:
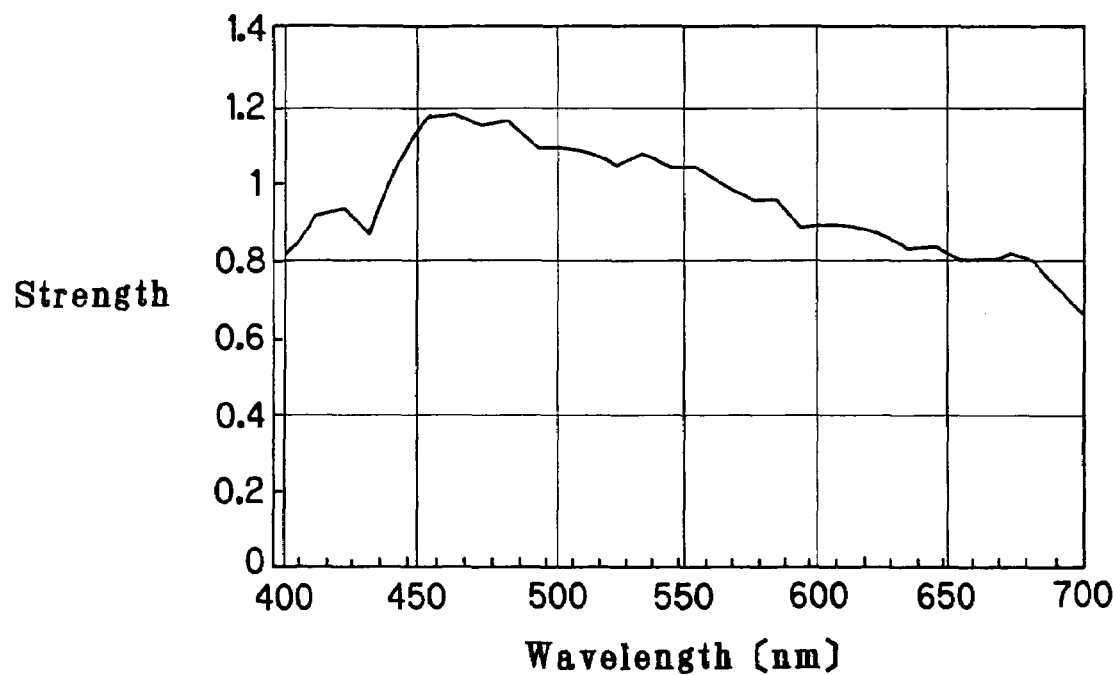
FIG. 71 is illustrative of the spectral characteristics of a standard light source $D_{65}$.
Figure 72:
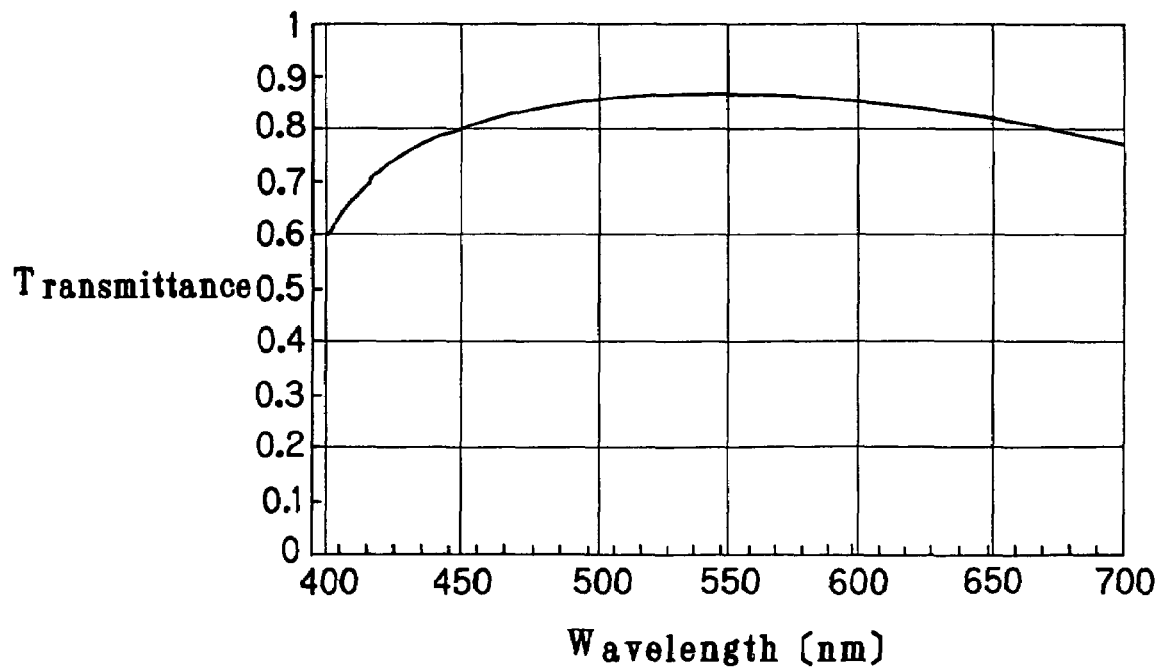
FIG. 72 is illustrative of the spectral transmittance of a phototaking lens system in one embodiment of the fourth aspect of the invention.

Alternatively, the filter 302 may be coated by evaporation with a thin film having such spectral characteristics as shown in FIG. 65 and having an infrared cutoff function. FIG. 66 is illustrative of the combined characteristics of a standard light source $D_{65}$ having such spectral characteristics as shown in FIG. 71, the phototaking lens system 301 having such a transmittance as shown in FIG. 72, the infrared cutoff filter shown in FIG. 65 and the complementary color filter shown in FIG. 62. Signal strength profiles for the development of R, G and B calculated from FIG. 66 are shown in FIG. 67. For reference, one example of the characteristics of a commonly used absorption type infrared cutoff filter is shown in FIG. 68. The combined characteristics of the characteristics of the standard light source $D_{65}$ and phototaking lens system 301 and the characteristics of the infrared filter and complementary color filter when used in combination with such an infrared cutoff filter are shown in FIG. 69. Signal strength profiles for the development of R, G and B calculated from FIG. 69 are shown in FIG. 70.

Figure 70:
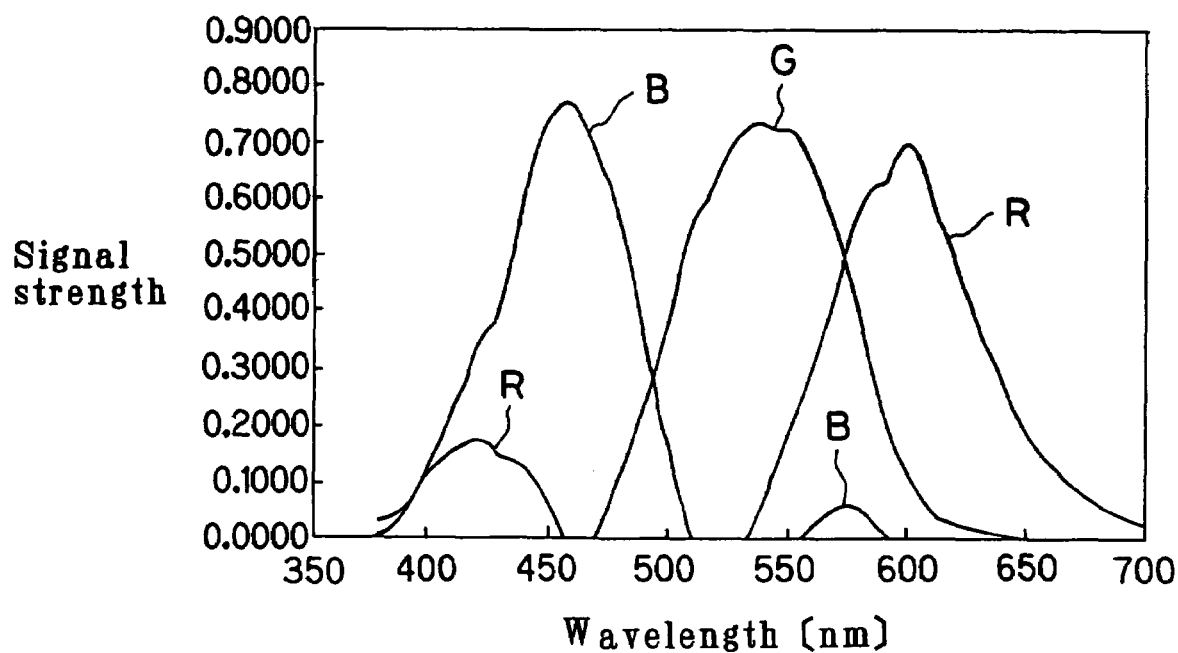
FIG. 70 is illustrative of the R, G and B signal strength profile calculated from the spectral characteristics of FIG. 69.

From a comparison of FIG. 67 with FIG. 70, it is found that the strength of R signals in the vicinity of 430 nm in particular becomes weak while the strength thereof in the vicinity of 620 nm becomes strong. It is also found that the strength of B signals in the vicinity of 450 nm becomes strong. In other words, red can be seen just as red and blue just as blue. Flares occurring due to chromatic aberrations on the shorter wavelength side have inherently low energy. In addition, the flares have only a limited influence on the development of striking red, and so have a primary action on the development of relatively unobtrusive blue. In other words, the flare information on the shorter wavelength side has no particularly great influence on a substantial screen carrying a large amount of information.

Figure 73:
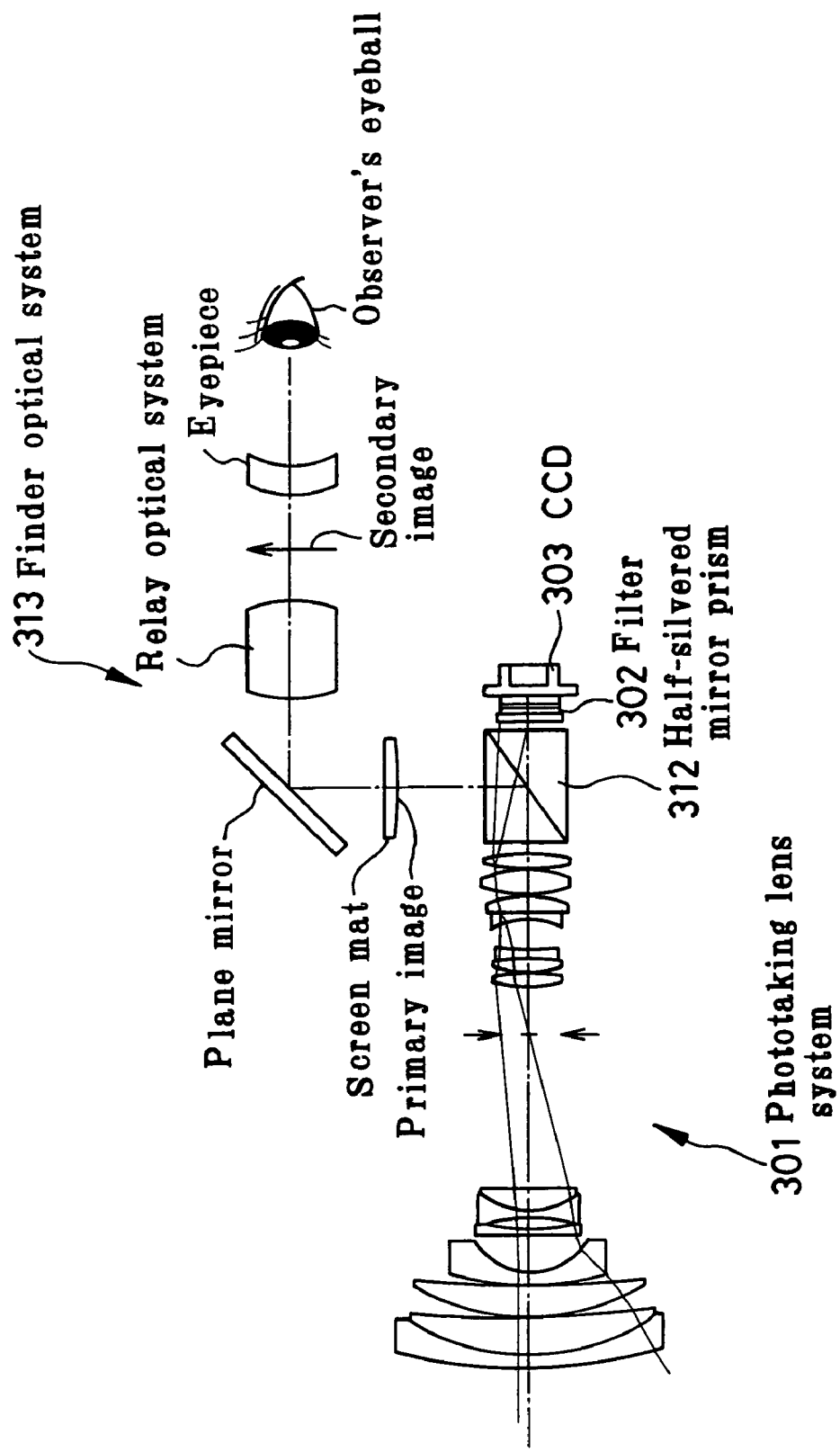
FIG. 73 is a schematic illustrative of the digital camera according to another embodiment of the fourth aspect of the invention.

FIG. 73 shows a modification to the FIG. 60 embodiment, using a so-called TTL finder type wherein a light beam is split by a half-silvered mirror prism 312 located on the object side of the image pickup element 303 for guidance to a finder optical system 313. This type is characterized in that a subject can be observed with reduced power consumption. The present invention may also be applied to such a type.

It is noted that the infrared cutoff function according to the present invention may be added to the characteristics of the complementary filter itself.

Figure 74:
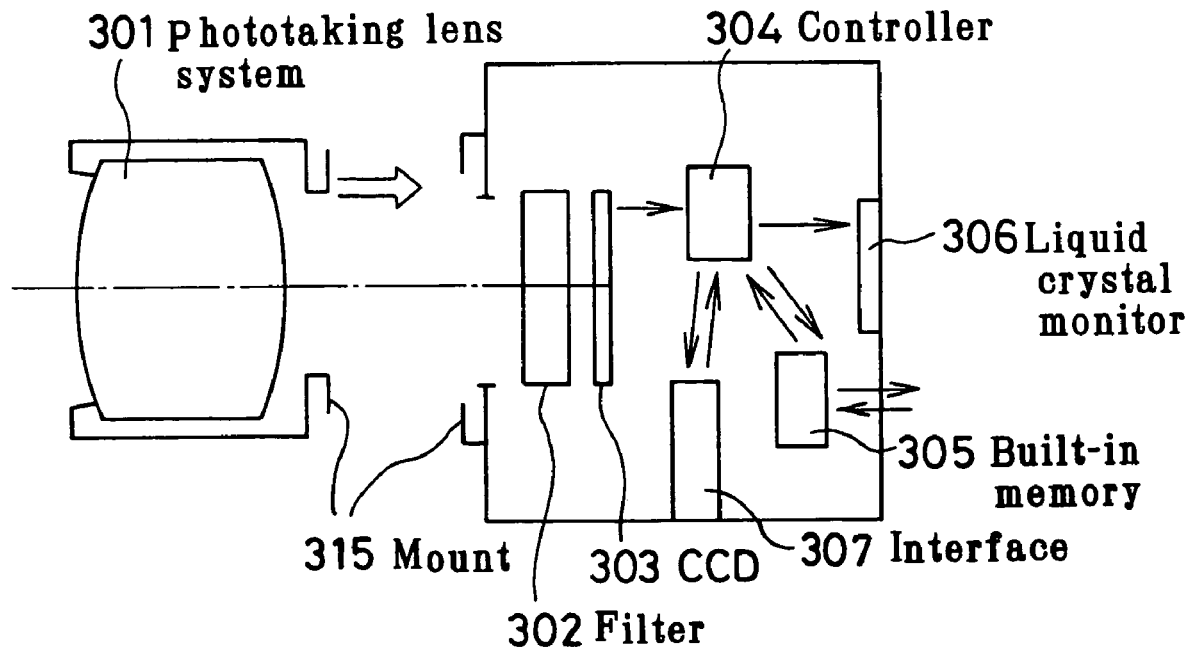
FIG. 74 is a schematic illustrative of the digital camera according to yet another embodiment of the fourth aspect of the invention.

In another embodiment, a phototaking lens system 301 may be detachable from a body including an image pickup device 303 as shown in FIG. 74. A mount 15 used to this end, for instance, may be of either the screw coupling type or the bayonet coupling type. In this case, the infrared cutoff function according to the present invention may be imparted to the phototaking lens system 301 or to the body including image pickup device 303.

It is understood that the image pickup system according to the present invention may be used to not only digital cameras but also to cellular phones equipped with an image pickup device, a notebook type of PCs, etc.

Set out below are Examples A' through G' of the optical system suitable for use with the aforesaid embodiments of the present invention. Some examples use filters and some do not; the filters may be optionally used.

Figure 75:
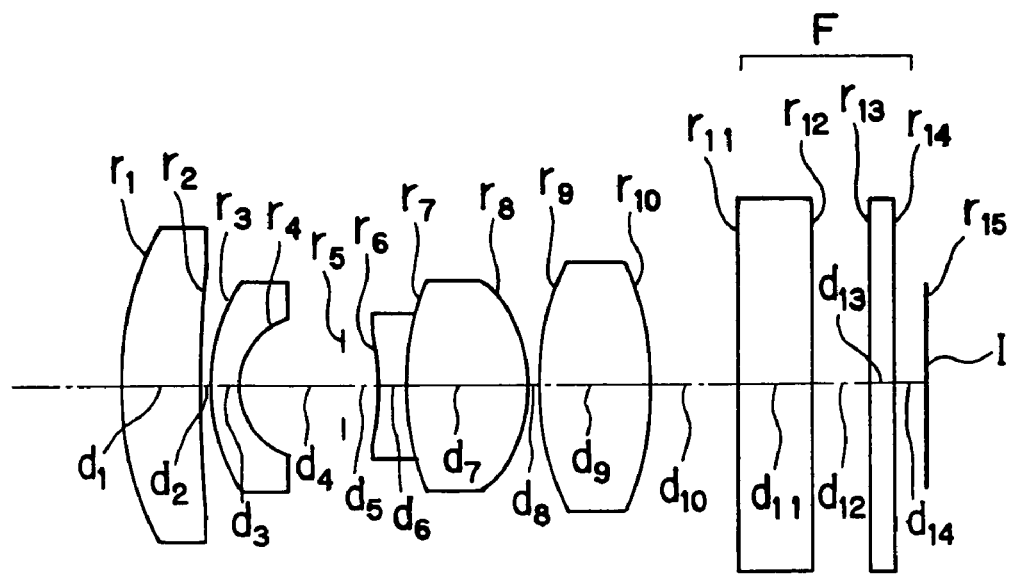
FIG. 75 is a sectional view of Example A' including its optical axis.
Figure 76:
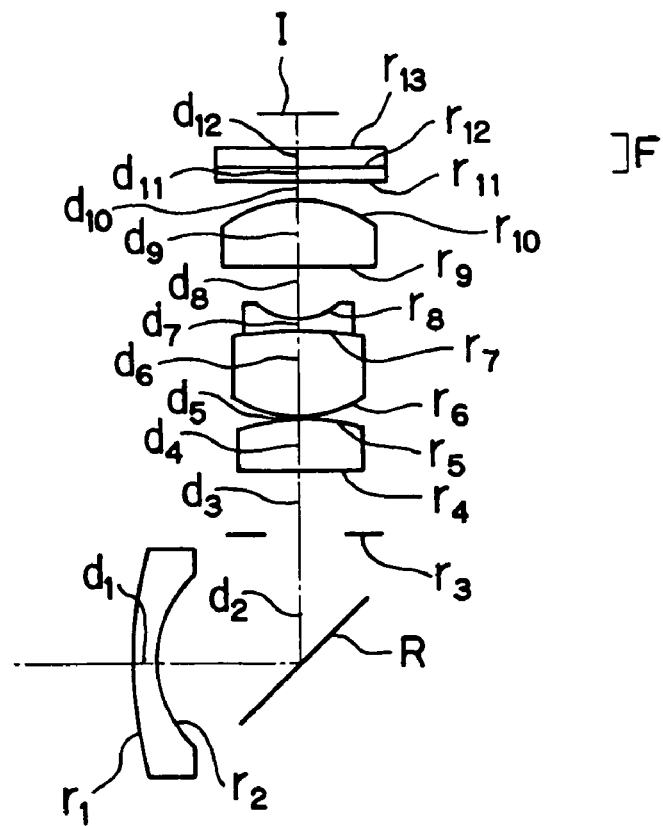
FIG. 76 is a sectional view of Example B' including its optical axis.
Figure 77:
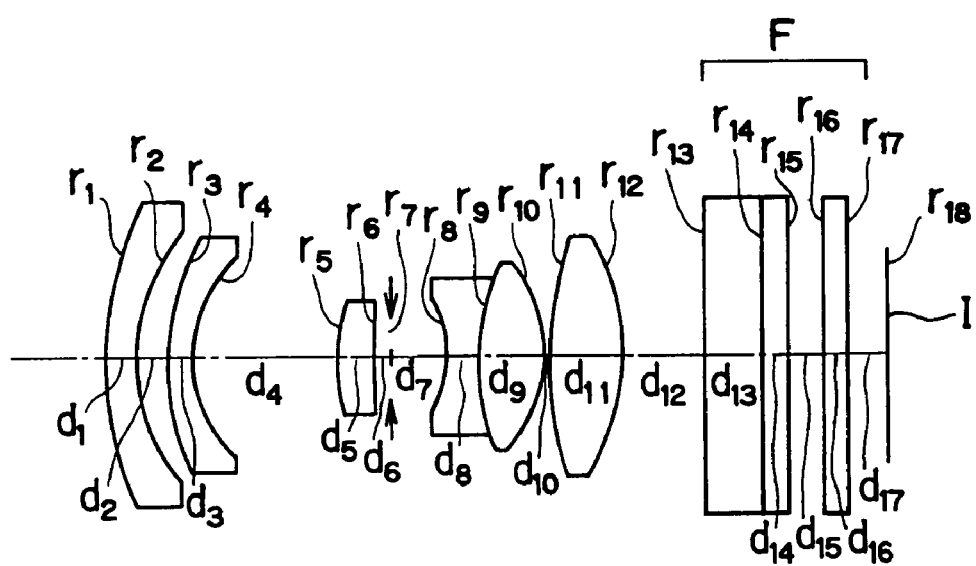
FIG. 77 is a sectional view of Example C' including its optical axis.

FIGS. 75 to 77 are sectional views of Examples A' to C', each including an optical axis. Likewise, FIGS. 78 to 81 are sectional views of Examples D' to G', each including an optical axis at a wide-angle end. Examples A' to C' are each directed to a lens system having a fixed focal length while Examples D' to G' are each directed to a zoom lens system having a variable focal length. In each figure, F denotes filters and prisms, and I stands for an image plane. Example B' is suitable for slimming down a camera because a reflecting member R is located within an image pickup optical system. Alternatively, the reflecting characteristics of this reflecting member R may be used instead of the infrared cutoff function according to the present invention. Example D' is suitable for use with the so-called TTL finder type.

The lens arrangement of each example is now explained.

The lens system of Example A' consists of four groups or five lenses, i.e., a positive meniscus lens convex on its object side, a negative meniscus lens convex on its object side, a stop, a doublet composed of a double-concave lens and a double-convex lens and a double convex lens, as shown in FIG. 75. One aspherical surface is used at the object-side surface of the double-convex lens located nearest to the image plane side of the system.

The lens system of Example B' consists of four groups or five lenses, i.e., a negative meniscus lens convex on its object side, a reflecting surface R for turning back an optical path, a stop, a double-convex lens, a doublet composed of a double-convex lens and a double-concave lens and a positive lens having a strong convex surface on its image side, as shown in FIG. 76. Two aspherical surfaces are used, one at the surface of the double-convex lens located in the rear of the stop and another at the surface of the positive lens located nearest to the image plane side of the system.

The system of Example C' consists of five groups or six lenses, i.e., two negative meniscus lenses, each convex on its object side, a convex lens, a stop, a doublet composed of a double-concave lens and a double-convex lens, and a double-convex lens, as shown in FIG. 77. Two aspherical surfaces are used, one at the surface of the second negative meniscus lens and another at the surface of the double-convex lens located nearest to the image plane side of the system.

Figure 78:
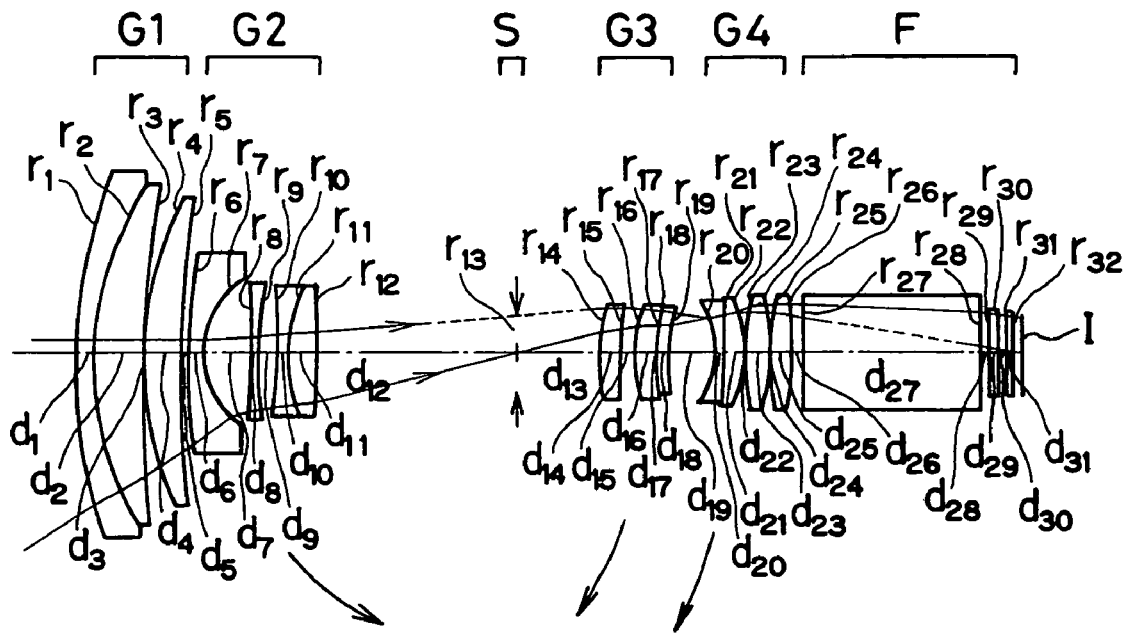
FIG. 78 is a sectional view of Example D' including its optical axis.

The system of Example D' consists of four groups G1 to G4. As shown in FIG. 78, the first group G1 consists of three lenses or a doublet composed of a negative meniscus lens convex on its object side and a positive meniscus lens convex on its object side and a positive meniscus lens convex on its object side, the second group G2 consists of four lenses or a negative meniscus lens convex on its object side, a double-concave lens and a doublet composed of a double-concave lens and a positive meniscus lens convex on its object side, in the rear of which a stop S is located, the third group G3 consists of three lenses or a positive meniscus lens convex on its object side, a double-convex lens and a negative meniscus lens convex on its object side, and the fourth group G4 consists of four lenses or a doublet composed of a negative meniscus lens convex on its image plane side and a positive meniscus lens convex on its image plane side and two double-convex lenses. Two aspherical surfaces are used, one at the object-side surface of the double-convex lens in the third group G3 and another at the surface of the lens in the fourth group G4, which is located nearest to the image plane side of the system. For zooming from the wide-angle end to the telephoto end of the system, the second group G2 moves from the object side to the image plane side and the third and fourth groups G3 and G4 move from the image plane side to the object side, as indicated by arrows, while the first group G1 and stop S remain fixed.

Figure 79:
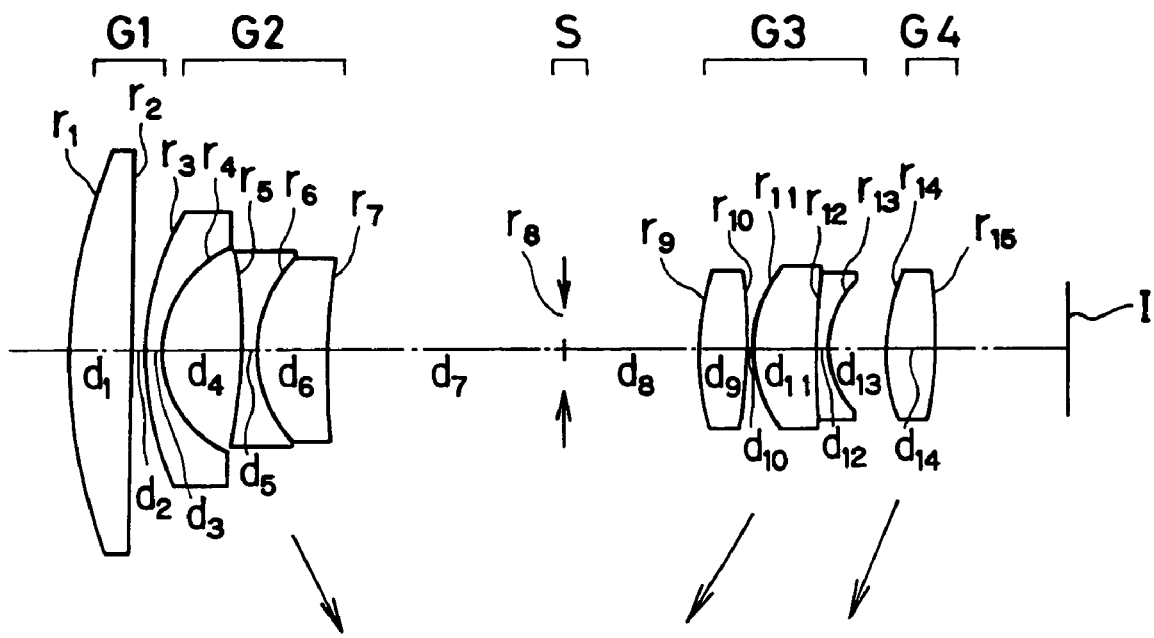
FIG. 79 is a sectional view of Example E' including its optical axis.

The system of Example E' consists of four lens groups G1 to G4. As shown in FIG. 79, the first group G1 consists of one convex lens, the second group G2 consists of a negative meniscus lens convex on its object side and a doublet composed of a double-concave lens and a positive meniscus lens convex on its object side, in the rear of which a stop S is located, the third group G3 consists of a double-convex lens and a doublet composed of a positive meniscus lens convex on its object side and a negative meniscus lens convex on its object side, and the fourth group G4 consists of one double-convex lens. Two aspherical surfaces are used, one at the surface of the lens in the third group G3, which is located nearest to the object side of the system, and another at the surface of the lens in the fourth group G4, which is located nearest to the object side of the system. For zooming from the wide-angle end to the telephoto end of the system, the second group G2 moves from the object side to the image plane side and the third and fourth groups G3 and G4 move from the image plane side to the object side with the separation between them becoming wide, as indicated by arrows, while the first group G1 and stop S remain fixed.

Figure 80:
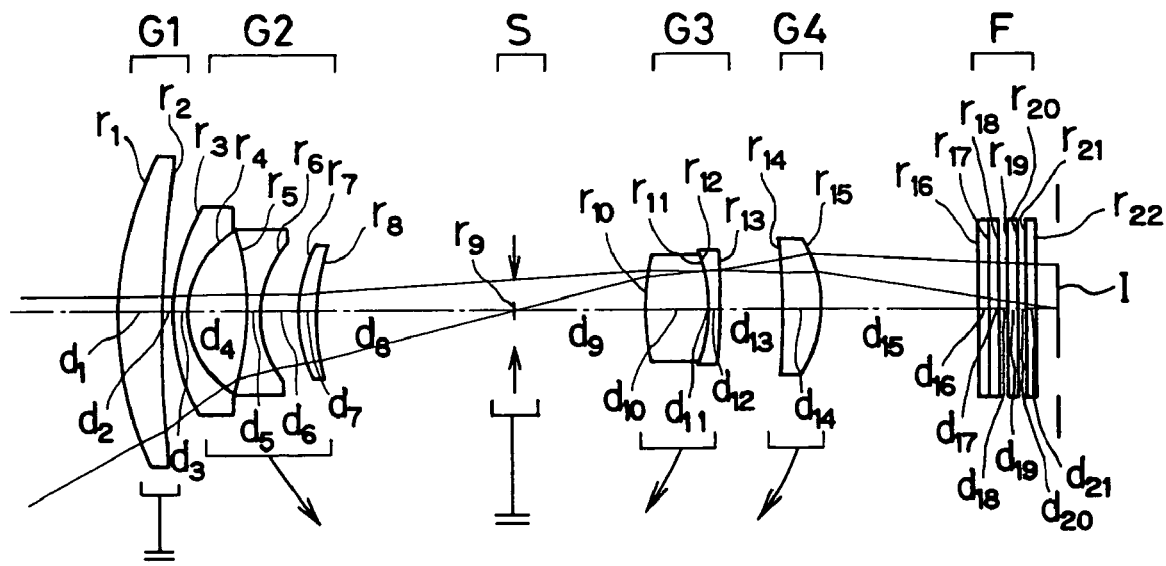
FIG. 80 is a sectional view of Example F' including its optical axis.

The system of Example F' consists of four groups G1 to G4. As shown in FIG. 80, the first group G1 consists of one positive lens convex on its object side, the second group G2 consists of a negative meniscus lens convex on its object side, a double-concave lens and a positive lens having a strong convex surface on its object side, in the rear of which there is a stop S, the third group G3 consists of a double-convex lens and a negative meniscus lens convex on its object side, and the fourth group G4 consists of one positive lens having a strong convex surface on its image plane side. One aspherical surface is used at the object-side surface of the positive lens in the fourth group G4. For zooming from the wide-angle end to the telephoto end of the system, the second group G2 moves from the object side to the image plane side and the third and fourth groups G3 and G4 move from the image plane side to the object side, as indicated by arrows, while the first group G1 and stop S remain fixed.

Figure 81:
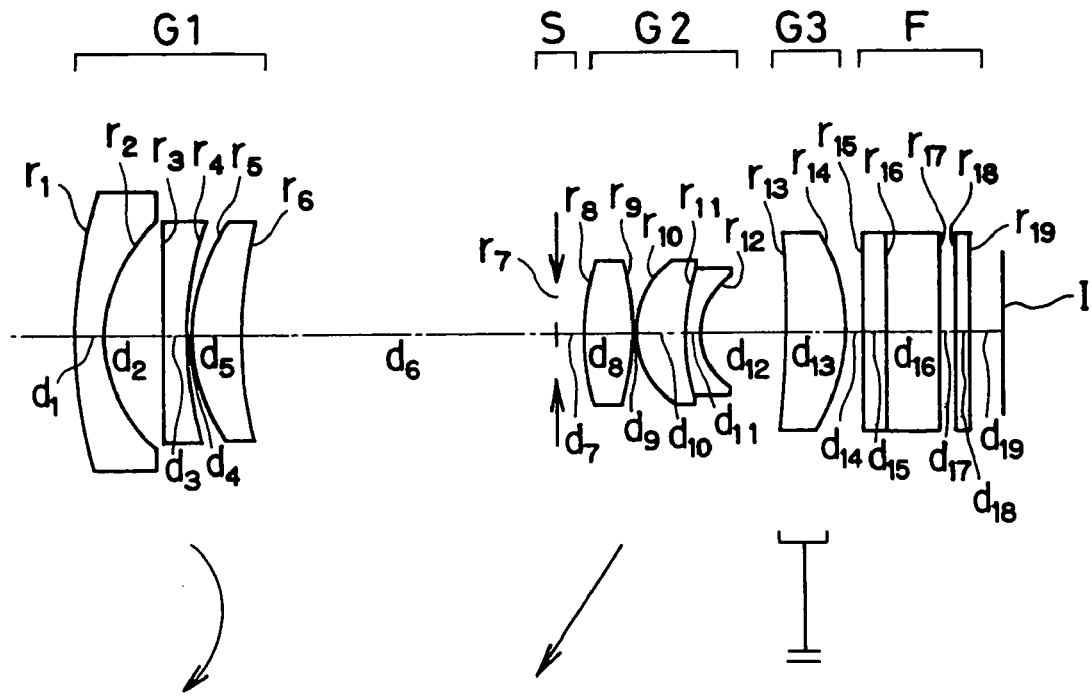
FIG. 81 is a sectional view of Example G' including its optical axis.

The system of Example G' consists of three groups G1 to G3. As shown in FIG. 81, the first group G1 consists of two negative meniscus lenses, each convex on its object side, and a positive meniscus lens having a strong convex surface on its object side, the second group G2 consists of a double-convex lens and a doublet composed of a positive meniscus lens having a strong convex surface on its object side and a negative meniscus lens having a strong concave surface on its image side, and the third group G3 consists of a positive meniscus lens having a strong convex surface on its image side. Two aspherical surfaces are used, one at the surface located nearest to the object side in the second group G2 and another at the image side-surface of the single lens in the third group G3. For zooming from the wide-angle end to the telephoto end of the system, the first group G1 first moves to the image side and then moves to the object side in a convex orbit while the third group G3 remains fixed, and the second group G2 moves together with the stop S from the image side to the object side, as indicated by arrows.

Enumerated below are numerical data about each example. The symbols used hereinafter but not referred to hereinbefore have the following meanings.

$F_{NO}$: F-number, $2\omega$: field angle (an effective diagonal field angle), p: pixel pitch, $r_1, r_2, \ldots$ : radius of curvature of each lens surface, $d_1, d_2, \ldots$ : separation between adjacent lenses, $n_{d1}, n_{d2}, \ldots$ : d-line refractive index of each lens, $n_{g1}, n_{g2}, \ldots$ : g-line refractive index of each lens, $n_{h1}, n_{h2}, \ldots$ : h-line refractive index of each lens, $\Delta\theta_{RN1}, \Delta\theta_{RN2}, \ldots$ : value of $\Delta\theta_{RN}$ of each lens, and $\nu_{d1}, \nu_{d2}, \ldots$ : d-line Abbe number of each lens.

The radii of curvature and separations are given by the mm unit. Here let x represent an optical axis provided that the direction of propagation of light is defined as positive and y represent the direction perpendicular to the optical axis. Then, aspherical configuration is given by $$x=(y^2/r)/[1+\{1-(K+1)(y/r)^2\}^{1/2}]+A_4y^4+A_6Y^6+A_8Y^8+A_{10}Y^{10}+A_{12}y^{12}$$

where r is the paraxial radius of curvature, K is the conical coefficient, and $A_4$, $A_6$, $A_8$, $A_{10}$ and $A_{12}$ are the fourth, sixth, eighth, tenth and twelfth spherical coefficients, respectively.

Example A' f = 5.55 mm
$F_{NO}$ = 2.88
$2\omega$ = 64.4°
p = 3.8 μm
d = 6.64 mm

| | | | |
|---|---|---|---|
| $r_1$ = 13.9598 | $d_1$ = 2.4200 | $n_{d1}$ = 1.84666 | $\nu_{d1}$ = 23.78 |
| $r_2$ = 56.3701 | $d_2$ = 0.2700 | | |
| $r_3$ = 7.6185 | $d_3$ = 0.8700 | $n_{d2}$ = 1.48749 | $\nu_{d2}$ = 70.21 |
| $r_4$ = 2.4917 | $d_4$ = 3.3154 | | |
| $r_5$ = ∞ (Stop) | $d_5$ = 1.0735 | | |
| $r_6$ = −8.2879 | $d_6$ = 0.8000 | $n_{d3}$ = 1.84666 | $\nu_{d3}$ = 23.78 |
| $r_7$ = 10.5000 | $d_7$ = 3.7900 | $n_{d4}$ = 1.72916 | $\nu_{d4}$ = 54.68 |
| $r_8$ = −5.2842 | $d_8$ = 0.1500 | | |
| $r_9$ = 9.8776 (Aspheric) | $d_9$ = 3.3700 | $n_{d5}$ = 1.56384 | $\nu_{d5}$ = 60.67 |
| $r_{10}$ = −13.3796 | $d_{10}$ = 2.7100 | | |
| $r_{11}$ = ∞ | $d_{11}$ = 2.3200 | $n_{d6}$ = 1.51633 | $\nu_{d6}$ = 64.14 |
| $r_{12}$ = ∞ | $d_{12}$ = 1.6000 | | |

-continued $$f = 5.55 \text{ mm}$$
$$F_{NO} = 2.88$$
$$2\omega = 64.4°$$
$$p = 3.8 \text{ μm}$$
$$d = 6.64 \text{ mm}$$

| | | | |
|---|---|---|---|
| $r_{13} = \infty$ | $d_{13} = 0.8000$ | $n_{d7} = 1.51633$ | $\nu_{d7} = 64.14$ |
| $r_{14} = \infty$ | $d_{14} = 1.0048$ | | |
| $r_{15} = \infty$ (Image plane) | | | |

| | | |
|---|---|---|
| $n_{g1} = 1.89419$ | $n_{h1} = 1.91428$ | $\Delta\theta_{RN1} = +0.0174$ |
| $n_{g2} = 1.49596$ | $n_{h2} = 1.49898$ | $\Delta\theta_{RN2} = +0.0022$ |
| $n_{g3} = 1.89419$ | $n_{h3} = 1.91428$ | $\Delta\theta_{RN3} = +0.0174$ |
| $n_{g4} = 1.74570$ | $n_{h4} = 1.75173$ | $\Delta\theta_{RN4} = -0.0086$ |
| $n_{g5} = 1.57532$ | $n_{h5} = 1.57947$ | $\Delta\theta_{RN5} = -0.0031$ |
| $n_{g6} = 1.52621$ | $n_{h6} = 1.52977$ | $\Delta\theta_{RN6} = -0.0024$ |
| $n_{g7} = 1.52621$ | $n_{h7} = 1.52977$ | $\Delta\theta_{RN7} = -0.0024$ |

Aspherical Coefficients

9th surface $K = 0$
$A_4 = -3.6930 \times 10^{-4}$
$A_6 = 7.0898 \times 10^{-7}$ Example B'

$$f = 9.88$$
$$F_{NO} = 2.8$$
$$2\omega = 59.12°$$
$$p = 3.9 \text{ μm}$$
$$d = 11$$

| | | | |
|---|---|---|---|
| $r_1 = 42.746$ | $d_1 = 1.80$ | $n_{d1} = 1.48749$ | $\nu_{d1} = 70.23$ |
| $r_2 = 9.841$ | $d_2 = 21.36$ | | |
| $r_3 = \infty$ (Stop) | $d_3 = 5.09$ | | |
| $r_4 = 96.670$ | $d_4 = 4.16$ | $n_{d2} = 1.69350$ | $\nu_{d2} = 53.20$ |
| $r_5 = -14.943$ (Aspheric) | $d_5 = 0.08$ | | |
| $r_6 = 9.051$ | $d_6 = 6.95$ | $n_{d3} = 1.62041$ | $\nu_{d3} = 60.29$ |
| $r_7 = -33.014$ | $d_7 = 0.98$ | $n_{d4} = 1.80518$ | $\nu_{d4} = 25.42$ |
| $r_8 = 5.859$ | $d_8 = 4.21$ | | |
| $r_9 = -51.618$ | $d_9 = 5.06$ | $n_{d5} = 1.58913$ | $\nu_{d5} = 61.28$ |
| $r_{10} = -7.361$ (Aspheric) | $d_{10} = 1.50$ | | |
| $r_{11} = \infty$ | $d_{11} = 1.00$ | $n_{d6} = 1.51633$ | $\nu_{d6} = 64.14$ |
| $r_{12} = \infty$ | $d_{12} = 1.60$ | $n_{d7} = 1.54771$ | $\nu_{d7} = 62.84$ |
| $r_{13} = \infty$ | | | |

| | | |
|---|---|---|
| $n_{g1} = 1.49596$ | $n_{h1} = 1.49898$ | $\Delta\theta_{RN1} = +0.0022$ |
| $n_{g2} = 1.70972$ | $n_{h2} = 1.71566$ | $\Delta\theta_{RN2} = -0.0081$ |
| $n_{g3} = 1.63315$ | $n_{h3} = 1.63778$ | $\Delta\theta_{RN3} = -0.0012$ |
| $n_{g4} = 1.84729$ | $n_{h4} = 1.86494$ | $\Delta\theta_{RN4} = +0.0158$ |
| $n_{g5} = 1.60103$ | $n_{h5} = 1.60535$ | $\Delta\theta_{RN5} = -0.0018$ |
| $n_{g6} = 1.52621$ | $n_{h6} = 1.52977$ | $\Delta\theta_{RN6} = -0.0024$ |
| $n_{g7} = 1.55843$ | $n_{h7} = 1.56226$ | $\Delta\theta_{RN7} = -0.0045$ |

Aspherical Coefficients

5th surface $K = 0$
$A_4 = 6.18542 \times 10^{-5}$
$A_6 = 3.07784 \times 10^{-7}$ 10th surface $K = 0$
$A_4 = 4.92151 \times 10^{-4}$
$A_6 = -3.57904 \times 10^{-6}$
$A_8 = 4.22919 \times 10^{-8}$ Example C'

$$f = 4.4182$$
$$F_{NO} = 2.4$$
$$2\omega = 80.9°$$
$$p = 3.8 \text{ μm or 3 μm}$$
$$d = 6.64$$

| | | | |
|---|---|---|---|
| $r_1 = 13.2550$ | $d_1 = 0.9000$ | $n_{d1} = 1.60311$ | $\nu_{d1} = 60.64$ |
| $r_2 = 7.0317$ | $d_2 = 1.0000$ | | |
| $r_3 = 12.0000$ (Aspheric) | $d_3 = 0.8000$ | $n_{d2} = 1.56384$ | $\nu_{d2} = 60.67$ |
| $r_4 = 4.9103$ | $d_4 = 4.6372$ | | |
| $r_5 = 7.9159$ | $d_5 = 1.1424$ | $n_{d3} = 1.84666$ | $\nu_{d3} = 23.78$ |
| $r_6 = \infty$ | $d_6 = 0.5000$ | | |
| $r_7 = \infty$ (Stop) | $d_7 = 1.8751$ | | |
| $r_8 = -3.7652$ | $d_8 = 1.0000$ | $n_{d4} = 1.80518$ | $\nu_{d4} = 25.42$ |
| $r_9 = 8.7546$ | $d_9 = 2.1667$ | $n_{d5} = 1.72916$ | $\nu_{d5} = 54.68$ |
| $r_{10} = -4.8805$ | $d_{10} = 0.1500$ | | |
| $r_{11} = 10.0186$ (Aspheric) | $d_{11} = 2.2298$ | $n_{d6} = 1.56384$ | $\nu_{d6} = 60.67$ |
| $r_{12} = -8.4667$ | $d_{12} = 2.3588$ | | |
| $r_{13} = \infty$ | $d_{13} = 1.9000$ | $n_{d7} = 1.51633$ | $\nu_{d7} = 64.14$ |
| $r_{14} = \infty$ | $d_{14} = 0.8000$ | $n_{d8} = 1.51633$ | $\nu_{d8} = 64.14$ |
| $r_{15} = \infty$ | $d_{15} = 1.2000$ | | |
| $r_{16} = \infty$ | $d_{16} = 0.7500$ | $n_{d9} = 1.48749$ | $\nu_{d9} = 70.23$ |
| $r_{17} = \infty$ | $d_{17} = 1.2200$ | | |
| $r_{18} = \infty$ (Image plane) | | | |

| | | |
|---|---|---|
| $n_{g1} = 1.61541$ | $n_{h1} = 1.61987$ | $\Delta\theta_{RN1} = -0.0019$ |
| $n_{g2} = 1.57532$ | $n_{h2} = 1.57947$ | $\Delta\theta_{RN2} = -0.0031$ |
| $n_{g3} = 1.89419$ | $n_{h3} = 1.91428$ | $\Delta\theta_{RN3} = +0.0174$ |
| $n_{g4} = 1.84729$ | $n_{h4} = 1.86494$ | $\Delta\theta_{RN4} = +0.0158$ |
| $n_{g5} = 1.74570$ | $n_{h5} = 1.75173$ | $\Delta\theta_{RN5} = -0.0086$ |
| $n_{g6} = 1.57532$ | $n_{h6} = 1.57947$ | $\Delta\theta_{RN6} = -0.0031$ |
| $n_{g7} = 1.52621$ | $n_{h7} = 1.52977$ | $\Delta\theta_{RN7} = -0.0024$ |
| $n_{g8} = 1.52621$ | $n_{h8} = 1.52977$ | $\Delta\theta_{RN8} = -0.0024$ |
| $n_{g9} = 1.49596$ | $n_{h9} = 1.49898$ | $\Delta\theta_{RN9} = +0.0022$ |

Aspherical Coefficients

3rd surface $K = 0$
$A_4 = 3.1698 \times 10^{-4}$
$A_6 = 6.1083 \times 10^{-5}$
$A_8 = -4.6332 \times 10^{-6}$
$A_{10} = -1.4286 \times 10^{-7}$ 11th surface $K = 0$
$A_4 = -1.0432 \times 10^{-3}$
$A_6 = -2.9351 \times 10^{-5}$
$A_8 = 4.2352 \times 10^{-6}$
$A_{10} = -1.8071 \times 10^{-7}$ Example D'

$$f = 9.099\sim18.100\sim35.998$$
$$F_{NO} = 2.008\sim2.065\sim2.481$$
$$2\omega = 68.4°\sim35.8°\sim18.6°$$
$$p = 3.5 \text{ μm}$$
$$d = 11$$

| | | | |
|---|---|---|---|
| $r_1 = 74.1213$ | $d_1 = 2.5000$ | $n_{d1} = 1.84666$ | $\nu_{d1} = 23.78$ |
| $r_2 = 45.2920$ | $d_2 = 7.6976$ | $n_{d2} = 1.61800$ | $\nu_{d2} = 63.33$ |
| $r_3 = 200.0000$ | $d_3 = 0.1500$ | | |
| $r_4 = 53.6322$ | $d_4 = 5.1636$ | $n_{d3} = 1.77250$ | $\nu_{d3} = 49.60$ |
| $r_5 = 160.3763$ | $d_5 = $ (Variable) | | |
| $r_6 = 86.4469$ | $d_6 = 1.8938$ | $n_{d4} = 1.77250$ | $\nu_{d4} = 49.60$ |
| $r_7 = 12.9947$ | $d_7 = 6.5582$ | | |

-continued $f = 9.099 \sim 18.100 \sim 35.998$
$F_{NO} = 2.008 \sim 2.065 \sim 2.481$
$2\omega = 68.4° \sim 35.8° \sim 18.6°$
$p = 3.5 \ \mu m$
$d = 11$

| | | | |
|---|---|---|---|
| $r_8 = -633.9388$ | $d_8 = 1.3849$ | $n_{d5} = 1.84666$ | $\nu_{d5} = 23.78$ |
| $r_9 = 53.5036$ | $d_9 = 3.0086$ | | |
| $r_{10} = -70.1852$ | $d_{10} = 1.3000$ | $n_{d6} = 1.48749$ | $\nu_{d6} = 70.21$ |
| $r_{11} = 19.4251$ | $d_{11} = 4.0971$ | $n_{d7} = 1.80518$ | $\nu_{d7} = 25.42$ |
| $r_{12} = 567.6091$ | $d_{12} =$ (Variable) | | |
| $r_{13} = \infty$ (Stop) | $d_{13} =$ (Variable) | | |
| $r_{14} = 35.5332$ | $d_{14} = 2.9155$ | $n_{d8} = 1.84666$ | $\nu_{d8} = 23.78$ |
| $r_{15} = 149.5334$ | $d_{15} = 1.9951$ | | |
| $r_{16} = 23.1874$ (Aspheric) | $d_{16} = 3.2540$ | $n_{d9} = 1.69350$ | $\nu_{d9} = 53.20$ |
| $r_{17} = -136.5790$ | $d_{17} = 0.1500$ | | |
| $r_{18} = 54.2006$ | $d_{18} = 1.1258$ | $n_{d10} = 1.80518$ | $\nu_{d10} = 25.42$ |
| $r_{19} = 17.2110$ | $d_{19} =$ (Variable) | | |
| $r_{20} = -12.6096$ | $d_{20} = 1.1000$ | $n_{d11} = 1.80518$ | $\nu_{d11} = 25.42$ |
| $r_{21} = -55.3792$ | $d_{21} = 3.1600$ | $n_{d12} = 1.61800$ | $\nu_{d12} = 63.33$ |
| $r_{22} = -15.6001$ | $d_{22} = 0.1500$ | | |
| $r_{23} = 74.9447$ | $d_{23} = 3.2661$ | $n_{d13} = 1.61800$ | $\nu_{d13} = 63.33$ |
| $r_{24} = -30.4739$ | $d_{24} = 0.1500$ | | |
| $r_{25} = 124.0475$ | $d_{25} = 2.5117$ | $n_{d14} = 1.69350$ | $\nu_{d14} = 53.20$ |
| $r_{26} = -68.0400$ (Aspheric) | $d_{26} =$ (Variable) | | |
| $r_{27} = \infty$ | $d_{27} = 24.0000$ | $n_{d15} = 1.51633$ | $\nu_{d15} = 64.14$ |
| $r_{28} = \infty$ | $d_{28} = 1.0000$ | | |
| $r_{29} = \infty$ | $d_{29} = 1.5700$ | $n_{d16} = 1.54771$ | $\nu_{d16} = 62.84$ |
| $r_{30} = \infty$ | $d_{30} = 1.0000$ | | |
| $r_{31} = \infty$ | $d_{31} = 0.8000$ | $n_{d17} = 1.51823$ | $\nu_{d17} = 58.96$ |
| $r_{32} = \infty$ | | | |

| | | |
|---|---|---|
| $n_{g1} = 1.89419$ | $n_{h1} = 1.91428$ | $\Delta\theta_{RN1} = +0.0174$ |
| $n_{g2} = 1.63010$ | $n_{h2} = 1.63451$ | $\Delta\theta_{RN2} = +0.0051$ |
| $n_{g3} = 1.79197$ | $n_{h3} = 1.79917$ | $\Delta\theta_{RN3} = -0.0092$ |
| $n_{g4} = 1.79197$ | $n_{h4} = 1.79917$ | $\Delta\theta_{RN4} = -0.0092$ |
| $n_{g5} = 1.89419$ | $n_{h5} = 1.91428$ | $\Delta\theta_{RN5} = +0.0174$ |
| $n_{g6} = 1.49596$ | $n_{h6} = 1.49898$ | $\Delta\theta_{RN6} = +0.0022$ |
| $n_{g7} = 1.84729$ | $n_{h7} = 1.86494$ | $\Delta\theta_{RN7} = +0.0158$ |
| $n_{g8} = 1.89419$ | $n_{h8} = 1.91428$ | $\Delta\theta_{RN8} = +0.0174$ |
| $n_{g9} = 1.70972$ | $n_{h9} = 1.71566$ | $\Delta\theta_{RN9} = -0.0081$ |
| $n_{g10} = 1.84729$ | $n_{h10} = 1.86494$ | $\Delta\theta_{RN10} = +0.0158$ |
| $n_{g11} = 1.84729$ | $n_{h11} = 1.86494$ | $\Delta\theta_{RN11} = +0.0158$ |
| $n_{g12} = 1.63010$ | $n_{h12} = 1.63451$ | $\Delta\theta_{RN12} = +0.0051$ |
| $n_{g13} = 1.63010$ | $n_{h13} = 1.63451$ | $\Delta\theta_{RN13} = +0.0051$ |
| $n_{g14} = 1.70972$ | $n_{h14} = 1.71566$ | $\Delta\theta_{RN14} = -0.0081$ |
| $n_{g15} = 1.52621$ | $n_{h15} = 1.52977$ | $\Delta\theta_{RN15} = -0.0024$ |
| $n_{g16} = 1.55843$ | $n_{h16} = 1.56226$ | $\Delta\theta_{RN16} = -0.0045$ |
| $n_{g17} = 1.52915$ | $n_{h17} = 1.53314$ | $\Delta\theta_{RN17} = +0.0035$ |

Zooming Spaces

| | f | | |
|---|---|---|---|
| | 9.099 | 18.100 | 35.998 |
| $d_5$ | 1.006 | 18.105 | 28.360 |
| $d_{12}$ | 28.950 | 11.850 | 1.597 |
| $d_{13}$ | 12.005 | 9.317 | 1.499 |
| $d_{19}$ | 7.213 | 7.088 | 10.629 |
| $d_{26}$ | 1.500 | 4.313 | 8.589 |

Aspherical Coefficients

16th surface $K = 0$
$A_4 = -1.3659 \times 10^{-5}$
$A_6 = -5.3156 \times 10^{-9}$
$A_8 = -2.4548 \times 10^{-11}$
$A_{10} = 2.2544 \times 10^{-12}$ -continued $f = 9.099 \sim 18.100 \sim 35.998$
$F_{NO} = 2.008 \sim 2.065 \sim 2.481$
$2\omega = 68.4° \sim 35.8° \sim 18.6°$
$p = 3.5 \ \mu m$
$d = 11$ 26th surface $K = 0$
$A_4 = 6.6763 \times 10^{-6}$
$A_6 = 3.7977 \times 10^{-8}$
$A_8 = -4.9995 \times 10^{-10}$
$A_{10} = 2.3437 \times 10^{-12}$ Example E'

$f = 6.608 \sim 11.270 \sim 19.098$
$F_{NO} = 2.03 \sim 2.36 \sim 2.91$
$p = 3.9 \ \mu m \ or \ 3.2 \ \mu m$
$d = 8$

| | | | |
|---|---|---|---|
| $r_1 = 36.688$ | $d_1 = 4.14$ | $n_{d1} = 1.48749$ | $\nu_{d1} = 70.23$ |
| $r_2 = \infty$ | $d_2 =$ (Variable) | | |
| $r_3 = 21.750$ | $d_3 = 1.25$ | $n_{d2} = 1.84666$ | $\nu_{d2} = 23.78$ |
| $r_4 = 8.054$ | $d_4 = 5.45$ | | |
| $r_5 = -27.511$ | $d_5 = 1.00$ | $n_{d3} = 1.48749$ | $\nu_{d3} = 70.23$ |
| $r_6 = 10.412$ | $d_6 = 4.50$ | $n_{d4} = 1.84666$ | $\nu_{d4} = 23.78$ |
| $r_7 = 40.550$ | $d_7 =$ (Variable) | | |
| $r_8 = \infty$ (Stop) | $d_8 =$ (Variable) | | |
| $r_9 = 17.583$ (Aspheric) | $d_9 = 3.42$ | $n_{d5} = 1.58913$ | $\nu_{d5} = 61.30$ |
| $r_{10} = -35.670$ | $d_{10} = 0.20$ | | |
| $r_{11} = 9.390$ | $d_{11} = 4.35$ | $n_{d6} = 1.77250$ | $\nu_{d6} = 49.60$ |
| $r_{12} = 87.943$ | $d_{12} = 0.90$ | $n_{d7} = 1.84666$ | $\nu_{d7} = 23.78$ |
| $r_{13} = 6.609$ | $d_{13} =$ (Variable) | | |
| $r_{14} = 13.553$ (Aspheric) | $d_{14} = 3.28$ | $n_{d8} = 1.58913$ | $\nu_{d8} = 61.30$ |
| $r_{15} = -30.808$ | | | |

| | | |
|---|---|---|
| $n_{g1} = 1.49596$ | $n_{h1} = 1.49898$ | $\Delta\theta_{RN1} = +0.0022$ |
| $n_{g2} = 1.89419$ | $n_{h2} = 1.91428$ | $\Delta\theta_{RN2} = +0.0174$ |
| $n_{g3} = 1.49596$ | $n_{h3} = 1.49898$ | $\Delta\theta_{RN3} = +0.0022$ |
| $n_{g4} = 1.89419$ | $n_{h4} = 1.91428$ | $\Delta\theta_{RN4} = +0.0174$ |
| $n_{g5} = 1.60103$ | $n_{h5} = 1.60535$ | $\Delta\theta_{RN5} = -0.0018$ |
| $n_{g6} = 1.79197$ | $n_{h6} = 1.79917$ | $\Delta\theta_{RN6} = -0.0092$ |
| $n_{g7} = 1.89419$ | $n_{h7} = 1.91428$ | $\Delta\theta_{RN7} = +0.0174$ |
| $n_{g8} = 1.60103$ | $n_{h8} = 1.60535$ | $\Delta\theta_{RN8} = -0.0018$ |

Zooming Spaces

| | f | | |
|---|---|---|---|
| | 6.608 | 11.270 | 19.098 |
| $d_2$ | 1.00 | 9.66 | 15.80 |
| $d_7$ | 16.20 | 7.55 | 1.50 |
| $d_8$ | 8.66 | 5.46 | 1.50 |
| $d_{13}$ | 3.46 | 5.00 | 5.71 |

Aspherical Coefficients

9th surface $K = 0.000$
$A_4 = -4.66054 \times 10^{-5}$
$A_6 = -1.33346 \times 10^{-6}$
$A_8 = 6.88261 \times 10^{-8}$ -continued $$f = 6.608 \sim 11.270 \sim 19.098$$
$$F_{NO} = 2.03 \sim 2.36 \sim 2.91$$
$$p = 3.9 \text{ μm or } 3.2 \text{ μm}$$
$$d = 8$$

$A_{10} = -1.18171 \times 10^{-9}$
$A_{12} = 1.21868 \times 10^{-12}$
14th surface $K = 0.000$
$A_4 = -9.93375 \times 10^{-5}$
$A_6 = -9.76311 \times 10^{-7}$
$A_8 = 3.21037 \times 10^{-7}$
$A_{10} = -1.95172 \times 10^{-8}$
$A_{12} = 3.74139 \times 10^{-10}$

Example F'

$$f = 9.000 \sim 15.590 \sim 27.000$$
$$F_{NO} = 2.800 \sim 3.030 \sim 4.069$$
$$2\omega = 67.094° \sim 39.462° \sim 23.030°$$
$$p = 6.7 \text{ μm or } 4 \text{ μm}$$
$$d = 11$$

| | | | |
|---|---|---|---|
| $r_1 = 44.5137$ | $d_1 = 4.4000$ | $n_{d1} = 1.69680$ | $v_{d1} = 55.53$ |
| $r_2 = 137.7320$ | $d_2 =$ (Variable) | | |
| $r_3 = 23.5602$ | $d_3 = 1.6000$ | $n_{d2} = 1.69680$ | $v_{d2} = 55.53$ |
| $r_4 = 12.0406$ | $d_4 = 5.7412$ | | |
| $r_5 = -54.8255$ | $d_5 = 1.5000$ | $n_{d3} = 1.56384$ | $v_{d3} = 60.70$ |
| $r_6 = 13.6238$ | $d_6 = 3.8135$ | | |
| $r_7 = 16.0196$ | $d_7 = 2.2000$ | $n_{d4} = 1.84666$ | $v_{d4} = 23.78$ |
| $r_8 = 23.3091$ | $d_8 =$ (Variable) | | |
| $r_9 = \infty$ (Stop) | $d_9 =$ (Variable) | | |
| $r_{10} = 31.1300$ | $d_{10} = 6.5179$ | $n_{d5} = 1.77250$ | $v_{d5} = 49.60$ |
| $r_{11} = -15.0403$ | $d_{11} = 0.1939$ | | |
| $r_{12} = -13.3787$ | $d_{12} = 0.8893$ | $n_{d6} = 1.84666$ | $v_{d6} = 23.78$ |
| $r_{13} = -65.0570$ (Variable) | $d_{13} =$ | | |
| $r_{14} = -2370.3961$ (Aspheric) | $d_{14} = 4.3000$ | $n_{d7} = 1.49241$ | $v_{d7} = 57.66$ |
| $r_{15} = -14.2694$ | $d_{15} =$ (Variable) | | |
| $r_{16} = \infty$ | $d_{16} = 1.1400$ | $n_{d8} = 1.54771$ | $v_{d8} = 62.84$ |
| $r_{17} = \infty$ | $d_{17} = 0.8100$ | $n_{d9} = 1.54771$ | $v_{d9} = 62.84$ |
| $r_{18} = \infty$ | $d_{18} = 1.0000$ | | |
| $r_{19} = \infty$ | $d_{19} = 1.0000$ | $n_{d10} = 1.48749$ | $v_{d10} = 70.23$ |
| $r_{20} = \infty$ | $d_{20} = 1.0000$ | | |
| $r_{21} = \infty$ | $d_{21} = 0.8000$ | $n_{d11} = 1.51823$ | $v_{d11} = 58.96$ |
| $r_{22} = \infty$ | | | |

| | | |
|---|---|---|
| $n_{g1} = 1.71234$ | $n_{h1} = 1.71800$ | $\Delta\theta_{RN1} = -0.0082$ |
| $n_{g2} = 1.71234$ | $n_{h2} = 1.71800$ | $\Delta\theta_{RN2} = -0.0082$ |
| $n_{g3} = 1.57532$ | $n_{h3} = 1.57947$ | $\Delta\theta_{RN3} = -0.0031$ |
| $n_{g4} = 1.89419$ | $n_{h4} = 1.91428$ | $\Delta\theta_{RN4} = +0.0174$ |
| $n_{g5} = 1.79197$ | $n_{h5} = 1.79917$ | $\Delta\theta_{RN5} = -0.0092$ |
| $n_{g6} = 1.89419$ | $n_{h6} = 1.91428$ | $\Delta\theta_{RN6} = +0.0174$ |
| $n_{g7} = 1.50320$ | $n_{h7} = 1.50713$ | $\Delta\theta_{RN7} = +0.0104$ |
| $n_{g8} = 1.55843$ | $n_{h8} = 1.56226$ | $\Delta\theta_{RN8} = -0.0045$ |
| $n_{g9} = 1.55843$ | $n_{h9} = 1.56226$ | $\Delta\theta_{RN9} = -0.0045$ |
| $n_{g10} = 1.49596$ | $n_{h10} = 1.49898$ | $\Delta\theta_{RN10} = +0.0022$ |
| $n_{g11} = 1.52915$ | $n_{h11} = 1.53314$ | $\Delta\theta_{RN11} = +0.0035$ |

Zooming Spaces

| | f | | |
|---|---|---|---|
| | 9.000 | 15.590 | 27.000 |
| $d_2$ | 1.000 | 13.349 | 18.974 |
| $d_8$ | 20.474 | 8.125 | 2.500 |
| $d_9$ | 13.221 | 9.796 | 2.000 |

-continued $$f = 9.000 \sim 15.590 \sim 27.000$$
$$F_{NO} = 2.800 \sim 3.030 \sim 4.069$$
$$2\omega = 67.094° \sim 39.462° \sim 23.030°$$
$$p = 6.7 \text{ μm or } 4 \text{ μm}$$
$$d = 11$$

| | | | |
|---|---|---|---|
| $d_{13}$ | 6.416 | 6.356 | 7.516 |
| $d_{15}$ | 15.209 | 18.694 | 25.330 |

Aspherical Coefficients

14th surface $K = 0.0000$
$A_4 = -7.8946 \times 10^{-5}$
$A_6 = 3.2441 \times 10^{-8}$
$A_8 = -1.6090 \times 10^{-9}$
$A_{10} = 1.6631 \times 10^{-11}$

Example G'

$$f = 4.5 \sim 8.7 \sim 12.9$$
$$F_{NO} = 2.8 \sim 3.9 \sim 5.0$$
$$2\omega = 58° \sim 32° \sim 21.9°$$
$$p = 3.0 \text{ μm}$$
$$d = 5.0$$

| | | | |
|---|---|---|---|
| $r_1 = 21.9050$ | $d_1 = 1.0000$ | $n_{d1} = 1.79952$ | $v_{d1} = 42.22$ |
| $r_2 = 5.4876$ | $d_2 = 1.9041$ | | |
| $r_3 = 133.8501$ | $d_3 = 0.9000$ | $n_{d2} = 1.79952$ | $v_{d2} = 42.22$ |
| $r_4 = 12.6430$ | $d_4 = 0.2000$ | | |
| $r_5 = 7.5698$ | $d_5 = 1.5775$ | $n_{d3} = 1.84666$ | $v_{d3} = 23.78$ |
| $r_6 = 19.3947$ | $d_6 =$ (Variable) | | |
| $r_7 = \infty$ (Stop) | $d_7 = 1.0000$ | | |
| $r_8 = 11.9178$ (Aspheric) | $d_8 = 1.6467$ | $n_{d4} = 1.58913$ | $v_{d4} = 61.14$ |
| $r_9 = -11.0083$ | $d_9 = 0.3000$ | | |
| $r_{10} = 3.5308$ | $d_{10} = 1.5734$ | $n_{d5} = 1.72916$ | $v_{d5} = 54.68$ |
| $r_{11} = 7.2012$ | $d_{11} = 0.5000$ | $n_{d6} = 1.80518$ | $v_{d6} = 25.42$ |
| $r_{12} = 2.5388$ | $d_{12} =$ (Variable) | | |
| $r_{13} = -24.9058$ | $d_{13} = 2.0739$ | $n_{d7} = 1.58913$ | $v_{d7} = 61.14$ |
| $r_{14} = -5.9760$ (Aspheric) | $d_{14} = 0.5000$ | | |
| $r_{15} = \infty$ | $d_{15} = 0.8000$ | $n_{d8} = 1.51633$ | $v_{d8} = 61.14$ |
| $r_{16} = \infty$ | $d_{16} = 1.8000$ | $n_{d9} = 1.54771$ | $v_{d9} = 62.84$ |
| $r_{17} = \infty$ | $d_{17} = 0.5000$ | | |
| $r_{18} = \infty$ | $d_{18} = 0.5000$ | $n_{d10} = 1.51633$ | $v_{d10} = 64.14$ |
| $r_{19} = \infty$ | $d_{19} = 1.2000$ | | |
| $r_{20} = \infty$ (Image plane) | | | |

| | | |
|---|---|---|
| $n_{g1} = 1.82355$ | $n_{h1} = 1.83271$ | $\Delta\theta_{RN1} = -0.0060$ |
| $n_{g2} = 1.82355$ | $n_{h2} = 1.83271$ | $\Delta\theta_{RN2} = -0.0060$ |
| $n_{g3} = 1.89419$ | $n_{h3} = 1.91428$ | $\Delta\theta_{RN3} = +0.0174$ |
| $n_{g4} = 1.60103$ | $n_{h4} = 1.60535$ | $\Delta\theta_{RN4} = -0.0018$ |
| $n_{g5} = 1.74570$ | $n_{h5} = 1.75173$ | $\Delta\theta_{RN5} = -0.0086$ |
| $n_{g6} = 1.84729$ | $n_{h6} = 1.86494$ | $\Delta\theta_{RN6} = +0.0158$ |
| $n_{g7} = 1.60103$ | $n_{h7} = 1.60535$ | $\Delta\theta_{RN7} = -0.0018$ |
| $n_{g8} = 1.52621$ | $n_{h8} = 1.52977$ | $\Delta\theta_{RN8} = -0.0024$ |

-continued $$f = 4.5\sim8.7\sim12.9$$
$$F_{NO} = 2.8\sim3.9\sim5.0$$
$$2\omega = 58°\sim32°\sim21.9°$$
$$p = 3.0 \text{ μm}$$
$$d = 5.0$$

| $n_{g9} = 1.55843$ | $n_{h9} = 1.56226$ | $\Delta\theta_{RN9} = -0.0045$ |
|---|---|---|
| $n_{g10} = 1.52621$ | $n_{h10} = 1.52977$ | $\Delta\theta_{RN10} = -0.0024$ |

Zooming Spaces

| | f | | |
|---|---|---|---|
| | 4.5 | 8.7 | 12.9 |
| $d_6$ | 11.0529 | 3.9900 | 1.5000 |
| $d_{12}$ | 3.0000 | 7.7712 | 12.5423 |

Aspherical Coefficients

8th surface

Figure 82:
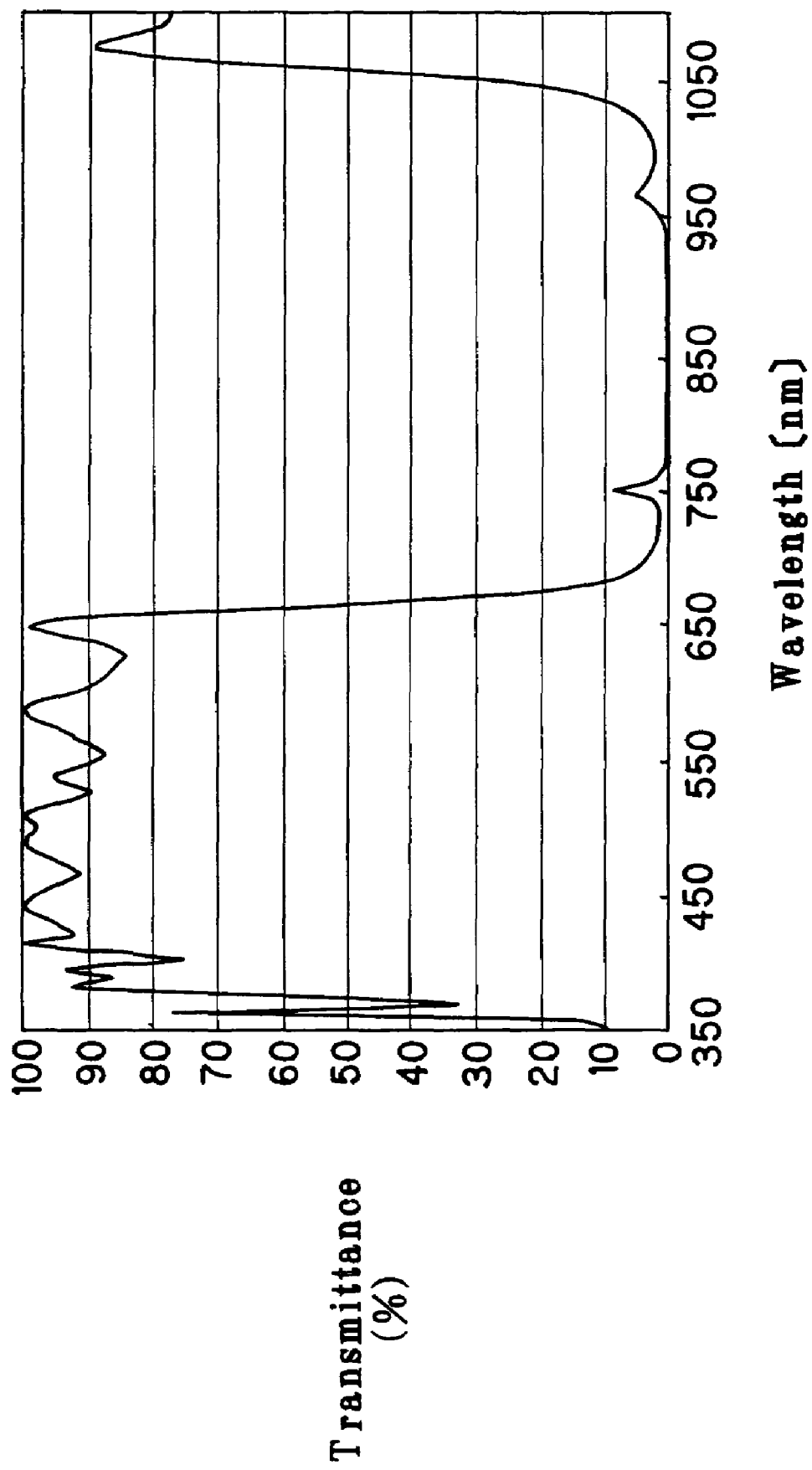
FIG. 82 is a diagram illustrative of the spectral transmittance of one embodiment of an IR cutoff filter usable in the fourth aspect of the invention.
Figure 83:
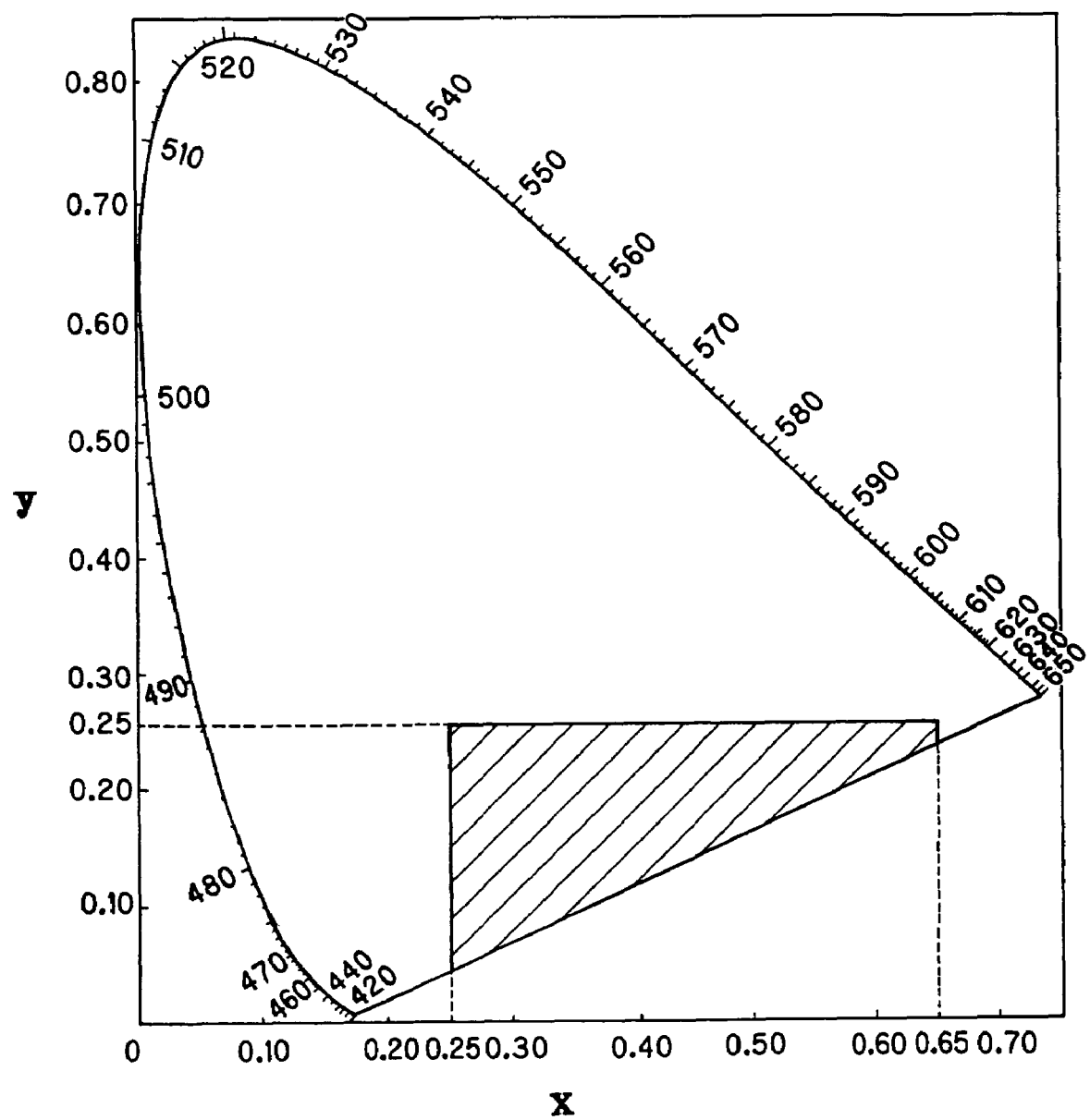
FIG. 83 is an x-y chromaticity diagram illustrative of a color range wherein color running occurs in each of the embodiments of the invention.
Figure 84:
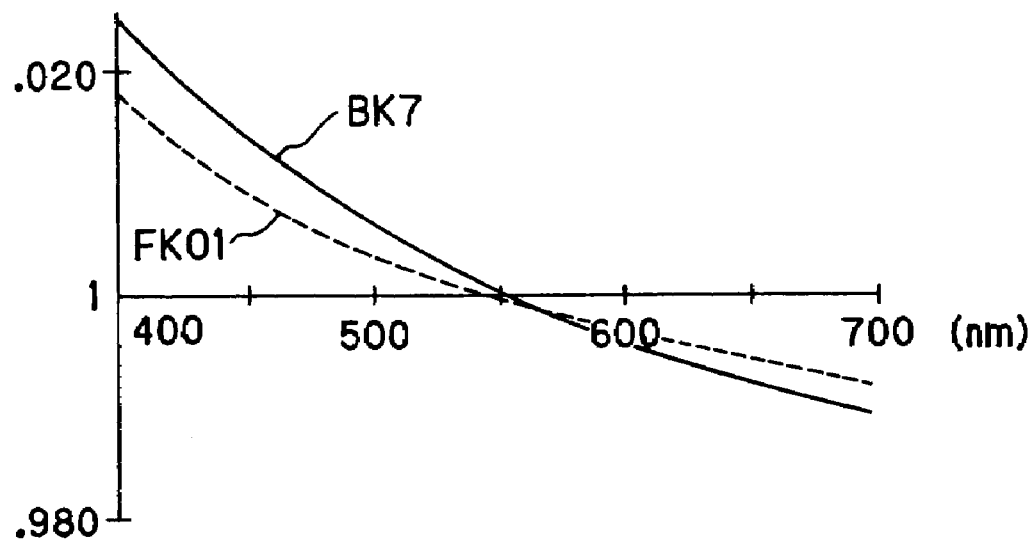
FIG. 84 is a diagram illustrative of changes in the index of refraction of a single lens due to wavelengths provided that the index of refraction of the single lens becomes 1 at 550-nm wavelength.
Figure 85:
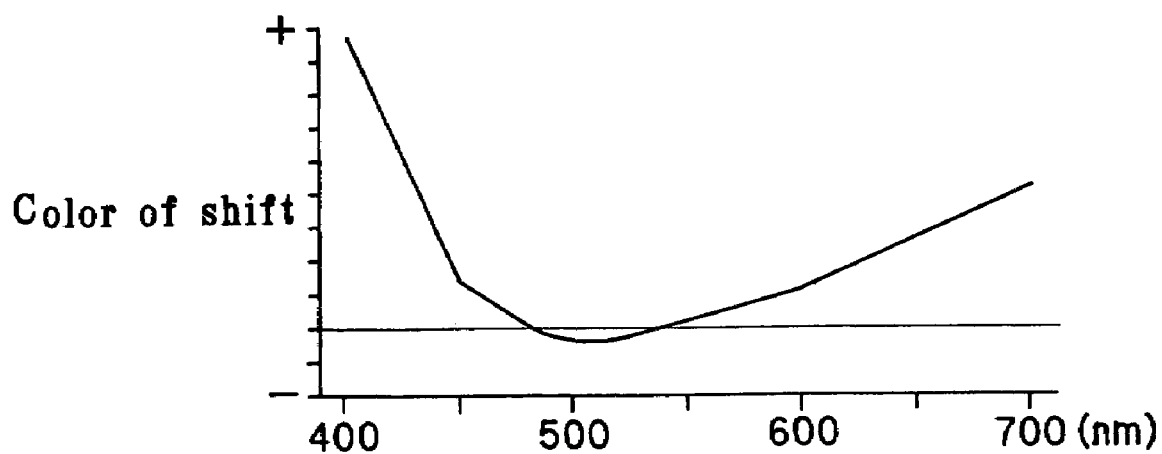
FIG. 85 is a diagram illustrative of the amount of a back focal position displacement with respect to wavelengths of an optical system comprising only a general refracting type optical elements, said amount being on the basis of 500 nm.

K = 0.0000
$A_4 = -6.2411 \times 10^{-4}$
$A_6 = -8.9699 \times 10^{-7}$
$A_8 = -2.7168 \times 10^{-8}$
$A_{10} = 5.6463 \times 10^{-9}$ 14th surface K = 0.0000
$A_4 = 1.3371 \times 10^{-3}$
$A_6 = -3.0850 \times 10^{-5}$
$A_8 = 1.0398 \times 10^{-9}$
$A_{10} = 1.5028 \times 10^{-7}$ For the filter used with the image pickup system of the present invention and having such an infrared cutoff function as shown in FIG. 65, for instance, a 27-layered IR cutoff filter having such spectral characteristics as shown in FIG. 82 may be used. Set out below are data about such multilayered coating. This filter comprises a plane-parallel plate substrate having a refractive index of 1.52, on which 27 layers of $Al_2O_3$, $TiO_2$ and $SiO_2$ are laminated in the following order. Design wavelength λ is 780 nm.

| Film Order Substrate | Material | Thickness | Thickness Relative To λ/4 |
|---|---|---|---|
| 1 | $Al_2O_3$ | 58.96 | 0.50 |
| 2 | $TiO_2$ | 84.19 | 1.00 |
| 3 | $SiO_2$ | 134.14 | 1.00 |
| 4 | $TiO_2$ | 84.19 | 1.00 |
| 5 | $SiO_2$ | 134.14 | 1.00 |
| 6 | $TiO_2$ | 84.19 | 1.00 |
| 7 | $SiO_2$ | 134.14 | 1.00 |
| 8 | $TiO_2$ | 84.19 | 1.00 |
| 9 | $SiO_2$ | 134.14 | 1.00 |
| 10 | $TiO_2$ | 84.19 | 1.00 |
| 11 | $SiO_2$ | 134.14 | 1.00 |
| 12 | $TiO_2$ | 84.19 | 1.00 |
| 13 | $SiO_2$ | 134.14 | 1.00 |
| 14 | $TiO_2$ | 84.19 | 1.00 |
| 15 | $SiO_2$ | 178.41 | 1.33 |
| 16 | $TiO_2$ | 101.03 | 1.21 |
| 17 | $SiO_2$ | 167.67 | 1.25 |
| 18 | $TiO_2$ | 96.82 | 1.15 |
| 19 | $SiO_2$ | 147.55 | 1.05 |
| 20 | $TiO_2$ | 84.19 | 1.00 |
| 21 | $SiO_2$ | 160.97 | 1.20 |
| 22 | $TiO_2$ | 84.19 | 1.00 |
| 23 | $SiO_2$ | 154.26 | 1.15 |
| 24 | $TiO_2$ | 95.13 | 1.13 |
| 25 | $SiO_2$ | 160.97 | 1.20 |
| 26 | $TiO_2$ | 99.34 | 1.18 |
| 27 | $SiO_2$ | 87.19 | 0.65 |
| Air | | | |

Values for conditions (41) to (45-5) and other parameter values in the aforesaid embodiments and examples A' to G' are given below.

| | Example A' | Example B' | Example C' | Example D' |
|---|---|---|---|---|
| (41) p/d | $5.72 \times 10^{-4}$ | $3.55 \times 10^{-4}$ | $5.72 \times 10^{-4}$ or $4.52 \times 10^{-4}$ | $3.18 \times 10^{-4}$ |

| | Example E' | Example F' | Example G' |
|---|---|---|---|
| | $4.88 \times 10^{-4}$ or $4.00 \times 10^{-4}$ | $6.09 \times 10^{-4}$ or $3.64 \times 10^{-4}$ | $6.00 \times 10^{-4}$ |

| | Embodiments (for phototaking lens 301 and filter 302) | |
|---|---|---|
| (42), (43) | $T_{700}$ | 0.02 |
| | $T_{600}$ | 0.79 |
| | $T_{400}$ | 0.45 |
| (44) | $S_{600}$ | 66% |
| | $S_{650}$ | 7% |
| | $S_P$ | 87% |
| | $(S_{600} - S_{650})/S_P$ | 0.68 |
| (45-1) | $G_P$ | 532 nm |
| (45-2) | $Y_P - G_P$ | 539 − 532 = 7 nm |
| (45-3) | $C_P - G_P$ | 505 − 532 = −27 nm |
| (45-4) | $M_{P1}$ | 455 nm |
| (45-5) | $M_{P2}$ | 613 nm |

| Strength with respect to peak at 530 nm (for color filter alone) | | | |
|---|---|---|---|
| Ye | M | C | G |
| 0.96 | 0.25 | 0.80 | 0.71 |

FIG. 65

| 600-nm transmittance | 96% |
|---|---|
| 700-nm transmittance | 0% |

FIG. 82

| 600-nm transmittance | 92% |
|---|---|
| 700-nm transmittance | 2% |

While the present invention has been explained with reference to a variety of embodiments, it is understood that the invention is in no sense limited to these embodiments; the constructions of the aforesaid embodiments may be combined with one another or modified in various manners.

As can be seen from the foregoing explanations, the present invention can provide an image pickup system and an image pickup optical system which, albeit being simplified in construction, enable the images of a wide range of natural subjects to be satisfactorily reproduced with substantially reduced color flares.

I claim:

1. An image pickup optical system that forms a subject image on an electronic image pickup device and optically reduces color flares due to chromatic aberrations, the image pickup optical system comprising:

at least one optical element configured to receive a light beam; and a wavelength correction element configured to control spectral characteristics of the received light beam;

wherein the wavelength correction element is configured such that:

a wavelength contributing to color flares, $\mu 1$, is allowed to exist within a wavelength range of d-line or shorter, and a wavelength $\lambda c$ whose transmittance is a half value of d-line transmittance satisfies the following condition (14):

$$\lambda 1 \leq \lambda c \leq d\text{-line}(587.56 \text{ nm}); \quad (14)$$

where $\mu 1$ satisfies the following condition (13):

$$(L\lambda - Ld)/F_{min} = 0.05 \text{ mm}; \quad (13)$$

where $F_{min}$ is the minimum F-number of said optical system, $L\lambda$ is the absolute value of spherical aberrations for a marginal ray at an arbitrary wavelength k, and Ld is the absolute value of spherical aberration for a d-line (587.56 nm) marginal ray when the F-number is $F_{min}$.

2. The image pickup optical system according claim 1, wherein the wavelength correction element comprises coated films applied on planes.

3. The image pickup optical system according to claim 1, wherein the wavelength correction element comprises a low pass filter and a wavelength-correcting coating is applied on at least one surface of said low pass filter.

4. The image pickup optical system according to claim 1, wherein the wavelength correction element comprises an infrared cutoff filter for reducing an infrared light component and a wavelength correcting coating is applied on at least one surface of said infrared cutoff filter.

5. The image pickup optical system according to claim 1, wherein coating is carried out in such a way that the wavelength whose transmittance is a half value of d-line transmittance exists between g line and h-line, and between 600 nm and 700 nm.

6. The image pickup optical system according to claim 1, wherein an optical path splitter means is located in an optical path of the image pickup optical system to locate a wavelength correcting element on only an optical path side, which has an image pickup area whose g-line sensitivity is 300 or more of e line sensitivity and is positioned on the side of the image pickup device.

7. The image pickup optical system according to claim 6, wherein an observation optical path leading to an observer's eyeball is defined by one of optical paths obtained by said optical path splitter means.

8. The image pickup optical system according to claim 1, further comprising an optical element taking part in the determination of a focal length in said image pickup optical system is made up of an optical element making use of a refraction phenomenon alone.

9. The image pickup optical system according to claim 1, wherein an electronic image pickup device having three or more different spectral sensitivity characteristics so as to obtain a color image is located at a back focal position of said image pickup optical system.

10. The image pickup optical system according to claim 1, wherein at least one of the three or more different spectral sensitivity characteristics the electronic image pickup device has so as to obtain a color image has two high peak wavelengths, between which there is a wavelength having a 50% or less sensitivity to both peak wavelengths.

* * * * *

UNITED STATES PATENT AND TRADEMARK OFFICE
CERTIFICATE OF CORRECTION

PATENT NO.        : 7,605,859 B2                                                                                 Page 1 of 1
APPLICATION NO. : 11/543855
DATED             : October 20, 2009
INVENTOR(S)       : Shinichi Mihara et al.

It is certified that error appears in the above-identified patent and that said Letters Patent is hereby corrected as shown below:

On title page, item 75 Inventors
    please add the following inventors names:

Hisashi Goto, Imagawa, Tokyo; Yuji Miyauchi, Machida-shi, Tokyo; Toyoharu Hanzawa, Mitaka-shi,
    Tokyo; Masahiro Imamura, Hachioji-shi, Tokyo; Yuko Kobayashi, Hachioji-shi, Tokyo; Tsutomu
    Uzawa, Hidaka-shi, Saitama; Toshihide Nozawa, Hachioji-shi, Tokyo; Takuji Horie, Machida-shi,
    Tokyo; Kouki Hozumi, Hachioji-shi, Tokyo Signed and Sealed this Twenty-sixth Day of January, 2010

David J. Kappos
*Director of the United States Patent and Trademark Office*